United States Patent
Sakajo et al.

(10) Patent No.: US 10,565,321 B2
(45) Date of Patent: Feb. 18, 2020

(54) FLUID TRANSITION ROUTE ACQUISITION APPARATUS, FLUID TRANSITION ROUTE ACQUISITION METHOD, AND PROGRAM

(71) Applicant: Japan Science and Technology Agency, Kawaguchi-shi, Saitama (JP)

(72) Inventors: Takashi Sakajo, Kyoto (JP); Tomoo Yokoyama, Kyoto (JP)

(73) Assignee: JAPAN SCIENCE AND TECHNOLOGY AGENCY, Kawaguchi-shi (JP)

(*) Notice: Subject to any disclaimer, the term of this patent is extended or adjusted under 35 U.S.C. 154(b) by 915 days.

(21) Appl. No.: 15/033,121

(22) PCT Filed: Nov. 6, 2014

(86) PCT No.: PCT/JP2014/079512
§ 371 (c)(1),
(2) Date: Apr. 29, 2016

(87) PCT Pub. No.: WO2015/068784
PCT Pub. Date: May 14, 2015

(65) Prior Publication Data
US 2016/0259864 A1 Sep. 8, 2016

(30) Foreign Application Priority Data
Nov. 6, 2013 (JP) .................. 2013-230678

(51) Int. Cl.
*G06F 17/50* (2006.01)

(52) U.S. Cl.
CPC .......... *G06F 17/50* (2013.01); *G06F 17/5009* (2013.01); *G06F 17/5018* (2013.01); *G06F 2217/16* (2013.01)

(58) Field of Classification Search
CPC ............. G06F 17/5009; G06F 17/5018; G06F 2217/16
USPC ............................................. 703/1
See application file for complete search history.

(56) References Cited

U.S. PATENT DOCUMENTS

| 5,732,192 A | 3/1998 | Malin | |
|---|---|---|---|
| 2007/0192863 A1* | 8/2007 | Kapoor | G06F 9/505 726/23 |
| 2009/0012931 A1 | 1/2009 | Appa | |

FOREIGN PATENT DOCUMENTS

| JP | H10-011420 A | 1/1998 |
|---|---|---|
| WO | 2008/149135 A1 | 12/2008 |

OTHER PUBLICATIONS

Becchi_2008 (Efficient Regular Expression Evaluation: Theory and Practice. ANCS' 08, Nov. 6-7, 2008 San Jose CA).*
Gulan_2011 (Graphs Encoded by Regular Expressions, 28th Symposium on Theoretical Aspects of Computer Science (STACS'11) 2011).*

(Continued)

*Primary Examiner* — Brian S Cook

(57) ABSTRACT

A pattern transition information on whether a structurally stable flow pattern in whole or in part of a topological two-dimensional flow structure can transition to another structurally stable flow pattern via a structurally unstable flow pattern in an intermediate state is stored, and according to the pattern transition information, transition information on a transition route from a specified structurally stable flow pattern to another structurally stable flow pattern that can be topologically adopted is acquired.

15 Claims, 65 Drawing Sheets

(56) References Cited

OTHER PUBLICATIONS

Joyner_2013 (Algorithmic Graph Theory, Version 0.7 Mar. 25, 2013).*
Chaos_1983 (Proceedings of a NATO Advanced Research Workshop on Quantum Chaos: Chaotic Behavior in Quantum Systems, Theory and Applications held Jun. 20-25, 1983, Como Italy).*
Fan_2011 (Wenfei Fan , Jianzhong Li , Shuai Ma , Nan Tang , Yinghui Wu, Adding regular expressions to graph reachability and pattern queries, Proceedings of the 2011 IEEE 27th International Conference on Data Engineering, p. 39-50, Apr. 11-16, 2011 [doi> 10.1109/ICDE.2011.5767858]).*
Crutchfield_1992 (Discovering Coherent Structures in Nonlinear Spatial Systems in Nonlinear Ocean Waves, World Scientific, Singapore 1992 190-216 SFI 91-09-034).*
Gulan_2011 (Graphs Encoded by Regular Expressions, 28th Symposium on Theoretical Aspects of Computer Science (STACS'11) 2011) (Year: 2011).*
Kreissl_2011 (topology optimization of flow problems modeled by the incompressible navier-stokes equations, spring Jan. 1, 2011 University of Colorado, Boulder). (Year: 2011).*
Crutchfield_1992 (Discovering Coherent Structures in Nonlinear Spatial Systems in Nonlinear Ocean Waves, World Scientific, Singapore 1992 190-216 SFI 91-09-034) (Year: 1992).*
Kapoor_2007 (2007/0192863 A1) teaches to represent state transitions (Fig 9, 10, 12, 15, 16, 17) using regular expressions (par 55 , 67, 130, 180) (Year: 2007).*
Fan_2011 (Wenfei Fan , Jianzhong Li , Shuai Ma , Nan Tang , Yinghui Wu, Adding regular expressions to graph reachability and pattern queries, Proceedings of the 2011 IEEE 27th International Conference on Data Engineering, p. 39-50, Apr. 11-16, 2011 [doi> 10.1109/ICDE.2011.5767858]) (Year: 2011).*
Chaos_1983 (Proceedings of a NATO Advanced Research Workshop on Quantum Chaos: Chaotic Behavior in Quantum Systems, Theory and Applications held Jun. 20-25, 1983, Como Italy) (Year: 1983).*
Joyner_2013 (Algorithmic Graph Theory, Version 0.7 Mar. 25, 2013) (Year: 2013).*
Gulan_2011 (Graphs Encoded by Regular Expressions, 28th Symposium on Theoretical Aspects of Computer Science (STACS'11) ) (Year: 2011).*
Becchi_2008 (Efficient Regular Expression Evaluation: Theory and Practice. ANCS' 08, Nov. 6-7, 2008 San Jose CA) (Year: 2008).*
International Search Report received for PCT Patent Application No. PCT/JP2014/079512, dated Dec. 22, 2014, 3 pages (1 page of English translation of International Search Report and 2 pages of International Search Report).
Tomasz Kaczynski et al., "Computational Homology", Applied Mathematical Sciences, vol. 157, through p. 37, Springer (2004).
Tomoo Yokoyama et al., "Word representation of streamline topologies for structurally stable vortex flows in multiply connected domains", Proceedings of the Royal Society A: Mathematical, Physical and Engineering Sciences, vol. 469, No. 2150, pp. 20120558, 1-18, Feb. 8, 2013.
European Patent Office, "Extended European Search Report," issued in European Patent Application No. 14 860 442.4, which is a European counterpart of U.S. Appl. No. 15/033,121, dated Jun. 27, 2017, 11 pages.
Morten Brøns et al., "Streamline topology in the near wake of a circular cylinder at moderate Reynolds numbers", Journal of Fluid Mechanics, vol. 584, pp. 23-43, Jul. 25, 2007.
J. N. Hartnack, "Streamline topologies near a fixed wall using normal forms", Acta Mechanica, vol. 136, No. 1-2, pp. 55-75, Mar. 1, 1999.
Slate Intellectual Property Office of People's Republic of China, "First Office Action," issued in CN Patent Application No. CN 201480059832.9, which is a Chinese counterpart of U.S. Appl. No. 15/033,121, dated May 4, 2018, 10 pages (5 pages of English translation of Chinese Office Action, and 5 pages of original Chinese Office Action).

* cited by examiner

FIG.2
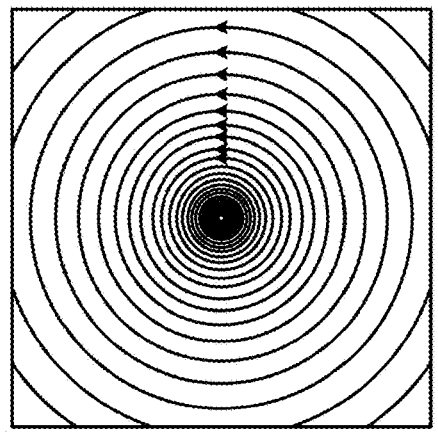
(a)
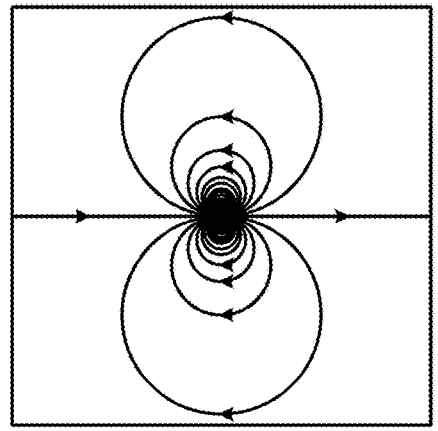
(b)
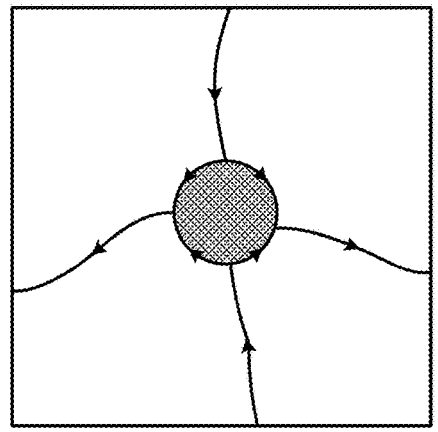
(c)

FIG.9-A
(a)
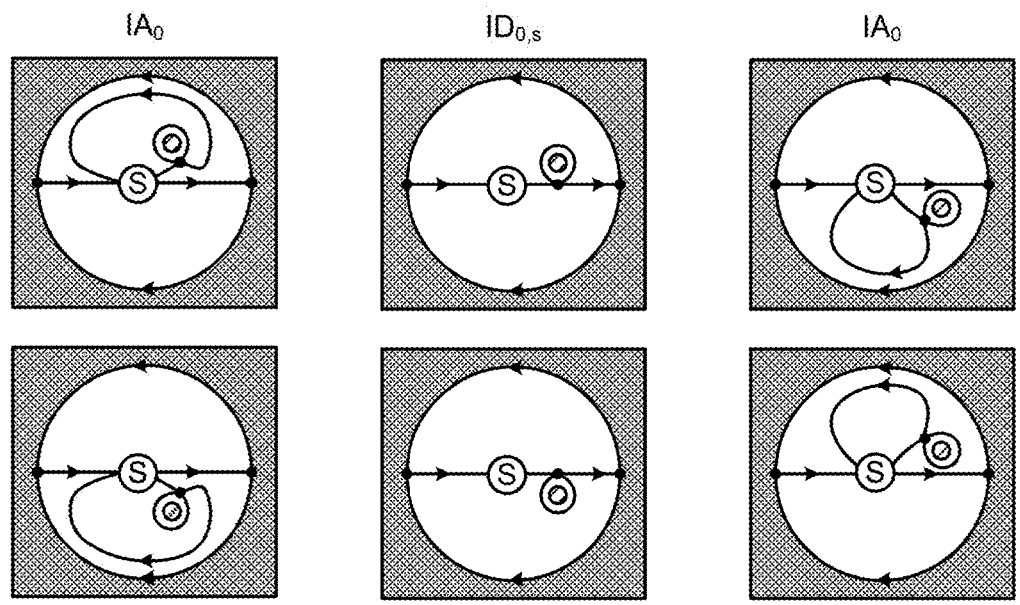
(b)
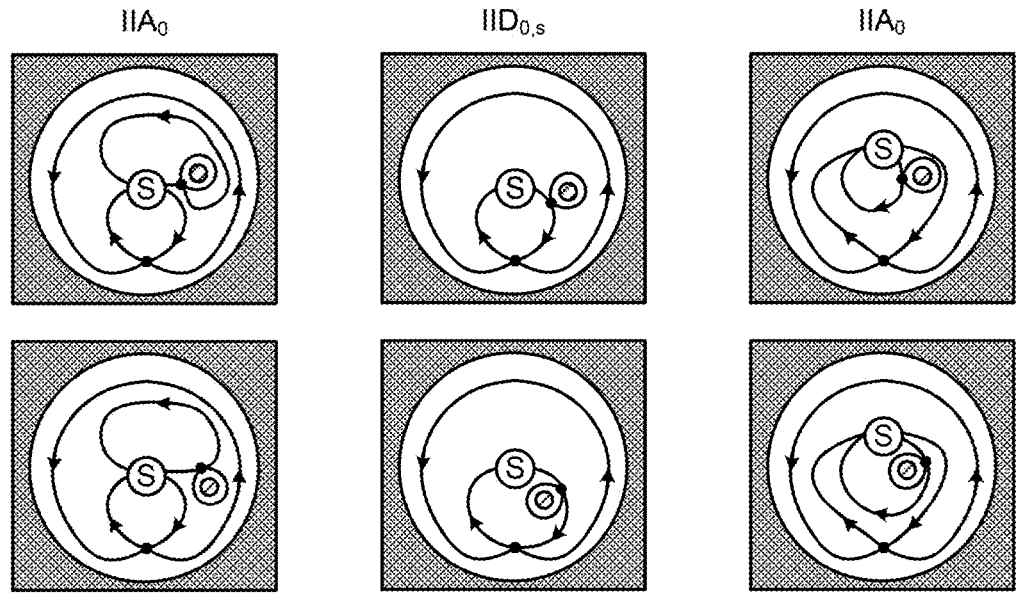

FIG.9-B
(c)     $A_0A_0$     $A_0D_{0,s}$     $A_0A_0$
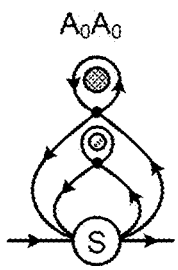
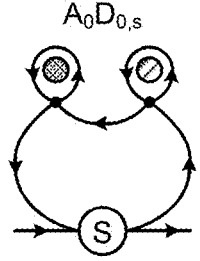
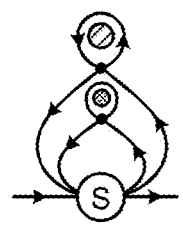
(d)     $A_2D_{0,s} = ID_{0,s}$
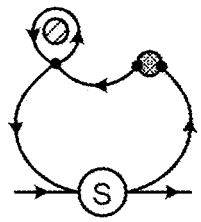
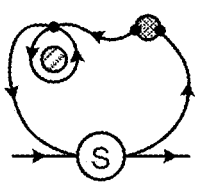

FIG.13
(a)    IA$_2$          ID$_{2,s}$          IA$_2$
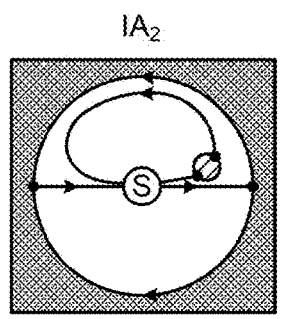 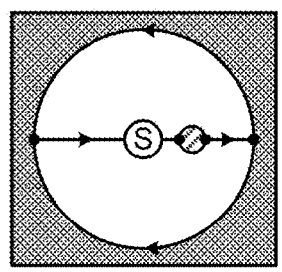 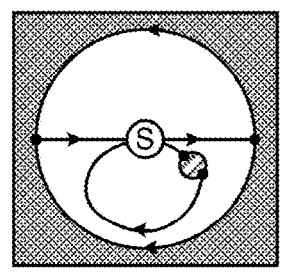
(b)    IIA$_2$=IA$_0$          IID$_{2,s}$          IIA$_2$=IA$_0$
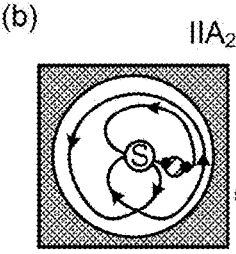 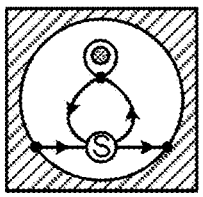 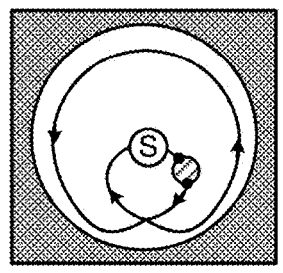 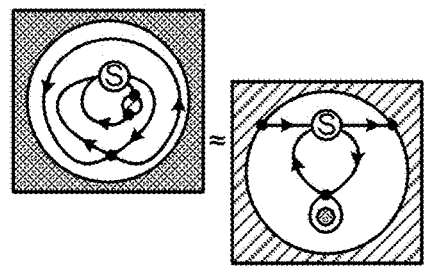
(c)    A$_0$D$_{2,s}$=A$_2$D$_{0,s}$      (d)    A$_2$D$_{2,s}$≈ID$_{2,s}$
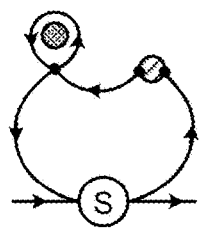      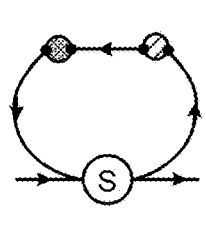 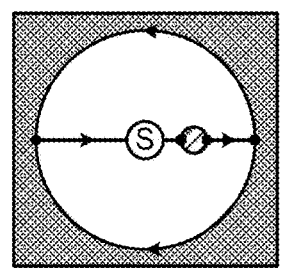

FIG.15
(a)
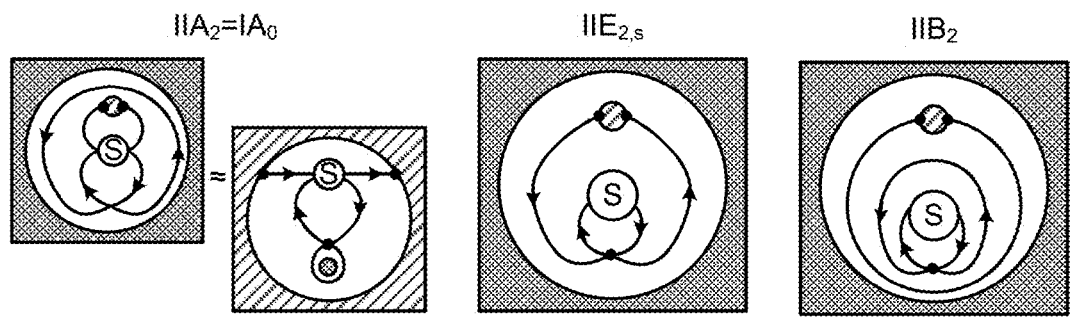
(b)
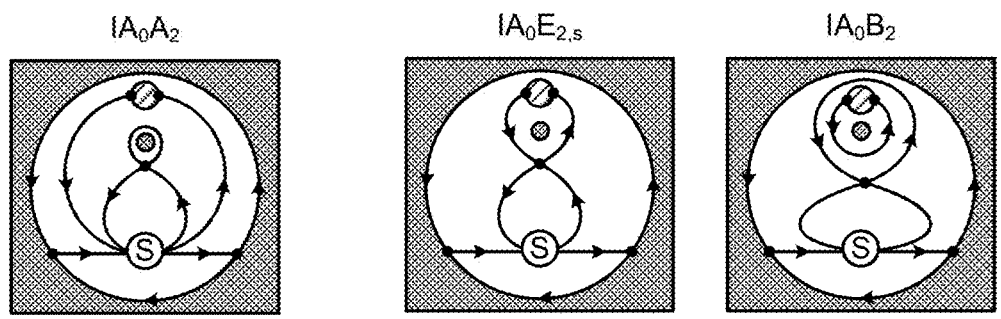
(c)
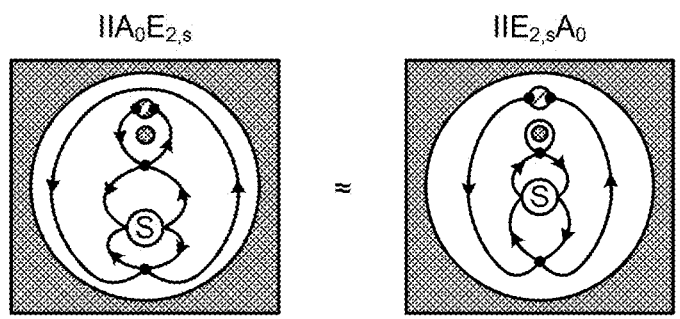
(d)
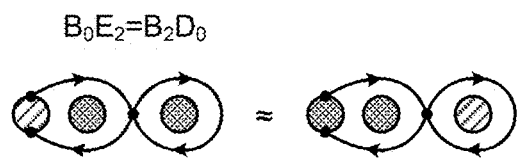

FIG.23
(a) $A_2\Delta_1$     $I\Delta_1$
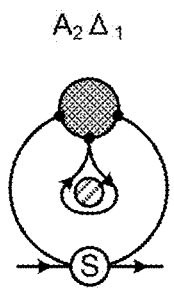 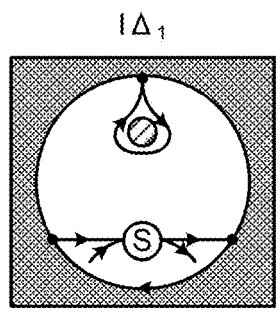
(b) $B_0B_2(B_2B_0)$     $B_2\Delta_1$     $B_2C$
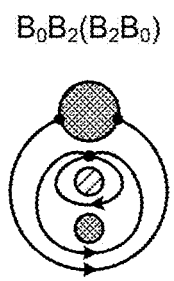 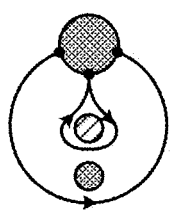 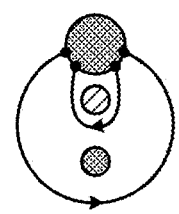
(c) $ICB_0$     $A_2C\Delta_1 \approx IC\Delta_1$     $ICC$
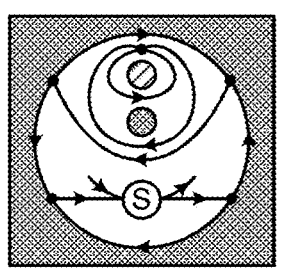 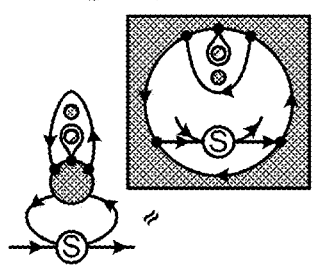 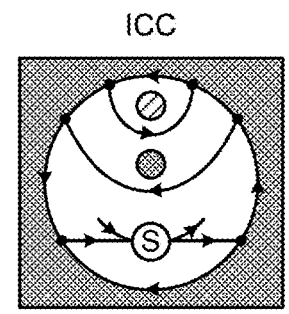
(d) $B_2C\Delta_1 = B_2\Delta_1C$
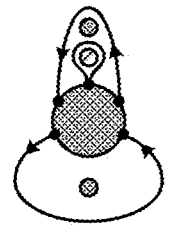

FIG.26

| OPER-ATION | TRANSITION X | SUBWORD $S_1$ | SUBWORD $S_2$ | INDEX DIFFERENCE d | FIGURE |
|---|---|---|---|---|---|
| $D_{0,s}$ | $ID_{0,s}(\approx A_2D_{0,s})$ | $IA_0(\approx A_0A_2)$ | $IA_0(\approx A_0A_2)$ | 0 | 9(a) |
|  | $IID_{0,s}$ | $IIA_0$ | $IIA_0$ | 0 | 9(b) |
|  | $A_0D_{0,s}$ | $A_0A_0$ | $A_0A_0$ | 0 | 9(c) |
| $D_0$ | $B_2D_0$ | $B_0B_2, B_2B_0$ | $B_0B_2, B_2B_0$ | 0 | 10(a) |
|  | $ICD_0(\approx A_2CD_0)$ | $IA_0C(\approx A_0A_2C)$ | $ICB_0(\approx A_2CB_0)$ | (1,0,-1,0,0) | 10(b) |
|  | $ICCD_0$ | $ICCB_0$ | $ICCB_0$ | 0 | 10(c) |
|  |  | $ICB_0C$ | $ICB_0C$ |  |  |
|  | $B_2CD_0$ | $B_2CB_0$ | $B_2CB_0$ | 0 | 10(d)(e) |
|  |  | $B_0B_2C$ | $B_0B_2C$ |  |  |
|  |  | $B_2B_0C$ | $B_2B_0C$ |  |  |
| $E_{0,s}$ | $IIE_{0,s}$ | $IIA_0$ | $IIB_0$ | (1,0,-1,0,0) | 11(a) |
|  | $A_0E_{0,s}$ | $A_0A_0$ | $A_0B_0$ | (1,0,-1,0,0) | 11(b) |
| $E_0$ | $B_0E_0$ | $B_0B_0$ | $B_0B_0$ | 0 | 11(c) |
| $\Phi_{0,s}$ | $II\Phi_{0,s}$ | $IIA_0$ | $IIA_0$ | 0 | 12(a) |
|  | $A_0\Phi_{0,s}$ | $A_0A_0$ | $A_0A_0$ | 0 | 12(b) |
| $\Phi_0$ | $B_0\Phi_0$ | $B_0B_0$ | $B_0B_0$ | 0 | 12(c) |
| $D_{2,s}$ | $ID_{2,s}(\approx A_2D_{2,s})$ | $IA_2(\approx A_2A_2)$ | $IA_2(\approx A_2A_2)$ | 0 | 13(a) |
|  | $IID_{2,s}$ | $IA_0$ | $IA_0$ | 0 | 13(b) |
|  | $A_0D_{2,s}=(A_2D_{0,s})$ | $A_0A_2$ | $A_0A_2$ | 0 | 13(c) |
| $D_2$ | $B_2D_2$ | $B_2B_2$ | $B_2B_2$ | 0 | 14(a) |
|  | $ICD_2(\approx A_2CD_2)$ | $IA_2C(\approx A_2A_2C)$ | $ICB_2(\approx A_2CB_2)$ | (0,1,0,-1,0) | 14(b) |
|  | $ICCD_2$ | $ICCB_2$ | $ICCB_2$ | 0 | 14(c) |
|  |  | $ICB_2C$ | $ICB_2C$ |  |  |
|  | $B_2CD_2$ | $B_2CB_2$ | $B_2CB_2$ | 0 | 14(d)(e) |
|  |  | $B_2B_2C$ | $B_2B_2C$ |  |  |
| $E_{2,s}$ | $IIE_{2,s}$ | $IA_0$ | $IIB_2$ | (0,1,0,-1,0) | 15(a) |
|  | $IA_0E_{2,s}$ | $IA_0A_2$ | $IA_0B_2$ | (0,1,0,-1,0) | 15(b) |
| $E_2$ | $B_0E_2(=B_2D_0)$ | $B_0B_2, B_2B_0$ | $B_0B_2, B_2B_0$ | 0 | 15(d) |

FIG.27

| OPER-ATION | TRANSITION X | SUBWORD $S_1$ | SUBWORD $S_2$ | INDEX DIFFER-ENCE d | FIGURE |
|---|---|---|---|---|---|
| $\Psi_s(2)$ | $I\Psi_s(2)(\approx A_2\Psi_s(2))$ | $IA_0C(\approx A_0A_2C)$ | $IA_0C(\approx A_0A_2C)$ | 0 | 17(a) |
| $\Psi(2)$ | $B_2\Psi(2)$ | $B_0B_2C$ | $B_0B_2C$ | 0 | 17(c) |
| | | $B_2CB_0$ | $B_2CB_0$ | | |
| | | $B_2B_0C$ | $B_2B_0C$ | | |
| | $IC\Psi(2)$ | $IA_0CC$ | $ICCB_0$ | (1,0,-1,0,0) | 18(a) |
| | | $IA_0CC$ | $ICB_0C$ | | |
| | $ICC\Psi(2)$ | $ICCCB_0$ | $ICCCB_0$ | 0 | 18(b) |
| | | $ICCB_0C$ | $ICCB_0C$ | | |
| | | $ICB_0CC$ | $ICB_0CC$ | | |
| | $B_2C\Psi(2)$ | $B_2CCB_0$ | $B_2CCB_0$ | 0 | 18(c)(d) |
| | | $B_0B_2CC$ | $B_0B_2CC$ | | |
| | | $B_2B_0CC$ | $B_2B_0CC$ | | |
| | | $B_2CB_0C$ | $B_2CB_0C$ | | |
| $\Xi_s(2n-1)$ | $I\Xi_s(2n-1)$ $(\approx A_2\Xi_s(2n-1))$ | $IA_2C^{2n-2}$ $(\approx A_2A_2C^{2n-2})$ | $IA_2C^{2n-2}$ $(\approx A_2A_2C^{2n-2})$ | 0 | 19(a) |
| $\Xi(2n-1)$ | $B_2\Xi(2n-1)$ | $B_2C^kB_2C^{2n-2-k}$ | $B_2C^kB_2C^{2n-2-k}$ | 0 | 19(b) |
| | $IC\Xi(2n-1)$ | $IA_2C^{2n-1}$ | $IC^kB_2C^{2n-1-k}$ | (0,1,0,-1,0) | 19(c) |
| | $ICC\Xi(2n-1)$ | $IC^kB_2C^{2n-k}$ | $IC^kB_2C^{2n-k}$ | 0 | 19(d) |

FIG.28

| OPERATION | TRANSITION X | SUBWORD $S_1$ | SUBWORD $S_2$ | INDEX DIFFERENCE d | FIGURE |
|---|---|---|---|---|---|
| $\Lambda$ | $\Lambda$ | I | II | (-1,1,0,0,0) | 20(a) |
|  | $\Lambda C$ | IC | $IIB_2$ | (-1,1,0,-1,1) | 20(b) |
| $\Delta_1$ | $\Delta_1$ | $B_0$ | $B_2$ | (0,0,1,-1,0) | 22(a) |
|  | $I\Delta_1(\approx A_2\Delta_1)$ | $IA_0(\approx A_0A_2)$ | $IC(\approx A_2C)$ | (1,0,0,0,-1) | 22(b) |
|  | $II\Delta_1$ | $IIB_0$ | $IIB_2$ | (0,0,1,-1,0) | 22(c) |
|  | $B_2\Delta_1$ | $B_0B_2,B_2B_0$ | $B_2C$ | (0,0,1,0,-1) | 23(b) |
|  | $IC\Delta_1(\approx A_2C\Delta_1)$ | $ICB_0(\approx A_2CB_0)$ | $ICC(\approx A_2CC)$ | (0,0,1,0,-1) | 23(c) |
| $M_{1,s}$ | $IM_{1,s}(\approx A_0M_{1,s})$ | $IA_0(\approx A_0A_2)$ | $IC(\approx A_2C)$ | (1,0,0,0,-1) | 24(a) |
| $M_{1,o}$ | $B_2M_{1,o}$ | $B_2B_0,B_0B_2$ | $B_2C$ | (0,0,1,0,-1) | 25(a) |
|  | $ICM_{1,o}$ | $ICB_0$ | $ICC$ | (0,0,1,0,-1) | 25(b) |
| $M_{1,i}$ | $B_2M_{1,i}$ | $B_2B_0$ | $B_2C$ | (0,0,1,0,-1) | 25(a) |
|  | $ICM_{1,i}$ | $IA_0C$ | $ICC$ | (1,0,0,0,-1) | 25(b) |
|  | $ICCM_{1,i}$ | $ICCB_0$ | $ICCC$ | (0,0,1,0,-1) | 25(c) |
|  |  | $ICB_0C$ | $ICCC$ |  |  |

FIG.35
$W_0 = ICCB_0$
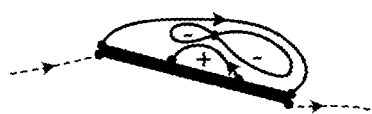
(a) $X = IM_{1,s}$
$W_1 = IA_0CB_0$
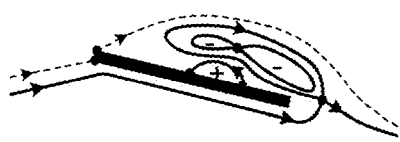
(b) $X = A_0E_{0,s}$
$W_2 = IA_0A_0C$
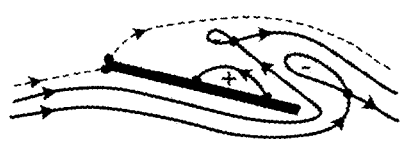

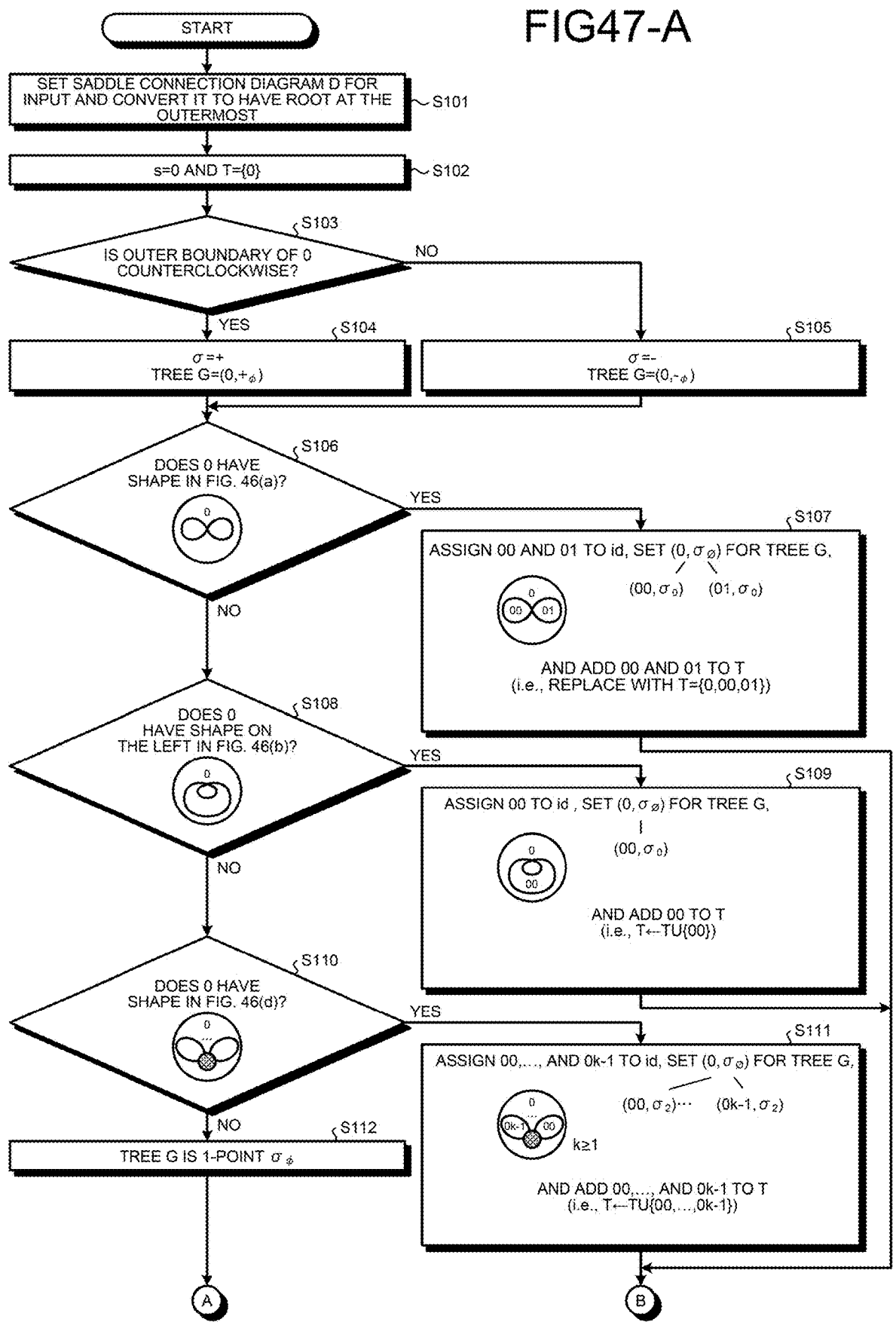
FIG47-A

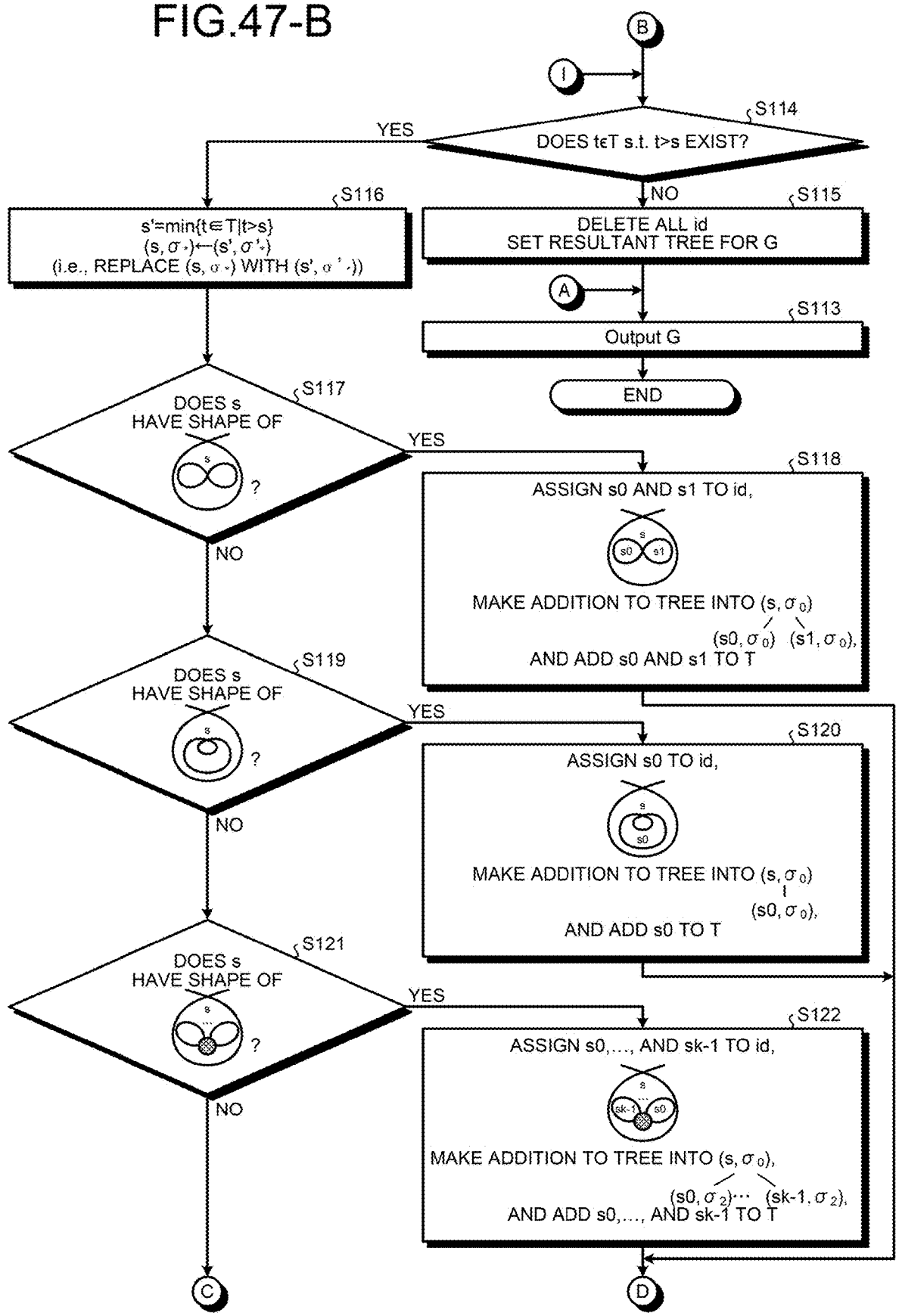
FIG.47-B

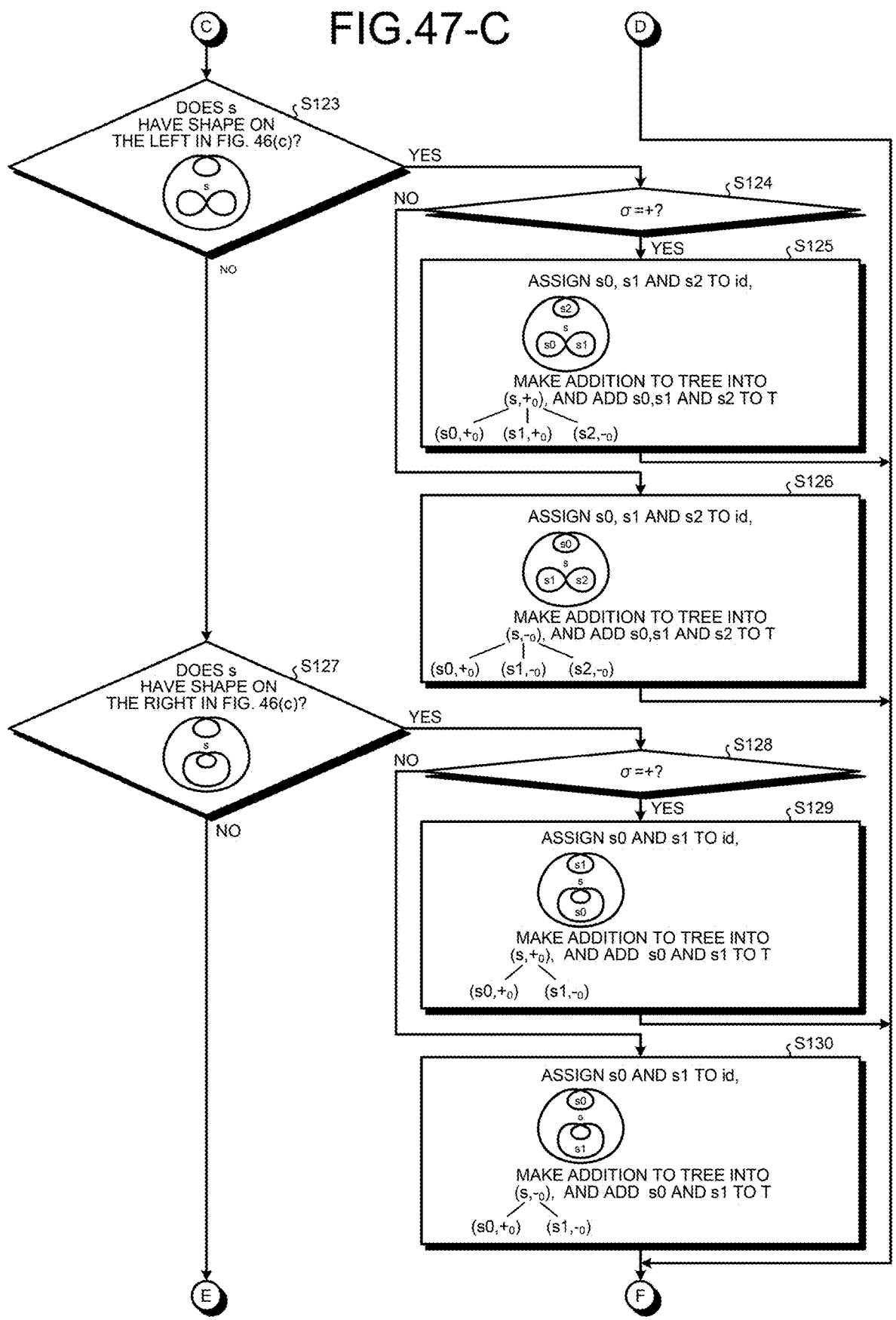
FIG.47-C

FIG.47-D
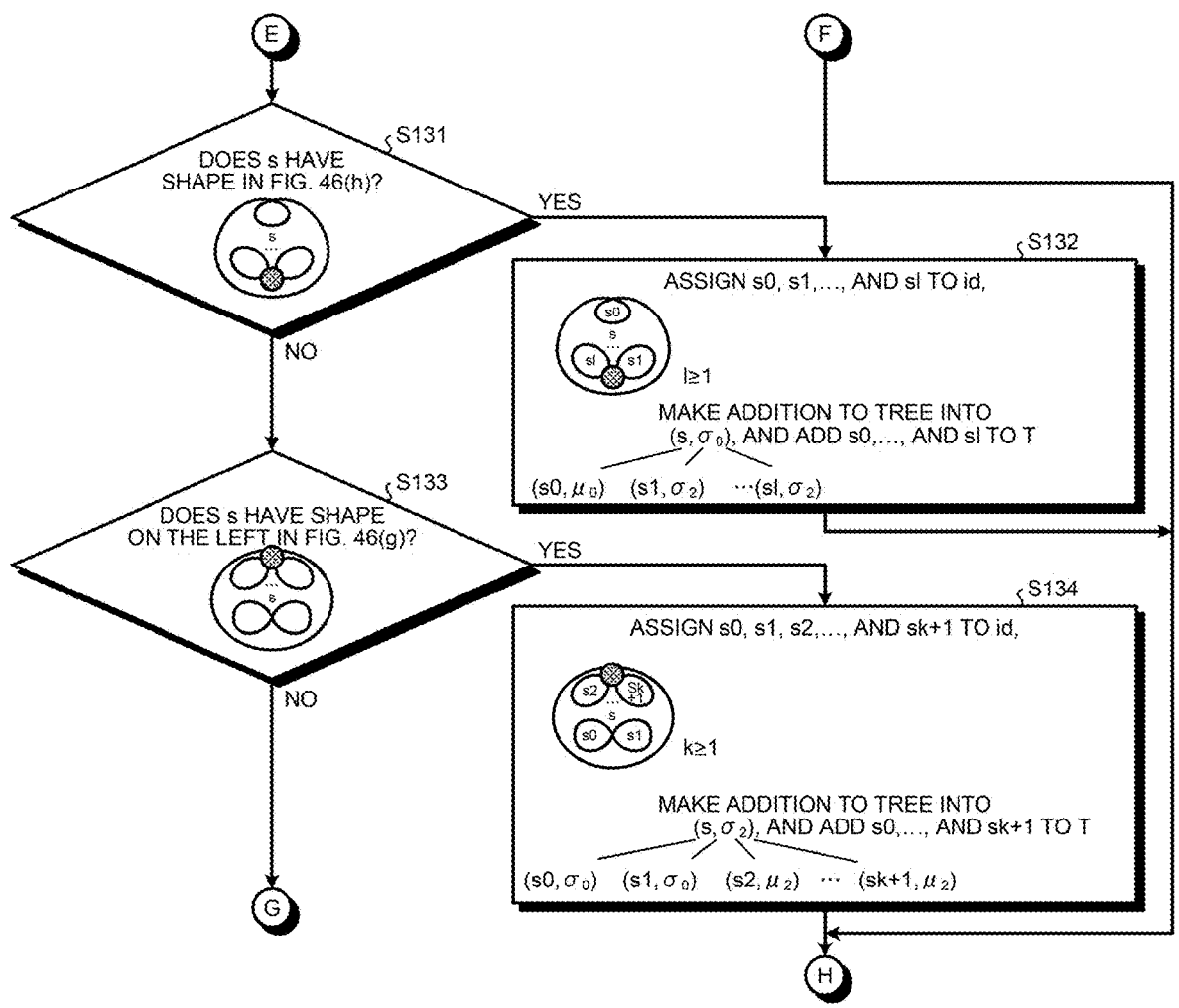

FIG.47-E
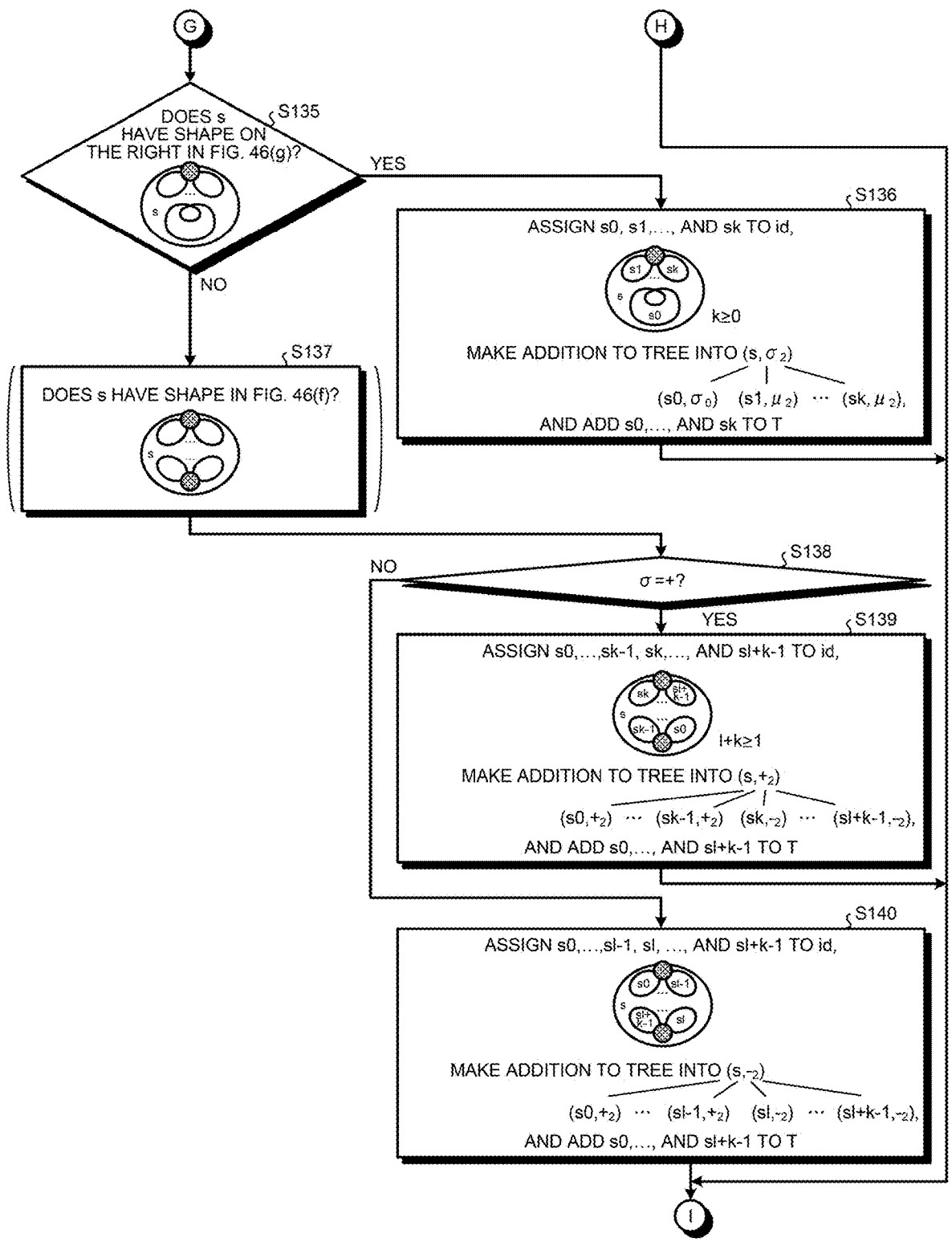

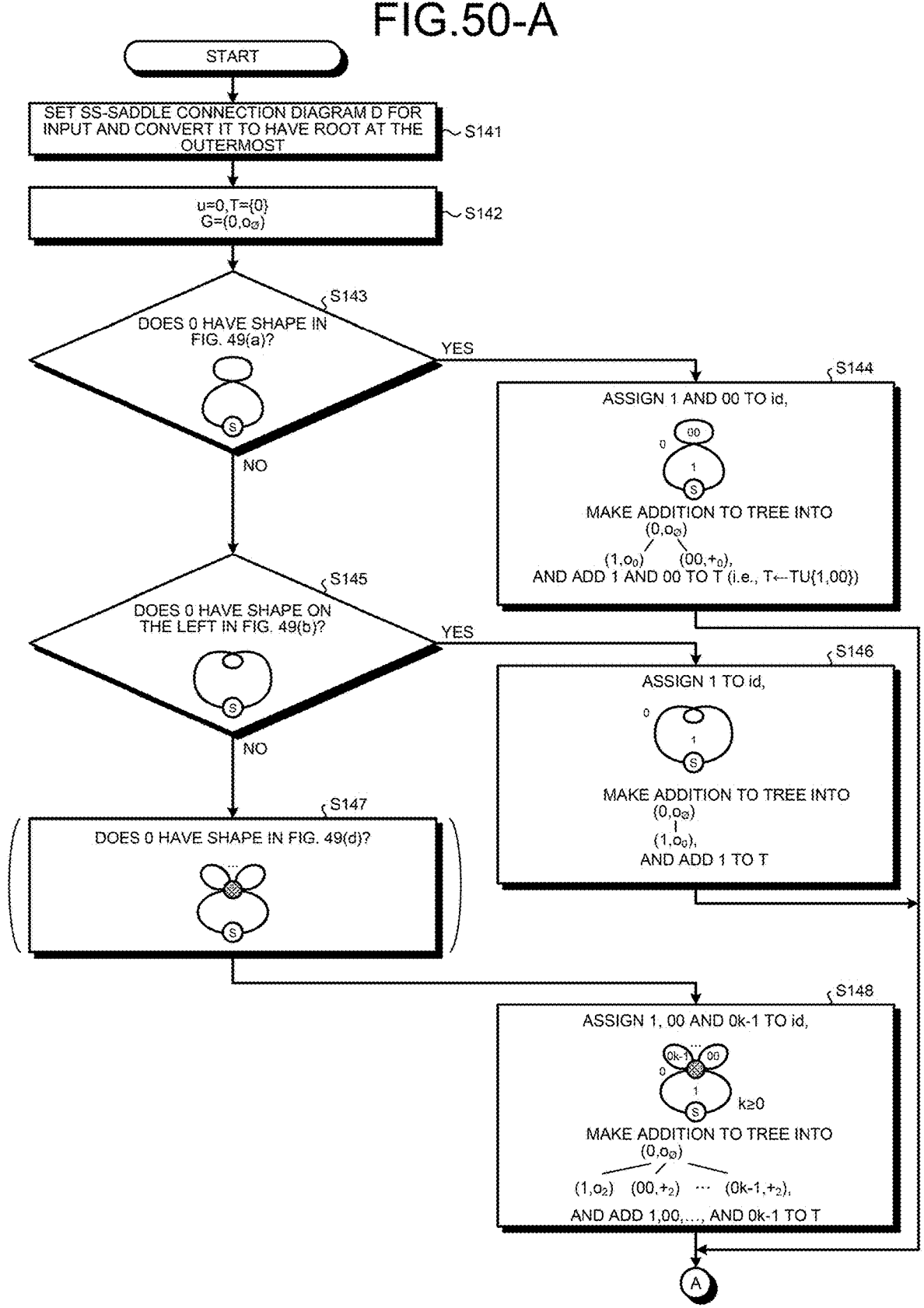
FIG.50-A

FIG.50-B
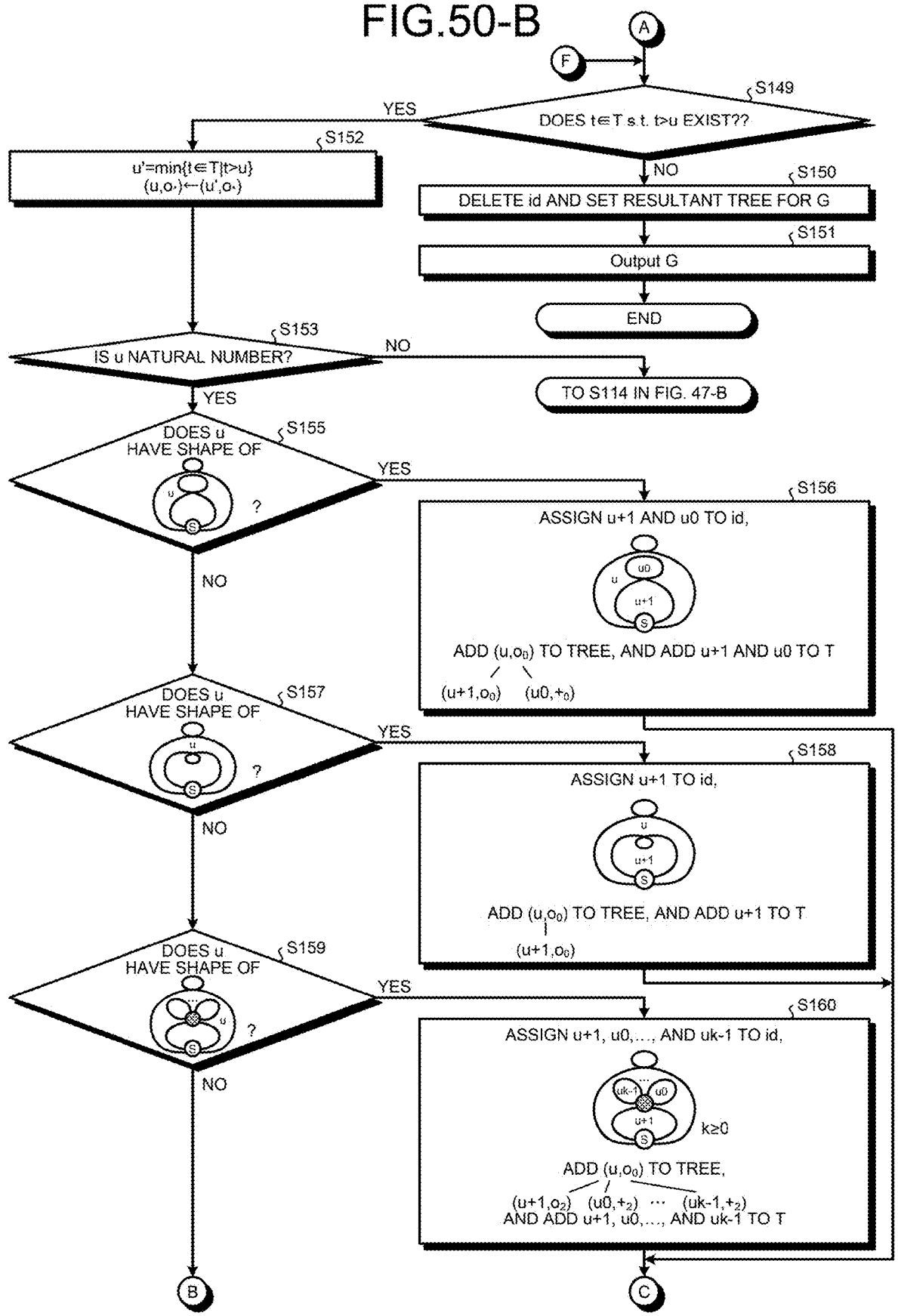

FIG.50-C
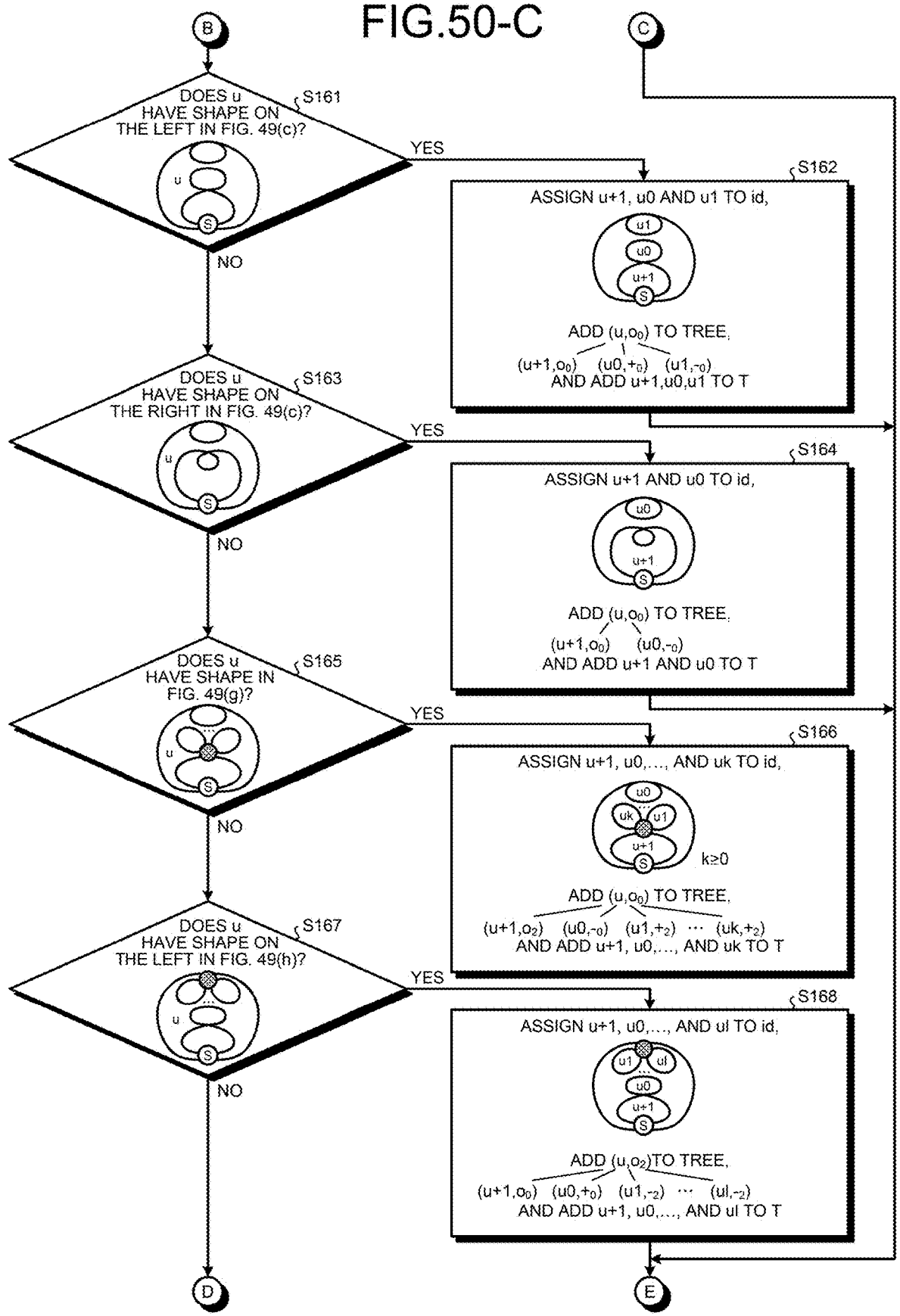

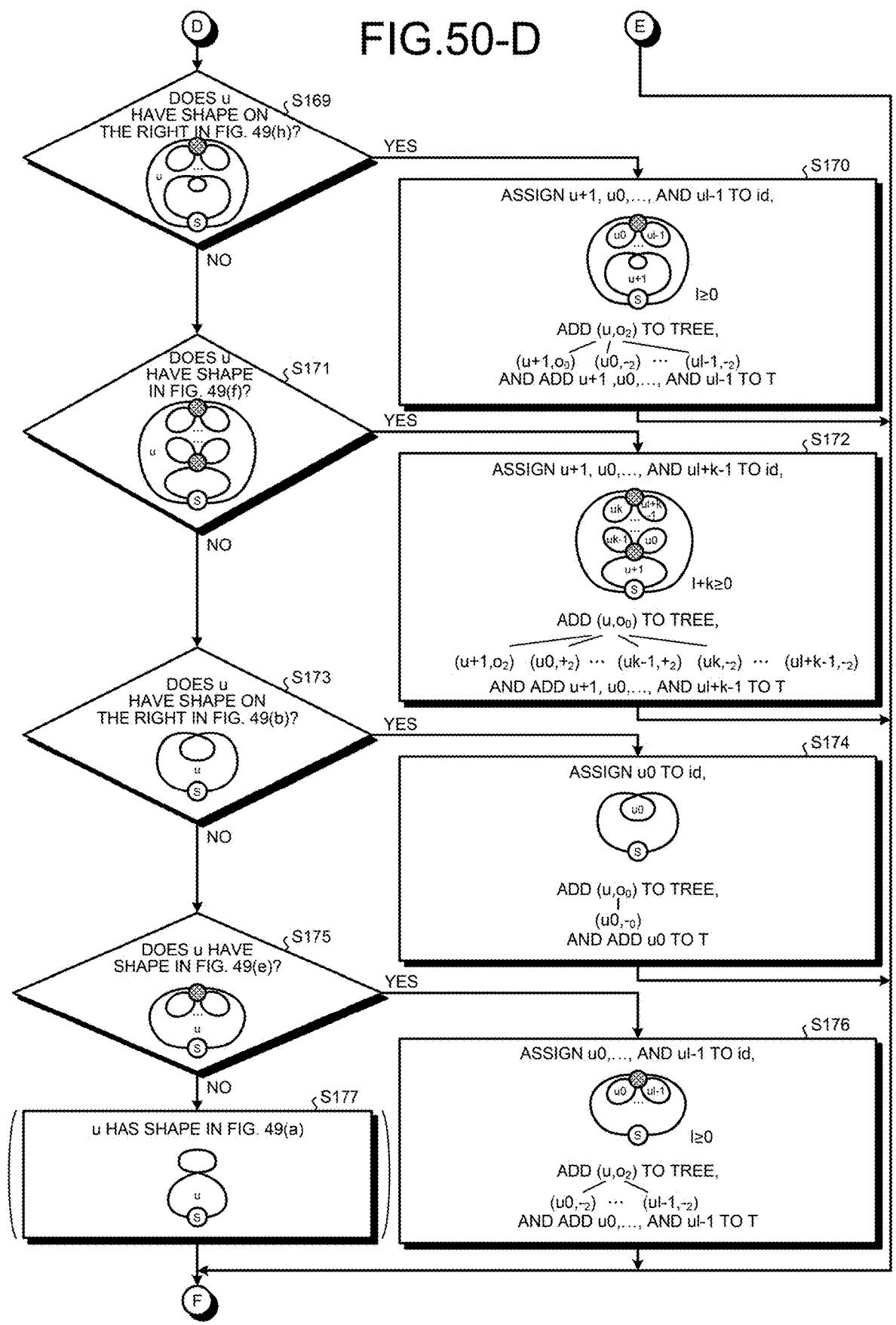

FIG.51-A
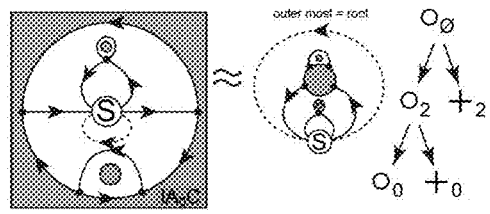
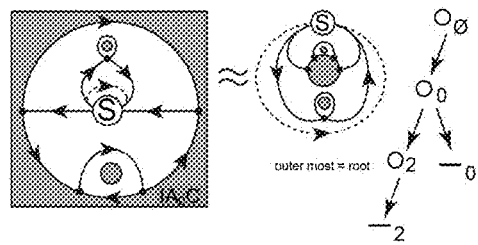
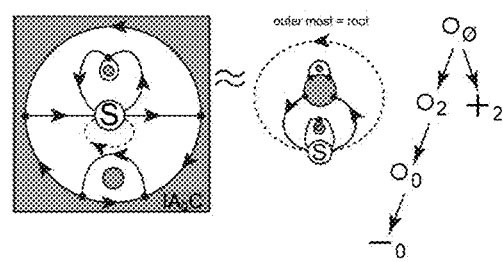
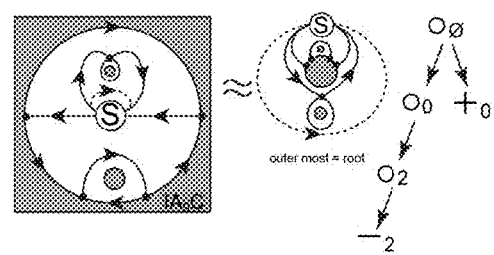
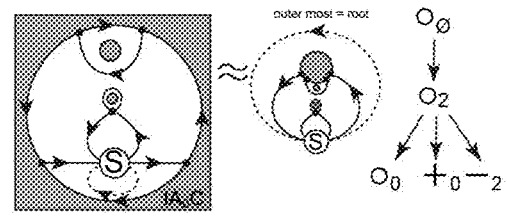
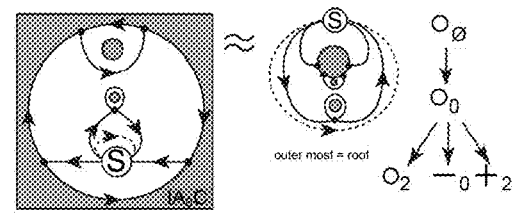
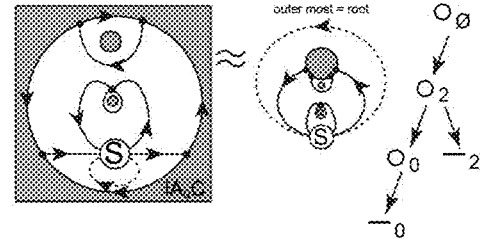
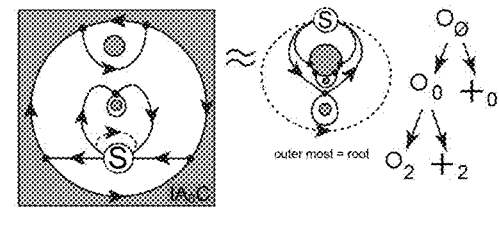

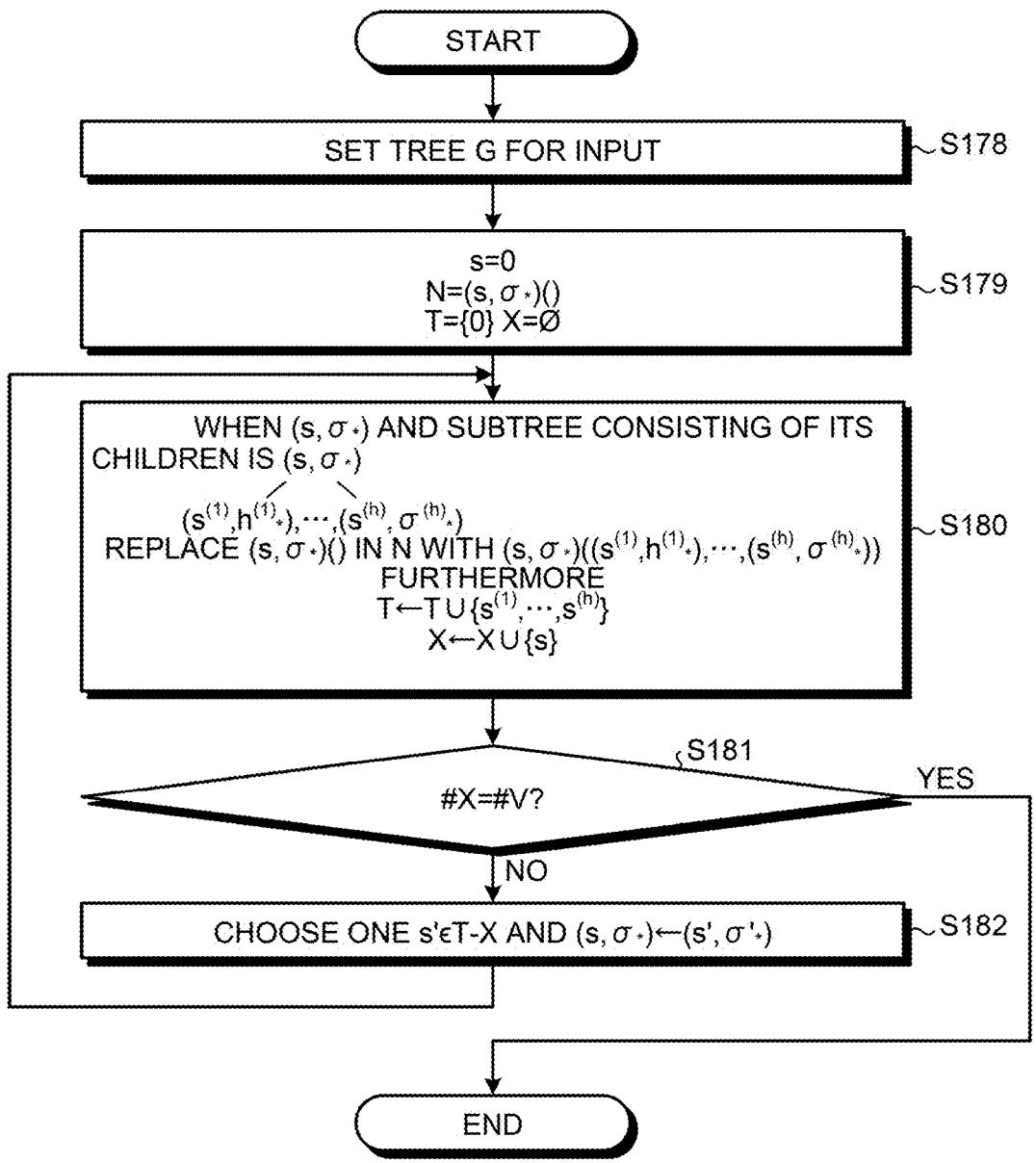

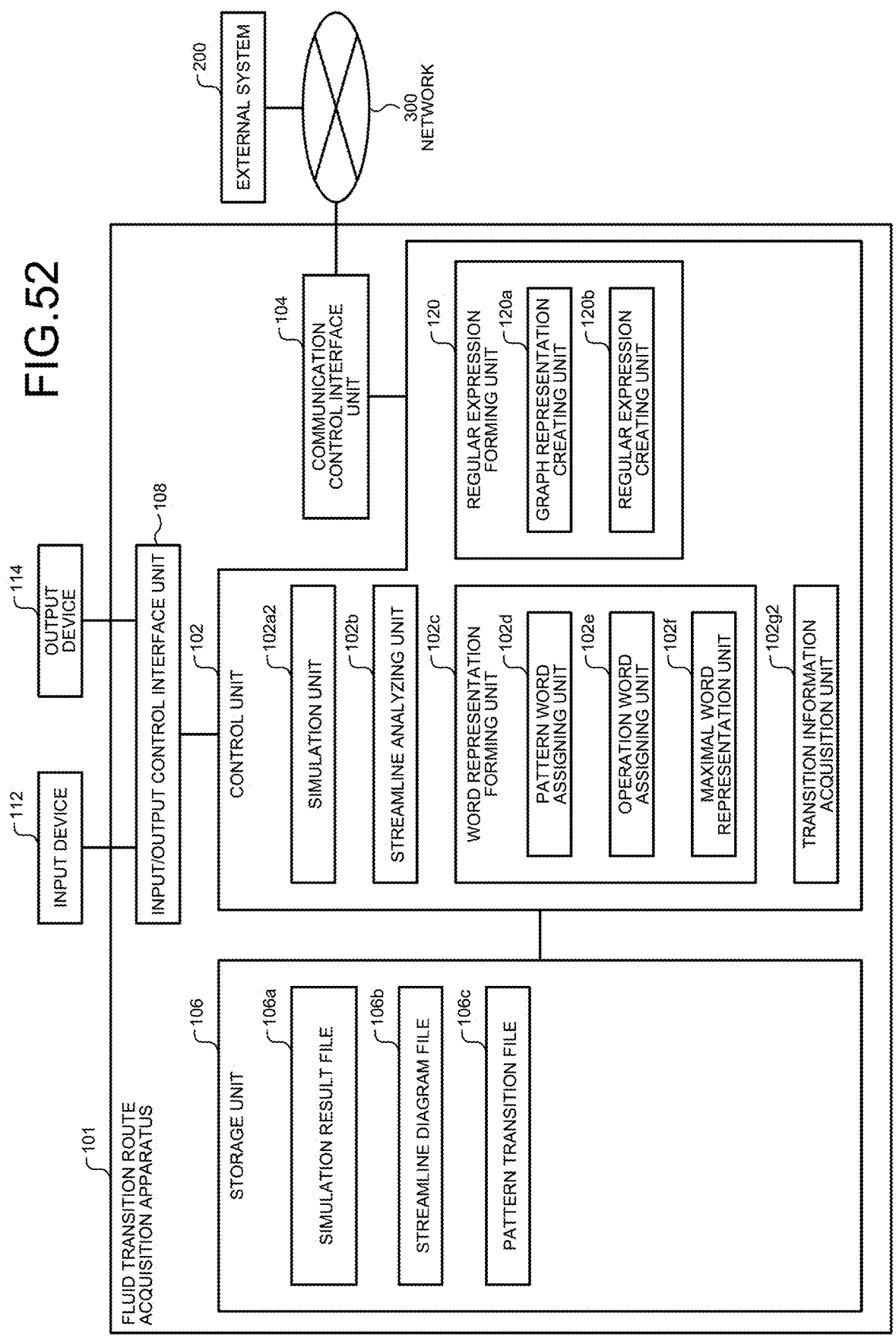

FIG.55
$W_0 = ICCB_0$
$N_0 = \circ_\phi(\circ_2(-_2(-_0,-_0,+_2)))$
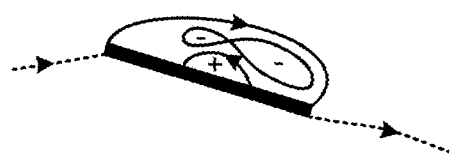
⇨ (a) $X = IM_{1,s}$
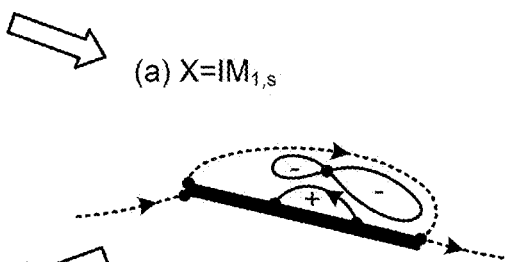
$W_1 = IA_0CB_0$
$N_1 = \circ_\phi(\circ_0(\circ_2,-_0(-_0,-_0),+_2))$
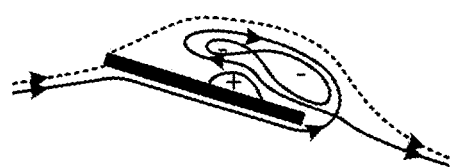
⇦ (b) $X = A_0E_{0,s}$
⇨
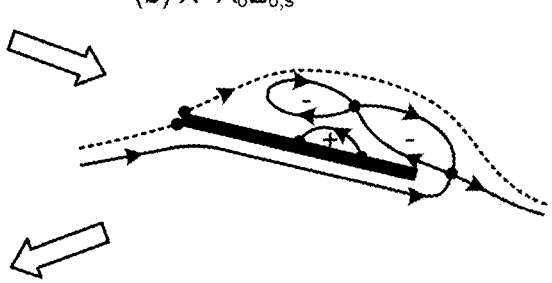
$W_2 = IA_0A_0C$
$N_2 = \circ_\phi(\circ_0(\circ_0(\circ_2,-_0,+_2),-_0))$
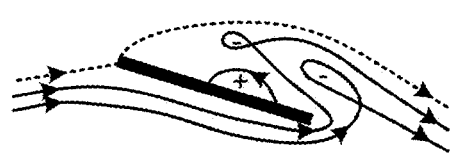
⇦

FLUID TRANSITION ROUTE ACQUISITION APPARATUS, FLUID TRANSITION ROUTE ACQUISITION METHOD, AND PROGRAM

CROSS REFERENCE TO RELATED APPLICATIONS

This patent application is a U.S. national stage application under 35 U.S.C. § 371 of International Patent Application No. PCT/JP2014/079512 filed on Nov. 6, 2014, which claims the benefit of foreign priority to Japanese Patent Application No. JP 2013-230678 filed on Nov. 6, 2013. The International Application was published in Japanese on May 14, 2015, as International Publication No. WO 2015/068784 A1 under PCT Article 21(2).

FIELD

The present invention relates to a fluid transition route acquisition apparatus, a fluid transition route acquisition method, and a program.

BACKGROUND

Conventionally, to optimize layout designing of multiple structures or the shape of a structure having efficient fluid dynamics characteristics, an optimum layout of structures is determined by repeating fluid simulations owing to large-scale numerical calculations.

For example, conventionally, to design a structure, such as a bridge, in a uniform flow, it is analyzed which flow would occur around the bridge piers through large-scale simulations depending on a calculator, etc.

Furthermore, in recent years, algorithms and programs have been developed that can mathematically deal with topologies of flow patterns by constructing a mathematical model of fluid, or the like.

CITATION LIST

Non Patent Literature

Non Patent Literature 1: Tomasz Kaczynski, Konstantin Mischaikow, Marian Mrozek, "Computational Homology" Spinger, 2000.

SUMMARY

Technical Problem

Conventional methods of optimizing structure designing, however, have a problem in that the large-scale calculations that are performed repeatedly lead to increases in calculation time and designing costs while, due to restrictions from them, the search area has to be limited and a possibility that the derived optimum structure is locally optimum cannot be excluded. In other words, conventionally, there is a problem in that which search area is selected has to depend on the engineer's experiences and intuition and accordingly the derived result of optimization of the structure depends on which area is set for the search area.

Particularly, for the optimization methods, there is nothing that should serve as an index for determining which transition stage is necessary in order to lead a flow pattern in a certain shape and layout to an objective flow pattern and therefore calculations have to be repeated heuristically in order to control the circumstances of a flow field by, for example, changing the layout or shape of structure with respect to the flow obtained according to the calculation result.

The present invention was made in view of the above-described problem, and an objective of the present invention is to provide a fluid transition route acquisition apparatus, a fluid transition route acquisition method, and a program that make it possible to obtain knowledges on transition of flow patterns.

Solution to Problem

It is an object of the present invention to at least partially solve the problems in the conventional technology. According to an aspect of the present invention, in a fluid transition route acquisition apparatus including a storage unit and a control unit, the storage unit stores pattern transition information on whether a structurally stable flow pattern in whole or in part of a topological two-dimensional flow structure can transition to another structurally stable flow pattern via a structurally unstable flow pattern in an intermediate state, and the control unit includes a transition information acquisition unit that, according to the pattern transition information, acquires transition information on a transition route leading from a specified structurally stable flow pattern to another structurally stable flow pattern that can be topologically adopted.

According to another aspect of the present invention, in the fluid transition route acquisition apparatus described above, the transition information includes information on the structurally unstable flow pattern in the intermediate state to the another structurally stable flow pattern.

According to still another aspect of the present invention, in the fluid transition route acquisition apparatus described above, according to the pattern transition information, the transition information acquisition unit acquires the transition information leading from one of two specified structurally stable flow patterns to the other structurally stable flow pattern.

According to still another aspect of the present invention, in the fluid transition route acquisition apparatus described above, the transition information acquisition unit acquires the transition information including the number of transitions each leading from one of the structurally stable flow patterns to the other structurally stable flow pattern, in which transition via the structurally unstable flow pattern in the intermediate state is regarded as one transition.

According to still another aspect of the present invention, in the fluid transition route acquisition apparatus described above, the transition information acquisition unit acquires the transition information leading from one of the structurally stable flow patterns to the other structurally stable flow pattern with the minimum number of transitions.

According to still another aspect of the present invention, in the fluid transition route acquisition apparatus described above, the structurally stable flow pattern is identified by a word representation that is formed by assigning any one of operation words that define five types of operations that can be topologically adopted to add one hole to a flow pattern, for the number of times corresponding to the number of added holes, to pattern words that define three types of flow patterns in total including, in addition to two types of flow patterns that can be topologically adopted in a simply connected exterior domain with one hole, a pattern without any 1 source-sink point in a doubly connected exterior domain with two holes, and the pattern transition information is information in which the structurally stable flow patterns that can transition to each other via the structurally unstable flow pattern in the intermediate state are described with the word representations, and the transition information acquisition unit acquires the transition information according to the pattern transition information by using the word representation of the specified structurally stable flow pattern as a reference.

According to still another aspect of the present invention, in the fluid transition route acquisition apparatus described above, the pattern transition information includes information on a change in operation word for word representation between the structurally stable flow patterns that can transition to each other via the structurally unstable flow pattern in the intermediate state, and the transition information acquisition unit acquires the transition information according to the information on the change by using the change in operation word for word representation between two specified structurally stable flow patterns as a reference.

According to still another aspect of the present invention, in the fluid transition route acquisition apparatus described above, when there are multiple possible transition routes that are acquired according to the pattern transition information by using the word representation of the specified structurally stable flow pattern as a reference, the transition information acquisition unit specifies one transition route by using a regular expression with one-to-one correspondence to the flow pattern.

According to still another aspect of the present invention, in the fluid transition route acquisition apparatus described above, when there are multiple possible transition routes that are acquired according to the information on the change by using the change in operation word for word representation between the two specified structurally stable flow patterns as a reference, the transition information acquisition unit acquires regular expressions corresponding respectively to the word representations of the two structurally stable flow patterns and, regarding the multiple possible transition routes, when a subrepresentation for causing the transition is not contained in the regular expression corresponding to the word representation of one of the structurally stable flow patterns, the transition information acquisition unit excludes it from possible transition routes.

According to still another aspect of the present invention, in the fluid transition route acquisition apparatus described above, when there are multiple possible transition routes that are not excluded, the transition information acquisition unit acquires regular expressions corresponding respectively to the multiple possible transition routes that are not excluded and specifies, as a transition pattern, a possible transition route, among the multiple possible transition routes that are not excluded, whose corresponding regular expression matches the regular expression corresponding to the word representation of the other structurally stable flow pattern.

According to still another aspect of the present invention, in the fluid transition route acquisition apparatus described above, the regular expression is created according to a graph representation with one-to-one correspondence with the flow pattern.

According to still another aspect of the present invention, in the fluid transition route acquisition apparatus described above, the graph representation is obtained by assigning a unique rooted, labeled and directed tree $T_H=(V,E)$ (where V is a set of points called vertices and E is a set of edges connecting the vertices) to a structurally stable Hamiltonian vector field H defined by the flow pattern and then visualizing the tree as a plane graph.

According to still another aspect of the present invention, in the fluid transition route acquisition apparatus described above, the apparatus further includes a simulation unit that, to select a possible design parameter for an object in a fluid, sets an upper limit and a lower limit of the design parameter, selects multiple parameters from a parameter region defined by the upper limit and the lower limit, performs experiments and/or numerical calculations on a flow with respect to the selected multiple parameters, assigns word representations and/or regular expressions to the results of experiments and/or numerical calculations, and selects, as the possible design parameter, a design parameter having the word representation and/or regular expression representing an optimum state among the assigned word representations and/or regular expressions.

According to still another aspect of the present invention, in the fluid transition route acquisition apparatus described above, even in a case where the assigned word representations and/or regular expressions do not include the word representation and/or regular expression representing the optimum state, the simulation unit selects the design parameter as the possible design parameter when the word representations and/or regular expressions include the word representation and/or regular expression representing the optimum state via one transition.

According to still another aspect of the present invention, in a fluid transition route acquisition method performed by a computer including a storage unit and a control unit, the storage unit stores pattern transition information on whether a structurally stable flow pattern in whole or in part of a topological two-dimensional flow structure can transition to another structurally stable flow pattern via a structurally unstable flow pattern in an intermediate state, and the fluid transition route acquisition method includes a transition information acquisition step of, according to the pattern transition information, acquiring transition information on a transition route leading from a specified structurally stable flow pattern to another structurally stable flow pattern that can be topologically adopted, the step being executed by the control unit.

According to still another aspect of the present invention, in a program to be executed by a computer including a storage unit and a computer, the storage unit stores pattern transition information on whether a structurally stable flow pattern in whole or in part of a topological two-dimensional flow structure can transition to another structurally stable flow pattern via a structurally unstable flow pattern in an intermediate state, and the program causes the control unit to execute a transition information acquisition step of, according to the pattern transition information, acquiring transition information on a transition route leading from a specified structurally stable flow pattern to another structurally stable flow pattern that can be topologically adopted.

The present invention further relates to a recording medium that stores the program.

Advantageous Effects of Invention

According to the present invention, pattern transition information on whether a structurally stable flow pattern in whole or in part of a topological two-dimensional flow structure can transition to another structurally stable flow pattern via a structurally unstable flow pattern in an intermediate state is stored, and, according to the pattern transition information, transition information on a transition route from a specified structurally stable flow pattern to another structurally stable flow pattern that can be topologically adopted is acquired. This leads to an effect that it is possible to obtain knowledge on the flow pattern transition. Particularly, because the topological transition order can be specified from the transition information, for example, the flow pattern transition order can be used as a reference for structure designing in order to lead to an ideal flow pattern in designing, for example, an aircraft.

According to the present invention, the transition information includes information on the structurally unstable flow pattern in the intermediate state to the another structurally stable flow pattern. This leads to an effect that it is possible to determine the intermediate state of transition between structurally stable flow patterns. Specifically, regarding the time evolution of a flow field around a wing of an airplane, it is possible to understand the mechanism on how a change of important characteristics serving as the wing function, such as the lift/drag ratio at each time, is formed and how it is lost. Accordingly, a guide to improvement in designing a wing function is obtained, enabling an efficient optimization method.

According to the present invention, the transition information leading from one of two specified structurally stable flow patterns to the other structurally stable flow pattern is acquired according to the pattern transition information. This leads to an effect that, when two structurally stable flow patterns can transition to each other, it is possible to obtain knowledge on a flow pattern transition route and a flow pattern in the intermediate state between them, etc.

According to the present invention, the transition information including the number of transitions each from one of the structurally stable flow patterns to the other structurally stable flow pattern, in which transition via the structurally unstable flow pattern in the intermediate state is regarded as one transition, is acquired. This leads to an effect that, by knowing how much transition is necessary for transition between two flow patterns as the number of transitions, it is possible to obtain a distance index representing remoteness or closeness in the flow structure.

According to the present invention, the transition information leading from one of the structurally stable flow patterns to the other structurally stable flow pattern with the minimum number of transitions is acquired. This leads to an effect that it is possible to obtain knowledge on the shortest flow pattern transition route.

According to the present invention, the structurally stable flow pattern is identified by a word representation that is formed by assigning any one of operation words that define five types of operations that can be topologically adopted to add one hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1 source-sink point in a doubly connected exterior domain with two holes. The pattern transition information is information in which the structurally stable flow patterns that can transition to each other via the structurally unstable flow pattern in the intermediate state are described with the word representations, and the transition information is acquired according to the pattern transition information by using the word representation of the specified structurally stable flow pattern as a reference. Accordingly, the present invention leads to an effect that, to determine flow pattern topological transition possibility, a computer can easily deal with it with word representations.

According to the present invention, the pattern transition information includes information on a change in operation word for word representation between the structurally stable flow patterns that can transition to each other via the structurally unstable flow pattern in the intermediate state, and the transition information is acquired according to the information on the change by using the change in operation word for word representation between the two structurally stable flow patterns as a reference. Accordingly, the present invention leads to an effect that it is possible to search for a transition route efficiently by using the change of the word representation as a reference.

According to the present invention, when there are multiple possible transition routes that are acquired according to the pattern transition information by using the word representation of the specified structurally stable flow pattern as a reference, one transition route is specified by using a regular expression with one-to-one correspondence to the flow pattern. This leads to an effect that it is possible to specify a transition route without performing pattern matching even when there are multiple possible transition routes.

According to the present invention, when there are multiple possible transition routes that are acquired according to the information on the change by using the change in operation word for word representation between the two structurally stable flow patterns as a reference, regular expressions corresponding respectively to the word representations of the two structurally stable flow patterns are acquired and, regarding the multiple possible transition routes, when a subrepresentation for causing the transition is not contained in the regular expression corresponding to the word representation of one of the structurally stable flow patterns, the possible transition is excluded from possible transition routes. This leads to an effect that, by only comparing the subrepresentation of the possible transition route with the regular expression, it is possible to exclude a possible transition route via which the flow pattern would never transition.

According to the present invention, when there are multiple possible transition routes that are not excluded, regular expressions corresponding respectively to the multiple possible transition routes that are not excluded are acquired and, as a transition pattern, a possible transition route is specified among the multiple possible transition routes that are not excluded, whose corresponding regular expression matches the regular expression corresponding to the word representation of the other structurally stable flow pattern. This leads to an effect that it is possible to specify one transition route by only comparing the regular expressions with each other.

According to the present invention, the regular expression is created according to a graph representation with one-to-one correspondence with the flow pattern. This leads to an effect that it is possible to provide a new representation method enabling one-to-one correspondence to the flow pattern.

According to the present invention, the graph representation is obtained by assigning a unique rooted, labeled and directed tree $T_H=(V,E)$ (where V is a set of points called vertices and E is a set of edges connecting the vertices) to a structurally stable Hamiltonian vector field H defined by the flow pattern and then visualizing the tree as a plane graph. This leads to an effect that, for a structurally stable Hamiltonian vector field, it is possible to provide, as a graph representation, one obtained by visualizing a unique rooted, labeled and directed tree into a plane graph.

According to the present invention, to select a possible design parameter for an object in a fluid, an upper limit and a lower limit of the design parameter are set, multiple parameters are selected from a parameter region defined by the upper limit and the lower limit, experiments and/or numerical calculations on a flow with respect to each of the selected multiple parameters are performed, word representations and/or regular expressions are assigned to the results of experiments and/or numerical calculations, and a design parameter having the word representation and/or regular expression representing an optimum state among the assigned word representations and/or regular expressions is selected as the possible design parameter. This leads to an effect that it is possible to set an ideal circumstance as a word representation or a regular expression of a flow pattern from the beginning and search for a parameter region enabling it. Accordingly, it is possible to search "possible" design parameters that realize optimum setting quickly and as many as possible. Starting from those possible design parameters, implementing the known optimization method increases the possibility that a large number of and highly-feasible design parameters can be obtained.

According to the present invention, even in a case where the assigned word representations and/or regular expressions do not include the word representation and/or regular expression representing the optimum state, the design parameter is selected as the possible design parameter when the word representations and/or regular expressions include the word representation and/or regular expression representing the optimum state via one transition. This leads to an effect that it is possible to adopt, as a possible design parameter, one with a word representation and/or word expression representing the optimum state via one transition.

BRIEF DESCRIPTION OF DRAWINGS

FIG. 2 is a diagram schematically showing flow patterns.

FIG. 9-A is a (first) diagram showing h-unstable streamline patterns generated by an operation $D_{0,s}$.

FIG. 9-B is a (second) diagram showing h-unstable streamline patterns generated by the operation $D_{0,s}$.

FIG. 13 is a diagram showing h-unstable streamline patterns generated by the operation $D_{2,s}$ and perturbation thereof.

FIG. 15 is a diagram showing h-unstable streamline patterns generated by the operations $E_{2,s}$ and $E_2$ and perturbation thereof.

FIG. 23 is a (second) diagram showing p-unstable streamline patterns generated by the operations $\Delta_1$ and perturbation thereof.

FIG. 26 is a diagram showing a list of h-unstable streamline patterns appearing as intermediate states each between two structurally stable streamline patterns.

FIG. 27 is a diagram showing a list of h-unstable streamline patterns appearing as intermediate states each between two structurally stable streamline patterns.

FIG. 28 is a diagram showing a list of p-unstable streamline patterns appearing as intermediate states each between two structurally stable streamline patterns.

FIG. 35 is a diagram showing the transition occurring in evolution from the time t=5.5 to 7.7.

FIG. 47-A is a flowchart for explaining a process of converting a saddle connection diagram of O system into a tree.

FIG. 47-B is a flowchart for explaining the process of converting a saddle connection diagram of O system into a tree.

FIG. 47-C is a flowchart for explaining the process of converting a saddle connection diagram of O system into a tree.

FIG. 47-D is a flowchart for explaining the process of converting a saddle connection diagram of O system into a tree.

FIG. 47-E is a flowchart for explaining the process of converting a saddle connection diagram of O system into a tree.

FIG. 50-A is a flowchart for explaining a process of converting an ss-saddle connection diagram of I, II system into a tree.

FIG. 50-B is a flowchart for explaining the process of converting an ss-saddle connection diagram of I, II system into a tree.

FIG. 50-C is a flowchart for explaining the process of converting an ss-saddle connection diagram of I, II system into a tree.

FIG. 50-D is a flowchart for explaining the process of converting an ss-saddle connection diagram of I, II system into a tree.

FIG. 51-A is a diagram showing graph representations of structurally stable streamline patterns with word representations $IA_0C$ and their corresponding regular expressions.

FIG. 51-B is a flowchart for explaining a process of converting a tree into a regular expression.

FIG. 52 is a block diagram showing an exemplary fluid transition route acquisition apparatus 101 to which the second embodiment is applied.

FIG. 55 is a diagram showing transition occurring in the time evolution from the time t=5.5 to 7.7.

DESCRIPTION OF EMBODIMENTS

Figure 1:
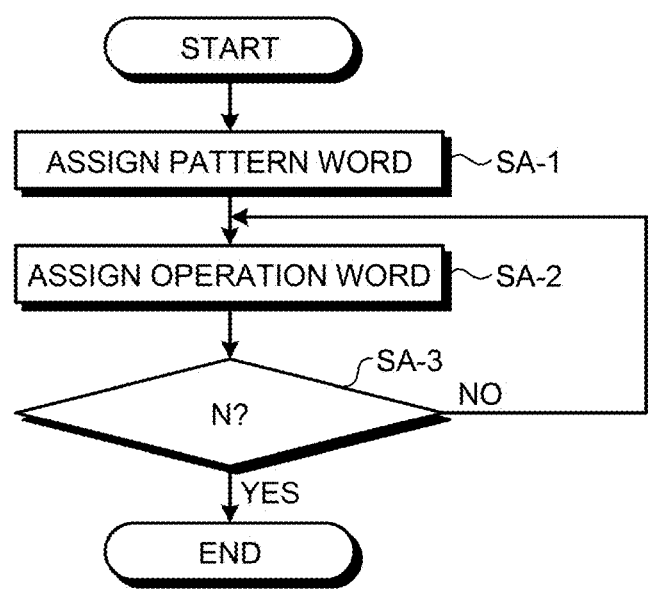
FIG. 1 is a flowchart showing an overview of a word representation algorithm used in the present embodiment.

Embodiments of a fluid transition route acquisition apparatus, a fluid transition route acquisition method, and a program according to the present invention will be described in detail below according to the drawings. The embodiments do not limit the invention.

First Embodiment

Overview of Embodiment of Present Invention

An overview of an embodiment of the present invention will be described with reference to FIGS. 1 to 28 and then the configuration, processing, etc., of the embodiment will be described in detail.

First, according to the embodiment, pattern transition information on whether a structurally stable flow pattern (also referred to as the "streamline pattern") in whole or in part of a topological two-dimensional flow structure can transition to another structurally stable flow pattern via a structurally unstable flow pattern in an intermediate state is stored. The method of acquiring such pattern transition information exhaustively will be described below.

Furthermore, according to the embodiment, transition information on a transition route leading from a specified structurally stable flow pattern to another structurally stable flow pattern that can be adopted topologically is acquired according to the pattern transition information. In short, according to the embodiment, a specified structurally stable flow pattern is regarded as a start point and a transition route leading to another structurally stable flow pattern is searched for. According to the embodiment, all possible routes may be derived. For example, a specified structurally stable flow pattern is regarded as a start point and, with reference to pattern transition information, all second structurally stable flow patterns each via a structurally unstable flow pattern in an intermediate state may be written out. Then, each of the secondarily structurally stable flow patterns may be regarded as a start point and, with reference to the pattern transition information, all thirdly structurally stable flow patterns each via a structurally unstable flow pattern in an intermediate state may be written out. By repeating the above-described process, all possible transition routes may be calculated. As in searching routes, such as roads, structurally stable flow patterns may be regarded as nodes, one transition via a structurally unstable flow pattern in an intermediate state may be regarded as a link, and a transition route may be searched for by using, for example, a known route search method.

According to the embodiment, the transition information may include information on a flow pattern in a structurally unstable flow pattern in an intermediate state to another structurally stable flow pattern. In other words, according to the embodiment, not only the order of structurally stable flow patterns in the transition may be acquired as the transition route, but also the structurally unstable flow pattern in the intermediate state between the structurally stable patterns may be acquired as part of the transition route.

According to the embodiment, transition information leading from one of two specified structurally stable flow patterns to the other structurally stable flow pattern may be acquired according to the pattern transition information. More specifically, according to embodiment, the specified one of the structurally stable flow patterns may be regarded as a start point, the other structurally stable flow pattern may be regarded as a terminus, and a transition route between them may be searched for. When there is no transition route between the two structurally stable flow patterns, the result representing that transition is impossible is acquired as the transition information.

According to the embodiment, transition information including the number of transitions each leading from one of the structurally stable flow patterns to the other structurally stable flow pattern, in which transition via the structurally unstable flow pattern in the intermediate state is regarded as one transition, may be acquired. In other words, the number of transitions may be acquired as a distance scale representing remoteness or closeness in the flow structure between the two flow patterns.

According to the embodiment, transition information leading from one of structurally stable flow patterns to the other structurally stable flow pattern with the minimum number of transitions may be acquired. In other words, according to the embodiment, the number of transitions may be used as an index to calculate the shortest transition route.

In order for a computer to easily deal with topologies of flow patterns, the flow patterns may be identified (labeled) with word representations. For example, a structurally stable flow pattern may be identified by a word representation that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes. According to the embodiment, as described above, identifying flow patterns with word representations makes it possible to, according to the pattern transition information in which the above-described structurally stable flow patterns that can transition to each other via the structurally unstable flow pattern in the intermediate state are described with word representations, acquire transition information by using the word representation of a specified structurally stable flow pattern as a reference. According to the embodiment, information on the change in operation word for word representation between structurally stable flow patterns that can transition to each other via a structurally unstable flow pattern in an intermediate state may be incorporated in the pattern transition information, whereby the transition information is acquired according to the change information by using, as a reference, the change in operation word for word representation between the two specified structurally stable flow patterns.

According to the embodiment, an algorithm forming the word representations is referred to as a "word conversion algorithm". For the "word conversion algorithm", the following Published Paper (T. Yokoyama and T. Sakajo, "Word representation of streamline topology for structurally stable vortex flows in multiply connected domains", Proc. Roy. Soc. A 469 (2013) doi: 10.1098/espa.2012.0558) (hereinafter, referred to as "Published Paper (2013)") can be referred to.

That is the overview of the embodiment.

Word Conversion Algorithm

An overview of the word conversion algorithm for forming the above-described word representations will be described below. FIG. 1 is a flowchart showing the overview of the word representation algorithm according to the embodiment.

According to the embodiment, first of all, as shown in FIG. 1, in order to form a word representation of a flow pattern in a connected exterior domain with N holes topologically, any one of pattern words (such as I, II and O) defining three types of flow patterns in total including, in addition to two types of flow patterns adoptable topologically in a simply connected exterior domain having one hole, a pattern without any 1-source-sink point in a doubly connected exterior domain with two holes, is assigned (step SA-1).

According to the embodiment, any one of operation words (such as $A_0$, $A_2$, $B_0$, $B_2$ and C) defining five types of operations adoptable topologically to add one hole to the flow pattern is assigned to the word assigned at step SA-1 (step SA-2) and the processing at step SA-2 is repeatedly performed until the number of holes reaches N (step SA-3), whereby a word representation corresponding to the connected exterior domain with N holes is formed. In this example, the pattern word is assigned (step SA-1) first and then the operation word is assigned (step SA-2). Alternatively, an operation word may be assigned first and then a pattern word may be assigned.

According to the embodiment, the "connected exterior domain" is an expression including simply connected exterior domain and multiply connected exterior domain, and the "simply connected exterior domain" refers to a domain in a two dimensional space (plane) with one hole and the "multiply connected exterior domain" refers to a domain in a two dimensional space (plane) with multiple holes. The expression "hole" is a mathematical abstract expression and various modes of expression may be applied. For example, when a uniform flow occurring when a vehicle moves is focused on and if there are one or more structures in a cross-section of the vehicle along the uniform flow, the domain may be dealt with as a simply connected exterior domain or a multiply connected exterior domain. As for, for example, a flying object, such as an airplane that travels in the air, a ground traveling vehicle, such as a train or a car that travels through the air, or a vehicle, such as a ship that travels on or in the sea, the domain can be dealt with as connected exterior domain of simply connect or multiply connect with one or more holes. In other words, according to the embodiment, a flow, such as a "flow with one or more obstacles in a flow" can be dealt with as a flow in a connected exterior domain. Furthermore, an independent vortex structure or a flow structure with a bounding closed orbit (an elliptic stagnation point) can also be referred to as a "hole".

As described above, assigning word representations to flow patterns allows topological classification of flows in a multiply connected exterior domain. "Topological" is a mathematical jargon indicating one geometric field also referred to as topology. In traditional geometry, a triangle and a square are regarded as different figures because of their difference in the number of corners; however, from the topological viewpoint, such detailed information is not focused on and a triangle and a square are regarded as diagrams equivalent to each other from, for example, a viewpoint that, for example, an elastic band is deformable between a triangle and a square. In other words, all polygons are regarded to be equivalent to circles. On the other hand, if there is a circular domain obtained by, for example, taking a circle out of another circle, the circle and the circular domain cannot be deformed by deforming one elastic band and therefore they are regarded as different diagrams. While, if the number of holes is different between multiply connected exterior domains, they are regarded as different diagrams topologically, they are regarded to be equivalent to each other if only the holes in the domains have the same shape regardless of whether the shapes of the holes are circular, rectangular or segment. For this reason, what characterizes the domain of flow is only the number of holes and, accordingly, a connected exterior domain is expressed by $D_\zeta(M)$ for the number of holes M+1 according to the embodiment. For example, there is a simply connected exterior domain $D_\zeta(0)$ when there is only one hole, and there is a doubly connected exterior domain $D_\zeta(1)$ when there are two holes.

To deal with topological classification of flows, a certain specific structure that characterizes a flow (referred to as a "topology") is captured and, if there are two flows having the specific structure and if both of them cannot deform mutually according to continuous deformation of the specific structure (i.e., without cutting and pasting), they are regarded as different flows.

Descriptions of Components of Flows

The components of flows that are dealt with in the embodiment will be described here with reference to FIGS. 2 to 4. Incompressible flows may be used as "flows" according to the embodiment. The incompressibility of fluid refers to the property that the volume does not change even if a force is applied. It is generally permissible to consider the flows of normal water or the atmosphere, when considered in the scale of daily life, in the frame of such flows. The present invention is not limited to this, and compressible flows may be dealt with in calculations.

The fluid according to the embodiment may be dealt with as an inviscid fluid. For an inviscid fluid, a boundary condition can be dealt with as a "slip condition". The boundary condition for an viscid fluid is a "zero boundary condition"; however, even for a viscid fluid, if its viscosity is not high, the vortex has a layered flow around the boundary, and virtually extending the outer boundary of the flow makes it possible to deal with the boundary condition as a "slip condition". Particularly, the word conversion algorithm for inviscid fluid according to the embodiment will be described and properly extending the boundary makes it possible to apply the embodiment to viscid fluids.

The components of the flows dealt with in the embodiment are the following three components: obstacle, vortex, and uniform flow. Obstacles refer to holes in a connected exterior domain, and it can be derived from the general mathematical theory on fluids that, even if the shapes of the holes are regarded as circles upon topological classification, it does not have any effect on the result given mathematically. FIG. 2 is a diagram schematically showing flow patterns. FIG. 2(c) schematically shows a boundary with four ∂-saddle points (the definitions will be described below).

As shown in FIG. 2(a), a vortex is a component that creates a flow rotating around the vortex. A uniform flow refers to, in a river current, a basic flow that is a flow across the domain. In the case of a moving object, such as a vehicle, a uniform flow refers to a flow, such as a relative air flow or a water flow, viewed from an observer on the vehicle. In other words, in the coordinate system of a moving object, even if the air or water are still, a relative flow flowing from a point at infinity can be recognized.

The component of a uniform flow is referred to as a 1-source-sink point (for its mathematical definition, see Definition 2.1 in Published Paper (2013)).

There is a reason for referring to the component not as a uniform flow but as a 1-source-sink point. In order to explain the reason, some mathematical explanations will be given below. When there exists a uniform flow, the assumed domain is a connected exterior domain where multiple holes (obstacles) are buried in a plane that extends infinitely, which is difficult to deal with for schematic representation. For this reason, using a projection method referred to as stereographic projection in mathematics, the plane may be projected onto a sphere. In this case, the point at infinity on the plane can correspond to the North Pole on the sphere and the origin can correspond to the South Pole.

Accordingly, the uniform flow has a flow structure of a pair of a source and a sink of the flow at the North Pole on the sphere, and it can be mathematically represented that it corresponds to a flow field like that shown in FIG. 2(b). Furthermore, in order for a further schematic representation of the flow field, the positions of the North Pole and the South Pole can be shifted properly by utilizing the highly symmetrical shape of sphere and therefore re-projection onto the plane by using stereographic projection after the point at infinity is positioned at the South Pole and the center of a circular hole (obstacle) is positioned at the North Pole leads to a flow like that shown in FIG. 2(b) near the origin corresponding to the South Pole. Furthermore, because the circular boundary with its center at the point at infinity is projected into an exterior circular boundary on the plane, the flow field over the plane can be resultantly represented in a bounded domain in a shape like that shown in FIG. 3. Regarding a connected exterior domain $D_\zeta(M)$, according to this conversion method, a connected domain containing M boundaries that is obtained by regarding the source-sink point at the point of infinity as the origin, choosing one of M+1 boundaries, and shifting the boundary to a unit circle exterior domain is written in $D_z(M)$. Accordingly, a representation like that shown in FIG. 2(b) via the proper projection method is equivalent to flows with a uniform flow over the plane. In the descriptions of the embodiment, because such a projection method is useful to schematically represent flows, flows will be sometimes represented in the drawings by using the projection method.

Figure 3:
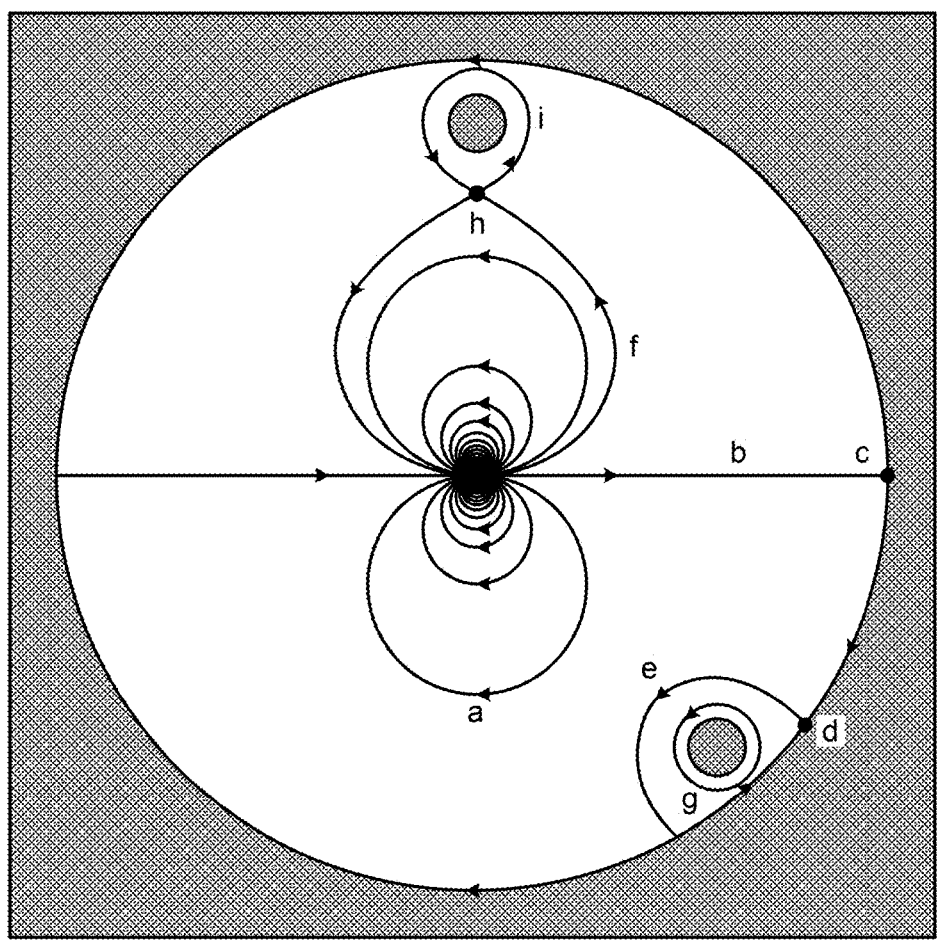
FIG. 3 is a diagram illustrating all characteristic orbits (streamlines) to perform topological classification of structurally stable flows in a domain.
Figure 4:
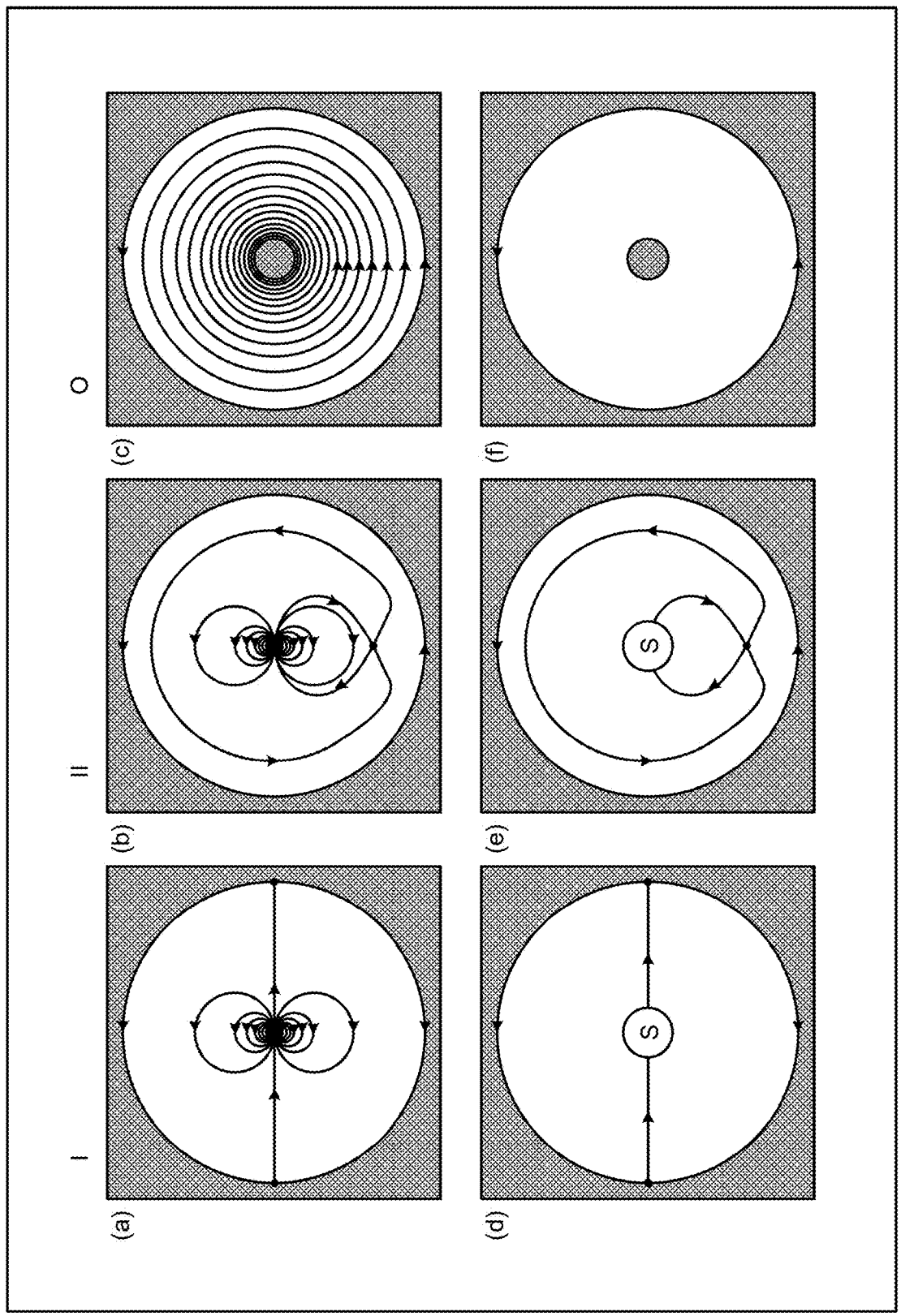
FIG. 4 is a diagram schematically showing three types of structurally stable flow patterns serving as initial structures.

FIG. 3 is a diagram illustrating all characteristic orbits (streamlines) to perform topological classification of structurally stable flows in such a connected domain $D_z(M)$. First of all, orbits departing from and returning to a 1-source-sink point as shown in FIG. 3(a) are referred to as ss-orbits. The lines represent the respective streamlines of a uniform flow in the connected exterior domain. Secondly, an orbit departing from the 1-source-sink point and connecting onto a boundary as shown in FIG. 3(b) is referred to as an ss-∂-saddle connection, and a point on the boundary to which the orbit connects as shown in FIG. 3(c) is referred to as an ss-∂-saddle.

An orbit departing not from the 1-source-sink point but from a point at a boundary and connecting to a point at the same boundary as shown in FIG. 3(e) is referred to as a ∂-saddle connection, and a point on the boundary thus connected as shown in FIG. 3(d) is referred to as a ∂-saddle. A hyperbolic stationary point not on any boundary as shown in FIG. 3(h) is referred to as a saddle point, and an orbit departing from the 1-source-sink point and connecting to the saddle point as shown in FIG. 3(f) is referred to as an ss-saddle connection. A closed curved orbit going around a boundary and the circumference of a vortex as shown in FIG. 3(g) is referred to as a closed orbit, and an orbit departing from and returning to the saddle point as shown in FIG. 3(i) is referred to as a homoclinic saddle connection. It can be mathematically proved that targeted structurally stable flows can be only represented by combinations of these orbits.

According to the embodiment, at the above-described step SA-2, a hole and the structure involved are added to the flow of a connected exterior domain $D_z(M-1)$ with M holes to inductively construct a flow field of a multiply connected exterior domain $D_z(M)$ with an additional hole. For this reason, one serving as an initial structure of the inductive configuration in a simply connected exterior domain $D_z(0)$ or a doubly connected exterior domain $D_z(1)$ is assigned at step SA-1.

Specifically, the above-described basic flow patterns are of three types in total:

1) a pattern I with a 1-source-sink point and two ss-∂-saddle connections, 2) a pattern II with a 1-source-sink point, a saddle point, a homoclinic saddle connection connecting to the saddle point, and two ss-saddle connections, and 3) a pattern O without any 1-source-sink point. FIG. 4 is a diagram schematically showing the three types of structurally stable flow patterns that serve as initial structures.

In other words, as shown in FIGS. 4(a) and 4(b), there exist two types of flows, Pattern I and Pattern II, in a simply connected exterior domain $D_z(0)$ with a hole. Each of these patterns has a 1-source-sink point, and it can be mathematically proved that there are only these two types. For a flow with a 1-source-sink point for which a uniform flow is supposed, while a doubly connected exterior domain $D_z(1)$ is constructed essentially from them, a flow without any 1-source-sink point cannot be constructed from them, and an initial flow necessary to construct that flow corresponds to the pattern O that is schematically shown in FIG. 4(c). In order to simply represent the topologies, the 1-source-sink point is denoted by a circled S in the drawings and ss-orbits and closed orbits are not represented because there exist an infinite number of ss-orbits and closed orbits. As shown in FIGS. 4(d) and 4(e), they will be schematically represented simply below. As shown in FIG. 4(c), not all closed orbits of a flow pattern in a doubly connected exterior domain $D_z(1)$ are drawn and they will be simply illustrated as shown in FIG. 4(f).

Descriptions of Operation Word

An "operation" of adding a hole and the flow structure involved to inductively construct a flow will be described with reference to FIGS. 5 and 6. In other words, an operation of adding one hole to the flow in a connected exterior domain $D_z$ (M-1) with M holes to calculate a flow in a multiply connected exterior domain $D_z(M)$ will be described.

At the above-described step SA-2, five operations that can be adopted topologically are:

1) an $A_0$ operation of replacing an ss-orbit with a saddle point, a homoclinic saddle connection connecting to the saddle point and enclosing a hole, and two ss-saddle connections;

2) an $A_2$ operation of replacing an ss-orbit with two ss-∂-saddle connections and two ∂-saddles at a boundary newly added;

3) a $B_0$ operation of replacing a closed orbit with two homoclinic saddle connections forming a figure eight by adding a hole and a saddle point (this pattern will be referred to as a figure eight pattern below);

4) a $B_2$ operation of replacing a closed orbit with an orbit with a ∂-saddle connection connecting two ∂-saddles added at a boundary of a hole newly added; and 5) a C operation of newly adding two ∂-saddles at a boundary already having 2k (k>0) ∂-saddles and connecting the two ∂-saddles with a ∂-saddle connection to enclose a hole newly added.

Figure 5:
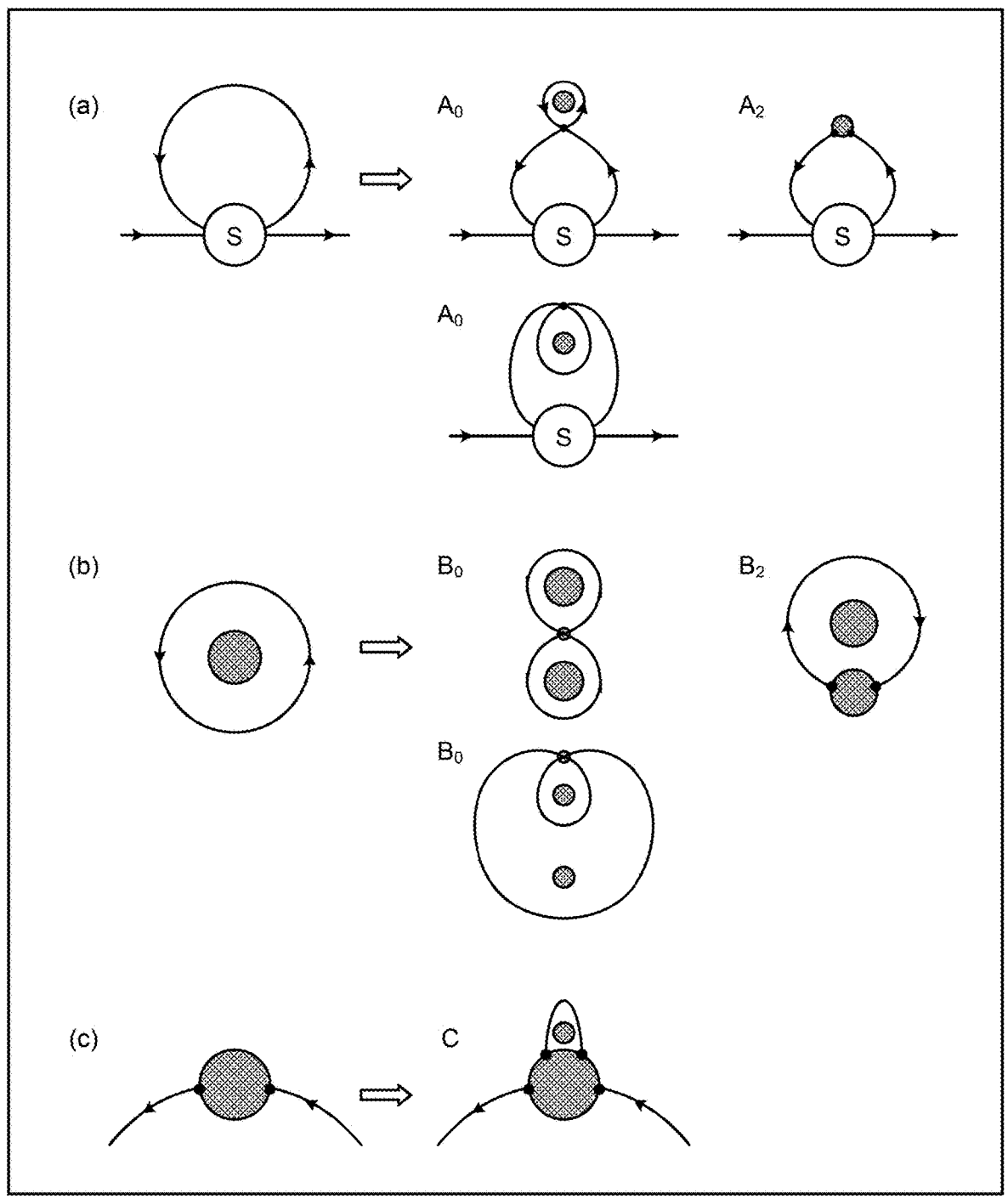
FIG. 5 is a diagram schematically showing five types of operations to construct a structurally stable flow by adding one hole.

FIG. 5 is a diagram schematically showing five types of operations of constructing a structurally stable flow by adding a hole.

As shown in FIG. 5(a), the operations $A_0$ and $A_2$ are applied to an ss-orbit. Furthermore, as shown in FIG. 5(b), the operations $B_0$ and $B_2$ are applied to a closed orbit. Furthermore, as shown in FIG. 5(c), the operation C is applied to a boundary already having ∂-saddles. It can be mathematically proved that there are only five types of operations to make that possible while maintaining structural stability (See Theorem 3.1, Corollary 3.1, Theorem 3.2 in Published Paper (2013)). As for flow pattern diagrams obtained by repeating the steps, a diagram from the pattern I or II is referred to as an ss-saddle connection diagram and a diagram from the pattern O is referred to as a saddle connection diagram.

The number of holes is increased one by one by performing these operations from the three types of flow patterns I, II and O of the initial structure assigned at step SA-1 (N to M+1) so that the flow in the domain with many holes is inductively constructed, and thus, according to the embodiment, the sequence of operation words representing the operations is regarded as a sequence of words and they are listed, whereby a word representation of the flow field can be obtained. FIG. 6 is a diagram showing all classification of structurally stable flow patterns with two structures and a uniform flow. As shown in FIG. 6, by assigning operation words to the initial structural Patterns I and II in simply connected exterior domains $D_z(0)$, all flow patterns in a doubly connected exterior domain $D_z(1)$ can be illustrated. Note that the total number of types of the flow patterns shown in FIG. 6 is not ten from two types (I and II)×five types ($A_0$, $A_2$, $B_0$, $B_2$ and C). In other words, the operation words are not obtained by arbitrarily arranging the five types of operation words and there are various limitations for mathematical reasons.

The limitations can be described as follows. Because the operations $A_0$ and $A_2$ are applied to an ss-orbit as described with FIG. 5, the existence of an ss-orbit is essential to the premise of applying the operations. Furthermore, because the operations $B_0$ and $B_2$ are applied to a closed orbit, the existence of a closed orbit is essential to the premise of applying the operations. Furthermore, because the operation C is applied to a boundary with a ∂-saddle, the existence of a boundary with a ∂-saddle is essential to the premise of applying the operation. For this reason, the rule of arrangement differs depending on from which of I, II and O the pattern words start. Descriptions will be given below for the rules of arranging the word sequences starting from the respective pattern words I, II and O, which are derived according to the above-described constraints.

There are the following rules to start with the pattern word O without any 1-source-sink point. The necessary and sufficient conditions for the word representation starting with O are as follows:

O-1) only $B_0$, $B_2$ and C are operations that can be practically applied, and accordingly the word representations starting with O is the list of these three words; and O-2) $B_2$ has to exist before C in order for the word C to be included in the word representation of the operation sequence.

Such a word sequence is referred to as a word of O system (O-word) and the correctness of the rules can be mathematically proved (see Lemma 3.1 in Published Paper (2013)).

For the word representation starting with the pattern word I, it is necessary to satisfy the following rules:

I-1) all $A_0$, $A_2$, $B_0$, $B_2$ and C are operations that can be applied and accordingly the word representation starting with I is the list of these five types of operation words; and I-2) C or $A_2$ has to exist before $B_0$ or $B_2$ in order for the word of $B_0$ or $B_2$ to be included in the word representation of the operation sequence.

Such a word sequence is referred to as a word of I system (I-word) and the correctness of the rules can be mathematically proved (see Lemma 3.3 in Published Paper (2013)).

Lastly, for the word representation starting with the pattern word II, is necessary to satisfy the following rules:

II-1) $A_0$, $B_0$, $B_2$ and C are operations that can be applied and accordingly the word representation starting with II is the list of these four words; and II-2) $B_2$ has to exist before C in order for the word C to be included in the word representation of the operation sequence.

Such a word sequence is referred to as a word of II system (II-word) and the correctness of the rules can be mathematically proved (see Lemma 3.4 in Published Paper (2013)).

A word representation obtained by excluding redundant word representations and inclusive word representations from the group of word representations is referred to as a maximal word representation. For example, for maximal word representations, word representations without any redundancy or inclusion relation may be formed by interchanging word representations according to the inclusion relations shown in the following table. In the following table, "=" denotes a matching relation and "≤" or "≥" denotes an inclusion relation. The only exceptions are $B_2$ and C that cannot be interchanged because no inclusive relation is satisfied even if they are interchanged, which is symbolically represented by $B_2C \| CB_2$. The maximal word representation is used because it is easy deal with as no redundancy or inclusive relation is involved; therefore, maximal word representations are not necessarily used to carry out the embodiment. For example, maximal word representations are not necessarily used if redundancy and inclusion relations are permitted to assign word representations (for example, if multiple corresponding word representations are assigned to a structurally stable flow pattern). Furthermore, once an algorithm, such as Algorithm B or its subspecies, is determined, a word representation can be assigned uniquely to an assigned flow.

TABLE 1

|  | $A_0$ | $A_2$ | $B_0$ | $B_2$ | C |
|---|---|---|---|---|---|
| $A_0$ | = | = | ≤ | ≤ | = |
| $A_2$ |  | = | = | = | ≤ |
| $B_0$ |  |  | = | ≤ | ≥ |
| $B_2$ |  |  |  | = | ∥ |
| C |  |  |  |  | = |

Representing streamline structures of flow patterns with words owing to word representations of flow patterns allows classification of all possible flow patterns.

Pattern Transition Information

Pattern transition information according to the embodiment will be described here. It may be assumed that a flow field may be already labeled with a unique maximal word expression by using the above-described algorithm. Note that the embodiment is not limited to using maximal word representations if redundancy and inclusion relation are permitted to assign word representations to the pattern transition information as described above.

The pattern transition information according to the embodiment is information that is obtained by, when maximal word representations $W_1$ and $W_2$ are assigned to two structurally stable streamline patterns, determining whether the two streamline patterns are interchangeable via an intermediate state and, when they are interchangeable, specifying a possible streamline pattern in the intermediate state.

An exemplary method of calculating pattern transition information according to the embodiment will be described. First of all, let W denote maximum word representations of assigned structurally stable flow patterns, and "indices" of the maximal words are defined as follows.

Definition 2.1

Let $a_0(W)$, $a_2(W)$, $b_0(W)$, $b_2(W)$ and $c(W)$ denote the numbers of words $A_0$, $A_2$, $B_0$, $B_2$ and C contained in the maximal word W, respectively. When W denotes a maximal word of O system (maximal O-word), a maximal word of I system (maximal I-word) and a maximal word of II system (maximal II-word), the indices of W are defined, respectively, as $ind_O(W) = (0,0,b_0(W),b_2(W),c(W))$, $ind_I(W) = (a_0(W),a_2(W)+1,b_0(W),b_2(W),c(W))$, $ind_{II}(W) = (a_0(W)+1,a_2(W),b_0(W),b_2(W),c(W))$.

A subsequence S of words (not necessarily neighboring) contained in the maximal word representation W is referred to as a subword of W.

Definition 2.2

Given that $W = O_0 O_1 \ldots O_k$ for a maximal word, $O_0$ is any one of O, I and II and $O_i$ ($1 \le i \le k$) is any one of $A_0$, $A_2$, $B_0$, $B_2$ and C. Part of the word sequence contained in W, that is, $S = O_{i_1} \ldots O_{i_l}$ ($0 \le i_1 < \ldots < i_l \le k$) is referred to as the subword of W, which is described as $S \subseteq W$.

Because $i_1 = 0$ is permitted in this definition, words representing three types of patterns, namely O, I and II, can be contained in the subword S.

Figure 7:
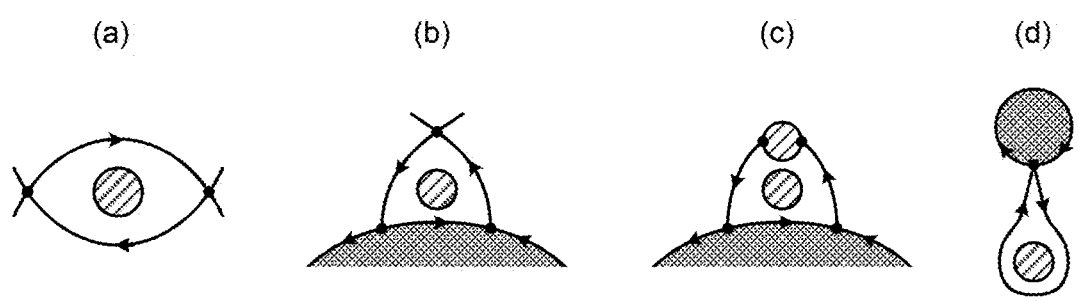
FIG. 7 is a diagram of exemplary structurally unstable orbits.

A transient state (intermediate state) that occurs between the topologies of structurally stable streamline patterns represented by the two assigned maximal word representations $W_1$ and $W_2$ is assigned to $W_1$ and $W_2$. Such a transient state immediately changes to two or more structurally stable patterns when added with some small perturbation; therefore, the pattern is a "structurally unstable" streamline pattern. In order to construct a streamline representing an intermediate state, it is thus necessary to use a structurally unstable flow field and a structurally unstable streamline pattern. Flow components constituting such structurally unstable flows will be given as described below. FIG. 7 is a diagram of exemplary structurally unstable orbits.

First of all, orbits connecting two different saddle points as shown in FIG. 7(a) are referred to as heteroclinic orbits.

FIG. 7(b) shows (two) s-∂-saddle connections connecting a saddle point with two ∂-saddles on a boundary. As described, an s-∂-saddle connection is an orbit connecting a saddle point with a ∂-saddle on a boundary.

FIG. 7(c) shows (two) heteroclinic ∂-orbits each of which connects two ∂-saddles on two different boundaries with each other. As described, a heteroclinic ∂-orbit is an orbit that connects ∂-saddles on two different boundaries.

A pair of saddle points connected with such orbits or a pair of circular boundaries will be referred to as a "heteroclinic pair" below. Furthermore, an incompressible flow field that has only one heteroclinic pair and that is wholly structurally stable except for the heteroclinic pair as shown in FIGS. 7(a), 7(b) and 7(c) will be referred to as being "h-unstable" or the streamline pattern of the flow field will be referred to as the "h-unstable streamline pattern".

On the other hand, FIG. 7(d) shows a homoclinic pinching orbit on a boundary. A homoclinic stagnation point on a boundary connecting to four branching orbits (separatrices) is referred to as a "pinching point". As shown in FIG. 7(d), a homoclinic pinching orbit represents an orbit where two of the four branching orbits are on the boundary and the remaining two orbits are connected with each other. An incompressible flow field that has only one pinching point and that is structurally stable except for the pinching point will be referred to as being "p-unstable" or the streamline pattern of the flow field will be referred to as the "p-unstable streamline pattern".

In the embodiment, a structurally unstable streamline pattern in an intermediate state between two structurally stable flow fields is represented by using the h-unstable or p-unstable flow field. Structurally unstable flow fields may include not only p-unstable and h-unstable flows but also, strictly, more various and complicated flow fields; however, on the assumption that the number of "holes" in the fluid domain is limited and does not change, it is possible to mathematically argue that all structurally unstable flow fields in intermediate states can be approximated sequentially by p-unstable or h-unstable flow fields. Therefore, there is no problem to describe intermediate states by using the structurally unstable flow fields with special structures (see Paper "Transitions of streamline topologies for structurally stable Hamiltonian flows in multiply connected domains".)

h-Unstable Pattern

Fourteen operations each for generating an h-unstable streamline structure that has a homoclinic pair and that is wholly structurally stable except for the homoclinic pair will be defined and to which streamline pattern the h-unstable streamline structure transitions when subjected to perturbation and its subword representation will be described.

Operation of Adding One Hole

Figure 8:
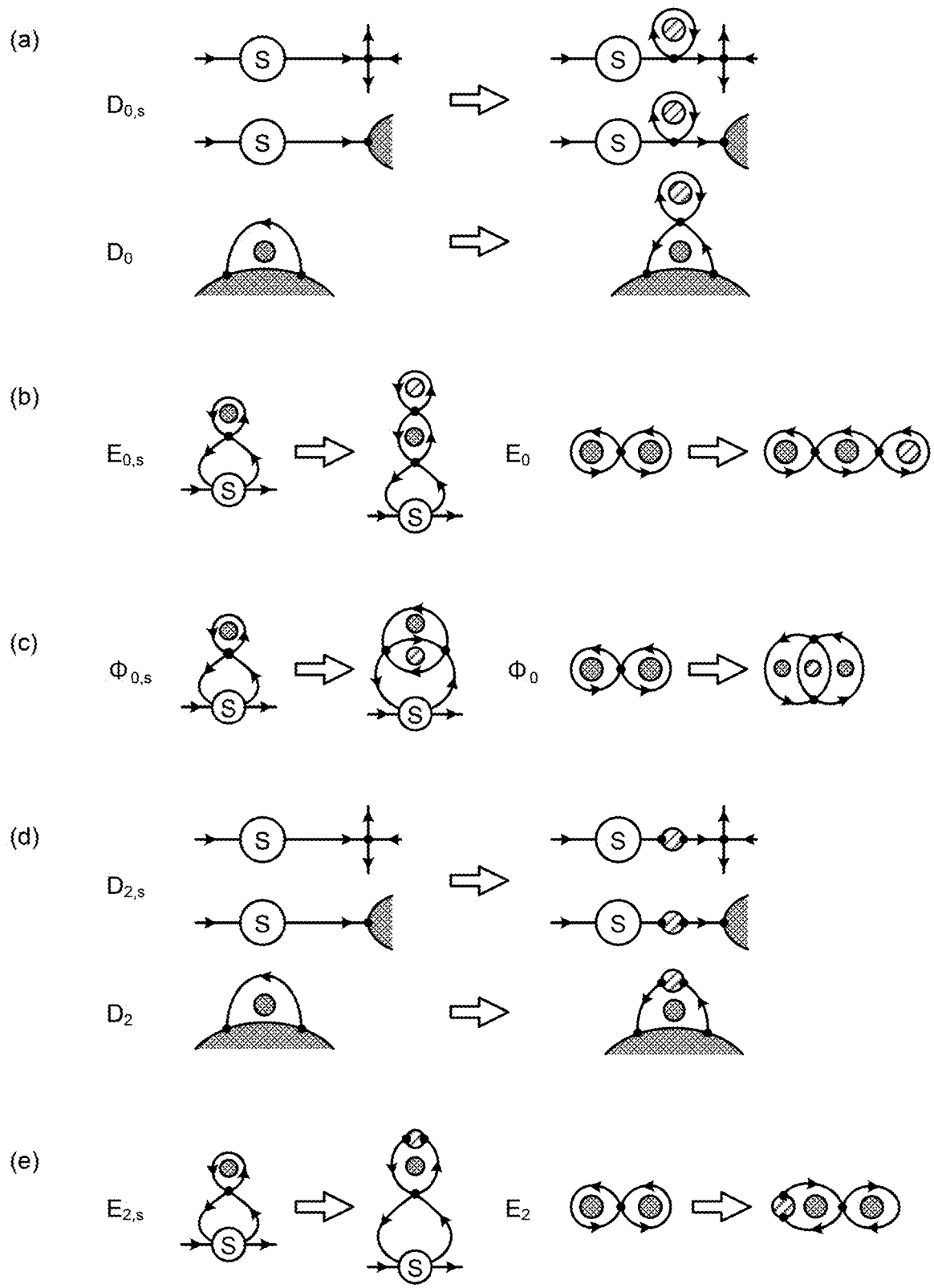
FIG. 8 is a diagram showing ten operations each generating, from a structurally stable streamline pattern in $D_z(M-1)$, an h-unstable streamline pattern in $D_z(M)$ by adding a hole.

Ten operations each generating an h-unstable streamline pattern in $D_z(M)$ by adding a hole to a streamline pattern in a structurally stable connected exterior domain $D_z(M-1)$ will be defined. FIG. 8 is a diagram showing the ten operations each generating, from a structurally stable streamline pattern in $D_z(M-1)$, an h-unstable streamline pattern in $D_z(M)$ by adding a hole. The dashed circles in FIG. 8 represent the holes newly added (This also applies to the drawings below).

Operations $D_{0,s}$ and $D_0$

Operations $D_{0,s}$ and $D_0$ are operations each appending one homoclinic saddle on the upper side of the ss-(∂-) saddle connection and ∂-saddle connection. The subscript "$_s$" appearing in the word $D_{0,s}$ means that this structure is directly connected to a 1-source-sink point representing the existence of a uniform flow.

As a result of mathematical examinations, the operation $D_{0,s}$ generates nine types of h-unstable flow patterns. Their structures and subword representations and the structurally stable streamline patterns obtained when the h-unstable flow patterns are perturbed will be described according to FIG. 9 (FIGS. 9-A and 9-B). FIGS. 9(a) to 9(c) are diagrams showing h-unstable streamline patterns and perturbation and subword expressions thereof. FIG. 9(d) shows two h-unstable streamline patterns. Regarding the diagrams represented below (for example, (a) to (c) in FIG. 9), an h-unstable streamline pattern and its subword representation are represented at the center, and the two structurally stable streamline patterns obtained by perturbing the h-unstable streamline pattern and their subword representations are represented on the left and on the right.

FIG. 9(a) is a diagram showing h-unstable flow patterns $ID_{0,s}$ and their perturbed patterns. Two types of patterns can be obtained by appending a homoclinic saddle to the upper or lower side of an ss-∂-saddle connection. While the streamline patterns of both of the two types after perturbation do not change, the position of the hole shifts from the upper side of the ss-∂-saddle connection to the lower side. The subword representations of both of the two types after perturbation are $IA_0$. Accordingly, this transition does not induce any change in index between the maximal word representations representing the respective structurally stable flow fields.

FIG. 9(b) is a diagram showing h-unstable flow patterns $IID_{0,s}$ and their perturbed patterns. While, also in this case, two types of h-unstable patterns can be obtained according to the direction in which a homoclinic saddle is added, perturbation causes each of the h-unstable patterns to transition to two structurally stable flow patterns with subword representations $IIA_0$. This transition does not induce any change in index between the maximal word representations representing the respective structurally stable flow fields.

FIG. 9(c) is a diagram showing h-unstable flow patterns $A_0D_{0,s}$ and their perturbed patterns. While, also in this case, three types of h-unstable patterns can be obtained according to the structure of $A_0$ with which an operation is performed and the direction in which a homoclinic saddle is added, perturbation causes each of the h-unstable patterns to transition to two structurally stable flow patterns with subword representations $A_0A_0$. This transition does not induce any change in index between the maximal word representations representing the respective structurally stable flow fields.

FIG. 9(d) is a diagram showing h-unstable flow patterns $A_2D_{0,s}$. While, also in this case, two types of h-unstable patterns can be obtained according to the direction in which a homoclinic saddle is added, the streamline patterns are topologically equivalent to $ID_{0,s}$ owing to proper conversion of variables, which induces transition equivalent to that in FIG. 9(a). No change in index occurs between word representations.

According to the above-described examination of $D_{0,s}$, in accordance with combination with, for example, the direction in which the operation is performed, for example, two types of h-unstable patterns can be obtained for $ID_{0,s}$. With any of following operations, multiple patterns according to similar combination can be obtained. The patterns are not substantially different since perturbation of any of the patterns causes transition to a structure with a totally equivalent representation and there is same change in index. For this reason, only one representative pattern of the multiple patterns will be illustrated in the drawings and described below for convenience. Such patterns will be referred to as "representative patterns" below.

Figure 10:
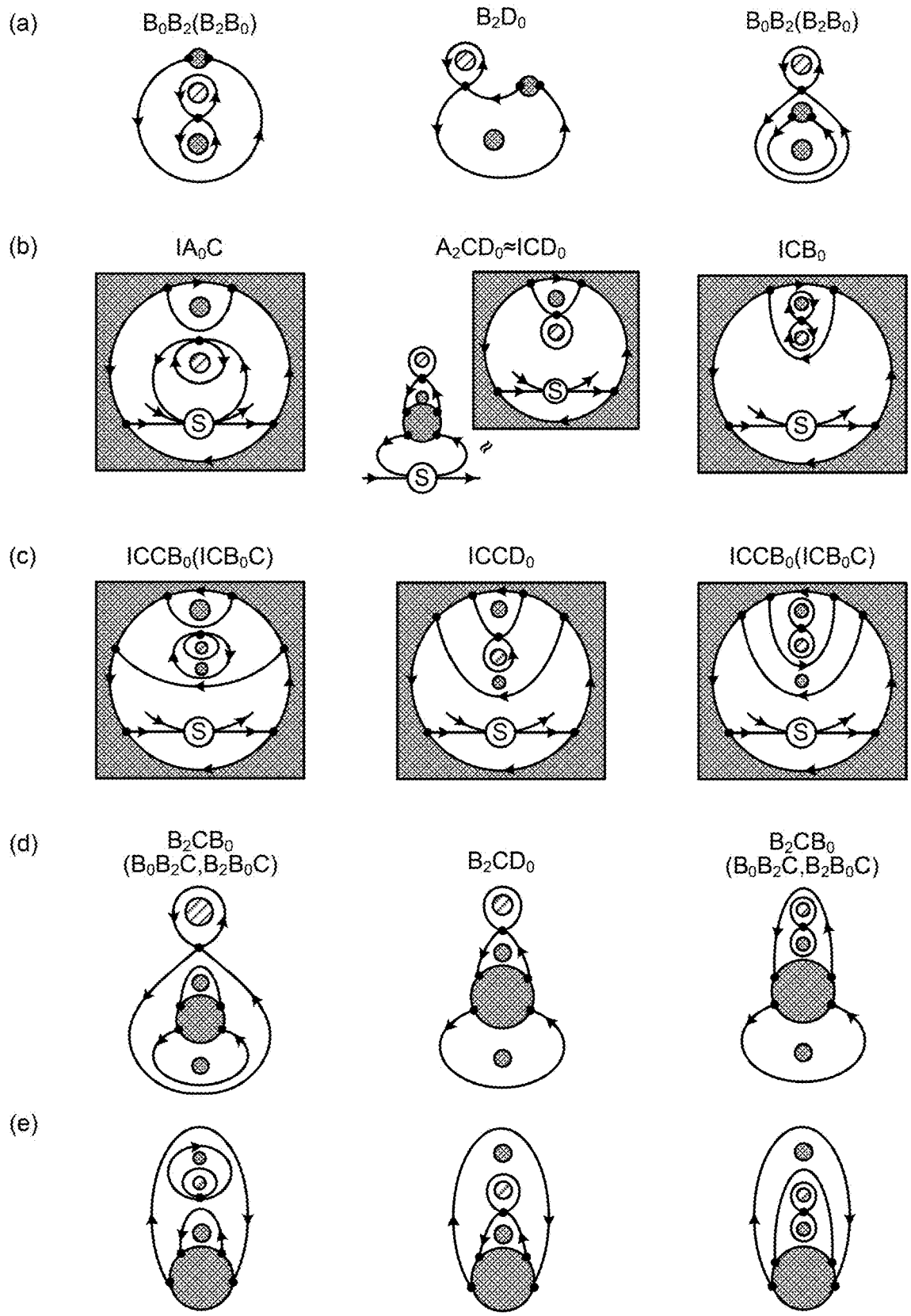
FIG. 10 is a diagram showing h-unstable streamline patterns generated by an operation $D_0$ and perturbation thereof.

As a result of mathematical examinations, the operation $D_0$ generates four representative h-unstable streamline patterns. FIG. 10 is a diagram showing h-unstable streamline patterns generated by the operation $D_0$ and perturbation thereof.

FIG. 10(a) shows an h-unstable streamline pattern $B_2D_0$ and perturbation thereof. Owing to the perturbation of the pattern, structurally stable streamline patterns with different structures but with equivalent subword representation $B_0B_2$ (or $B_2B_0$) can be obtained and therefore no change in index occurs between the maximal word representations.

FIG. 10(b) shows an h-unstable streamline pattern $A_2CD_0$ and perturbation thereof. Because the pattern of $A_2CD_0$ is topologically equivalent to the pattern represented by $ICD_0$ under proper conversion of variables, the perturbation of the pattern will be considered. Owing to the perturbation, two structurally stable streamline patterns with different subword representations of $IA_0C$ and $ICB_0$ can be obtained. Then, there is a change of index of the maximal word representation given by $ind_f(IA_0C)-ind_f(ICB_0)=(1,0,-1,0,0)$.

FIG. 10(c) shows an h-unstable streamline pattern $ICCD_0$ and perturbation thereof. Owing to the perturbation of the pattern, two structurally stable streamline patterns with different structures but with the same subword representation $ICCB_0$ (or $ICB_0C$) are obtained and therefore there is no change of index.

FIG. 10(d) shows an h-unstable streamline pattern $B_2CD_0$ and perturbation thereof. Owing to the perturbation of the pattern, two structurally stable streamline patterns with different structures but with the same subword representation $B_2CB_0$ (or $B_0B_2C$, $B_2B_0C$) are obtained and therefore there is no change of index.

FIG. 10(e) shows an h-unstable streamline pattern $B_2CD_0$ and perturbation thereof. Owing to the perturbation of the pattern, two structurally stable streamline patterns with different structures but with the same subword representation $B_2CB_0$ (or $B_0B_2C$, $B_2B_0C$) are obtained and therefore there is no change of index.

Operations $E_{0,s}$ and $E_0$

Figure 11:
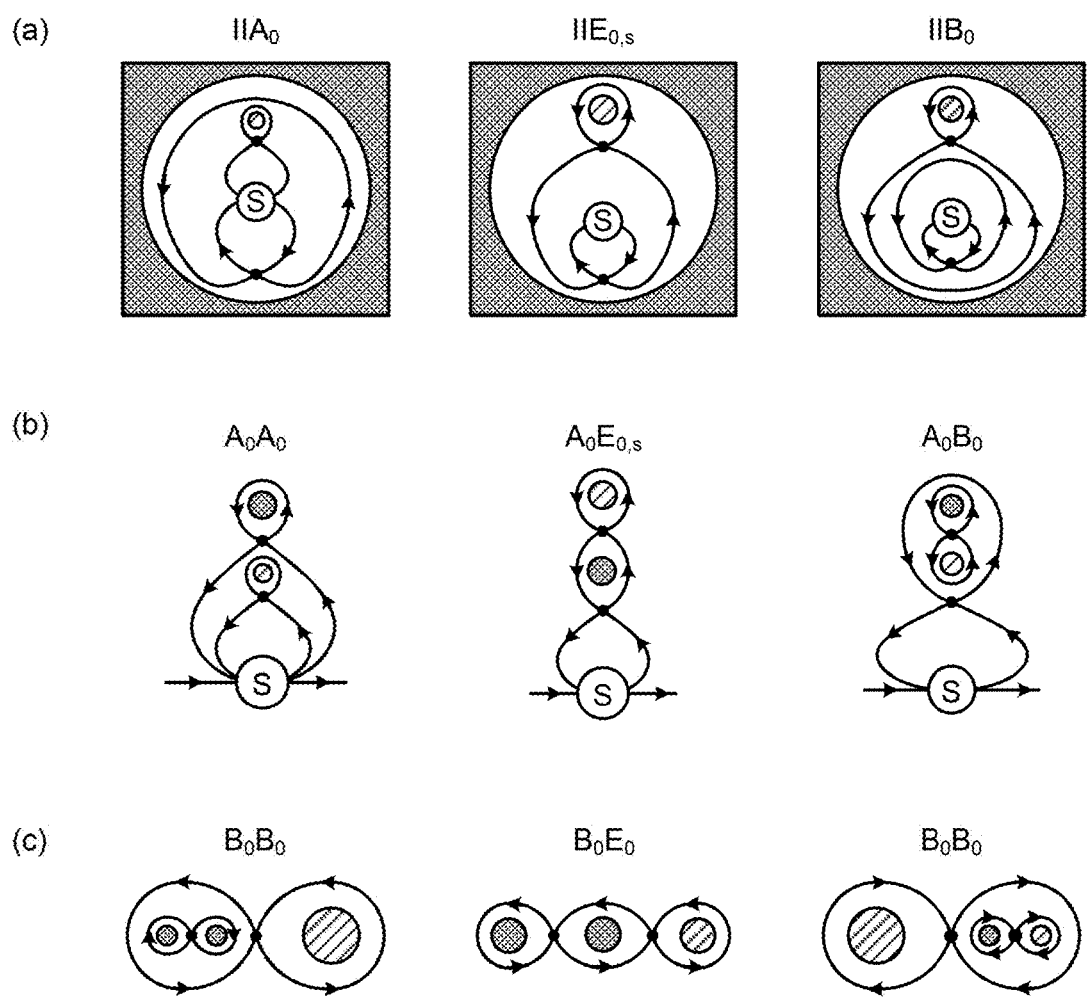
FIG. 11 is a diagram showing h-unstable streamline patterns generated by the operation $E_{0,s}$ and $E_0$ and perturbations thereof.

As shown in FIG. 8(b), the operations $E_{0,s}$ and $E_0$ represent operations each newly adding a homoclinic saddle in the orbit of a homoclinic saddle connection. As a result of mathematical examinations, the representative h-unstable streamline patterns and perturbation thereof are as follows. FIG. 11 is a diagram representing h-unstable streamline patterns that are generated by the operations $E_{0,s}$ and $E_0$ and perturbation thereof.

FIG. 11(a) shows an h-unstable streamline pattern $IIE_{0,s}$ and perturbation thereof. Owing to the perturbation of the pattern, structurally stable streamline patterns whose subword representations correspond to $IIA_0$ and $IIB_0$ can be obtained. The change of index of the maximal word representation induced by the transition is given by $ind_H(IIA_0)-ind_H(IIB_0)=(1,0,-1,0,0)$.

FIG. 11(b) shows an h-unstable streamline pattern $A_0E_{0,s}$ and perturbation thereof. Owing to the perturbation of the pattern, structurally stable streamline patterns whose subword representations correspond to $A_0A_0$ and $A_0B_0$ can be obtained. The change of index of the maximal word representation induced by the transition is given by $ind_f(A_0A_0)-ind_f(A_0B_0)=ind_H(A_0A_0)-ind_f(A_0B_0)=(1,0,-1,0,0)$.

FIG. 11(c) shows an h-unstable streamline pattern $B_0E_0$ and perturbation thereof. Owing to the perturbation, structures with the same subword representation $B_0B_0$ are obtained and therefore there is no change of index.

Operations $\Phi_{0,s}$ and $\Phi_0$

Figure 12:
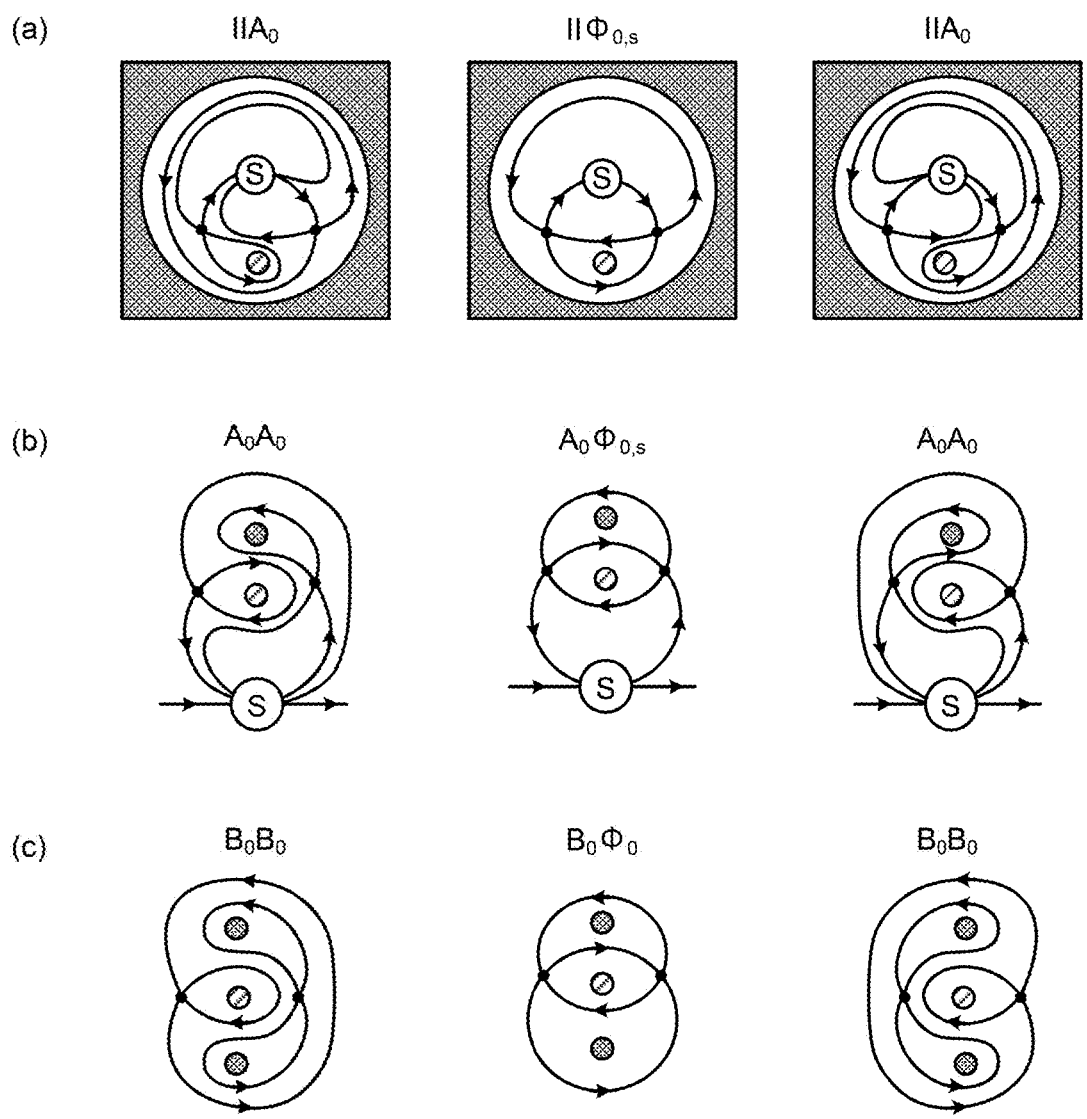
FIG. 12 is a diagram showing h-unstable streamline patterns generated by the operation $\Phi_0$ and perturbation thereof.

Like those shown in FIG. 8(c), the operations $\Phi_{0,s}$ and $\Phi_0$ are operations each splitting a saddle point into two saddle points and connecting the saddle points with two new heteroclinic orbits (enclosing a new hole). Because these operations create a $\Phi$-shaped streamline pattern, this symbol is used. As a result of mathematical examinations, because of these operations, three types of representative h-unstable streamline patterns and perturbation thereof like those shown in FIG. 12 can be obtained. FIG. 12 is a diagram showing the h-unstable streamline patterns generated by the operations $\Phi_{0,s}$ and $\Phi_0$ and perturbation thereof.

FIG. 12(a) shows an h-unstable streamline pattern $II\Phi_{0,s}$ and perturbation thereof. Owing to the perturbation, structures with the same subword representation $IIA_0$ are obtained and therefore there is no change of index.

FIG. 12(b) shows an h-unstable streamline pattern $A_0\Phi_{0,s}$ and perturbation thereof. Owing to the perturbation, structures with the same subword representation $A_0A_0$ are obtained and therefore there is no change of index.

FIG. 12 (c) shows an h-unstable streamline pattern $B_0\Phi_0$ and perturbation thereof. Owing to the perturbation, structures with the same subword representation $B_0B_0$ are obtained and therefore there is no change of index.

Operations $D_{2,s}$ and $D_2$

Operations, like those shown in FIG. 8(d), each cutting an ss-($\partial$-)saddle connection or a $\partial$-saddle connection and connecting the cut points to a newly-added boundary are referred to as the operations $D_{2,s}$ and $D_2$, respectively. First of all, as a result of mathematical examinations, because of $D_{2,s}$, three types of representative h-unstable streamline patterns like those shown in FIG. 13 can be obtained. FIG. 13 is a diagram showing h-unstable streamline patterns generated by the operation $D_{2,s}$ and perturbation thereof.

FIG. 13(a) shows an h-unstable streamline pattern $ID_{2,s}$ and perturbation thereof. Owing to the perturbation, structures with the same subword representation $IA_2$ are obtained and therefore there is no change of index.

FIG. 13(b) shows an h-unstable streamline pattern $IID_{2,s}$ and perturbation thereof. Owing to the perturbation, structures with the same subword representation $IA_0$ are obtained and therefore there is no change of index.

As shown in FIG. 13(c), an h-unstable streamline pattern $A_0D_{2,s}$ is topologically equivalent to $A_2D_{0,s}$ (see FIG. 9-2 (d)).

As shown in FIG. 13(d), an h-unstable streamline pattern $A_2, D_{2,s}$ is topologically equivalent to $ID_{2,s}$ owing to proper conversion of variables (see FIG. 13(a)).

Figure 14:
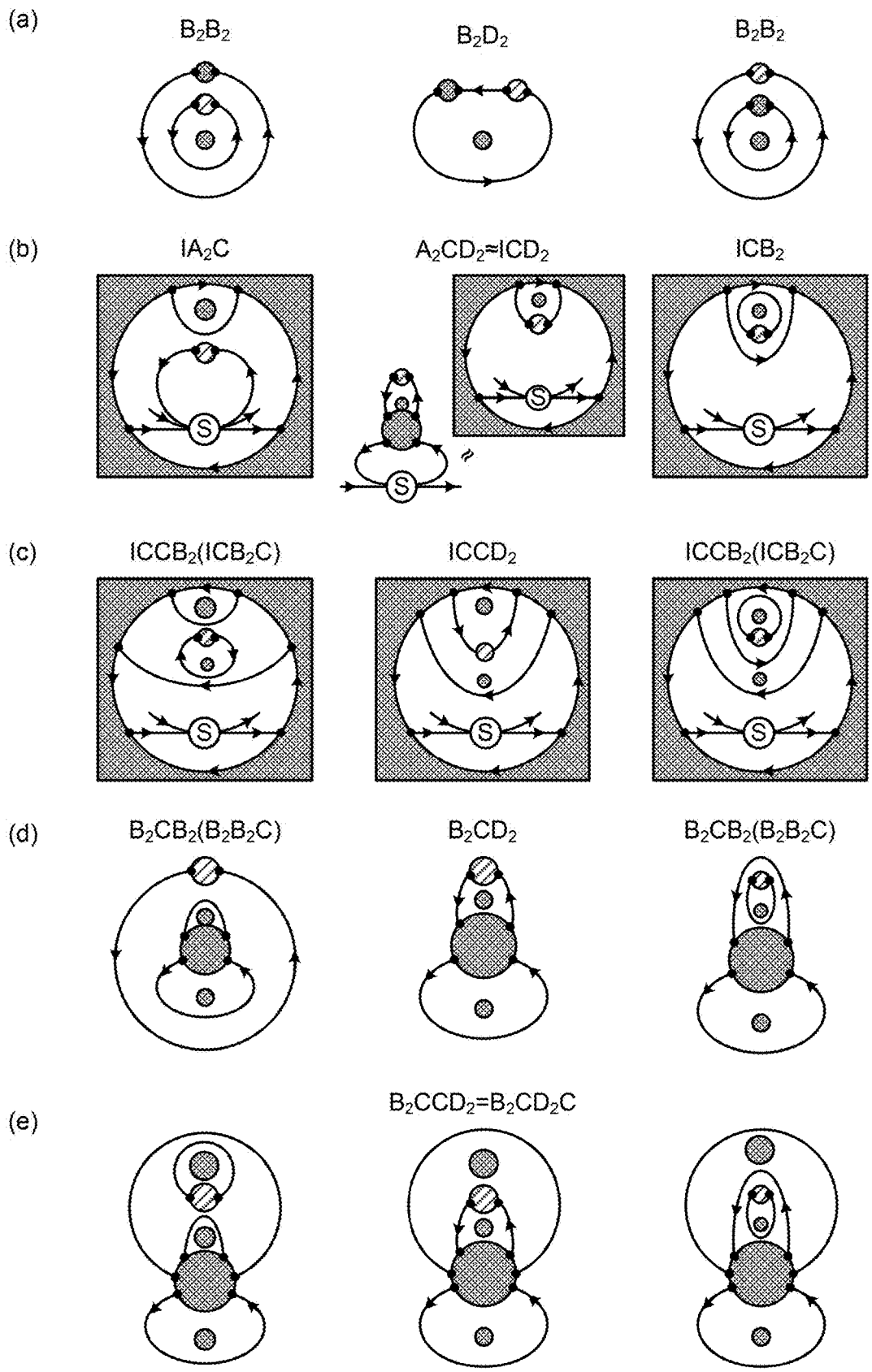
FIG. 14 is a diagram showing h-unstable streamline patterns generated by the operation $D_2$ and perturbation thereof.

As a result of mathematical examinations, the operation $D_2$ generates five types of representative h-unstable streamline patterns like those shown in FIG. 14. FIG. 14 is a diagram showing h-unstable streamline patterns generated by the operation $D_2$ and perturbation thereof.

FIG. 14(*a*) shows an h-unstable streamline pattern $B_2D_2$ and perturbation thereof. Owing to the perturbation, structures with the same subword representation $B_2B_2$ are obtained and therefore there is no change of index.

As shown in FIG. 14(*b*), because an h-unstable streamline pattern $A_2CD_2$ is equivalent to $ICD_2$ under proper conversion of variables, the perturbation of the pattern will be considered. Owing to the perturbation, different structurally stable streamline patterns with subword representations $IA_2C$ and $ICB_2$ can be obtained. Then a change of index induced by this transition is given by $\text{ind}_f(IA_2C) - \text{ind}_f(ICB_2) = (0,1,0,-1,0)$.

FIG. 14(*c*) shows an h-unstable streamline pattern $ICCD_2$ and perturbation thereof. Owing to the perturbation, structures with equivalent subword representation $ICCB_2$ (or $ICB_2C$) are obtained and therefore there is no change of index.

FIG. 14(*d*) shows an h-unstable streamline pattern $B_2CD_2$ and perturbation thereof. Owing to the perturbation, structures with the same subword representation $B_2CB_2$ (or $B_2B_2C$) are obtained and therefore there is no change of index.

FIG. 14(*e*) shows an h-unstable streamline pattern $B_2CCD_2$ and perturbation thereof. Because this pattern is equivalent to one obtained by applying C to $B_2CD_2$, a subword change equivalent to $B_2CD_2$ is assigned (see FIG. 14(*d*)).

Operations $E_{2,s}$ and $E_2$

The operations $E_{2,s}$ and $E_2$ represent operations, like those shown in FIG. 8(*e*), each cutting a homoclinic saddle connection and connecting a new circular boundary to the cut points. As a result of mathematical examinations, the operations establish three types of representative h-unstable streamline patterns like those shown in FIG. 15. FIG. 15 is a diagram showing h-unstable streamline patterns generated by the operations $E_{2,s}$ and $E_2$ and perturbation thereof.

FIG. 15(*a*) shows an h-unstable streamline pattern $IIE_{2,s}$ and perturbation thereof. Owing to the perturbation, different structurally stable streamline patterns with subword representations $IA_0$ and $IIB_2$ can be obtained. The change of index induced by this transition is given by $\text{ind}_f(IA_0) - \text{ind}_{II}(IIB_2) = (0,1,0,-1,0)$.

FIG. 15(*b*) shows an h-unstable streamline pattern $IA_0E_{2,s}$ and perturbation thereof. Owing to the perturbation, different structurally stable streamline patterns with subword representations $IA_0A_2$ and $IA_0B_2$ can be obtained. The change of index induced by this transition is given by $\text{ind}_f(IA_0A_2) - \text{ind}_f(IA_0B_2) = (0, 1, 0, -1, 0)$.

As shown in FIG. 15(*c*), an h-unstable streamline pattern $IIA_0E_{2,s}$ is equivalent to one obtained by applying the operation $A_0$ to $IIE_{2,s}$ (see FIG. 15(*a*)).

As shown in FIG. 15(*d*), an h-unstable streamline pattern $B_0E_2$ is topologically equivalent to $B_2D_0$ (see FIG. 10(*a*)).

Operations Adding Two or More Holes

Figure 16:
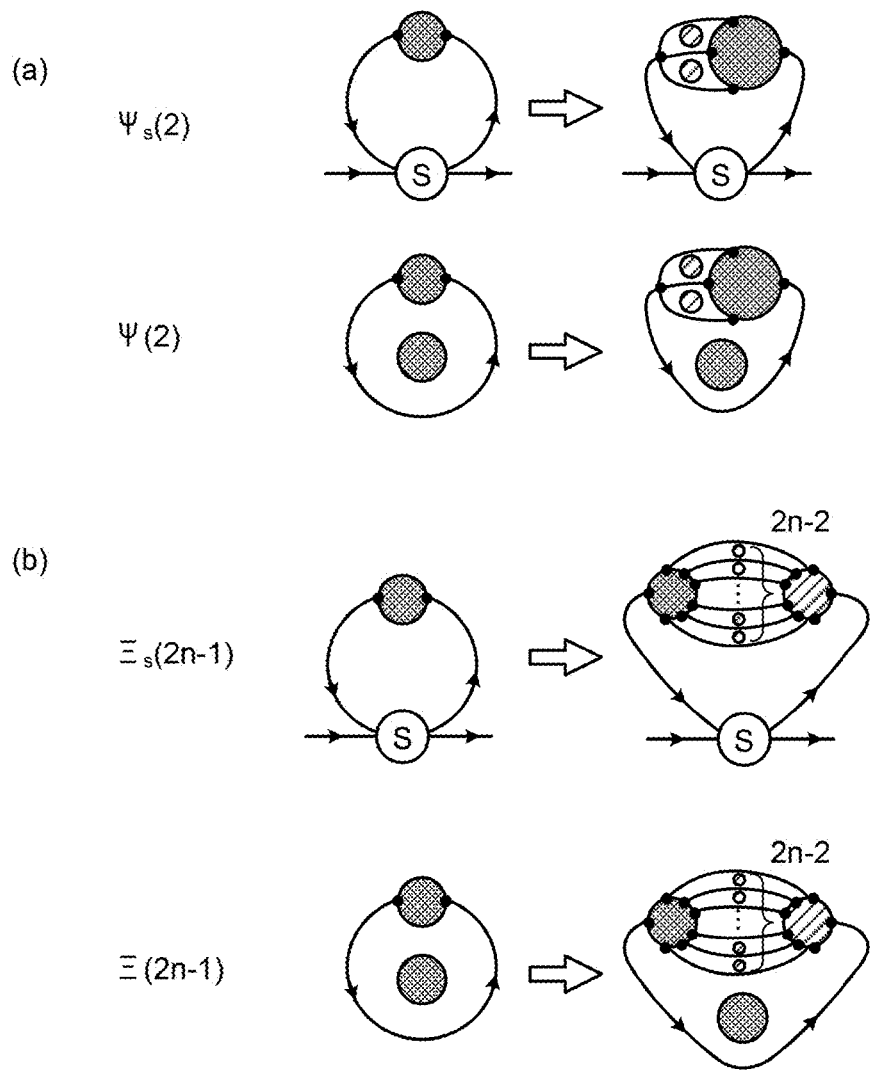
FIG. 16 is a diagram showing four operations generating h-unstable streamline patterns from structurally stable patterns by adding two or more holes.

Here, h-unstable streamline pattern generated by introducing an operation adding two or more holes during one operation like that shown in FIG. 16 and perturbation thereof will be described. FIG. 16 is a diagram showing four operations each generating an h-unstable streamline pattern from a structurally stable streamline pattern by adding two or more holes.

Operations $\Psi_s(2)$ and $\Psi(2)$

Operations each picking up an ss-∂-saddle on a boundary, adding a saddle point on the orbit connecting to the ss-∂-saddle and two ∂-saddles on the boundary, and then connecting the saddle point with the two ∂-saddles with two s-∂-saddle connections as shown in FIG. 16(*a*) are referred to as $\Psi_s(2)$. On the other hand, an operation picking up a ∂-saddle and performing the same operation is referred to as $\Psi(2)$. By performing the operations, three s-∂-saddle connections are obtained and two new holes bounded by the s-∂-saddle connections are added. Because a $\Psi$-shaped streamline pattern is formed as a result of the operations, this symbol is used. The word (2) in $\Psi(2)$ explicitly represents the number of holes added by the operations.

Figure 17:
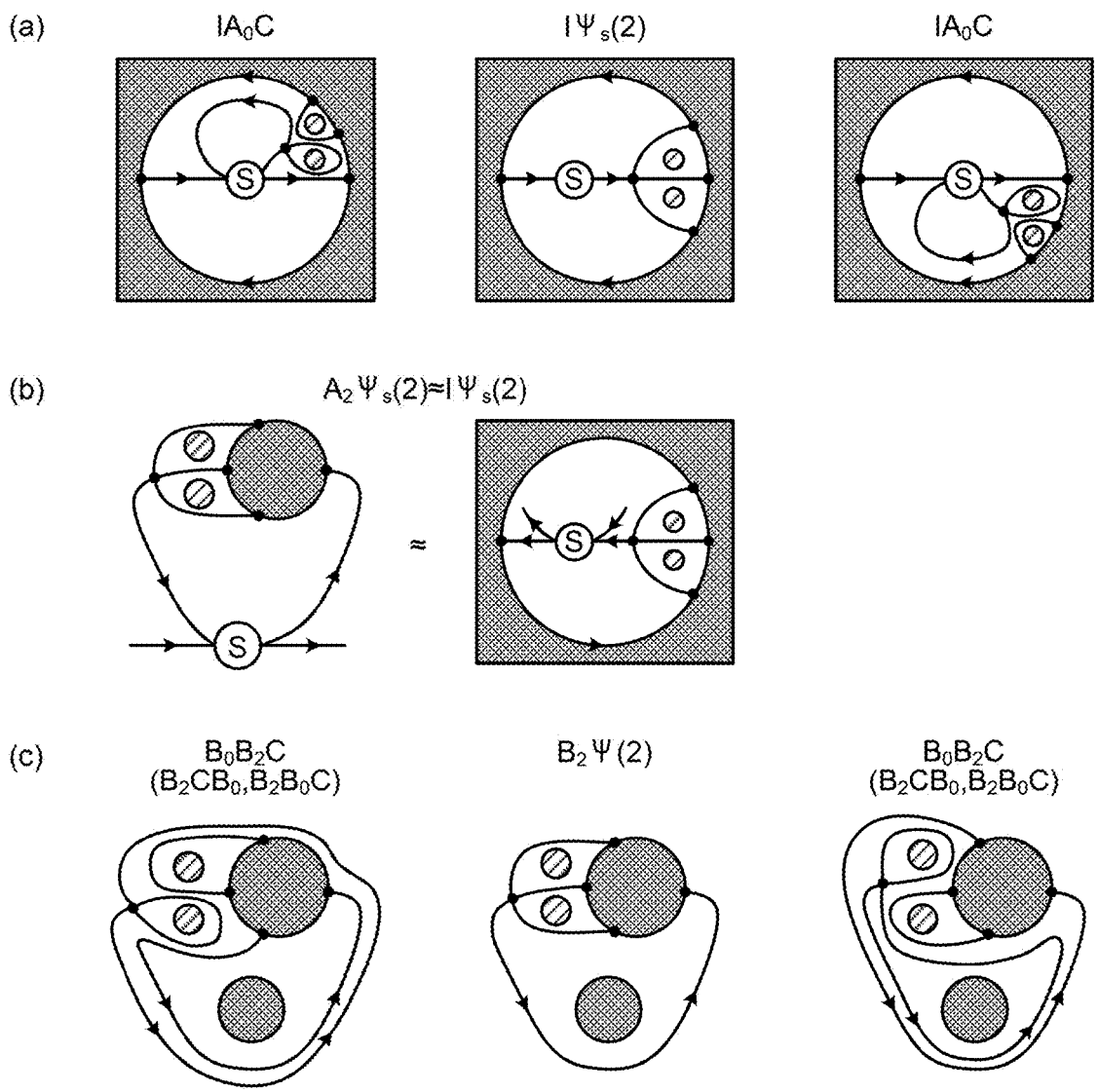
FIG. 17 is a diagram showing h-unstable streamline patterns generated by the operations $\Psi_s(2)$ and $\Psi(2)$ and perturbation thereof.
Figure 18:
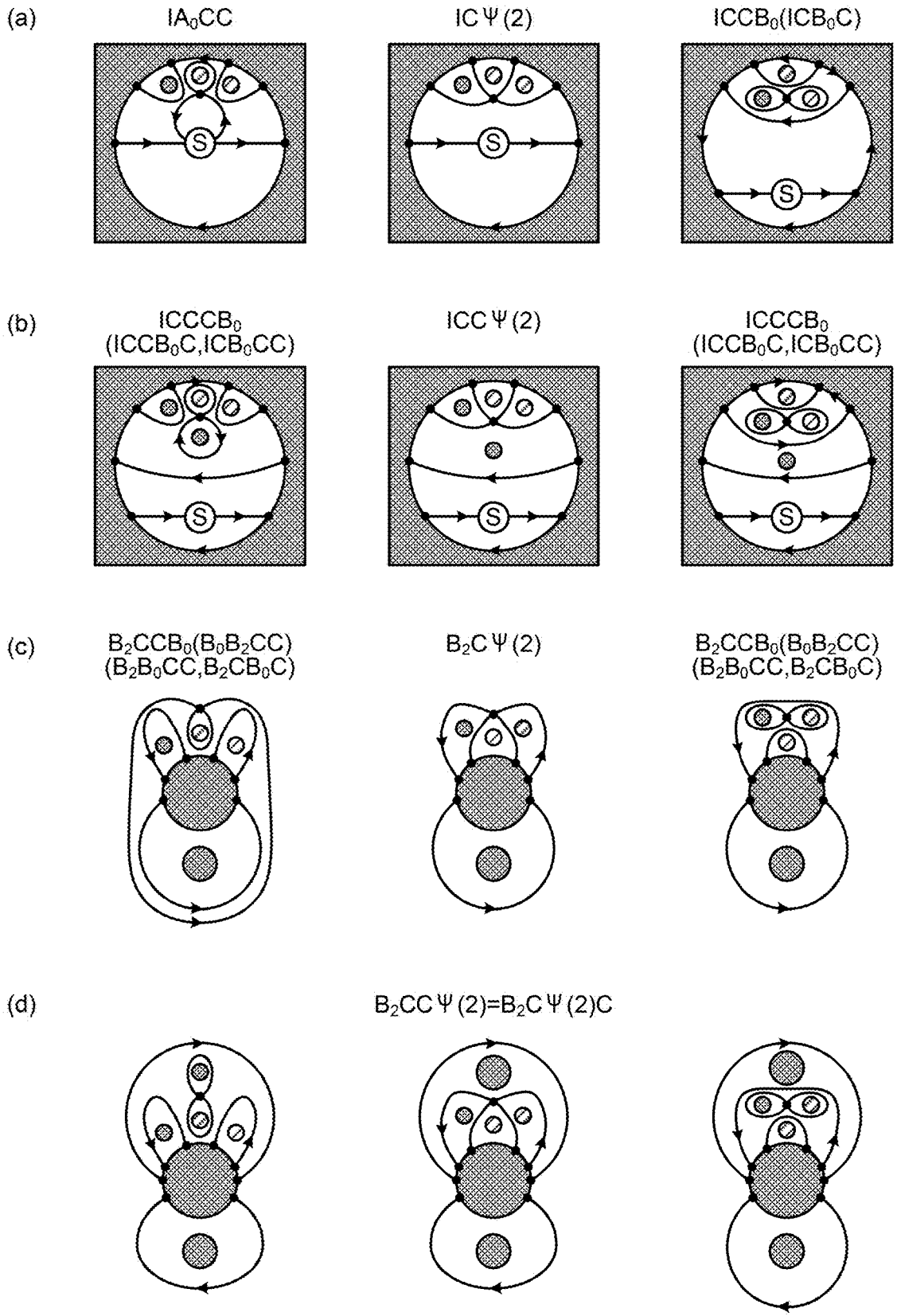
FIG. 18 is a diagram showing h-unstable streamline patterns generated by the operation $\Psi(2)$ and perturbation thereof.

There are five types of representative $\Psi$-unstable streamline patterns shown in FIGS. 17 and 18 that are generated by $\Psi_s(2)$ and $\Psi(2)$, as a result of mathematical examinations. FIG. 17 is a diagram showing h-unstable streamline patterns generated by the operations $\Psi_s(2)$ and $\Psi(2)$ and perturbation thereof. FIG. 18 is a diagram showing h-unstable streamline patterns generated by the operation $\Psi(2)$ and perturbation thereof.

FIG. 17(*a*) shows an h-unstable streamline pattern $I\Psi_s(2)$ and perturbation thereof. Owing to the perturbation, structures with the same subword representation $IA_0C$ are obtained and therefore there is no change of index.

As shown in FIG. 17(*b*), the h-unstable streamline pattern $A_2\Psi_s(2)$ is topologically equivalent to $I\Psi_s(2)$ (see FIG. 17(*a*)).

FIG. 17(*c*) shows an h-unstable streamline pattern $B_2\Psi(2)$ and perturbation thereof. Owing to the perturbation, structures having the same subword representation $B_0B_2C$ (or $B_2CB_0$, $B_2B_0C$) are obtained and therefore there is no change of index.

FIG. 18(*a*) shows an h-unstable streamline pattern $IC\Psi(2)$ and perturbation thereof. Owing to the perturbation, different structurally stable streamline patterns with subword representations $IA_0CC$ and $ICCB_0$ (or $ICB_0C$) are obtained. The change of index induced by this transition is given by $\text{ind}_f(IA_0CC) - \text{ind}_f(ICCB_0) = (1,0,-1,0,0)$.

FIG. 18(*b*) shows an h-unstable streamline pattern $ICC\Psi(2)$ and perturbation thereof. Owing to the perturbation, structures having the same subword representation $ICCCB_0$ (or $ICCCB_0C$, $ICB_0CC$) are obtained and therefore there is no change of index.

FIG. 18(*c*) shows an h-unstable streamline pattern $B_2C\Psi(2)$ and perturbation thereof. Owing to the perturbation, structures having the same subword representation $B_2CCB_0$ (or $B_0B_2CC$, $B_2B_0CC$, $B_2CB_0C$) are obtained and therefore there is no change of index.

FIG. 18(*d*) shows an h-unstable streamline pattern $B_2CC\Psi(2)$ and perturbation thereof. Because this pattern is equivalent to that obtained by applying C to $B_2C\Psi(2)$, a subword representation equivalent to $B_2C\Psi(2)$ is assigned (see FIG. 18(*c*)).

(Operations $\equiv_s(2n-1)$ and $\equiv(2n-1)$, $n \geq 2$)

Figure 19:
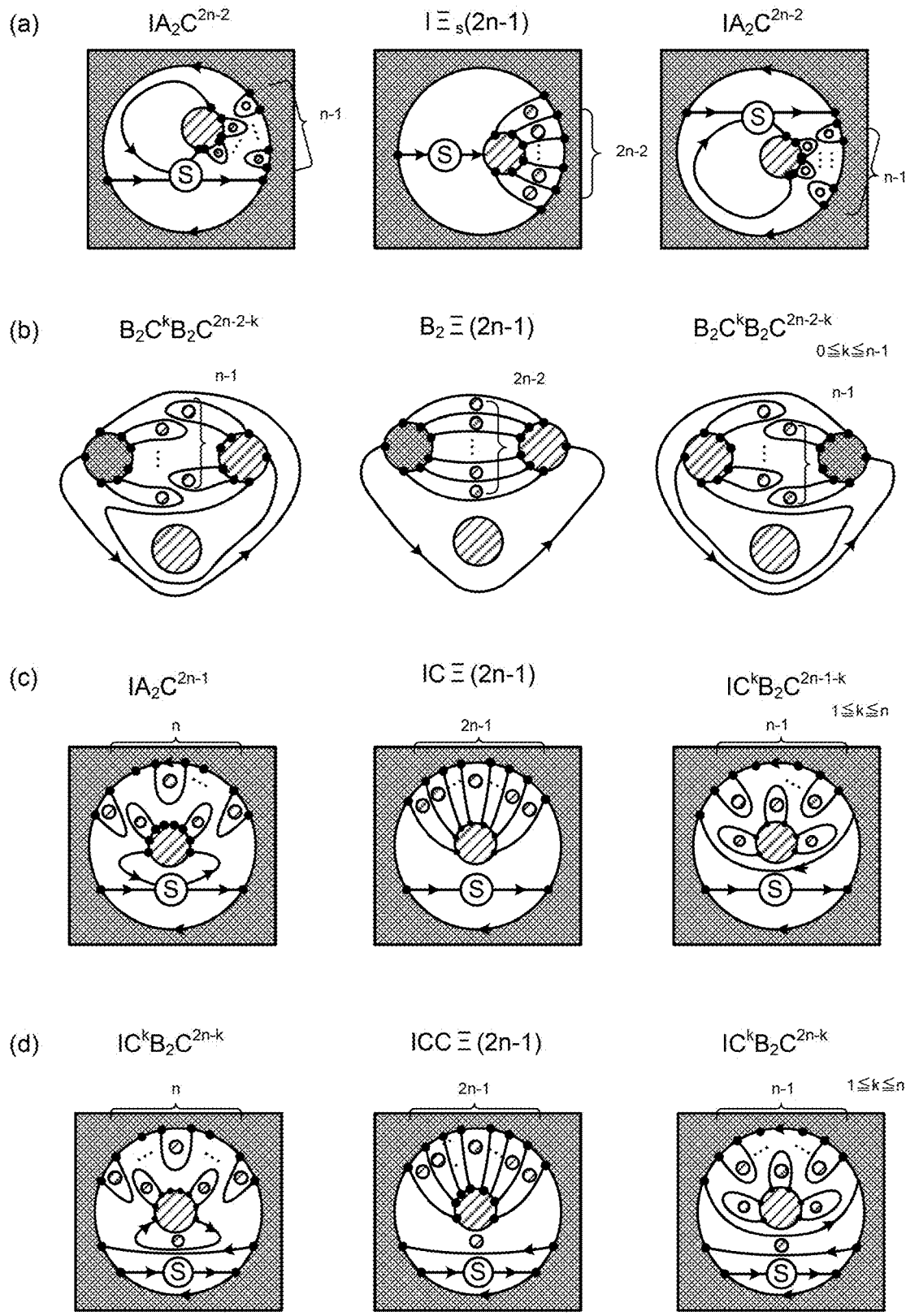
FIG. 19 is a diagram showing h-unstable streamline patterns generated by the operation $\equiv_s(2n-1)$ and $\equiv(2n-1)$ and perturbation thereof.

The operations $\equiv_s(2n-1)$ and $\equiv(2n-1)$ are operations each adding three or any larger odd number of new holes to generate an h-unstable streamline pattern. Specifically, they are operations each picking up a circular boundary already having a ∂-saddle, generating a new circular boundary in a different position, and connecting the two boundaries with 2n−1 heteroclinic ∂-orbits. As a result, 2n−2 circular boundaries enclosed by the ∂-orbits are added to generate 2n−1 holes in total. The operations match $D_{2,s}$ and $D_2$ for n=1 and thus n≥2 without loss of generality may be assumed. As a result of mathematical examinations, these operations generate four types of representative h-unstable streamline patterns as shown in FIG. 19. FIG. 19 is a diagram showing h-unstable streamline patterns generated by the operations $\equiv_s(2n-1)$ and $\equiv(2n-1)$.

FIG. 19(a) shows an h-unstable streamline pattern $I\equiv_s$ (2n−1) and perturbation thereof. Owing to the perturbation, structures having the same subword representation $IA_2C^{2n-2}$ are obtained and therefore there is no change of index.

FIG. 19(b) shows an h-unstable streamline pattern $B_2\equiv_s$ (2n−1) and perturbation thereof. Owing to the perturbation, structures having the same subword representation $B_2C^kB_2C^{2n-2-k}$ (0≤k≤n−1) are obtained and therefore there is no change of index.

FIG. 19(c) shows an h-unstable streamline pattern IC≡ (2n−1) and perturbation thereof. Owing to the perturbation, different structurally stable streamline patterns with subword representations $IA_2C^{2n-1}$ and $IC^kB_2C^{2n-1-k}$ (1≤k≤n) are obtained. The change of index induced by this transition is given by $\text{ind}_I(IA_2C^{2n-1})-\text{ind}_I(ICB_2C^{2n-2})=(0,1,0,-1,0)$.

FIG. 19(d) shows an h-unstable streamline pattern ICC≡ (2n−1) and perturbation thereof. Owing to the perturbation, structures with the same subword representation $IC^kB_2C^{2n-k}$ (1≤k≤n) are obtained and therefore there is no change of index.

The fourteen operations forming h-unstable streamline patterns, resultant h-unstable 32 representative streamline patterns, and perturbation thereof and subword representations have been described above. Mathematically, it can be strictly verified that exist only those h-unstable streamline patterns each appearing as an intermediate state between two structurally stable flow fields. By collecting the possible transition patterns according to the difference d in index between the subwords $S_1$ and $S_2$ contained in the maximal word representations of the assigned two structurally stable streamline patterns $W_1$ and $W_2$, pattern transition information on transition via h-unstable patterns can be obtained (see FIGS. 26 and 27 to be described below).

p-Unstable Patterns

Figure 20:
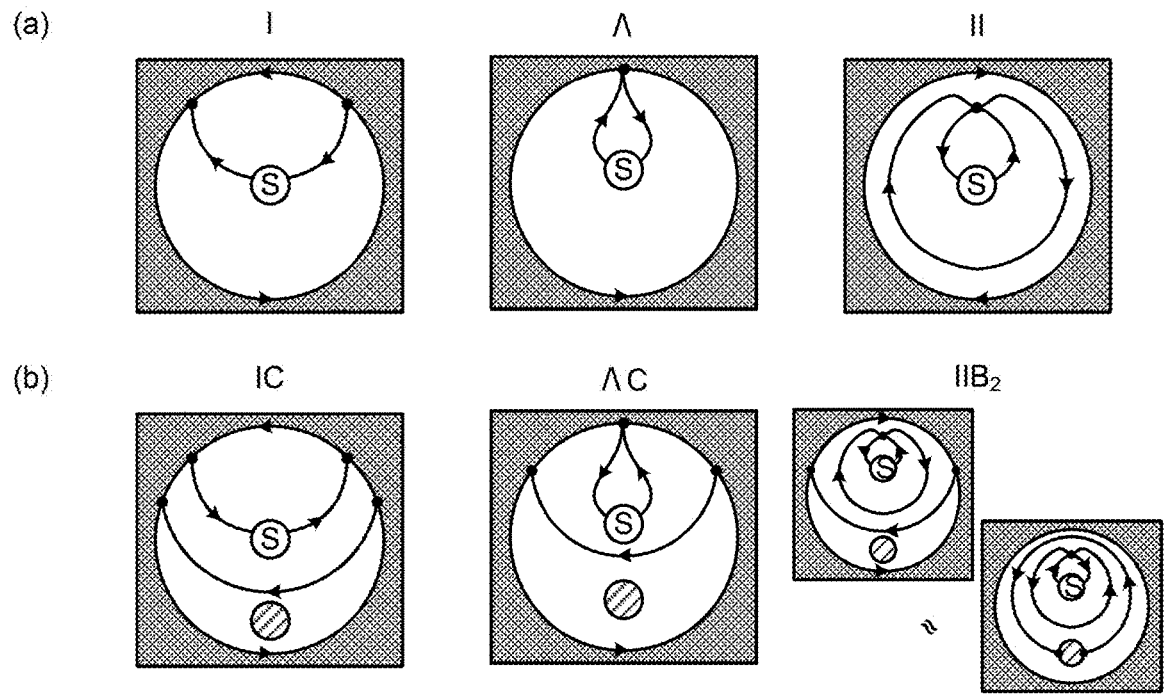
FIG. 20 is a diagram showing p-unstable patterns $\Lambda$ and perturbation thereof.

First of all, there exists a fundamental pattern with one pinching orbit in a simply connected exterior domain $D_z(O)$ without any inner boundary, and the fundamental pattern will be named. FIG. 20 is a diagram showing a p-unstable pattern Λ and perturbation thereof.

Fundamental Pattern Λ

The fundamental pattern Λ is a p-unstable streamline pattern in $D_z(O)$, which is given in FIG. 20(a). This pattern transitions to the fundamental patterns I and II obtained by perturbing this pattern. Accordingly, this pattern changes the word of the top part of the maximal representation. The change of index of the maximal word representation is given by $\text{ind}_I(I)-\text{ind}_{II}(II)=(-1,1,0,0,0)$. On the other hand, FIG. 20(b) represents a streamline pattern ΛC where the structure created by Λ is enclosed by a ∂-saddle connection and the perturbation of the streamline pattern ΛC. Owing to the perturbation, different structurally stable streamline patterns with subword representations IC and $IIB_2$ are obtained. The change of index of the maximal word representation is given by $\text{ind}_I(IC)-\text{ind}_{II}(IIB_2)=(-1,1,0,-1,1)$. For p-unstable flow fields, starting from the Λ pattern serving as the fundamental pattern, obtained by repeating the operations $A_0, A_2, B_0, B_2$ and C forming structurally stable flow fields, the maximal word representations obtained by arranging the performed operations in sequence can be referred to as maximal Λ-words (Maximal words of System Λ). Thus, perturbing a Λ-word causes transition between the I-word and II-word. Note that, when a Λ-word contains the word $A_2$, the II-word owing to perturbation of the Λ-word is always converted into a I-word by using the relation $IA_0=IIA_2$. For example, perturbing the p-unstable flow field represented by $\Lambda A_0A_2B_0C$ yields a structurally stable flow field with maximal Word representations $IA_0A_2B_0C$ and $IIA_0A_2B_0C=IA_0A_0B_0C$.

Figure 21:
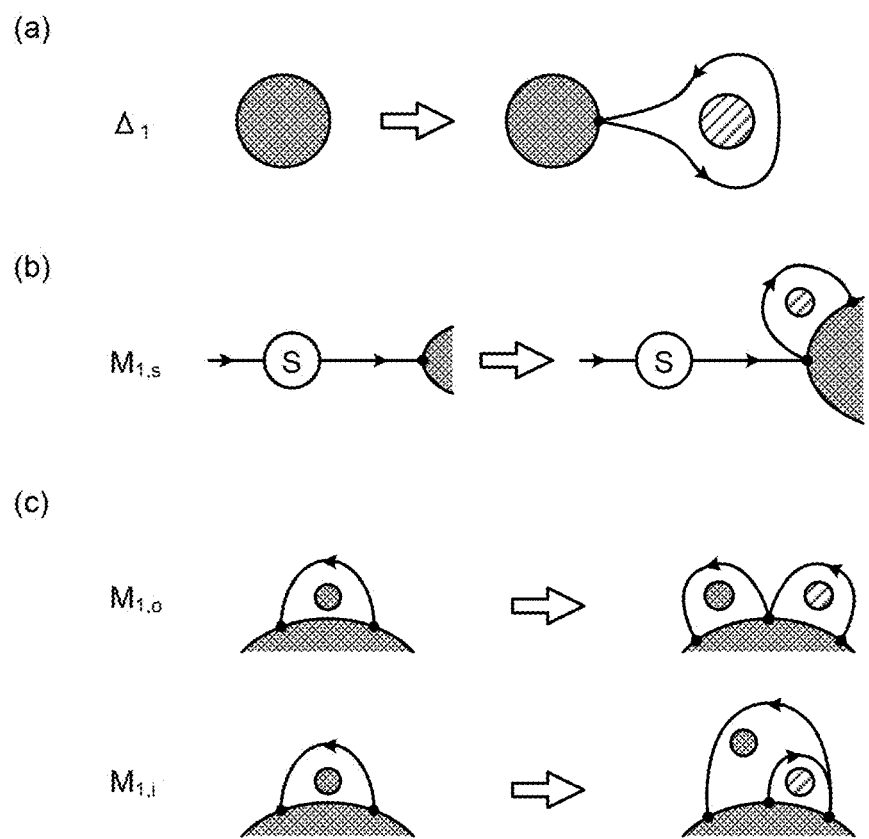
FIG. 21 is a diagram showing operations each creating a p-unstable streamline pattern by adding a pinching orbit to a structurally stable field in $D_Z(M-1)$.

FIG. 21 is a diagram showing operations each generating a p-unstable streamline pattern by adding a pinching orbit to a structurally stable flow field in $D_z(M-1)$.

Operation $\Delta_1$

Figure 22:
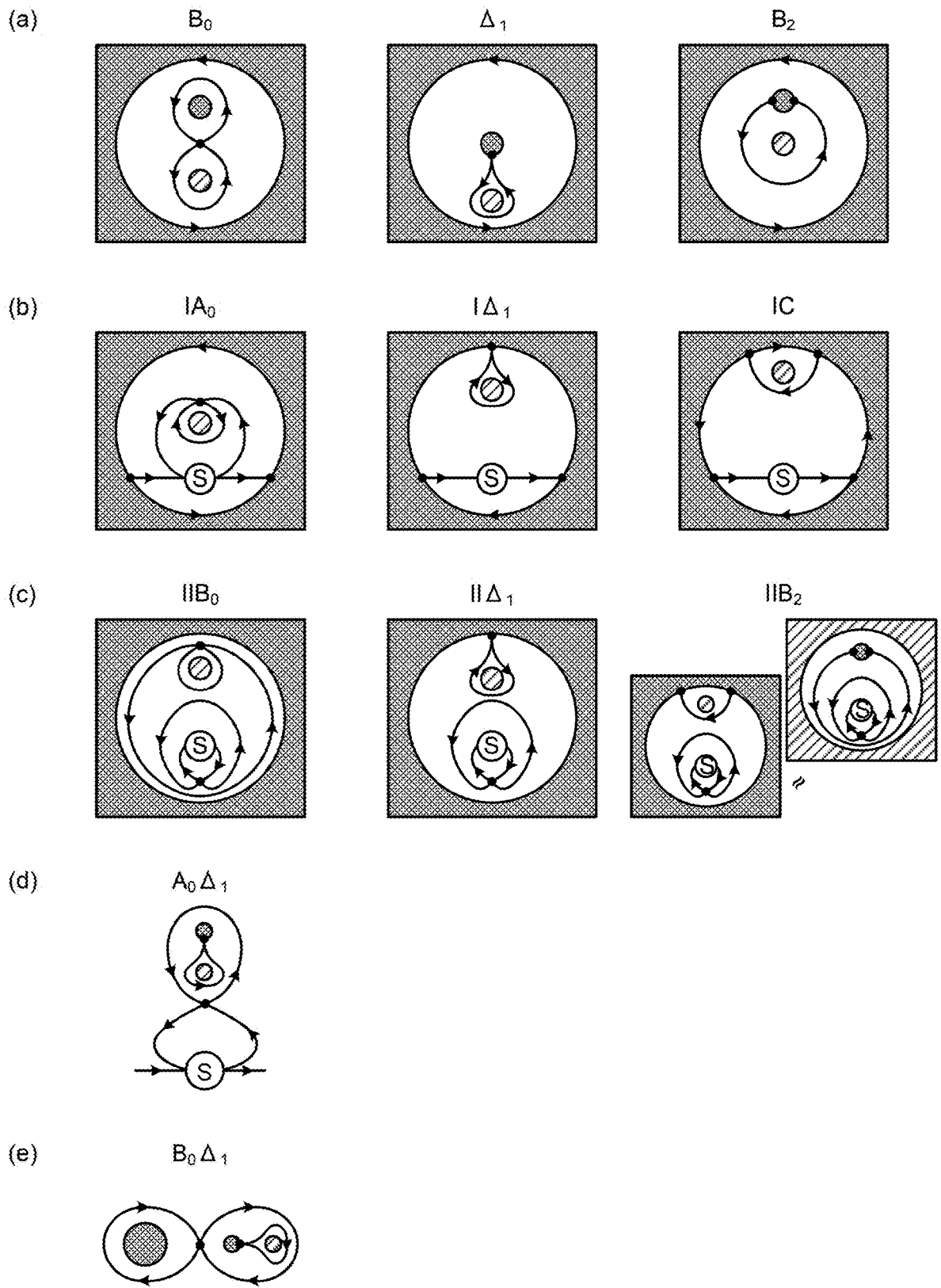
FIG. 22 is a (first) diagram showing p-unstable streamline patterns generated by the operations $\Delta_1$ and perturbation thereof.

The operation $\Delta_1$ represents an operation increasing the number of holes by adding a homoclinic pinching orbit to any circular boundary as shown in FIG. 21(a). As a result of mathematical examinations, the operation $\Delta_1$ generates five types of representative p-unstable streamline patterns like those shown in FIGS. 22 and 23. FIGS. 22 and 23 are diagrams showing p-unstable streamline patterns generated by the operation $\Delta_1$ and perturbation thereof.

FIG. 22(a) shows a p-unstable streamline pattern $\Delta_1$ and perturbation thereof. Owing to the perturbation, different structurally stable streamline patterns with subword representations $B_0$ and $B_2$ can be obtained. The change of index induced by this transition is given by $\text{ind}^*(B_0)-\text{ind}^*(B_2)=(0,0,1,-1,0)$ (where * is any one of O, I and II).

FIG. 22(b) shows a p-unstable streamline pattern $I\Delta_1$ and perturbation thereof. Owing to the perturbation, different structurally stable streamline patterns with subword representations $IA_0$ and IC can be obtained. The change of index induced by this transition given by $\text{ind}_I(IA_0)-\text{ind}_I(IC)=(1,0,0,0,-1)$.

FIG. 22(c) shows a p-unstable streamline pattern $II\Delta_1$ and perturbation thereof. Owing to the perturbation, different structurally stable streamline patterns with subword representations $IIB_0$ and $IIB_2$ can be obtained. The change of index induced by this transition is given by $\text{ind}_{II}(IIB_0)-\text{ind}_{II}(IIB_2)=(0,0,1,-1,0)$.

FIG. 22(d) shows a p-unstable streamline pattern $A_0\Delta_1$ and perturbation thereof. The p-unstable streamline pattern $A_0\Delta_1$ is equivalent to the pattern obtained by performing $A_0$ on a boundary with $\Delta_1$ (see FIG. 22(a)).

FIG. 22(e) shows a p-unstable streamline pattern $B_0\Delta_1$ and perturbation thereof. The p-unstable streamline pattern $B_0\Delta_1$ is equivalent to the pattern obtained by performing $B_0$ on a boundary with $\Delta_1$ (see FIG. 22(a)).

As shown in FIG. 23(a), a p-unstable streamline pattern $A_2\Delta_1$ is topologically equivalent to $I\Delta_1$.

FIG. 23(b) shows a p-unstable streamline pattern $B_2\Delta_1$ and perturbation thereof. Owing to the perturbation, different structurally stable streamline patterns with subword representations $B_0B_2$ (or $B_2B_0$) and $B_2C$ can be obtained. The change of index induced by this transition is given by $\text{ind}^*(B_0B_2)-\text{ind}^*(B_2C)=(0,0,1,0,-1)$ (where * is any one of O, I and II).

As shown in FIG. 23(c), a p-unstable streamline pattern $A_2C\Delta_1$ is topologically equivalent to $IC\Delta_1$. Owing to the perturbation thereof, different structurally stable streamline patterns with subword representations $ICB_0$ and ICC can be obtained. The change of index induced by this transition is given by $\text{ind}_I(ICB_0)-\text{ind}_I(ICC)=(0,0,1,0,-1)$.

According to FIG. 23(d), because the p-unstable streamline pattern $B_2C\Delta_1$ is equivalent to the pattern obtained by performing C on $B_2\Delta_1$, no consideration is required (see FIG. 23(b)).

Operations $M_{1,s}$

Figure 24:
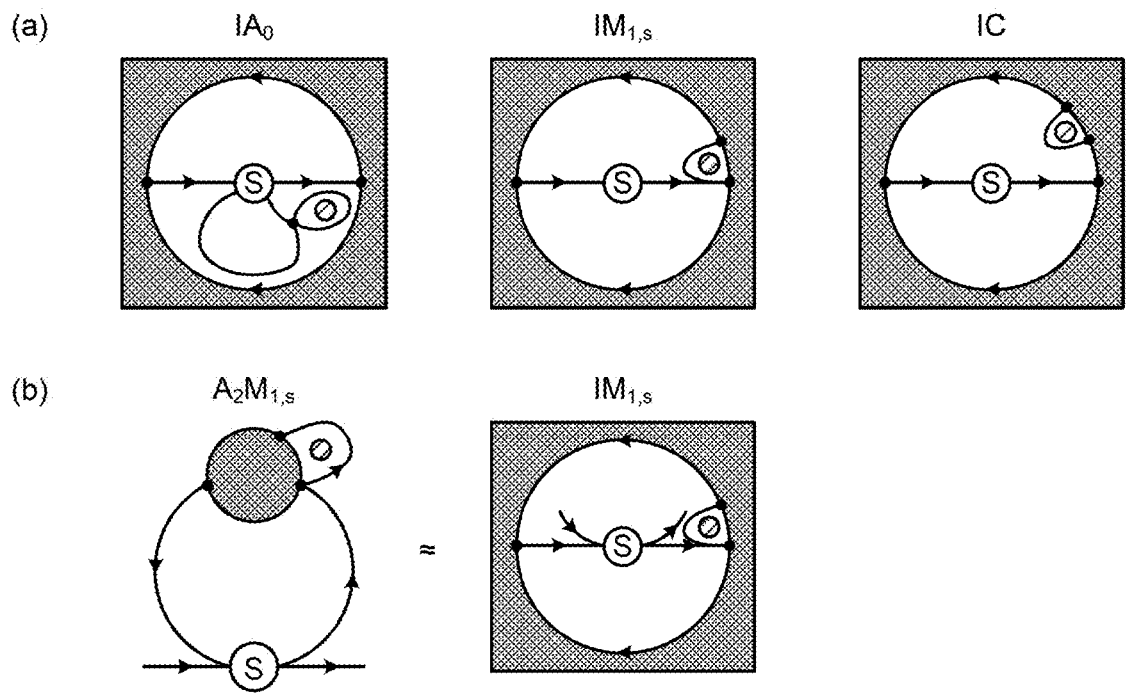
FIG. 24 is a diagram showing p-unstable streamline patterns generated by the operations $M_{1,s}$ and perturbation thereof.

An operation adding a ∂-saddle connection sharing an endpoint with a ∂-saddle connecting to a 1-source-sink point with an ss-∂-saddle connection on the same boundary as shown in FIG. 21(b) is referred to as $M_{1,s}$. While this operation increases the number of holes by one, as a result of mathematical examinations, one type of representative p-unstable streamline pattern like that shown in FIG. 24 is generated. FIG. 24 is a diagram showing a p-unstable streamline pattern generated by the operation $M_{1,s}$ and perturbation thereof.

FIG. 24(*a*) shows a p-unstable streamline pattern $IM_{1,s}$ and perturbation thereof. Owing to the perturbation, different structurally stable streamline patterns with subword representations $IA_0$ and IC can be obtained. The change of index induced by this transition is given by $Ind_f(IA_0)-ind_f(IC)=(1,0,0,0,-1)$.

According to FIG. 24(*b*), a p-unstable streamline pattern $A_2,M_{1,s}$ is topologically equivalent to $IM_{1,s}$ owing to proper conversion of variables (see FIG. 24(*a*)).

Operations $M_{1,i}$ and $M_{1,o}$

Figure 25:
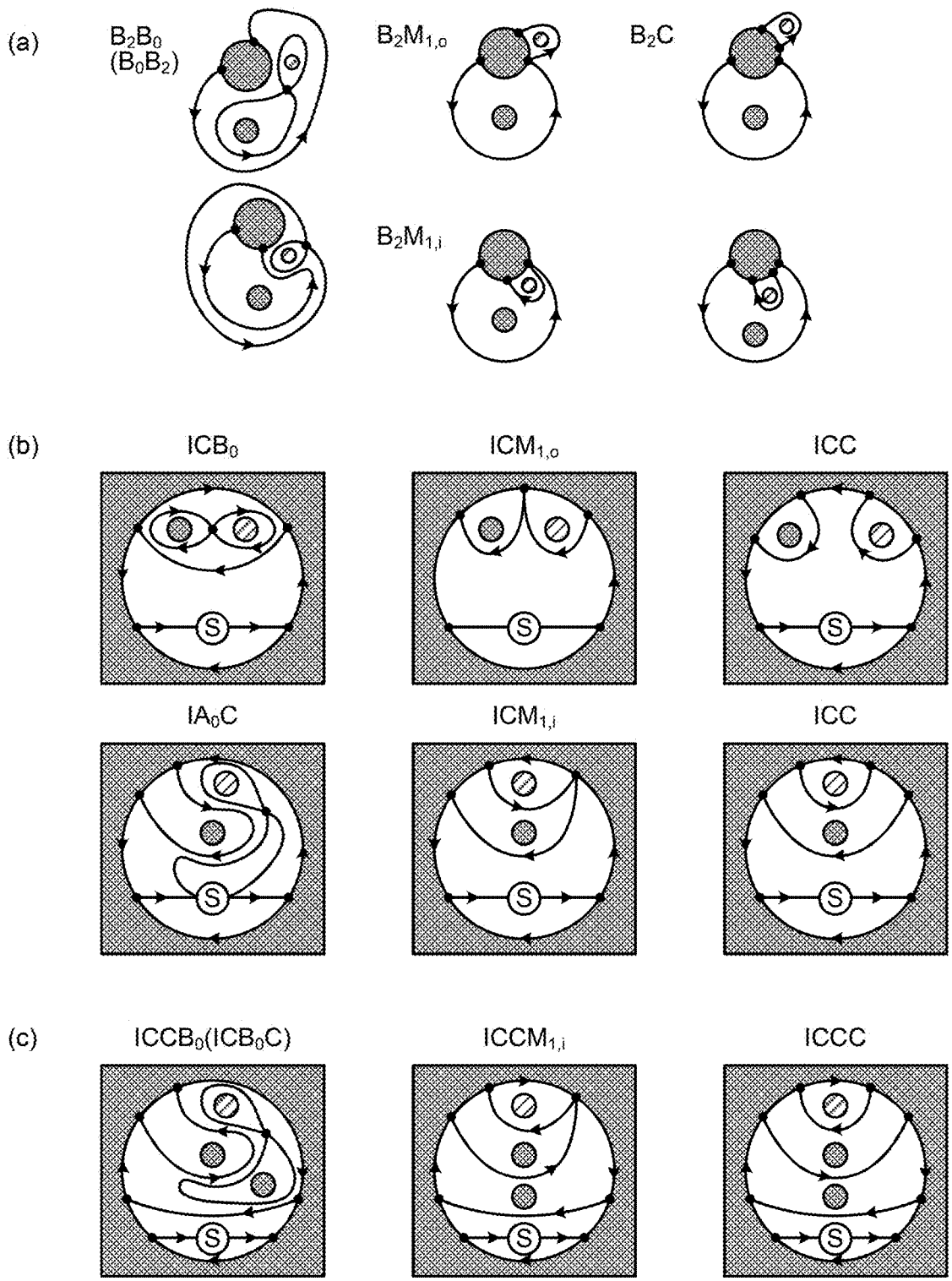
FIG. 25 is a diagram showing p-unstable streamline patterns generated by the operations $M_{1,i}$ and $M_{1,o}$ and perturbation thereof.

The operations $M_{1,i}$ and $M_{1,o}$ are operations each newly adding a ∂-saddle connection sharing an end point with a ∂-saddle of a ∂-saddle connection existing on a boundary on the same boundary as shown in FIG. 21(*c*). $M_{1,i}$ adds a ∂-saddle connection inside the existing ∂-saddle connection and $M_{1,o}$ adds a ∂-saddle connection outside the existing ∂-saddle connection. As a result of mathematical examinations, these operations generate five types of p-unstable streamline patterns like those shown in FIG. 25. FIG. 25 is a diagram showing p-unstable streamline patterns generated by the operations $M_{1,i}$ and $M_{1,o}$ and perturbation thereof.

FIG. 25(*a*) shows p-unstable streamline patterns $B_2M_{1,o}$ and $B_2M_{1,i}$ and perturbation thereof. Owing to perturbation of the p-unstable streamline patterns, different structurally stable streamline patterns with subword representations $B_2B_0$ and $B_2C$ are obtained. The change of index induced by this transition is given by $ind^*(B_2B_0)-ind^*(B_2C)=(0,0,1,0,-1)$ (where * any one of O, I and II).

A p-unstable streamline pattern $ICM_{1,o}$ and perturbation thereof are shown on the upper stage of FIG. 25(*b*). Owing to the perturbation, different structurally stable streamline patterns with subword representations $ICB_0$ and ICC are obtained. The change of index induced by this transition is given by $ind_f(ICB_0)-ind_f(ICC)=(0,0,1,0,-1)$.

A p-unstable streamline pattern $ICM_{1,i}$ and perturbation thereof are shown at the lower stage of FIG. 25(*b*). Owing to the perturbation, different structurally stable streamline patterns with subword representations $IA_0C$ and ICC are obtained. The change of index induced by this transition is given by $ind_f(IA_0C)-ind_f(ICC)=(1,0,0,0,-1)$.

FIG. 25(*c*) shows a p-unstable streamline pattern $ICCM_{1,i}$ and perturbation thereof. Owing to the perturbation, different structurally stable streamline patterns with subword representations $ICCB_0$ (or $ICB_0C$) and ICCC are obtained. The change of index induced by this transition is given by $ind_f(ICCB_0)-ind_f(ICCC)=(0,0,1,0,-1)$.

One fundamental pattern and six operations generating p-unstable streamline patterns, 13 types of p-unstable streamline patterns generated by them, and perturbation and word representation thereof have been described. It can be mathematically proved that there exist no other operations generating p-unstable streamline patterns.

The collection of the above-described all h-unstable streamline patterns and p-unstable streamline patterns and the collection of possible transition patterns corresponding to the difference d between indices of subwords $S_1$ and $S_2$ contained in the maximal word representations of the assigned two structurally stable streamline patterns $W_1$ and $W_2$ are in the lists shown in FIGS. 26 to 28.

FIGS. 26 and 27 are diagrams showing lists of h-unstable streamline patterns appearing as intermediate states each between two structurally stable streamline patterns. It is represented that transition with an h-unstable streamline pattern X as part of structure can occur between two structurally stable flow fields with maximal word representations by $W_1$ and $W_2$ if the conditions, $S_1 \subseteq W_1$, $S_2 \subseteq W_2$ and $ind^*(W_1)-ind^*(W_2)=d$ (where * is any one of O, I and II), are satisfied.

FIG. 28 is a diagram showing a list of p-unstable streamline patterns appearing as intermediate states each between two structurally stable streamline patterns. It is represented that transition with a p-unstable streamline pattern X as part of structure can occur between two structurally stable flow fields with maximal word representations by $W_1$ and $W_2$ if the conditions, $S_1 \subseteq W_1$, $S_2 \subseteq W_2$ and $ind^*(W_3)-ind^*(W_2)=d$ (where * is any one of O, I and II), are satisfied.

The lists shown in FIGS. 26 to 28 approximately cover all structurally unstable flow fields that are intermediate states and therefore using the lists as pattern transition information makes it possible to search for transition routes.

An apparatus configuration and processing to implement the above-described method according to the embodiment with a computer will be described in detail below. All or part of the above-described method according to the embodiment may be implemented by a person or a computer and the following processing according to the embodiment may be used when implemented by a person.

Configuration of Fluid Transition Route Acquisition Apparatus

Figure 29:
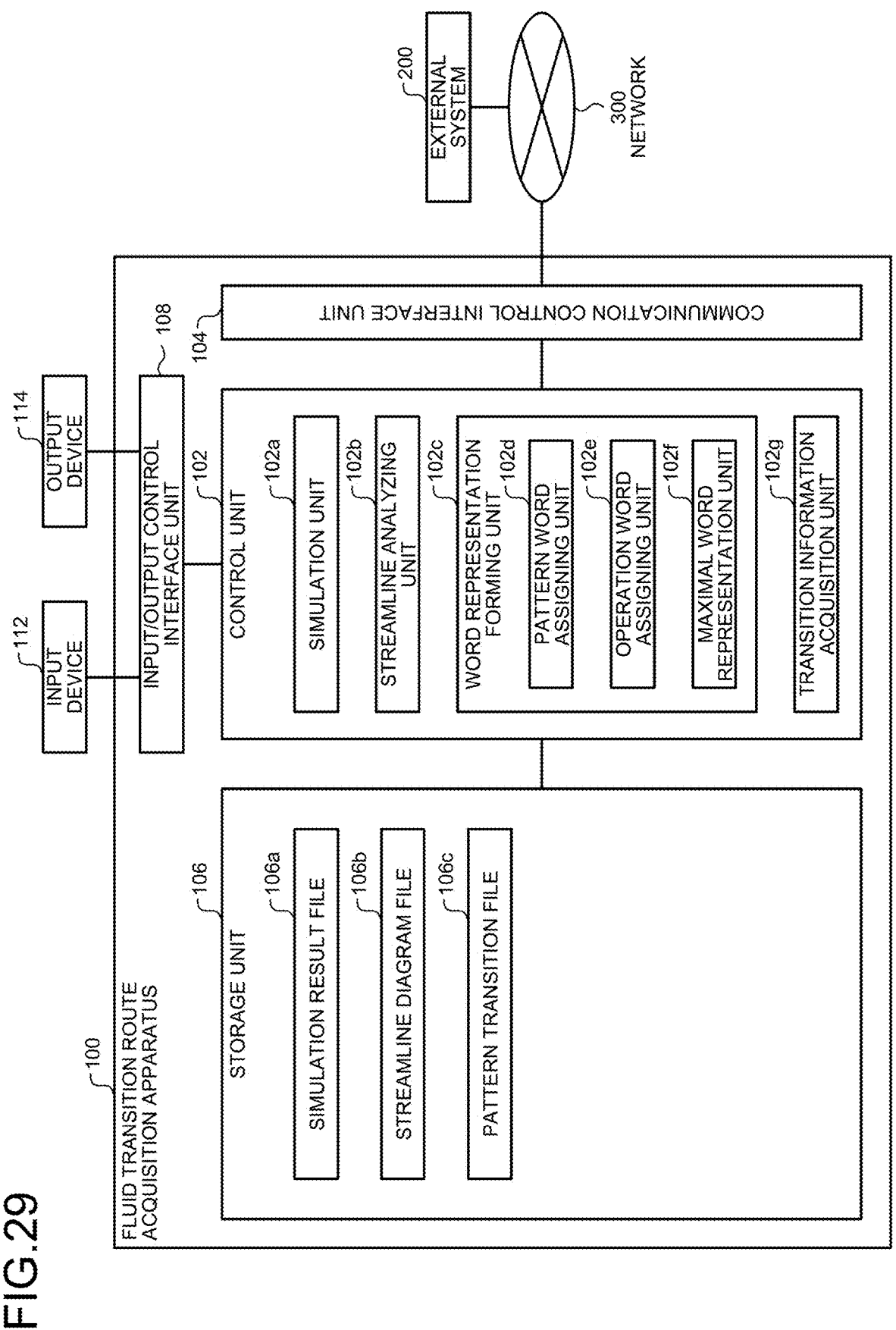
FIG. 29 is a block diagram showing an exemplary fluid transition route acquisition apparatus 100 to which the embodiment is applied.

The configuration of the fluid transition route acquisition apparatus according to the embodiment will be described with reference to FIG. 29. FIG. 29 is a block diagram showing an exemplary fluid transition route acquisition apparatus 100 to which the embodiment is applied, schematically showing only components relevant to the embodiment among the components.

As shown in FIG. 29, schematically, the fluid transition route acquisition apparatus 100 according to the embodiment at least includes a control unit 102 and a storage unit 106 and, in the embodiment, further includes an input/output control interface unit 108 and a communication control interface unit 104. The control unit 102 is a CPU that generally controls whole the fluid transition route acquisition apparatus 100, or the like. The communication control interface unit 104 is an interface that is connected to a communication device (not shown), such as a route, that is connected to a communication line or the like, and the input/output control interface unit 108 is an interface that is connected to an input device 112 and an output device 114. The storage unit 106 is a device that stores various data bases and tables. The units of the fluid transition route acquisition apparatus 100 are communicably connected via any communication path. Furthermore, the fluid transition route acquisition apparatus 100 is communicably connected to a network 300 via a communication device, such as a route, and a wired or wireless communication line, such as a dedicated line.

The various databases and tables (a simulation result file 106*a*, a streamline diagram file 106*b*, a pattern transition file 106*c*, etc.) stored in the storage unit 106 are storage units, such as fixed disk devices, etc. For example, the storage unit 106 stores various programs used for various types of processing, tables, files, databases, webpages, etc.

From among these components of the storage unit 106, the simulation result file 106*a* is a simulation result storage unit that stores data representing the simulation results of experimental or numerical simulations performed by a simulation unit 102*a*. For example, the simulation result file 106*a* may store experimental results or numerical calculation results on the force applied to an object or a flow around the object. For example, the simulation result file 106a may be data representing the values of design variables representing the shape of a structure and hydrodynamic simulation results (the pressure or the direction of flow of the fluid at each set of space coordinates) for a given fluid (such as an ocean current or air current) with respect to the structure. The simulation result file 106a may store, as simulation results, data that is input in advance via the input device 112 through a model measurement of, for example, a wind channel test in a laboratory. The data stored in the simulation result file 106a is not limited to numerical calculation results. The data may be data obtained through model measurements in a laboratory. Even if the data is experimental results, the data of the experimental results may be visualized and processed by a computer to be represented as snapshots capturing the condition of flows that are a streamline diagram.

The streamline diagram file 106b is a streamline data storage unit that stores data, such as a streamline diagram, representing streamlines. For example, the streamline data stored in the streamline diagram file 106b may be data representing the streamlines that are analyzed by a streamline analyzing unit 102b on the basis of the data representing the simulation result.

The pattern transition file 106c is a correspondence relation information storage unit that stores pattern transition information. The pattern transition file 106c stores pattern transition information on whether a structurally stable flow pattern in whole or part of a topological two-dimensional flow structure is transitionable to another structurally stable flow pattern via a structurally unstable flow pattern in an intermediate state. Each flow pattern may be identified by a word representation. For example, the word representation data stored in the pattern transition file 106c is sequences of words consisting of combinations of pattern words and operation words. For example, a structurally stable flow pattern may be identified by a word representation that is formed by assigning any one of operation words (for example, $A_0$, $A_2$, $B_0$, $B_2$ and C) that define five types of operations that can be topologically adopted to add a hole to a flow pattern, for the number of times corresponding to the number of added holes, to pattern words (for example, I, II and O) that define three types of flow patterns in total including, in addition to two types of flow patterns that can be topologically adopted in a simply connected exterior domain with a hole, a pattern without any 1 source-sink point in a doubly connected exterior domain with two holes.

The pattern transition information stored in the pattern transition file 106c may contain information on the change in operation word for word representation (such as a difference d in index) between structurally stable flow patterns that can transition to each other via a structurally unstable flow pattern in an intermediate state. For example, the pattern transition information stored in the pattern transition file 106c is data that stores the index difference d in association with the subword $S_1$ and $S_2$ of structurally stable flow patterns that can transition to each other via a structurally unstable flow pattern in an intermediate state as shown in FIGS. 26 to 28. When a method of searching a route using links and nodes is used, structurally stable flow patterns are set as nodes. When transition between two structurally stable flow patterns via an intermediate state is possible, a link may be set between the corresponding nodes. The pattern transition information in the pattern transition file 106c is not limited to identifying flow patterns with word representations. Flow patterns may be identified with other identifying information (such as sequential numbers or symbols). For example, identifying numbers may be assigned to all flow pattern diagrams in a connected exterior domain and, when flow patterns can transition to each other at a time, the identifying numbers of the two flow patterns may be associated and listed to be used as pattern transition information. Accordingly, even without word representations, displaying the list of flow pattern diagrams on the output device 114 to allow a user to choose flow pattern diagrams via the input device 112 makes it possible to specify flow patterns and search for a transition route from the corresponding identifying numbers.

FIG. 29 will be referred back here. The input/output control interface unit 108 controls the input device 112 and the output device 114. For the output device 114, a monitor (including a home TV set) or alternatively a speaker may be used (the output device 114 may be referred to as a monitor below). For the input device 112, a keyboard, a mouse, a microphone, etc., may be used.

The control unit 102 in FIG. 29 includes an internal memory for storing a control program of, for example, an OS (Operating System), a program that defines various processing procedures, and necessary data. The control unit 102 performs information processing to perform various types of processing by these programs etc. The control unit 102 includes functionally and schematically includes the simulation unit 102a, the streamline analyzing unit 102b, a word representation forming unit 102c, and a transition information acquisition unit 102g.

The simulation unit 102a is a simulation unit that performs simulations of a fluid with respect to an object, such as a structure. For example, the simulation unit 102a may perform simulations of a fluid with respect to an object numerically or experimentally to acquire the results of experiments or the results of numerical calculations on the force to which the object is subjected and the flow around the object. The simulation unit 102a may perform, in addition to simulations in a two-dimensional plane, simulations of a fluid in a three-dimensional space. In the embodiment, the simulation unit 102a stores data representing the simulation results in the simulation result file 106a. For example, the simulation unit 102a may store data representing the value of a design variable representing the shape of the structure and the results of hydrodynamic simulations of a given fluid (such as an ocean current or air current) with respect to the structure (the pressure, the direction of flow, resistance, etc., of the fluid at each set of spatial coordinates). The simulation unit 102a may use Navier-Stokes equations, finite element method, finite-difference methods, and the finite volume method as known fluid dynamics calculation methods.

The simulation unit 102a may perform optimization of the structure by using a known optimization method. For example, while repeatedly changing the design variable that determines the shape of a structure by simulated annealing, a genetic algorithm method, etc., the simulation unit 102a may perform a fluid simulation with respect to the structure to calculate an appropriate shape of the structure (e.g., a shape of bridge piers with less resistance to the water current). The simulation unit 102a may refer to a transition route according to the transition information that is acquired by the transition information acquisition unit 102g to perform optimization. For example, when the transition information acquisition unit 102g acquires a transition route where a streamline pattern according to the current shape and layout of the structure is regarded as the start point and an ideal stream line pattern is regarded as a terminus, the simulation unit 102a may perform optimization of the shape and layout of the structure by performing approximation to the ideal streamline pattern while changing the shape and layout of the structure to find out the next streamline pattern from the current streamline pattern in the transition route.

The streamline analyzing unit 102b is a flow analyzing unit that performs a flow analysis. The streamline analyzing unit 102b may derive a streamline diagram by performing a streamline analysis on the result of a simulation performed by the simulation unit 102a. For example, the streamline analyzing unit 102b creates a streamline diagram by using a known method from the results of experiments (such as experimental data), or the results of numerical calculations (numerical simulation result) on the flow around the object, stored in the simulation result file 106a. Specifically, the streamline analyzing unit 102b can create a streamline diagram by, after calculating all of a saddle point, a ∂-saddle∂, etc., from the numerical simulation result, drawing all contour lines of a stream function having the same value as that of the stream function at that point and drawing all contour lines of a stream function having the equal value as that of a stream function at the boundary. In a case of the result of a three-dimensional simulation, the streamline analyzing unit 102b may perform a streamline analysis after conversion into two-dimensional data at a cross section of structure. Any plane can be a cross section and, preferably, the streamline analyzing unit 102b may implement a conversion into two-dimensional data at a cross section along a direction, i.e., the direction in which the fluid flows (uniform flow). For example, for transportation, such as a train, a motor vehicle or an airplane, a cross section may be generated along the travel direction. Furthermore, using the technology described in Computational Homology, the streamline analyzing unit 102b may extract a characteristic structure that satisfies the conditions from a flow field (see Tomasz Kaczynski, Konstantin Mischaikow, Marian Mrozek, "Computational Homology" Spinger, 2000). In the embodiment, the streamline analyzing unit 102b stores the created streamline diagram data in the streamline diagram file 106b.

The word representation forming unit 102c is a word representation forming unit that forms a word representation representing a flow pattern of a flow around an object by assigning, according to the streamline diagram acquired by the streamline analyzing unit 102b, any one of words (pattern words I and II) that define two types of flow patterns that can be topologically adopted in a simply connected exterior domain with a hole and any one of words (operation words $A_0$, $A_2$, $B_0$, $B_2$ and C) that define five types of operations that can be topologically adopted to add a hole to a flow pattern for the number of times corresponding to the number of added holes. If required for word representation, the word representation forming unit 102c may use a pattern word ($\Lambda$) for representing a flow pattern in an intermediate state or operation words ($D_0$, $E_{0,s}$, $\Phi_0$, $D_2$ and $M_{1,i}$). As shown in FIG. 29, the word representation forming unit 102c includes a pattern word assigning unit 102d, a operation word assigning unit 102e, and a maximal word representation unit 102f.

The pattern word assigning unit 102d is a pattern word assigning unit that assigns any one of words (e.g., pattern words I and II) that define two types of flow patterns that can be topologically applied in a simply connected exterior domain with a hole. The pattern word assigning unit 102d may add any one of words defining three types of flow patterns in total, i.e., the above-described patterns and, in addition, a pattern without any 1-source-sink point in a doubly connected exterior domain with two holes (i.e., Pattern words I, II and O). More specifically, the three types of flow patterns are:

1) a pattern I with a 1-source-sink point and two ss-∂-saddle connections, 2) a pattern II with a 1-source-sink point, a saddle point, a homoclinic saddle connection connecting to the saddle point, and two ss-saddle connections, and 3) a pattern O without any 1-source-sink point.

The pattern word assigning unit 102d may perform, according to an algorithm for calculating a word representation from a streamline diagram (referred to as an "algorithm B"), a I classification step of determining whether there exists an ss-∂-saddle connection in the streamline diagram and assigning a word of the pattern I when there exists an ss-∂-saddle connection; and a II/O classification step of determining whether there exists an ss-saddle connection in the streamline diagram when there exists no ss-∂-saddle connection at the I classification step, assigning a word of the pattern II when there exists an ss-saddle connection, and assigning a word of the patter O when there exists no ss-saddle connection on the other hand. This allows the pattern word assigning unit 102d to properly determine the system (I system, II system or O system) to which the streamline diagram belongs.

The operation word assigning unit 102e is an operation word assigning unit that forms a word representation corresponding to a multiply connected exterior domain with N holes by repeatedly assigning one of words (e.g., operation words $A_0$ $A_2$, $B_0$, $B_2$ and C) defining five types of operations that can be topologically applied in a case where one hole is added to the flow pattern. More specifically, the five types of operations are:

1) an $A_0$ operation of replacing an ss-orbit with a saddle point, a homoclinic saddle connection connecting to the saddle point and enclosing a hole, and two ss-saddle connections;

2) an $A_2$ operation of replacing an ss-orbit with two ss-∂-saddle connections and two ∂-saddles at a boundary newly added;

3) a $B_0$ operation of replacing a closed orbit with two homoclinic saddle connections forming a figure eight with addition of a hole and a saddle point;

4) a $B_2$ operation of replacing a closed orbit with an orbit with a ∂-saddle connection connecting two ∂-saddles added at a boundary of a hole newly added; and 5) a C operation of newly adding two ∂-saddles at a boundary already with 2k (k>0) ∂-saddles and connecting the two ∂-saddles with a ∂-saddle connection to enclose a hole newly added.

The operation word assigning unit 102e may assign operation words according to the following constraints. In other words, when assigning the five types of operation words, the operation word assigning unit 102e may 1) assign an operation word $A_0$ or $A_2$ on condition that there exists one ss-orbit, 2) assign an operation word $B_0$ or $B_2$ on condition that there exists a closed orbit, or 3) assign an operation word C on condition that there exists a boundary with a ∂-saddle.

The detailed descriptions of the specific processing performed by the operation word assigning unit 102e according to the constraints will be given below with reference to the flowchart. In the embodiment, the operation word assigning unit 102e may store, in the pattern transition file 106c, a word representation that is a word sequence of operation words that is assigned to the pattern word.

The maximal word representation unit 102f is a maximal word representation unit that converts a word representation that is formed by the pattern word assigning unit 102d and the operation word assigning unit 102e (a word sequence consisting of a combination of pattern word and operation word) into a maximal word. In other words, according to an algorithm for writing all flow patterns that can be applied (hereinafter, an "algorithm A"), while the group of word representations that are formed by the pattern word assigning unit 102d and the operation word assigning unit 102e writes all flow patterns, there exist word representations defining the same flow pattern and word representations defining flow patterns in an inclusion relation. Thus, the maximal word representation unit 102f performs, on the word representation group, processing for excluding redundant word representations and inclusive word representations to obtain a maximal word representation. For example, the maximal word representation unit 102f forms a maximal word representation by exchanging the word representations according to the inclusion relation shown in the following table. In the following table, "=" denotes a matching relation, "≤" or "≥" denotes an inclusion relation. $B_2$ and C are the only exceptions. Because an inclusive relation is not satisfied by exchanging them, they are incomparable, which is symbolized by $B_2C\|CB_2$. The detailed descriptions of the specific processing performed by the maximal word representation unit 102f according to the relation expressions will be given below with reference to the flowcharts.

TABLE 2

|       | $A_0$ | $A_2$ | $B_0$ | $B_2$ | C |
|-------|-------|-------|-------|-------|---|
| $A_0$ | =     | =     | ≤     | ≤     | = |
| $A_2$ |       | =     | =     | =     | ≤ |
| $B_0$ |       |       | =     | ≤     | ≥ |
| $B_2$ |       |       |       | =     | ‖ |
| C     |       |       |       |       | = |

The transition information acquisition unit 102g is a transition information acquisition unit that acquires, according to the pattern transition information in the pattern transition file 106c, transition information on a transition route from a specified structurally stable flow pattern to another structurally stable flow pattern that can be adopted topologically. For example, the transition information acquisition unit 102g may regard, as a start point, a structurally stable flow pattern specified by a user via the input device 112 and search for a transition route to another structurally stable flow pattern. Furthermore, the transition information acquisition unit 102g may regard, as a start point, a structurally stable flow pattern that is specified according to the results of simulations performed by the simulation unit 102a and search for a transition route to another structurally stable flow pattern. For example, in a streamline diagram obtained by the simulation unit 102a through analysis of the results of simulations performed by the simulation unit 102a, a word representation that is formed by the word representation forming unit 102c may be regarded as a start point of a specified flow pattern and a previously specified ideal flow pattern may be regarded as a terminus. The transition information acquisition unit 102g may send back the transition information of the transition route obtained by searching to the simulation unit 102a, whereby the transition information is used as an index for the optimization method performed by the simulation unit 102.

Here, the transition information acquisition unit 102g may acquire all possible transition routes or may acquire only the shortest transition route about specified two structurally stable flow patterns. The transition information acquisition unit 102g may acquire transition information containing the number of transitions each from one of the structurally stable flow patterns to the other structurally stable flow pattern, in which transition via a structurally unstable flow pattern in an intermediate state is regarded as one transition.

As in searching routes, such as, roads, a transition route may be searched for by using graph theory using links and nodes. In this case, the transition information acquisition unit 102g may deal with structurally stable flow patterns as nodes and deal with one transition via a structurally unstable flow pattern via an intermediate state as a link. For example, a case where a flow pattern according to the current shape and layout of a structure is set as a start point and an ideal flow pattern is set as a terminus will be described. For example, the transition information acquisition unit 102g regards a specified structurally stable flow pattern as a start point and, with reference to the pattern transition information, writes out all secondarily structurally stable flow patterns each via a structurally unstable flow pattern in an intermediate state. The transition information acquisition unit 102g then regards each of the secondarily structurally stable flow patterns as a start point and, with reference to the pattern transition information, writes all thirdly structurally stable flow patterns each via a structurally unstable flow pattern in an intermediate state. When the ideal flow pattern that is set as the terminus is reached by sequentially extending the search area in this manner, the transition information acquisition unit 102g ends repeating the process. The transition information acquisition unit 102g may output the transition route to the terminus as the shortest route. As described above, according to the pattern transition information, the transition information acquisition unit 102g may acquire, regarding specified two structurally stable flow patterns, transition information from one of the structurally stable flow patterns to the other structurally stable flow pattern. When there is no transition route between two structurally stable flow patterns, the result representing that transition is impossible is acquired as the transition information. The transition information acquisition unit 102g may output the acquired transition information to the output device 114, such as a monitor, may allow the simulation unit 102a to refer to the transition information for optimization, or may store the transition information in the storage unit 106, such as the simulation result file 106a.

The transition information acquisition unit 102g may use the change of the number of operation words for word representations (increase or decrease in the number of operation words) as an index to effectively search for transition routes. In other words, in the pattern transition file 106c, when the information on the change in operation word for word representation between structurally stable flow patterns that can transition to each other via a structurally unstable flow pattern in an intermediate state is stored in the pattern transition information, the transition information acquisition unit 102g may collate the change between the operation words of the two specified two word representations to the pattern transition information to extract the corresponding flow pattern. More specifically, the transition information acquisition unit 102g may calculate, for assigned two structurally stable streamline patterns $W_1$ and $W_2$, a difference d between indices of maximal word representations that are formed by the word representation forming unit 102c may be calculated and a transition pattern with the difference d is searched for from the pattern transition information like those shown in FIGS. 26 to 28 to acquire the transition information.

This is the exemplary configuration of the fluid transition route acquisition apparatus 100 according to the embodiment. The fluid transition route acquisition apparatus 100 may be connected to an external system 200 via the network 300. In this case, the communication control interface unit 104 implements communication control between the fluid transition route acquisition apparatus 100 and the network 300 (or a communication device such as a route). In other words, the communication control interface unit 104 has a function of communicating data with another terminal via a communication line. Furthermore, the network 300 has a function of connecting fluid transition route acquisition apparatus 100 and the external system 200 each other and is, for example, the Internet or the like.

The external system 200 is connected to the fluid transition route acquisition apparatus 100 via the network 300 and has a function of providing an external database relating to various types of data including simulation result data, such as experimental results or numerical calculation results, and streamline diagram data, a program for causing a connected information processing apparatus to implement the fluid transition route acquisition method, etc.

The external system 200 may be configured as a web server, an ASP server, or the like. The hardware configuration of the external system 200 may be configured using an information processing apparatus, such as a generally available work station or a personal computer, and an auxiliary device thereof. Each of the functions of the external system 200 may be implemented by the CPU, disk device, memory device, input device, output device, and communication control device in the hardware configuration of the external system 200 and by a program for controlling them.

Here is the end of explanation of the configuration of the embodiment.

Process Performed by Fluid Transition Route Acquisition Apparatus 100

Figure 30:
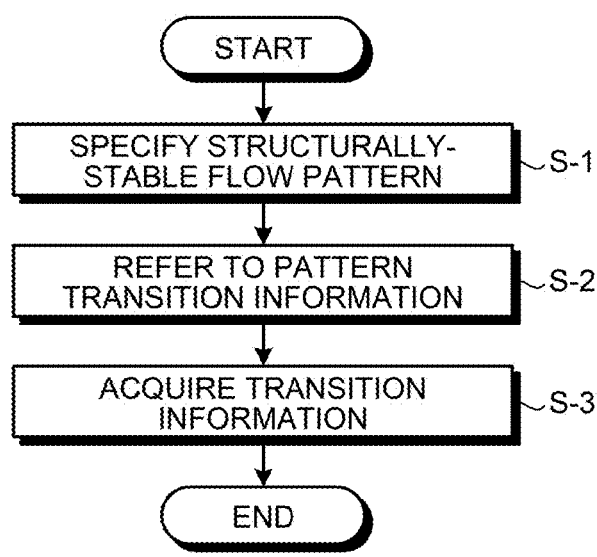
FIG. 30 is a flowchart of an exemplary process performed by the fluid transition route acquisition apparatus 100.

An exemplary process performed by the fluid transition route acquisition apparatus 100 will be described in detail below with reference to the accompanying drawings. FIG. 30 is a flowchart showing an exemplary process performed by the fluid transition route acquisition apparatus 100.

As shown in FIG. 30, first of all, the transition information acquisition unit 102g performs control leading to specifying a structurally stable flow pattern (step S-1). For example, the transition information acquisition unit 102g may perform control to lead the user to specify a flow pattern via the input device 112. The transition information acquisition unit 102g may regard, as a flow pattern to be specified, a streamline diagram obtained by the streamline analyzing unit 102b on the basis of the results of simulations performed by the simulation unit 102a. When the transition information acquisition unit 102g searches for a route according to word representations, the word representation forming unit 102c converts the specified streamline diagram, or flow pattern, into a word representation The transition information acquisition unit 102g refers to the pattern transition information corresponding to the specified structurally stable flow pattern (step S-2). For example, when structurally stable flow patterns that can transition to each other via an intermediate state are stored as word representations in association with each other in the pattern transition file 106c, the transition information acquisition unit 102g may search for the pattern transition information matching the word representation of the specified structurally stable flow pattern and sequentially search for a flow pattern to which the flow pattern can transition. When two structurally stable flow patterns are specified, the transition information acquisition unit 102g may perform sequential searching from one of the structurally stable flow patterns toward the other structurally stable flow pattern or may perform searching on the basis of the topological difference (for example, the difference of index) between the two structurally stable flow patterns. The latter process will be described in detail below. Alternatively, the transition information acquisition unit 102g may search for a transition route by using a known route searching method or a known shortest-route searching method (Dijkstra's algorithm).

The transition information acquisition unit 102g acquires the transition information on the searched transition route (step S-3). For example, when a flow pattern is specified, the transition information acquisition unit 102g may acquire transition information on a transition route from the specified structurally stable flow pattern to another structurally stable flow pattern via a predetermined number of transitions. The transition information acquisition unit 102g may incorporate, in the transition information, not only the information on the structurally stable flow patterns but also the intermediate structurally unstable flow pattern between the structurally stable flow patterns. When two structurally stable patterns are specified, the transition information acquisition unit 102g may acquire transition information on transition from one of the structurally stable flow patterns (W1) to the other structurally stable flow pattern (W2). The transition information acquisition unit 102g may acquire, as transition information, a transition route with the minimum number of transitions. The transition information acquisition unit 102g may acquire transition information where the transition route is a diagram such as a streamline diagram or a flow pattern or acquire transition information that is described by word representation. The transition information acquisition unit 102g may output and display the acquired transition information to and on the output device 114, store the acquired transition information in the storage unit 106, or allow the acquired transition information to be refereed to for the optimization processing performed by the simulation unit 102a.

That is the exemplary process performed by the fluid transition route acquisition apparatus 100.

Transition Route Searching Process Using Index Difference

Figure 31:
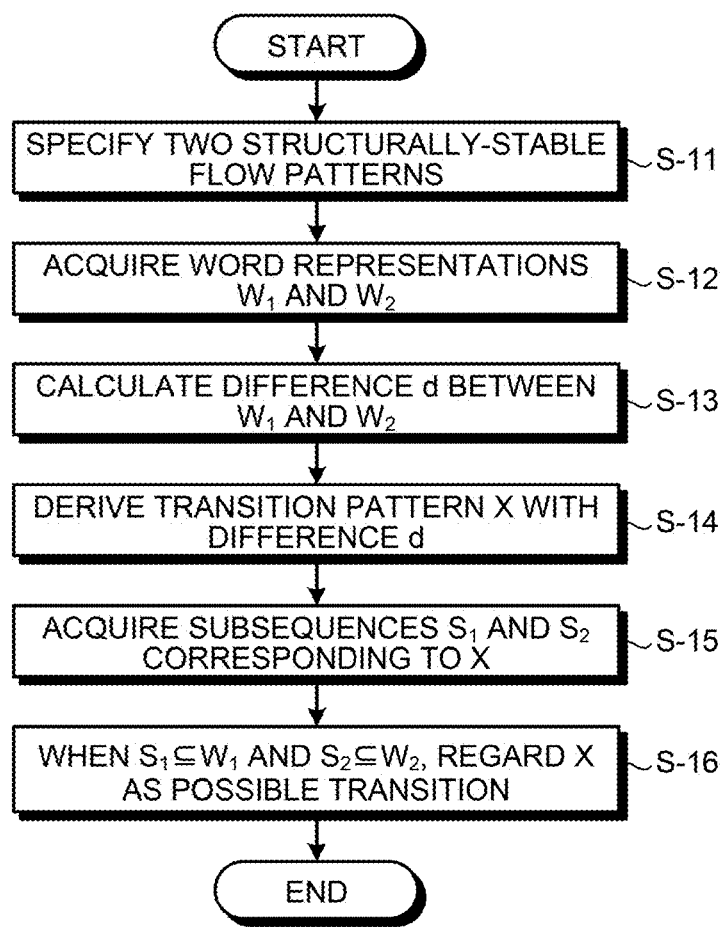
FIG. 31 is a flowchart of an exemplary transition route searching process using the index difference that is performed by the fluid transition route acquisition apparatus 100.

An exemplary transition route searching process using the index difference will be described in detail below with reference to the drawings. FIG. 31 is a flowchart showing an exemplary transition route searching process using the index difference performed by the fluid transition route acquisition apparatus 100. The following example uses, as pattern transition information, the lists in FIGS. 26 to 28 obtained on perturbation of h-unstable and p-unstable streamline patterns and their subword representations. Furthermore, descriptions will be given on the premise that two structurally stable streamline patterns and their corresponding maximal word representations $W_1$ and $W_2$ of the streamline patterns are specified as the input and a list of possible transition X determined from the maximal word representations is output as transition information.

First of all, as in the case of step S-1, the transition information acquisition unit 102g leads to specifying two structurally stable streamline patterns (step S-11).

The transition information acquisition unit 102g acquires word representations $W_1$ and $W_2$ corresponding to the two structurally stable streamline patterns (step S-12). For example, when streamline diagrams are specified, the transition information acquisition unit 102g acquires their corresponding word representations $W_1$ and $W_2$ owing to the processing performed by the word representation forming unit 102c.

The transition information acquisition unit 102g calculates the difference d between the word representations $W_1$ and $W_2$ (step S-13). In other words, the transition information acquisition unit 102g chooses a proper * from I, II and O and calculates $d=\text{ind}^*(W_1)-\text{ind}^*(W_2)$.

The transition information acquisition unit 102g derives transition patterns X with the difference d from the pattern transition information (the lists in FIGS. 26 to 28) (step S-14). When the transition pattern X with the difference d does not match, the transition information may represent that the two structurally stable streamline patterns cannot transition to each other via one transition, or a transition route in which they can transition to each other via multiple transitions may be searched for. For example, assuming that the streamline patterns can transition to each other via k transitions, the transition information acquisition unit 102g may derive a combination of transition patterns $X_1, X_2, \ldots,$ and $X_k$ satisfying $d=\text{ind}^*(W_1)-\text{ind}^*(W_2)=d_1+d_2+\ldots+d_k$. Adjacent streamline patterns on transition have to have the same word representation (a subword has to be shared).

The transition information acquisition unit 102g searches the lists for all transition patterns X with the difference d (step S-14) and acquires subsequences $S_1$ and $S_2$ corresponding to each of the transition patterns X (step S-15). Assuming the multiple transitions described above, subsequences $S_{11}, S_{21}$ to $S_{1k},$ and $S_{1k}$ are calculated for the transition patterns $X_1, X_2, \ldots,$ and $X_k$.

The transition information acquisition unit 102g examines whether the subsequences $S_1$ and $S_2$ serve as subwords of $W_1$ and $W_2$, respectively. When they serve as the subwords, X is incorporated as a possible transition in transition information (step S-16). In other words, it is examined whether $S_1 \subseteq W_1$ and $S_2 \subseteq W_2$. When $S_1 \subseteq W_1$ and $S_2 \subseteq W_2$ are satisfied, the transition information acquisition unit 102g acquires X as a possible transition and, if not, discards X. When the above-described multiple transitions are assumed, arranging is performed such that neighboring streamline patterns upon transition shares a subsequence. When there is an arrangement where a subsequence is shared, the order is acquired as a possible transition. When there is arrangement where a subsequence is shared, the order is discarded. Arrangement where a subsequence is shared makes it is possible to determine overall word representations in the transition route sequentially from $W_1$ and $W_2$ at an end.

That is the exemplary transition route searching process using the index difference. In the example where the lists in FIGS. 26 to 28 obtained regarding perturbation of h-unstable and p-unstable streamline patterns and their corresponding subword representations are used as the pattern transition information, patterns X that are possible transitions only give possible transitions that can occur (necessary condition) and therefore, on whether the corresponding intermediate state can be actually realized, it is necessary to check whether there actually exists the structure obtained according to the subword (sufficient condition). Once the existence is confirmed, it is possible to actually transcribe the p-unstable or h-unstable streamline pattern serving as the intermediate state between the two structurally stable streamline patterns. Note that, for checking the sufficient condition, streamline structure pattern matching may be manually performed by a person or may be performed by using a known pattern matching technology.

Example

An example where the simulation results are used will be described. It is premised that, regarding an object placed in a uniform flow, the results of experiments or numerical calculations on the force to which the object is subjected and the flow around the object in a certain period are stored. The force to which the object is subjected is the force to which the object is subjected owing to the uniform flow. Specifically, the force may be lift or drag and, for example, it may be the lift/drag ratio (the ratio of lift to drag).

Figure 32:
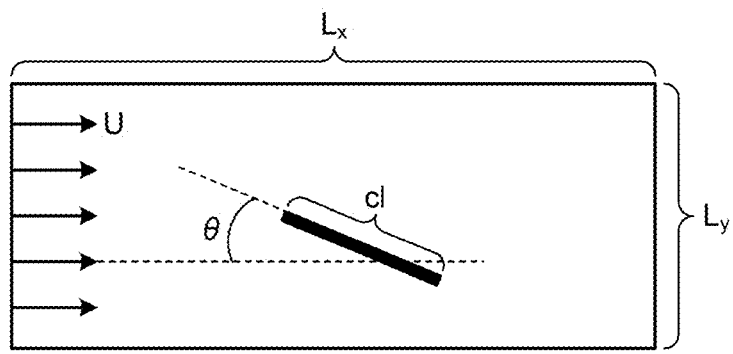
FIG. 32 is a diagram schematically showing the case where, in a two-dimensional exterior domain, a flat thin plate having a finite thickness is set as an object in a uniform flow to be inclined at a certain angle with respect to the uniform flow.

FIG. 32 is a diagram schematically showing the case where, in a two-dimensional exterior domain, a flat thin plate having a finite thickness is placed as an object in a uniform flow to be inclined at a certain angle with respect to the uniform flow. The symbol U in FIG. 32 denotes the uniform flow, cl denotes the length of the longer side of the flat plate, θ denotes the angle with respect to the uniform flow, and Lx and Ly denote the rectangular region defined by the lengths in the x-axis and y-axis directions to be subjected to calculations.

Figure 33:
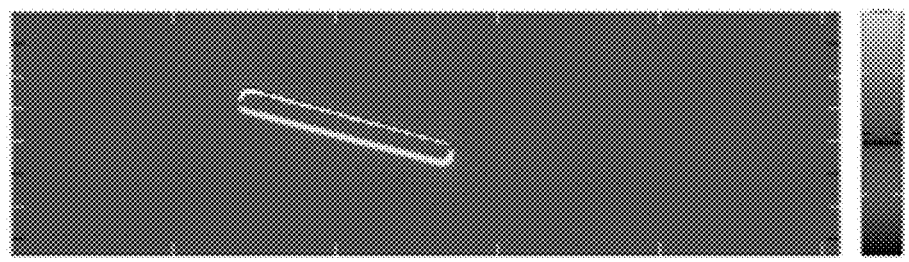
FIG. 33 is a diagram showing the result of numerical calculation of the flow around the object.
Figure 34:
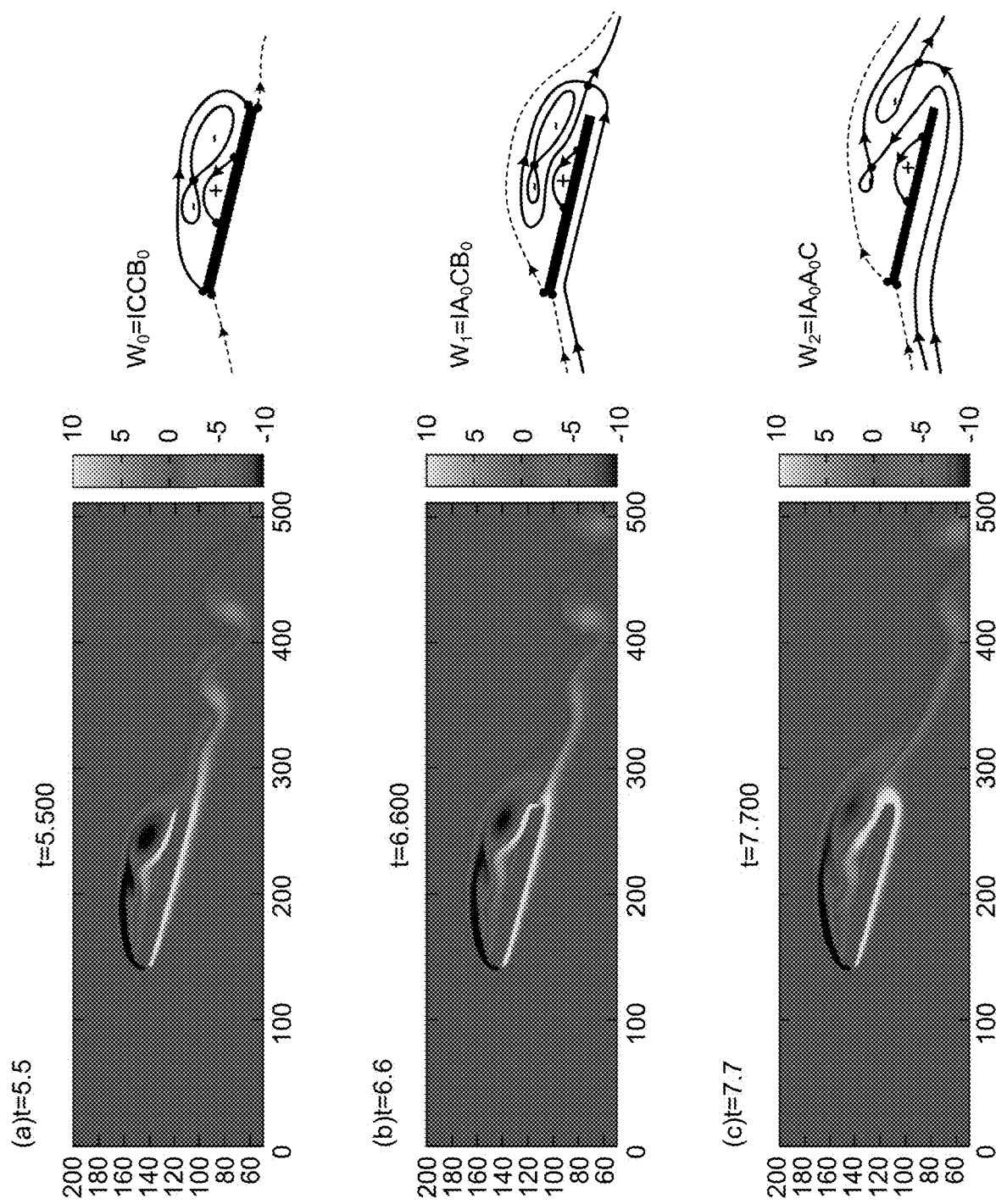
FIG. 34 is a diagram showing the result of numerical calculations of the flow around the object.

As shown in FIG. 32, for example, regarding an object, such as an aircraft, a train, or an automobile, a uniform flow from a point at infinity occurs relatively along its traveling direction. Then a two-dimensional cross-section is assumed to consider obtaining, regarding the object placed in the uniform flow, the force to which the object is subjected and the flow around the object in a certain period are obtained by simulation. FIGS. 33 and 34 are diagrams showing the results of numerical calculations on the flow around the object. The detailed numerical calculation conditions (for example, the Reynolds number:1370, θ:15°, the analysis area (resolution):1024×256) are not important here and are thus omitted.

FIG. 33 illustrates the flow around the object occurring when the uniform flow is not against the object and FIG. 34 illustrates the flow around the object at a certain time point (t=5.5) when the uniform flow is against the object. The counterclockwise flow is represented by the positive value, the clockwise flow is represented by the negative value, and the straight flow is represented by 0. In other words, the diagram represents the vorticity components of the flow, where the area with the positive value represents the area with the counterclockwise positive vorticity component and the area with the negative value represents the area with the clockwise negative vorticity component. In the lift or the lift/drag ratio (l/d ratio) in the force to which the object is subjected, large fluctuations according to the time can be seen, which periodically vibrate vertically.

Conventionally, while it is possible to associate the lift or the lift/drag ratio at a certain time point with the result of simulation of the flow around the object at that time point, it is difficult analyze or know which change of the topology would affect the fluctuation of the force to which the object is subjected and which unstable topology in an intermediate state would occur during the change of the topology. In the example, for such simulation, the following process is performed to analyze the intermediate state.

FIG. 34 shows the time evolution of the flat plate placed in the uniform flow from t=5.5 to t=7.7, the topologies of its streamline patterns and their corresponding maximal expressions. According to them, it can be assumed that some transition has occurred because the maximal representation differs at each time. Which transition has occurred will be given according to the algorithm (including the transition route searching process using the index difference) according to the embodiment.

First of all, the maximal representations at the times t=5.5 and t=6.6 are $W_0=ICCB_0$ and $W_1=IA_0CB_0$ and the difference d between the indices is given by $d=ind_f(W_1)-ind_f(W_0)=(1,0,0,0,-1)$. The lists in FIGS. 26 to 28 represent that there are three transitions $X=I\Delta_1$, $IM_{1,s}$, $ICM_{1,i}$ as the transition X that generates that index difference.

When subsequences $S_1$ and $S_2$ corresponding to each X are picked up according to the lists, both of them are contained as subwords in $W_1$ and $W_0$ and therefore it is represented that these three transitions would occur.

When pattern matching between streamline patterns obtained by perturbation is performed, it is also represented that the transition that has actually occurred is $IM_{1,s}$ and the p-unstable streamline pattern in the intermediate state is that in FIG. 35(a). FIG. 35 is a diagram showing the transition occurring in evolution from the time t=5.5 to 7.7.

For the time from t=6.6 to t=7.7, their corresponding maximal representations are $W_1=IA_0CB_0$ and $W_2=IA_0A_0C$ and the difference between the indices is given by $d=ind_f(W_2)-ind_f(W_1)=(1,0,-1,0,0)$. By searching the lists in FIGS. 26 to 28 for X, $X=ICD_0,A_0E_{0,s}$ and $IC\Psi(2)$ are obtained.

Because the subwords $S_1$ and $S_2$ corresponding to $IC\Psi(2)$ are not contained in $W_2$ and $W_1$, it is excluded.

On the other hand, because $S_1 \subseteq W_1$ and $S_2 \subseteq W_2$ are satisfied for $X=A_0E_{0,s}$ and $X=ICD_0$, they are possible transitions that can occur. Owing to comparison between structurally stable patterns obtained by perturbing the structurally-unstable pattern, it is represented that the transition having occurred is $X=A_0E_{0,s}$ and an h-unstable streamline pattern like that in FIG. 35(b) is obtained as its corresponding intermediate state.

Here is the end of explanation of the embodiment. According to the embodiment, for example, regarding the evolution of a flow field around a wing of an airplane, it is possible to understand the mechanism on how a change of important characteristics serving as the wing function, such as the lift/drag ratio at each time, is formed and how it is lost and accordingly a guide to improvement in designing an efficient wing function is given more precisely. Furthermore, in designing bridge piers and dams other than airplanes, it is possible to describe the middle stage in optimization from a streamline obtained in a certain layout to a streamline structure supposed to be optimism or the route to it.

If the optimum layout is known in terms of efficiency of interaction between various fluids and structures, according to the example, when deforming the shape or layout is deformed sequentially for the first time from the current state, it is possible to know the state of the flow pattern to be taken next. This leads to knowledge of the shortest route to the optimum layout via sequential change of the shape and layout of the structure and accordingly gives an efficient guide of optimization. Because, for the evolution of the flow obtained through large-scale numeric calculations or experiments of a fluid, it becomes possible to describe the transition of the flow pattern, which makes it possible to assume the shortest control to keep the optimum state by controlling the movement. For example, it is possible to know an efficient method of controlling wings preventing the speed of, for example, an aircraft from lowering.

Fundamental Process of Word Representation Algorithm

Here, an exemplary fundamental process of the word representation algorithm executed by the fluid transition route acquisition apparatus 100 will be described with reference to the above-described FIG. 1 again. In the following example, a pattern word is assigned first (step SA-1) and an operation word is then assigned (step SA-2); however, it is not limited to this, i.e., an operation word may be assigned first and a pattern word may be then assigned.

As shown in FIG. 1, the pattern word assigning unit 102d of the word representation forming unit 102c assigns any one of the pattern words I and II (step SA-1). The pattern word assigning unit 102d may assign any one of three types of pattern words I, II and O in total, i.e., the above described patterns and, in addition, the pattern O. More specifically, the above-descried three types of pattern words are:

1) a pattern word I defining a pattern with a 1-source-sink point and two ss-∂-saddle connections, 2) a pattern word II defining a pattern with a 1-source-sink point, a saddle point, a homoclinic saddle connection connecting to the saddle point, and two ss-saddle connections, and 3) a pattern word O defining a pattern without any 1-source-sink point.

The operation word assigning unit 102e of the word representation forming unit 102c assigns any one of the five types of operation words $A_0$, $A_2$, $B_0$, $B_2$ and C to the pattern word that is assigned by the pattern word assigning unit 102d (step SA-2). More specifically, the five types of operation words are as follows:

1) an operation word $A_0$ defining an operation of replacing an ss-orbit with a saddle point, a homoclinic saddle connection connecting to the saddle point and enclosing a hole, and two ss-saddle connections;

2) an operation word $A_2$ defining an operation of replacing an ss-orbit with two ss-∂-saddle connections and two ∂-saddles at a boundary newly added;

3) an operation word $B_0$ defining an operation of replacing a closed orbit with two homoclinic saddle connections forming a figure eight with addition of a hole and a saddle point;

4) an operation word $B_2$ defining an operation of replacing a closed orbit with an orbit with a ∂-saddle connection connecting two ∂-saddles added at a boundary of a hole newly added; and 5) an operation word C defining an operation of newly adding two ∂-saddles at a boundary already with 2k (k>0) ∂-saddles and connecting the two ∂-saddles with a ∂-saddle connection to enclose a hole newly added.

Because the above-described operations define the operations to add a hole, according to Algorithm B for assigning operation words to the streamline diagram, inverse operations (inverse exchanging operations) of the above-described operations are performed on the streamline diagram.

Because the above-described operations are on the premise that there exists an ss-orbit, a closed orbit, etc, the operation word assigning unit 102e may assign operation words according to the following constraints. In other words, when assigning the five types of operation words, the operation word assigning unit 102e may 1) assign an operation word $A_0$ or $A_2$ on condition that there exists an ss-orbit, 2) assign an operation word $B_0$ or $B_2$ on condition that there exists a closed orbit, or 3) assign an operation word C on condition that there exists a boundary with a ∂-saddle.

The operation word assigning unit 102e of the word representation forming unit 102c determines whether the number of holes reaches N (step SA-3). For example, the operation word assigning unit 102e determines whether (N-1) operation words have been assigned to the pattern word I or II in a simply connected exterior domain $D_c(0)$ with a hole until the number of holes reaches N. The operation word assigning unit 102e also determines whether (N−2) operation words have been assigned to the pattern word O in a doubly connected exterior domain $D_\zeta(1)$ with two holes until the number of holes reaches N. According to Algorithm B, no value is set for the number of holes according to Algorithm B. In the case of Algorithm B, the operation word assigning unit 102e may determine whether the number of holes has reached N depending on whether the streamline diagram has reached an initial pattern (I, II or O) by the exchanging operations according to the operation words on the streamline diagram.

When the number of holes has not reached N (NO at step SA-3), the operation word assigning unit 102e of the word representation forming unit 102c further assigns an operation word to the word sequence that has been created (step SA-2).

When the number of holes has reached N (YES at step SA-3), the operation word assigning unit 102e of word representation forming unit 102c stores the word sequence that has been created as a word representation in the pattern transition file 106c and ends the processing.

This is the exemplary fundamental process of the word representation algorithm performed by the fluid transition route acquisition apparatus 100 according to the embodiment. By forming a word representation as described above, to which flow pattern the simulation result corresponds is represented by a word representation.

Algorithm B

On the basis of the above-described fundamental process performed by the word representation forming unit 102c, detailed descriptions of the processing according to Algorithm B for calculating a word representation from a streamline diagram will be given below with reference to FIGS. 36 to 43.

B-1. Process of Assigning Pattern Word

Figure 36:
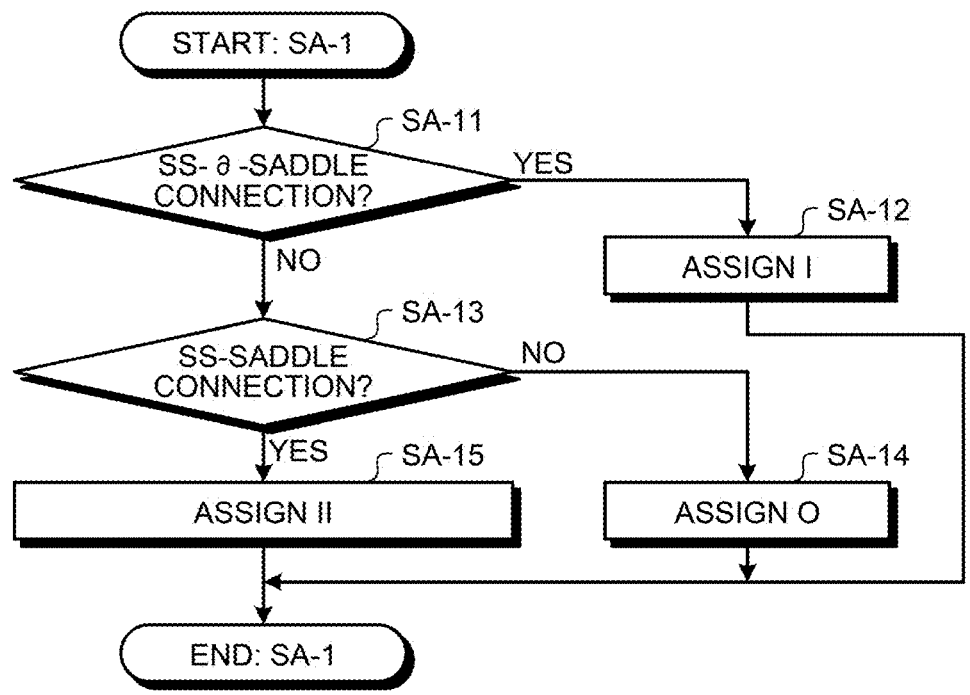
FIG. 36 is a flowchart of an exemplary process of assigning a pattern word.

The process of assigning a pattern word at step SA-1 in the above-described fundamental process will be described below with reference to FIG. 36. FIG. 36 is a flowchart showing the exemplary process of assigning a pattern word.

Figure 6:
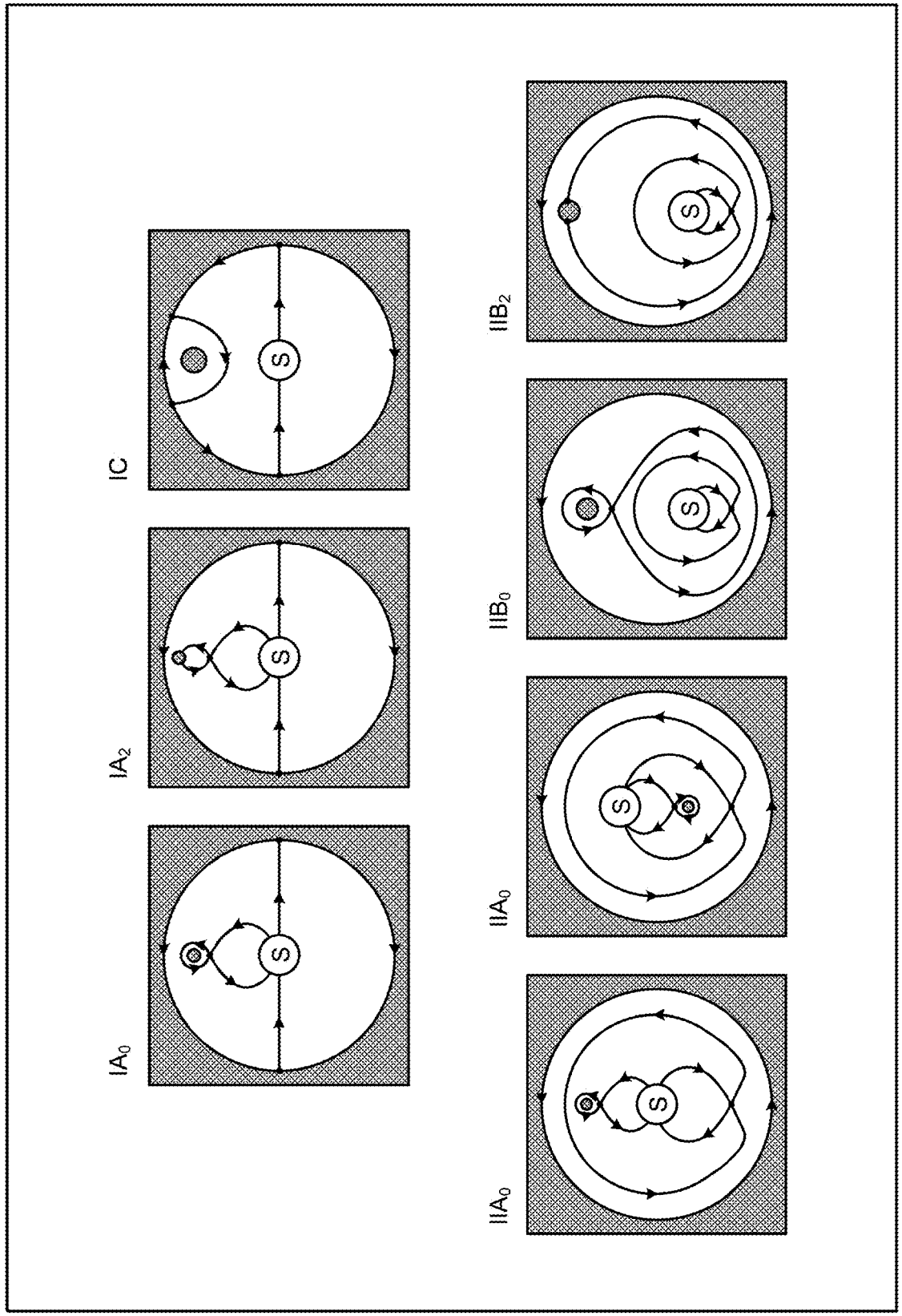
FIG. 6 is a diagram showing all classification of structurally stable flow patterns with two structures and a uniform flow.

The streamline diagrams provided here are illustrated as domains in circles as shown in FIG. 6 for purpose of illustration; however, this algorithm is an algorithm for determining the flow in an unbounded domain originally with a uniform flow. Because the flows obtained by numerical simulations or actual measurements are streamline diagrams of (obtained by taking out of) an unbounded flow field, what needs to be discussed is on whether a conversion into a domain in a circle is necessary. As a result of earnest investigation by the inventors, it was found that such conversion is unnecessary when the algorithm is applied. According to the fact, by performing the following processing on the provided streamline diagram, it is possible to known whether the streamline diagram is of I system, II system or O system. In other words, when the following processing is performed, it is unnecessary to convert a streamline diagram into a domain in a circle by stereographic projection or the like.

As shown in FIG. 36, the pattern word assigning unit 102d determines whether there exists an ss-∂-saddle connection in a provided streamline diagram according to Algorithm B for calculating a word representation from the streamline diagram (step SA-11).

When it is determined that there exists an ss-∂-saddle connection (YES at step SA-11), the pattern word assigning unit 102d assigns a pattern word I (step SA-12), i.e., it is determined that the provided streamline diagram is of I system.

On the other hand, when there exists no ss-∂-saddle connection (NO at step SA-11), the pattern word assigning unit 102d determines whether there exists an ss-saddle connection in the streamline diagram (step SA-13).

When it is determined that there exists an ss-saddle connection (YES at step SA-13), the pattern word assigning unit 102d assigns a pattern word II (step SA-15), i.e., it is determined that the provided streamline diagram is of II system.

On the other hand, when there exists no ss-saddle connection (NO at step SA-13), the pattern word assigning unit 102d assigns a pattern word O (step SA-14), i.e., it is determined that the provided streamline diagram is of O system.

This is the exemplary process of assigning a pattern word.

B-2. Process of Assigning Operation Word of I System

Figure 37:
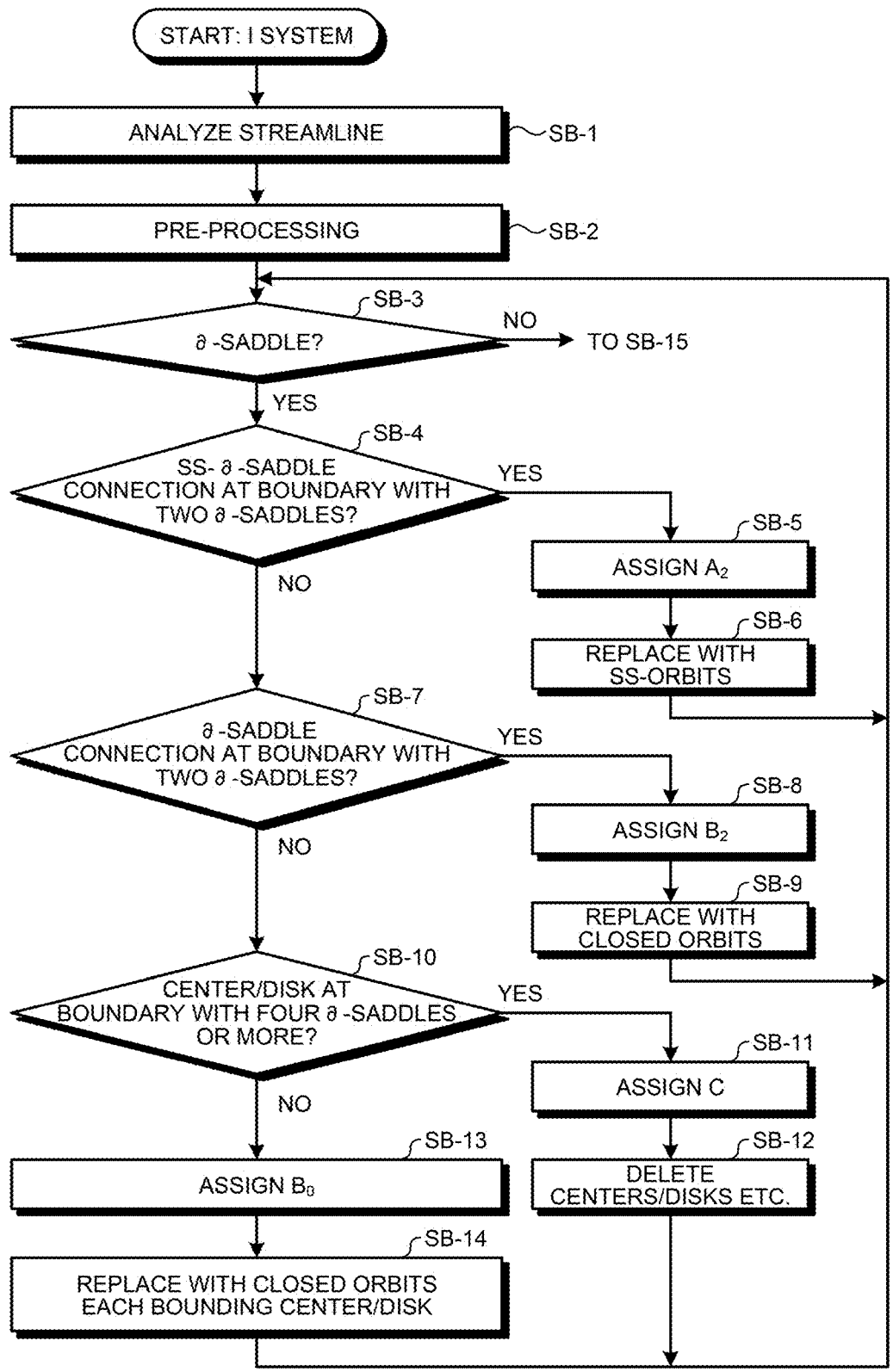
FIG. 37 is a flowchart of an exemplary process of assigning an operation word of I system according to Algorithm B.
Figure 38:
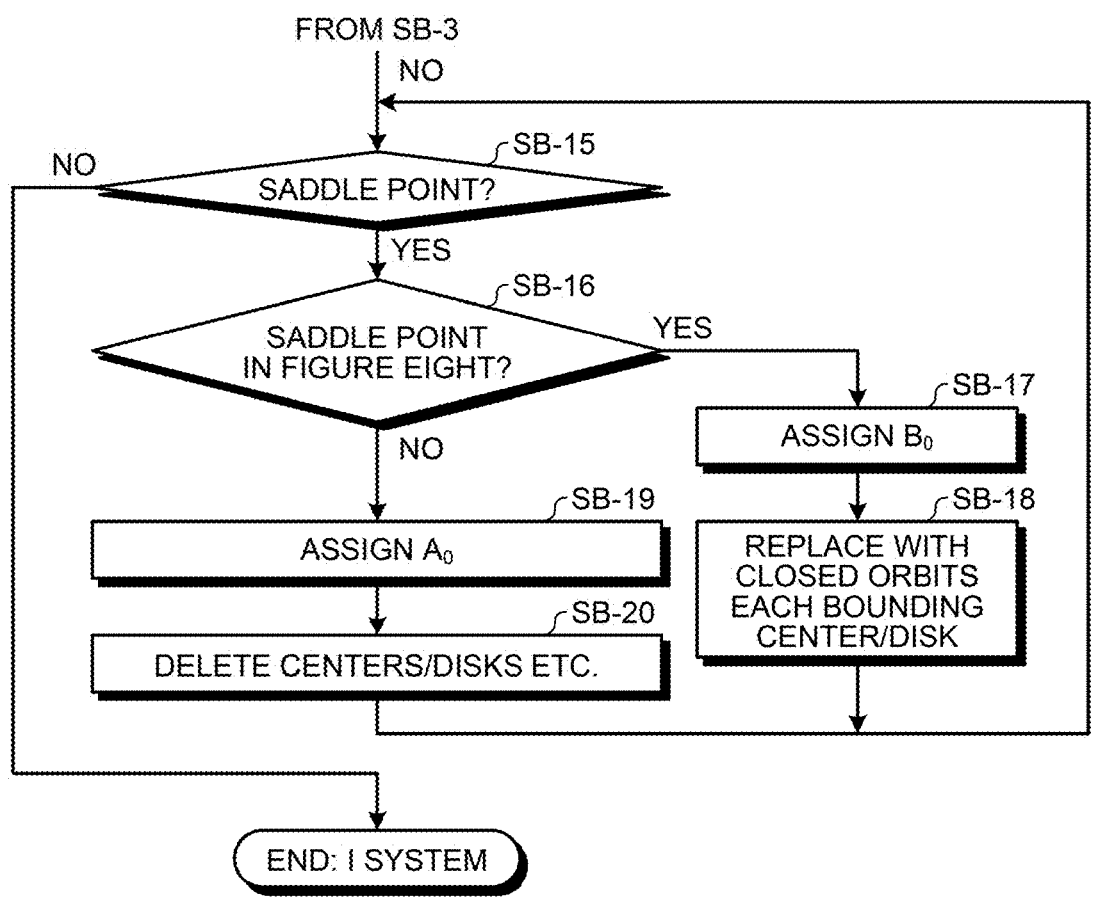
FIG. 38 is a flowchart of the exemplary process of assigning an operation word of I system according to Algorithm B.

Next, an exemplary process of assigning an operation word of I system according to Algorithm B will be described with reference to FIGS. 37 and 38. FIGS. 37 and 38 are flowcharts showing the exemplary process of assigning an operation word of I system according to Algorithm B.

As shown in FIG. 37, the streamline analyzing unit 102b creates a streamline diagram from the numerical simulation and test data stored in the simulation result file 106a by performing a streamline analysis (step SB-1). Specifically, the streamline analyzing unit 102b can create a streamline diagram by, after calculating all of a saddle point, a ∂-saddle, etc., from the numerical simulation result, drawing all contour lines of a stream function having the same value as that of the stream function at that point and connecting that point, and drawing all contour lines of a stream function having the equal value as that of a stream function at the boundary and connecting the boundary. In addition, the streamline analyzing unit 102b may extract a characteristic structure that satisfies the conditions from the flow field by using the technology described in Computational Homology (Non Patent Literature 1). In the embodiment, the streamline analyzing unit 102b stores the created streamline diagram data in the streamline diagram file 106b. For the data management, the streamline analyzing unit 102b may deal with the streamline data by assigning numbers to the obtained all of the lines, saddle point, ss-orbits, ∂-saddles, and boundary. Accordingly, determining a data structure with such inclusion relations and by ordering them makes it easy for the calculator to deal with the following pre-processing and the algorithm of each system.

The streamline analyzing unit 102b performs pre-processing on the streamline diagram (step SB-2). For example, the streamline analyzing unit 102b performs the following three sets of pre-processing on the provided streamline diagram. The number of times these operations are performed is referred to as the number of errors that serves as an index representing to what extent the streamlines can be represented by the word representation. For example, for a whirlpool, in addition to the motion of the fluid on a plane, the ocean current flows in the direction orthogonal to the plane. Furthermore, a gas, or the like, that has bumped against an obstacle may flow into an object, such as an airplane, in a direction not parallel to a two-dimensional cross section along a uniform flow. By performing the following pre-processing for approximation to the flow on the plane to use the number of times the pre-processing is performed (the number of errors) as an index representing how much it deviates from the true one.

1. If a stable manifold, an unstable manifold or a limit set of (∂-)saddle contains a limit cycle to a sink and from a source, it is closed and the sink, source, and limit cycle are deleted.

2. The (attracting) domain of sink is replaced with the center/disk and homoclinic (∂-)saddle connection.

3. The (repelling) domain of source is replaced with the center/disk and homoclinic (∂-)saddle connection.

The operation word assigning unit 102e determines whether there exists a ∂-saddle in the streamline diagram on which the pre-processing is performed by the streamline analyzing unit 102b (step SB-3).

When there exists a ∂-saddle (YES at step SB-3), the operation word assigning unit 102e determines whether there is one with an ss-∂-saddle connection at a boundary at which there exist just two ∂-saddles (step SB-4).

When there are k ones each with an ss-∂-saddle connection containing a boundary at which there exist just two ∂-saddles (YES at step SB-4), the operation word assigning unit 102e assigns k operation words $A_2$ (step SB-5) and the streamline analyzing unit 102b performs, on the streamline diagram, an operation of deleting the two ∂-saddles and the boundary and providing a replacement with an ss-orbit for k times (step SB-6).

On the other hand, when there is no one with an ss-∂-saddle connection containing a boundary at which there exist just two ∂-saddles (NO at step SB-4), the operation word assigning unit 102e determines whether there is one with a ∂-saddle connection at the same boundary as that where there exist just two ∂-saddles (step SB-7).

When there are k ones each with a ∂-saddle connection containing a boundary at which there exist just two ∂-saddles (YES at step SB-7), the operation word assigning unit 102e assigns k operation words $B_2$ (step SB-8) and the streamline analyzing unit 102b performs, on the streamline diagram, an operation of deleting the ∂-saddles, which are connected by the ∂-saddle connection at the same boundary, and the boundary and providing a replacement with a closed orbit for k times (step SB-9).

On the other hand, when there is no one with a ∂-saddle connection containing a boundary at which there exist just two ∂-saddles (NO at step SB-7), the operation word assigning unit 102e determines whether there is one with a ∂-saddle connection that is at the same boundary as that with at least four ∂-saddles and that encloses a center/disk (step SB-10).

When there are k boundaries with multiplicity each with a ∂-saddle connection that is at a boundary containing at least four ∂-saddles and that encloses a center/disk (YES at step SB-10), the operation word assigning unit 102e assigns k operation words C (step SB-11) and the streamline analyzing unit 102b performs, on the streamline diagram, an operation of deleting the ∂-saddle connection at the same boundary, the two ∂-saddles connected by the ∂-saddle connection, and the center/disk bounded by them for k times (step SB-12).

On the other hand, when there is no boundary with a ∂-saddle connection that is at a boundary containing at least four ∂-saddles and that encloses a center/disk (NO at step SB-10), because there exists an innermost figure eight (i.e., ∂-saddle connections, at least one of which encloses a center/disk), it is determined that there are k ones and the operation word assigning unit 102e assigns k operation words $B_0$ (step SB-13), and the streamline analyzing unit 102b performs, on the streamline diagram, an operation of deleting one saddle point and one boundary from the innermost figure eight and providing a replacement with a closed orbit bounding the center/disk for k times (step SB-14). The "figure eight" refers to a structure of a flow consisting of a saddle point and two homoclinic saddle connections each enclosing a center/disk (formed in a shape of eight).

After the above-described processing is performed, the processing is returned to step SB-3 and, when there still exists a ∂-saddle (YES at step SB-3), the fluid transition route acquisition apparatus 100 repeats the above-described processing.

On the other hand, there is no ∂-saddle (NO at step SB-3), as shown in FIG. 38, the operation word assigning unit 102e determines whether there exists a saddle point (step SB-15).

When there exists a saddle point (YES at step SB-15), the operation word assigning unit 102e determines whether there is a saddle point that exists in a figure eight pattern (step SB-16).

When there are k saddle points each existing in a figure eight pattern (YES at step SB-16), the operation word assigning unit 102e assigns k operation words $B_0$ (step SB-17) and the streamline analyzing unit 102b performs, on the streamline diagram, an operation of providing a replacement of the innermost figure eight pattern with a closed orbit around a center/disk for k times (step SB-18).

On the other hand, when there is no saddle point existing in a figure eight pattern (NO at step SB-16), there exists one that is an ss-saddle connection with a homoclinic saddle connection enclosing a center/disk and thus it is determined that there are k ones. The operation word assigning unit 102e assigns an operation word $A_0$ (step SB-19) and the streamline analyzing unit 102b performs an operation of deleting the saddle point, the homoclinic saddle connection connecting to the saddle point, and the center/disk bounded by them for k times (step SB-20).

After the above-described processing is performed, processing is returned to step SB-15 and, when there still exists a saddle point (YES at step SB-15), the fluid transition route acquisition apparatus 100 repeats the above-described processing.

On the other hand, if there is no saddle point anymore (NO at step SB-15), the fluid transition route acquisition apparatus 100 ends the process of assigning an operation word of I system according to Algorithm B. Under the control of the transition information acquisition unit 102g, the word representation formed by the word representation forming unit 102c is stored in the pattern transition file 106c in association with the force to which the object is subjected at that time. By choosing one $A_2$ from the obtained word sequence, replacing $A_2$ with I, shifting I to the top of the word sequence, and re-ordering the remaining word sequence according to the rules, the maximal word representation unit 102f of the word representation forming unit 102c can provide a conversion into a maximal word.

B-3. Process of Assigning Operation Word of II System

Figure 39:
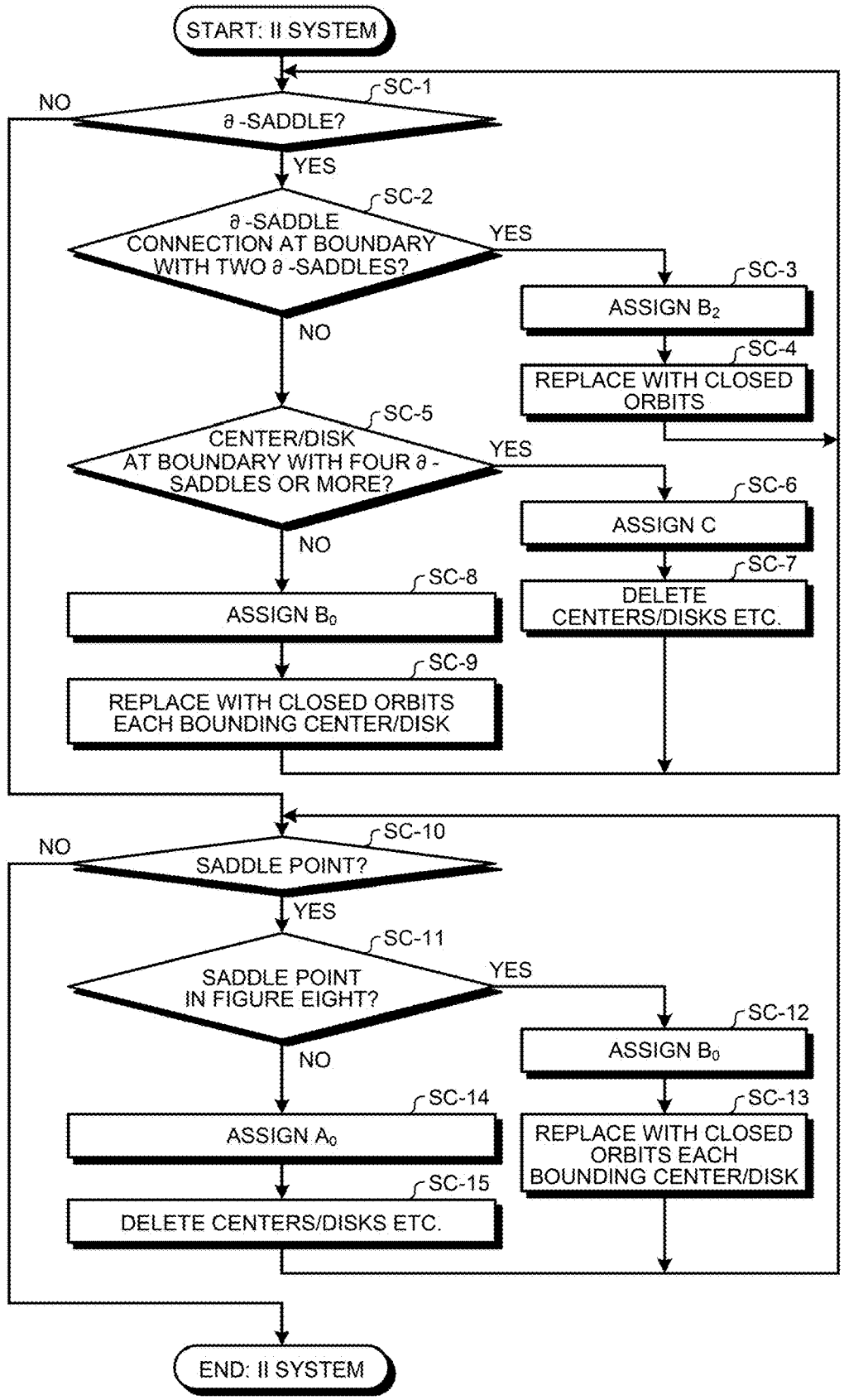
FIG. 39 is a flowchart of an exemplary process of assigning an operation word of II system according to Algorithm B.

Next, an exemplary process of assigning an operation word of II system according to Algorithm B will be described with reference to FIG. 39. FIG. 39 is a flowchart showing the example of the process of assigning an operation word of II system according to Algorithm B. As in the case of step SB-1 and step SB-2 of the process of assigning an operation word of I system, generation of a streamline diagram and pre-processing may be performed by streamline analysis.

As shown in FIG. 39, the operation word assigning unit 102e determines whether there exists a ∂-saddle on a provided streamline diagram (step SC-1).

When there exists a ∂-saddle (YES at step SC-1), the operation word assigning unit 102e determines whether there is one with a ∂-saddle connection at a boundary at which there exist just two ∂-saddles (step SC-2).

When there are k ones each with a ∂-saddle connection containing a boundary at which there exist just two ∂-saddles (YES at step SC-2), the operation word assigning unit 102*e* assigns k operation words $B_2$ (step SC-3) and the streamline analyzing unit 102*b* performs, on the streamline diagram, an operation of replacing the ∂-saddles at the same boundary with a closed orbit for k times (step SC-4).

On the other hand, when there is no one with a ∂-saddle connection containing a boundary at which there exist just two ∂-saddles (NO at step SC-2), the operation word assigning unit 102*e* determines whether there is one with a ∂-saddle connection that is at the same boundary as at with at least four ∂-saddle and that encloses a center/disk (step SC-5).

When there are k boundaries with multiplicity each with a ∂-saddle connection that is at a boundary containing at least four ∂-saddle and that encloses a center/disk (YES at step SC-5), the operation word assigning unit 102*e* assigns k operation words C (step SC-6) and the streamline analyzing unit 102*b* performs, on the streamline diagram, an operation of deleting the ∂-saddle connection at the same boundary, the two ∂-saddles connected by the ∂-saddle connection, and the center/disk bounded by them for k times (step SC-7).

On the other hand, when there is no boundary with a ∂-saddle connection that is at a boundary containing at least four ∂-saddle and that encloses a center/disk (NO at step SC-5), because there exists an innermost figure eight, it is determined that there are ones and the operation word assigning unit 102*e* assigns k operation words $B_0$ (step SC-8), and the streamline analyzing unit 102*b* performs, on the streamline diagram, an operation of replacing the innermost figure eight pattern with a closed orbit bounding the center/disk for k times (step SC-9).

After the above-described processing is performed, the processing is returned to step SC-1 and, when there still exists a ∂-saddle (YES at step SC-1), the fluid transition route acquisition apparatus 100 repeats the above-described processing.

On the other hand, when there is no more ∂-saddle (NO at step SC-1), the operation word assigning unit 102*e* determines whether there exists a saddle point (step SC-10).

When there exists a saddle point (YES at step SC-10), the operation word assigning unit 102*e* determines whether there is a saddle point that exists in a figure eight pattern (step SC-11).

When there are k saddle points each existing in a figure eight pattern (YES at step SC-11), the operation word assigning unit 102*e* assigns k operation word $B_0$ (step SC-12) and the streamline analyzing unit 102*b* performs, on the streamline diagram, an operation of providing a replacement of the innermost figure eight pattern with a closed orbit around a center/disk for k times (step SC-13).

On the other hand, when there is no saddle point existing in a figure eight pattern (NO at step SC-11), there exists one that is an ss-saddle connection with a homoclinic saddle connection enclosing a center/disk and thus it is determined that there are k ones. The operation word assigning unit 102*e* assigns k operation words $A_0$ (step SC-14) and the streamline analyzing unit 102*b* performs an operation of deleting the saddle point, the homoclinic saddle connection connecting to the saddle point, and the center/disk bounded by them for k times (step SC-15).

After the above-described processing is performed, the processing is returned to step SC-10 and, when there still exists a saddle point (YES at step SC-10), the fluid transition route acquisition apparatus 100 repeats the above-described processing.

On the other hand, when there is no more ∂-saddle point (NO at step SC-10), the fluid transition route acquisition apparatus 100 ends the process of assigning an operation word of II system according to Algorithm B. Choosing one $A_0$ from among the obtained word sequence, replacing $A_0$ with II, shifting II to the top of the word sequence, and re-ordering the remaining word sequence according to the rules can provide a conversion into a maximal word.

B-4. Process of Assigning Operation Word of O System

Figure 40:
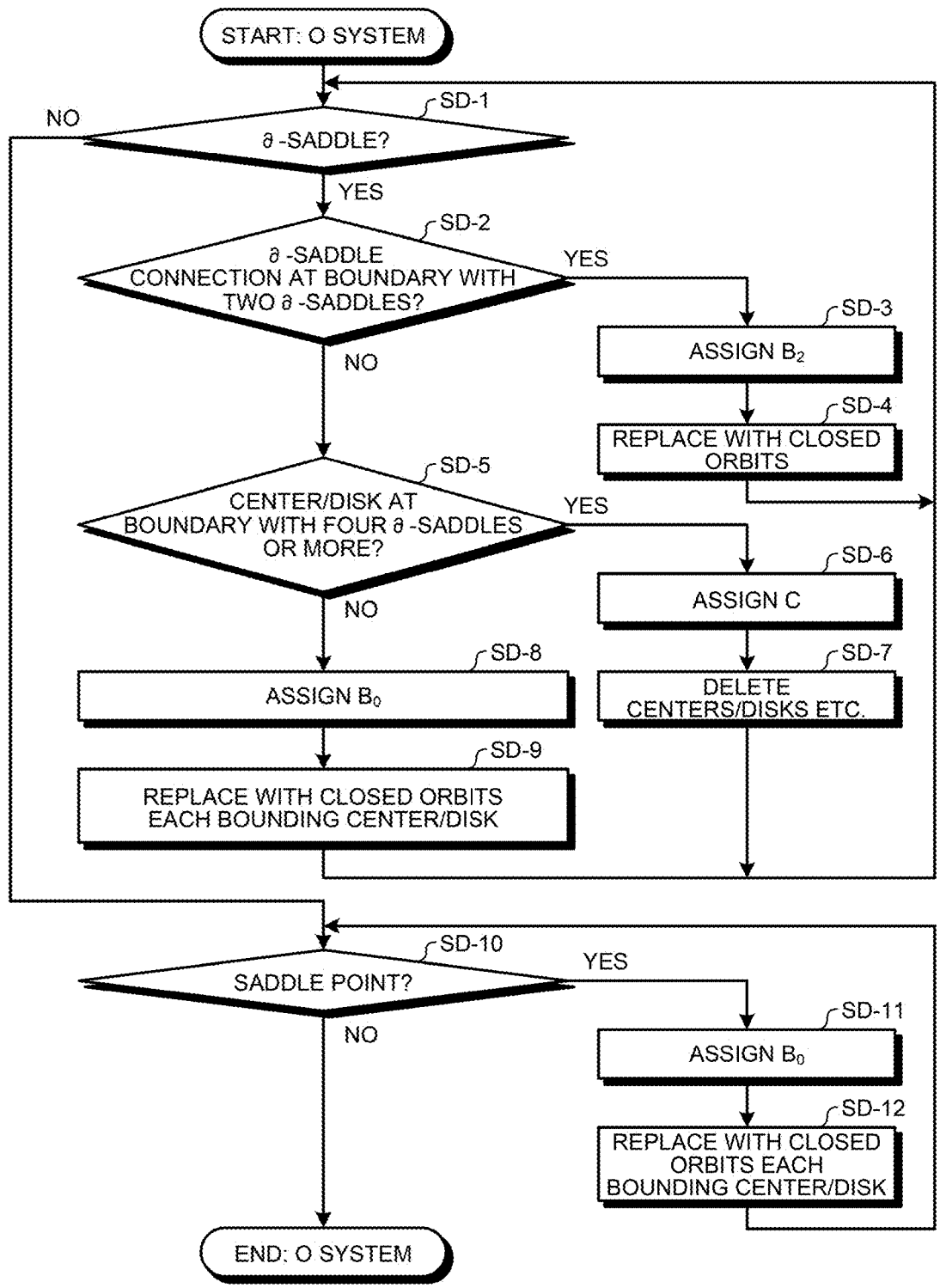
FIG. 40 is a flowchart of an exemplary process of assigning an operation word of O system according to Algorithm B.

Next, exemplary process of assigning an operation word of O system according to Algorithm B will be described below with reference to FIG. 40. FIG. 40 is a flowchart showing the example of the process of assigning an operation word of O system according to Algorithm B. As in the case of step SB-1 and step SB-2 of the process of assigning an operation word of I system, generation of a streamline diagram and pre-processing may be performed by streamline analysis.

As shown in FIG. 40, the operation word assigning unit 102*e* determines whether there exists a ∂-saddle on a provided streamline diagram (step SD-1).

When there exists a ∂-saddle (YES at step SD-1), the operation word assigning unit 102*e* determines whether there is one with a ∂-saddle connection at a boundary at which there exist just two ∂-saddles (step SD-2).

When there are k ones each with a boundary at which there exist just two ∂-saddles and with a ∂-saddle connection (YES at step SD-2), the operation word assigning unit 102*e* assigns operation words $B_2$ (step SD-3) and the streamline analyzing unit 102*b* performs, on the streamline diagram, an operation of deleting the ∂-saddles, which are at the boundary and are connected by the ∂-saddle connection, and the boundary and providing a replacement with a closed orbit for k times (step SD-4).

On the other hand, when there is no one with a ∂-saddle connection containing a boundary at which there exist just two ∂-saddles (NO at step SD-2), the operation word assigning unit 102*e* determines whether there is one with a ∂-saddle connection that is at the same boundary as that with at least four ∂-saddles and that encloses a center/disk (step SD-5).

When there are k boundaries with multiplicity each with a ∂-saddle connection that is at a boundary containing at least four ∂-saddles and that encloses a center/disk (YES at step SD-5), the operation word assigning unit 102*e* assigns k operation words C (step SD-6) and the streamline analyzing unit 102*b* performs, on the streamline diagram, an operation of deleting the ∂-saddle connection at the same boundary, the two ∂-saddles connected by the ∂-saddle connection, and the center/disk bounded by them for k times (step SD-7).

On the other hand, when there is no boundary with a ∂-saddle connection that is at a boundary containing at least four ∂-saddles and that encloses a center/disk (NO at step SD-5), because there exists an innermost figure eight, it is determined that there are k ones and the operation word assigning unit 102*e* assigns k operation words $B_0$ (step SD-8), and the streamline analyzing unit 102*b* performs, on the streamline diagram, an operation of replacing the innermost figure eight pattern with a closed orbit bounding a center/disk for k times (step SD-9).

After the above processing is performed, the processing is returned to step SC-1 and, when there still exists a ∂-saddle (YES at step SD-1), the fluid transition route acquisition apparatus 100 repeats the above-described processing.

On the other hand, when there is no more ∂-saddle (NO at step SD-1), the operation word assigning unit 102e determines whether there exists a saddle point (step SD-10).

When there exist k saddle points (YES at step SD-10), the operation word assigning unit 102e assigns k operation word $B_0$ (step SD-11) and the streamline analyzing unit 102b performs, on the streamline diagram, an operation of replacing the innermost figure eight pattern with a closed orbit around a center/disk for k times (step SD-12).

After the above-described processing is performed, the processing is returned to step SD-10 and, when there still exists a saddle point (YES at step SD-10), the fluid transition route acquisition apparatus 100 repeats the above-described processing.

On the other hand, when there is no more ∂-saddle point (NO at step SD-10), the fluid transition route acquisition apparatus 100 ends process of assigning an operation word of O system according to Algorithm B. Adding O to the top of the obtained word sequence and re-ordering it according to the rules can provide a conversion into a maximal word.

This is the detailed example of the processing according to Algorithm B for calculating a word representation. This allows an appropriate calculation of a word representation corresponding to any streamline diagram. The above-described processing according to Algorithm B is an example only, and the present invention is not limited to the above-described algorithm. For example, the following processing may be performed as another example of the processing according to Algorithm B.

B-5. Process of Assigning Operation Word of I, II System (Algorithm for Subspecies)

Figure 41:
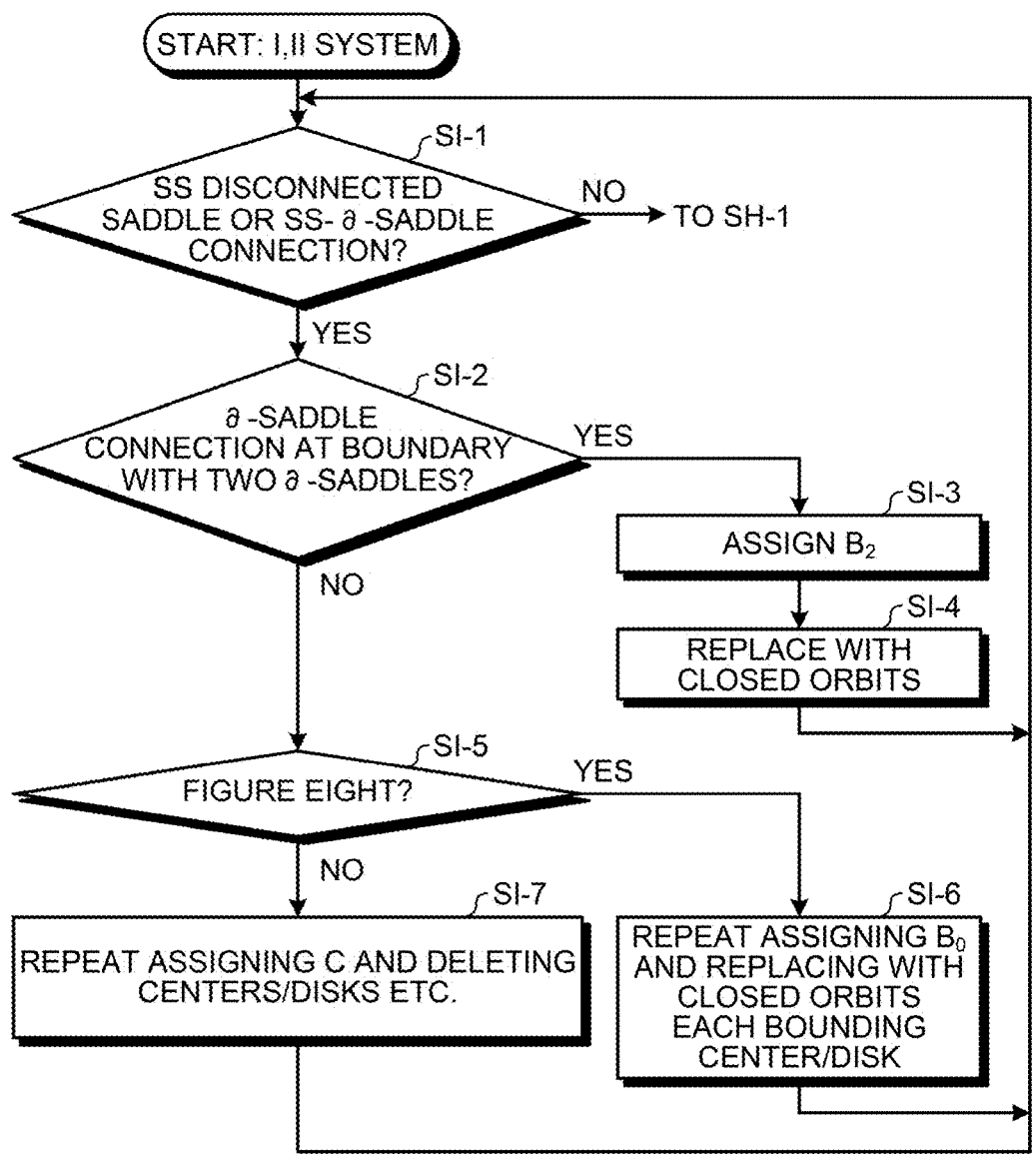
FIG. 41 is a flowchart of another exemplary process of assigning an operation word of I, II system according to Algorithm B (I, II-Word algorithm).
Figure 42:
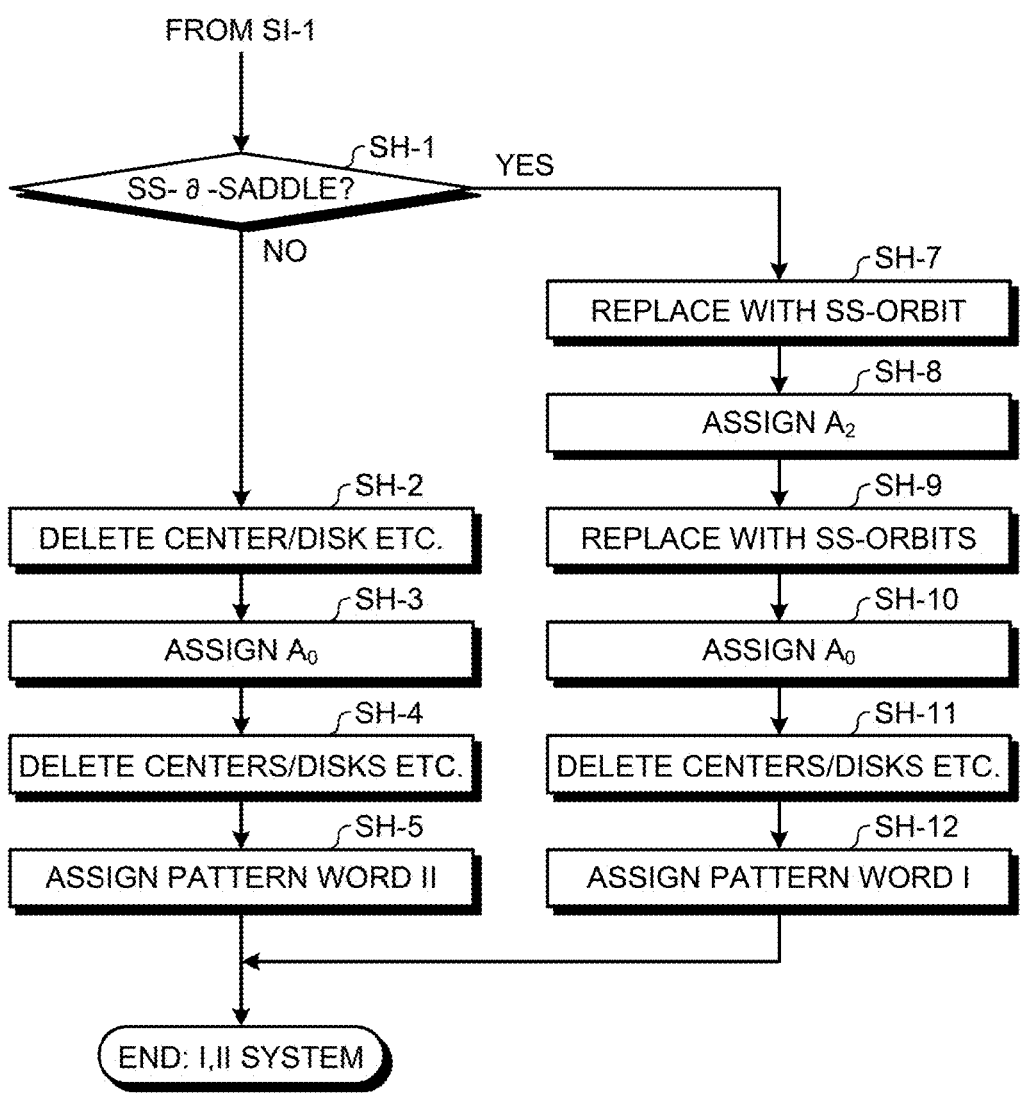
FIG. 42 is a flowchart of the exemplary process of assigning an operation word of I, II system according to Algorithm B (I, II-Word algorithm).

Next, another exemplary process of assigning operation words I and II according to Algorithm B (algorithm for subspecies) will be described below with reference to FIGS. 41 and 42. FIGS. 41 and 42 are flowcharts showing the example of the process of assigning a word of the I, II system according to Algorithm B (I, II-word algorithm). As in the case of step SB-1 and step SB-2 of the above-described processing, generation of a streamline diagram and pre-processing may be performed by streamline analysis. When an operation word is assigned in the following process of assigning an operation word, it is assigned from the last to the first.

As shown in FIGS. 41 and 42, the operation word assigning unit 102e determines, on a streamline diagram on which the pre-processing has been performed by the streamline analyzing unit 102b, whether there exists a saddle that is not connected to a 1-source-sink point or there exists a ∂-saddle connection (step SI-1).

When there exists a saddle that is not connected to a 1-source-sink point or there exists a ∂-saddle connection (YES at step SI-1), the operation word assigning unit 102e determines whether there is one with a ∂-saddle connection at a boundary at which there exist just two ∂-saddles (step SI-2).

When there are k ones each with a ∂-saddle connection at a boundary at which there exist just two ∂-saddles (YES at step SI-2), the operation word assigning unit 102e assigns k operation words $B_2$ (step SI-3) and the streamline analyzing unit 102b performs, on the streamline diagram, an operation of deleting the ∂-saddles, which are at the same boundary and are connected by the ∂-saddle connection, and the boundary and providing a replacement with a closed orbit for k times (step SI-4).

When there is no one with a ∂-saddle connection at a boundary at which there exist just two ∂-saddles (NO step SI-2) and there is an innermost figure eight pattern (YES at step SI-5), the operation word assigning unit 102e assigns an operation word $B_0$ and the operation word assigning unit 102e performs an operation of replacing the innermost figure eight pattern with a closed orbit around a center/disk (step SI-6). This operation (operation of assigning an operation word $B_0$ and providing a replacement with a closed orbit) is repeatedly performed as much as possible.

On the other hand, when there exists no saddle point that is in an innermost figure eight pattern (NO at step SI-5), i.e., when there is a boundary with a ∂-saddle connection that is at a boundary containing at least four ∂-saddles and that encloses a center/disk, the operation word assigning unit 102e performs an operation of assigning an operation word C and the streamline analyzing unit 102b performs an operation of deleting the ∂-saddle connection at the boundary, the two ∂-saddles connected by the ∂-saddle connection, and the center/disk bounded by them, repeatedly (step SI-7). This operation (operation of assigning an operation word C and deleting a center/disk) is repeatedly performed as much as possible.

After the above processing is performed, the processing is returned to step SI-1 and, when there still exists a saddle that is not connected to a 1-source-sink point or there exists a ∂-saddle connection (YES at step SI-1), the fluid transition route acquisition apparatus 100 repeats the above-described processing.

On the other hand, when there exists only a saddle that is connected to a 1-source-sink point and there is no more ∂-saddle connection (NO at step SI-1), as shown in FIG. 42, the operation word assigning unit 102e determines whether there exists an ss-∂-saddle (step SH-1).

When there exists no ss-∂-saddle (NO at step SH-1), the streamline analyzing unit 102b performs, once, an operation of deleting the saddle point, the homoclinic saddle connection connecting to the saddle point, and center/disk bounded by them (step SH-2).

When there are k ss-saddles, the operation word assigning unit 102e assigns k operation words $A_0$ (step SH-3).

The streamline analyzing unit 102b performs an operation of deleting the saddle point, the homoclinic saddle connection connecting to the saddle point, and the center/disk bounded by them for k times (step SH-4).

The pattern word assigning unit 102d assigns a pattern word II (step SH-5) and the fluid transition route acquisition apparatus 100 ends the process of assigning an operation word of I, II system according to Algorithm B (I, II-word algorithm). The obtained word sequence is a maximal word.

On the other hand, at step SHI, when there exists an ss-∂-saddle (YES at step SH-1), the streamline analyzing unit 102b performs, on the streamline diagram, an operation of deleting these two ∂-saddles and the boundary and implementing a replacement with an ss-orbit once (step SH-7).

When there are k ss-∂-saddles, the operation word assigning unit 102e assigns k operation words $A_2$ (step SH-8).

The streamline analyzing unit 102b then performs, on the streamline diagram, an operation of deleting these two ∂-saddles and the boundary and providing a replacement with an ss-orbit for k times (step SH-9).

When there are k ss-saddles, the operation word assigning unit 102e assigns k operation words $A_0$ (step SH-10).

The streamline analyzing unit 102b performs an operation of deleting the saddle point, the homoclinic saddle connection connecting to the saddle point, and center/disk bounded by them for k times (step SH-11).

The pattern word assigning unit 102*d* assigns a pattern word I (at step SH-12) and the fluid transition route acquisition apparatus 100 ends the process of assigning an operation word of I, II system according to Algorithm B (I, II-word algorithm). The obtained word sequence is a maximal word.

B-6. Operation of Assigning Operation Word of O System (Algorithm for Subspecies)

Figure 43:
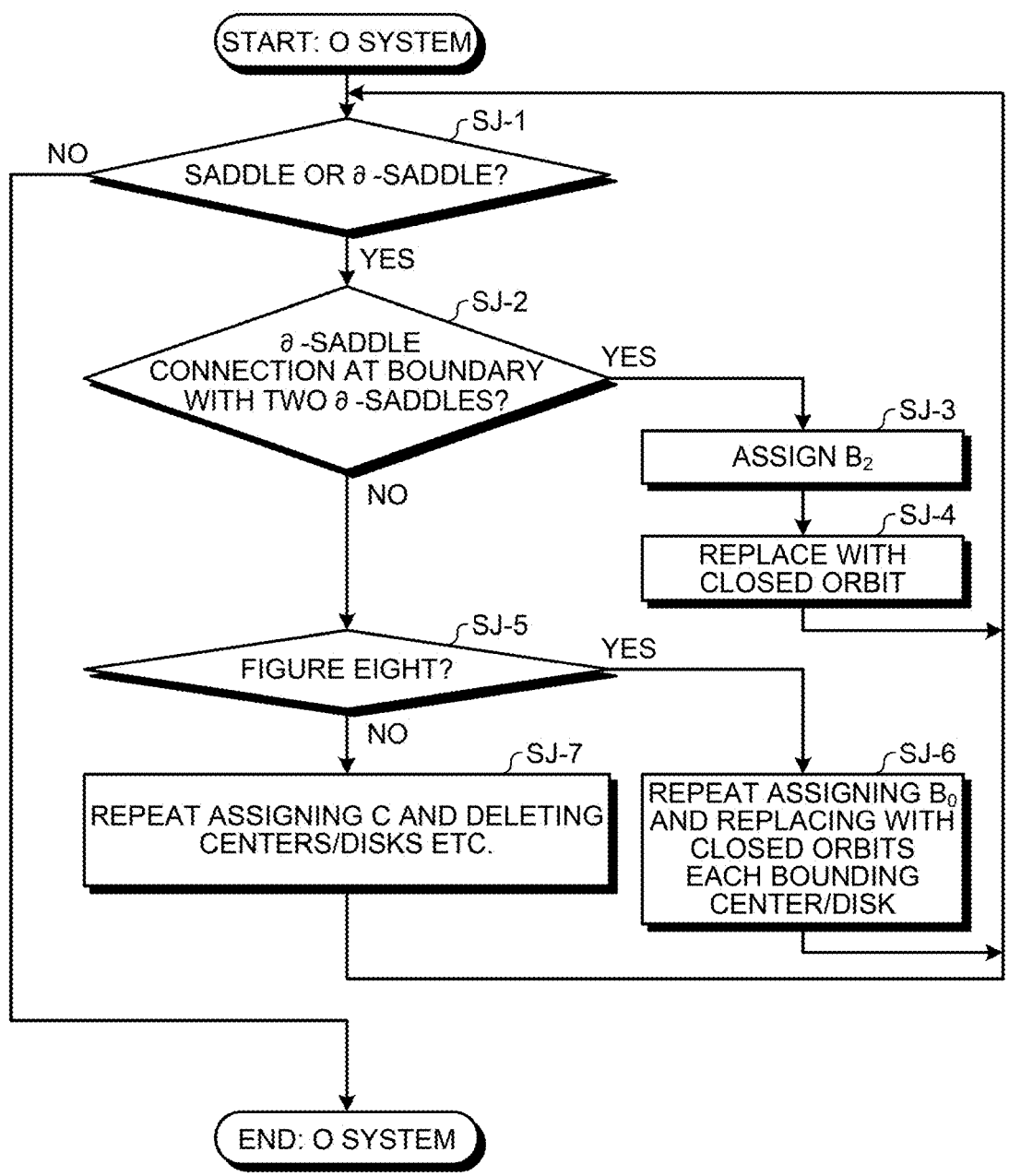
FIG. 43 is a flowchart of another exemplary process of assigning an operation word of O system according to Algorithm B (O-Word algorithm).

Next, exemplary process of assigning an operation word of O system according to Algorithm B (algorithm for subspecies) will be described below with reference to FIG. 43. FIG. 43 is a flowchart showing another example of the process of assigning an operation word of O system according to Algorithm B (O-word algorithm). As in the case of step SB-1 and step SB-2 of the above-described assigning processing, generation of a streamline diagram and pre-processing may be performed by streamline analysis. When an operation word is assigned in the following process of assigning an operation word, it is assigned from last to the first.

As shown in FIG. 43, the operation word assigning unit 102*e* determines, on a provided streamline diagram, whether there exists a saddle or a ∂-saddle (step SJ-1).

When there exists a saddle or a ∂-saddle (YES at step SJ-1), the operation word assigning unit 102*e* determines whether there is one with a ∂-saddle connection at a boundary at which there exist just two ∂-saddles (step SJ-2).

When there are k ones each with a ∂-saddle connection connecting to a boundary at which there exist just two ∂-saddles (YES at step SJ-2), the operation word assigning unit 102*e* assigns k operation words $B_2$ (step SJ-3).

The streamline analyzing unit 102*b* then performs, on the streamline diagram, an operation of deleting the ∂-saddles, which are at the same boundary and are connected by the ∂-saddle connection, and the boundary and providing a replacement with a closed orbit for k times (step SJ-4).

On the other hand, when there is no one with a ∂-saddle connection connecting to a boundary at which there exist just two ∂-saddles and at the boundary (NO at step SJ-2), the operation word assigning unit 102*e* determines whether there is an innermost figure eight (step SJ-5).

When there is one with an innermost figure eight (i.e., ∂-saddle connections, at least one of which encloses a center/disk) (YES at step SJ-5), the operation word assigning unit 102*e* assigns an operation word $B_0$ and the streamline analyzing unit 102*b* performs, on the streamline diagram, an operation of providing a replacement with a closed orbit bounding a center/disk (step SJ-6). This operation (operation of assigning an operation word $B_0$ and providing a replacement with a closed orbit) is repeatedly performed as much as possible.

On the other hand, when there is no innermost figure eight (NO at step SJ-5), i.e., when there is a boundary with a ∂-saddle connection that is at a boundary containing at least four ∂-saddles and that encloses a center/disk, the operation word assigning unit 102*e* assigns an operation word C word and the streamline analyzing unit 102*b* deletes, on the streamline diagram, the ∂-saddle connection at the boundary, the two ∂-saddles connected by the ∂-saddle connection, and the center/disk bounded by them (step SJ-7). This operation (operation of assigning an operation word C and deleting the center/disk) is repeatedly performed as much as possible.

After the above processing is performed, the processing is returned to step SJ-1 and, when there still exists a saddle or a ∂-saddle (YES at step SJ-1), the fluid transition route acquisition apparatus 100 repeats the above-described processing.

On the other hand, when there is no more saddle or ∂-saddle (NO at step SJ-1), the fluid transition route acquisition apparatus 100 ends the process of assigning an operation word of O system according to Algorithm B (O-word algorithm). Addition of O to the top of the obtained word sequence leads to a maximal word.

This is the detailed example of the processing according to Algorithm B for calculating a word representation from a streamline diagram (algorithm for subspecies). This allows an appropriate calculation of a word representation corresponding to any streamline diagram.

Maximal Word Representation

Because a word representation to be obtained may be redundant, after all word sequences are generated from combinations of pattern words, it is determined whether each word sequence is a maximal word, which is principle and method to obtain a maximal word representation without redundancy.

In other words, in accordance with constraints for assignment of operation word, it is in principle possible to represent topologies of all structurally stable flows by listing operation words. However, it should be noted that "there are multiple words that represent one flow pattern" and that, on the other hand, "there are multiple flow patterns that are represented by one word representation". An example of this can be seen in $IA_0A_2$, $IA_2A_0$, etc. From the point of view of word representation, the latter one is not a significant problem because a word just represents a set (group) of flow patterns. On the other hand, the former is problematic because, when multiple words represent one flow, it is redundant and is very confusing. Then, using a "maximal word representation" can solve the problem.

The maximal word representation is introduced by examining what re-ordering of word sequences representing operations provided by I system, II system and O system brings in the set of the flows represented by the word sequences. For example, regarding the two word representations of words $IA_0A_2$ and $IA_2A_0$, because it is represented that the flow patterns represented by them are the same, exchanging $A_0$ and $A_2$ does not change the patterns to be represented. Thus, a rule defining "$A_0$ should appear before $A_2$ in a word representation" is added to exclude a redundant representation $IA_2A_0$. The change in the patterns represented by the words caused on such exchange of words is represented symbolically by $A_0A_2=A_2A_0$. Combinations that do not, even when the words are exchanging, change the patterns represented by the words are given by Lemma 3.5 and Lemma 3.6.

On the other hand, exchange of words may change the set of patterns represented by the words. For example, regarding $IB_0A_0$ and $IA_0B_0$, there is an inclusion relation that the set of patterns represented by the former one is included in the set of patterns represented by the latter one. In other words, using a symbol of set, $(IB_0A_0) \subset (IA_0B_0)$ is satisfied. As described above, when an exchange causes an inclusion of a set of patterns in another set of patterns, the included word representation is excluded and only the greater word representation is applied. This relational expression is symbolically represented by $B_0A_0 \leq A_0B_0$. A combination of exchange of words leading to such an inclusion relation is given by Lemma 3.7.

The following table represents the inclusion relations according to the exchange between these words. No inclusion relation is satisfied by the exchange between $B_2$ and C and thus $B_2C \| CB_2$ represents that these two are incomparable.

TABLE 3

|       | $A_0$ | $A_2$ | $B_0$ | $B_2$ | C   |
|-------|-------|-------|-------|-------|-----|
| $A_0$ | =     | =     | ≤     | ≤     | =   |
| $A_2$ |       | =     | =     | ≤     | ≤   |
| $B_0$ |       |       | =     | ≤     | ≥   |
| $B_2$ |       |       |       | =     | ǁ   |
| C     |       |       |       |       | =   |

By fixing an appropriate algorithm, it is possible to mathematically prove that, for one pattern, there is only one maximal representation to be obtained by the exchange of the word representations (see Lemma 3.8 in Published Paper (2013)).

Furthermore, according to this, a canonical maximal representation can be calculated. Theorem 3.3 provides a canonical maximal representation for O system, Theorem 3.4 provides a canonical maximal representation for I system, and Theorem 3.5 provides a canonical maximal representation for II system (see Published Paper (2013)).

According to the above-described theory, it is determined whether a word sequence is a maximal word. According to Algorithm B, it is possible to perform rewriting into a maximal word representation and, according to Algorithm B (subspecies), it is possible to write out only a maximal word representation. Because a sequence of words can be obtained without redundancy accordingly, it is possible to assign one word representation to one flow pattern topologically, enabling exclusion of redundancy.

Here is the end of detailed explanation of the embodiment.

According to the embodiment, the transition information obtained by using the method of optimizing designing of a structure, such as an airplane, can be used. For example, according to the embodiment, because the order or transition of flow patterns and flow patterns each in an intermediate state can be obtained, the fluid transition route acquisition apparatus 100 may perform control such that an optimum structure is searched by the simulation unit 102a under the limitations based on the information, such as the parameter range and the transition order, stored in the pattern transition file 106c. For example, in the case where a transition route to an ideal flow pattern is obtained but a flow pattern following the current flow pattern is not obtained yet through simulations, the simulation unit 102a may set, in simulated annealing, a higher global parameter T (temperature) to allow a significant change in a design variable to get out of a local minimum. Furthermore, in order to lead to an ideal flow pattern in designing of, for example, airplane, the simulation unit 102a may make an adjustment such that the search area defining a desired pattern, which is set, is a desired pattern. For example, as described above, the simulation unit 102a may set, in simulated annealing, a high global parameter T (temperature) to allow a significant change for a design variable when the search area does not match the desired pattern and, on the other hand, may set a low global parameter T (temperature) to require a small change for the design variable when the search area matches the desired pattern. Accordingly, it makes it possible to calculate an optimum state of interaction between layout of objects, such as rivers, oceans and airplanes, and flows in a short time and at low costs. By specifying a streamline pattern according to an object, labor saving in structure designing can be implemented.

According to the embodiment, it is possible to identify a search route to an optimum structure as a transition route in designing layout of bridge piers, designing layout of breakwater, efficient removal of contaminants at harbors, designing the shape of blades for wind power generation and airplanes, and oil fences.

Other Embodiments

The embodiment of the present invention has been described above, and the present invention can be carried out by, in addition to the above-described embodiment, various different embodiments within the scope of the technical idea described in the claims.

Particularly, according to the above-describe embodiment, the example to which the invention is applied to cross-sections (cross-sections of a structure, etc.) in three-dimensional fluid simulations. Alternatively, the present invention may be applied to two-dimensional fluid simulations.

For example, while the example has been given described where the fluid transition route acquisition apparatus 100 performs the processing in a stand-alone mode, the fluid transition route acquisition apparatus 100 may perform the processing in response to a request from a client terminal and return the processing result to the client terminal.

Moreover, among the steps of the processing described in the embodiment, all or part of the steps of the processing described as ones automatically performed may be performed manually and all or part of the steps of the processing described as ones manually performed may be performed automatically by well-known methods.

In addition to this, the processing procedures, control procedures, specific names, information including registered data of each set of processing and parameters, such as retrieval conditions, screen examples, and database configurations, described in the literatures and drawings above may be arbitrarily changed unless otherwise noted.

Furthermore, each component of the fluid transition route acquisition apparatus 100 illustrated in drawings is of a functional concept and is not necessarily configured physically as illustrated in the drawings.

For example, all or any part of the processing functions that the devices in the fluid transition route acquisition apparatus 100 have, and particularly each processing function performed by the control unit 102, may be implemented by a CPU (Central Processing Unit) and a program interpreted and executed by the CPU, or may be implemented as hardware using a wired logic. The program is recorded in a recording medium to be described below and is mechanically read by the fluid transition route acquisition apparatus 100 as necessary. Specifically, the storage unit 106, such as a ROM and an HD, or the like records a computer program for giving instructions to the CPU in cooperation with the OS (Operating System) to perform various types of processing. This computer program is downloaded to a RAM and accordingly executed to configure the control unit 102 in cooperation with the CPU.

Moreover, this computer program may be stored in an application program server that is connected to the fluid transition route acquisition apparatus 100 via any network 300, and all or part thereof may be downloaded as necessary.

Furthermore, the program according to the present invention may be stored in a computer-readable recording medium and may be configured as a program product. The "recording medium" includes any "portable physical medium", such as a memory card, USB memory, SD card, flexible disk, magneto-optical disk, ROM, EPROM, an EEPROM, CD-ROM, MO, DVD, and Blu-ray disc.

Moreover, the "program" refers to a data processing method written in any language and by any description method, and is not limited to a specific format, such as source codes and binary codes. The "program" is not necessarily configured unitarily and includes a program configured in a dispersed manner as multiple modules and libraries and a program that implements its functions in cooperation with a different program represented by an OS (Operating System). Well-known configurations and procedures can be used for the specific configuration for each device shown in the embodiment to read the recording medium, the reading procedure, or the installation procedure after the reading, and the like.

Various databases and the like (the simulation result file 106a, the streamline diagram file 106b, the pattern transition file 106c, etc.) stored in the storage unit 106 are storage units, examples of which are a memory device, such as a RAM or a ROM, a fixed disk device, such as a hard disk, a flexible disk, and an optical disk, and store therein various programs, tables, databases, files for web pages, and the like that are used for various types of processing and providing websites.

Moreover, the fluid transition route acquisition apparatus 100 may be configured as an information processing apparatus, such as a well-known personal computer or workstation, or may be configured by connecting any peripheral device to the information processing apparatus. Moreover, the fluid transition route acquisition apparatus 100 may be implemented by installing software (including program and data) that causes the information processing apparatus to implement the method according to the present invention.

Furthermore, specific modes of distribution/integration of the devices are not limited to those illustrated in the drawings, and all or a part thereof can be configured by functionally or physically distributing or integrating them in any unit according to various additions or the like, or according to functional loads. In other words, the above-described embodiment may be implemented by any combination or the embodiment may be selectively performed.

Second Embodiment

A fluid transition route acquisition apparatus, a fluid transition route acquiring method, and a program according to a second embodiment will be described with reference to FIGS. 44 to 56. For the second embodiment, descriptions of components common with the first embodiment will be omitted and only different aspects will be described.

As described for the first embodiment, multi flow patterns may correspond to a word representation. For this reason, the method of specifying a transition pattern X by using only word representations as in the first embodiment, only possible transitions that can occur (necessary conditions) are given and, on whether the corresponding intermediate states actually can happen, it is necessary to check whether there actually exists a structure obtained according to the subword by using streamline structure pattern matching.

In the second embodiment, while regular expressions that are a new representation method and that have complete one-to-one correspondence to flow patterns are proposed, a method of automatically specifying a transition pattern X by specifying a transition pattern X by using regular expressions in addition to word representations, without any pattern matching, are proposed. Note that, utilizing the complete one-to-one correspondence between a streamline pattern and a regular expression, it is possible to describe in advance local changes in a streamline structure corresponding to a transition pattern X as a partial change of part of regular expressions (subrepresentation).

Flow Pattern Regular Expression Method

Figure 44:
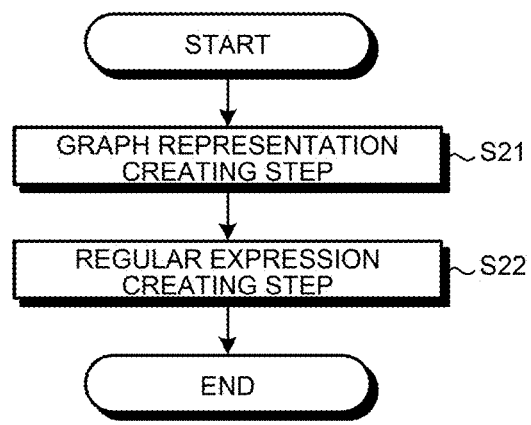
FIG. 44 is a flowchart for explaining a flow pattern regular expression creating method according to a second embodiment.

A flow pattern regular expression creating method according to the second embodiment will be described. The flow pattern regular expression creating method according to the second embodiment uses part of the word representation theory according to the first embodiment. The flow pattern regular expression creating method according to the second embodiment is executable by an apparatus, such as a computer. FIG. 44 is a flowchart for explaining an overview of the flow pattern regular expression method according to the second embodiment.

As shown in FIG. 44, the flow pattern regular expression method according to the embodiment creates a regular expression of a flow pattern in a multiply connected exterior domain with N (N is an integer equal to or larger than 1) holes topologically. The method roughly includes a graph representation creating step of creating a graph representation having one-to-one correspondence to the flow pattern (step S21) and a regular expression creating step of creating a regular expression from the graph representation that is created at the graph representation creating step at step S21 (step S22).

The graph representation may be obtained by assigning a unique rooted, labeled and directed tree $T_H$=(V,E) (where V is a set of points called vertices and E is a set of edges connecting the vertices) to a structurally stable Hamiltonian vector field H defined by a flow pattern and then visualizing it as a plane graph.

The graph representation may include one obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to the rules of a given order relation and drawing arrows from l(v) to l(w) from left to right for w∈Γ(v).

The flow pattern may be at least one of patterns of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes.

The word representation may be a sign word that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes.

Figure 45:
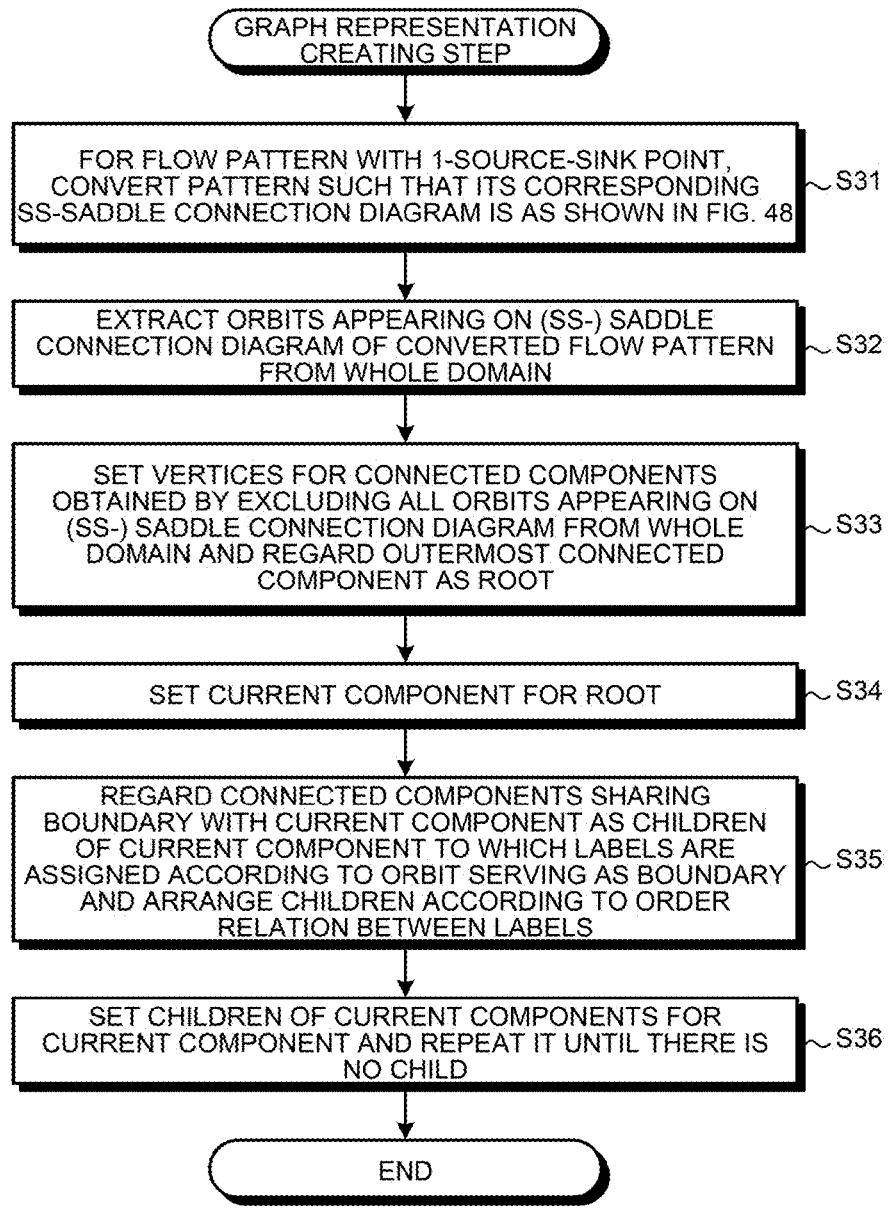
FIG. 45 is a flowchart for explaining the exemplary graph representation creating step in FIG. 44.
Figure 48:
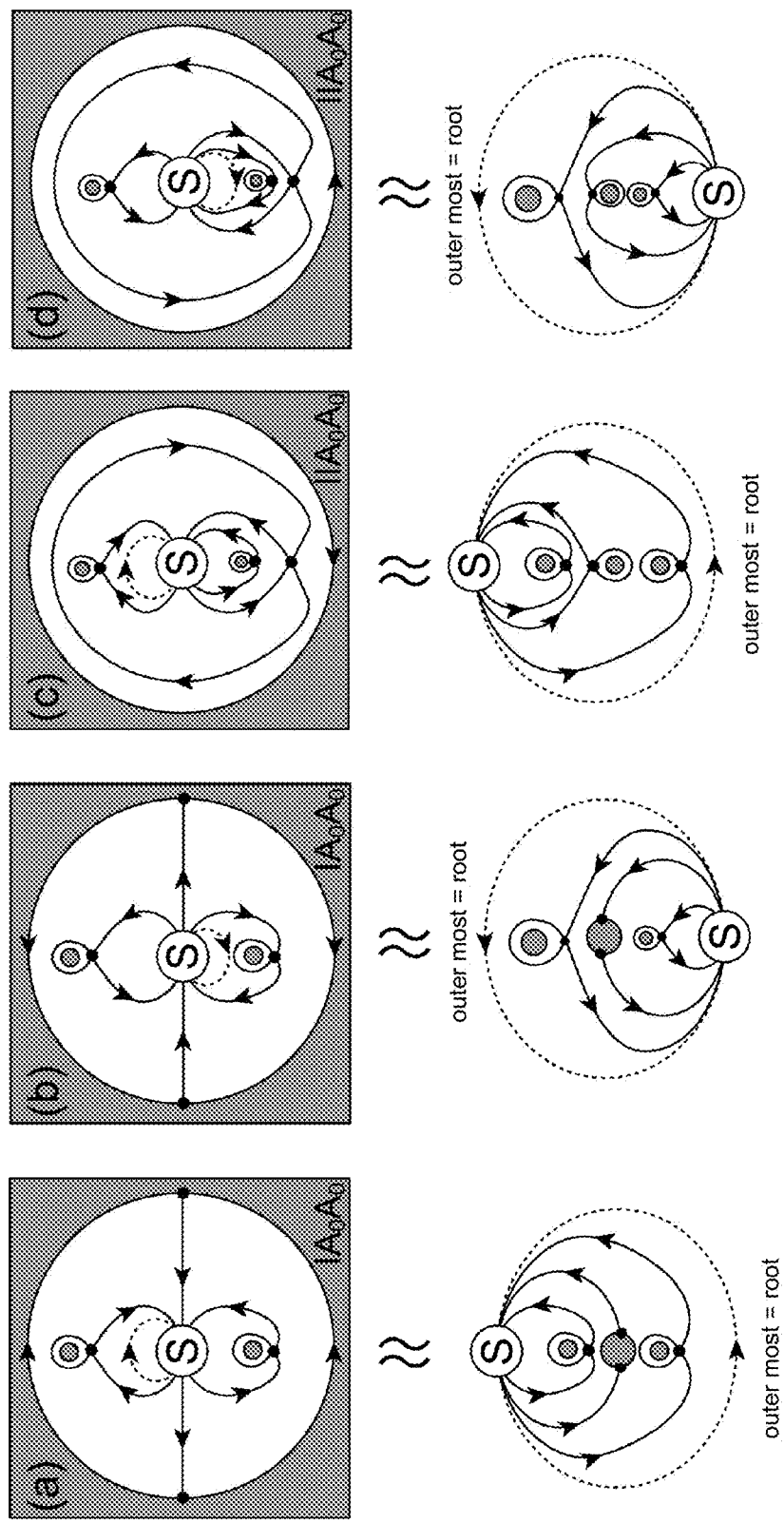
FIG. 48 is a diagram for explaining a method of choosing a connected component serving as a route from $C_H = D_Z(M) \backslash D$.

FIG. 45 is a flowchart for explaining the exemplary graph representation creating step in FIG. 44. According to FIG. 45, in the graph representation creating step, first, when a flow pattern has a 1-source-sink point, the flow pattern is converted such that the domain containing a counterclockwise ss-orbit closest to the 1-source-sink pair is the outermost domain (step S31). For example, the flow pattern may be a flow pattern diagram with N holes that is created by repeating an operation, starting from one or multiple patterns of the above-described patterns, of assigning any one of the operation words defining the five types of operation words that can be topologically adopted to add a hole to a flow pattern until the number of holes reaches N. Specifically, as described below, conversion is performed such that the roots of ss-saddle connection diagrams (flow pattern diagram) with I,II-words are as shown in FIG. 48. Then, the orbits appearing on the (ss-)saddle connection diagram of the converted flow pattern are extracted from the whole domain (step S32). Vertices are set for the connected components obtained by excluding all orbits appearing on the (ss-)saddle connection diagram from the whole domain and the outermost connected component is regarded as the root (step S33). The current component is then set for root (step S34). The connected components sharing the boundary with the current component are regarded as children of the current component to which labels are assigned according to the orbit serving as the boundary and children are arranged according to a given order relation between labels (step S35). The children of the current component are set for current components and step S35 is repeatedly executed until there is no child (step S36).

The flow pattern regular expression method according to the second embodiment and its principle will be described in detail below.

2. Graph Representation Creating Step

The graph representation creating step (step S21) will be described in detail. First, the graph theory used in the second embodiment will be described.

2-1. Graph Theory

A graph T=(V,E) is a set given as a pair of a set of points called "vertices" (vertex set) V and a set E called "edges" connecting vertices. In general, graphs can have various structures; however, in the graph representation theory according to the embodiment, the following set of graphs having a specific structure of a set over the graph will be considered.

1) A tree refers to a graph where any two vertices are connected by only a single edge.

2) A rooted graph refers to a graph where a specific vertex (called the "root" below) exists. For the rooted graph, the shortest path depending on the connection of the edge from the root to each vertex v∈V can be considered, which is referred to as the height of v whose symbol is written in ht(v). Accordingly, for the rooted tree T, the height of the tree T can be given by $ht(T):=\max_{v \in V} ht(v)$.

3) A directed graph refers to a graph where every edge has a parent-child order. An edge in a directed graph from a vertex v∈V to W∈V is denoted by v⇒w∈E, where v refers to a parent of w and w refers to a child of v. Let Γ(v) denote the set of children of the vertex v∈V, i.e., Γ(v):= {w∈V|v⇒w∈E}. The number of child vertices contained in the set, i.e., #Γ(v), is referred to as the out-degree of v and, on the contrary, the number of edges entering v is referred to as the in-degree of v.

4) A labeled graph refers to a graph in which a certain label is assigned to every vertex.

For the embodiment, a rooted, labeled, and directed tree will be considered. For the root of the tree, the in-degree zero vertex, that is, the vertex without any edge entering there, will be considered. Any one of $\{o_\emptyset, o_0, o_2, +_\emptyset, +_0, +_2, -_\emptyset, -_0, -_2\}$ is assigned as a label of a vertex. Here, the subset of the set of vertices whose label is $o_\emptyset(o_0, o_2, +_\emptyset, +_0, +_2, -_\emptyset, -_0$ or $-_2)$ is denoted by $V o_\emptyset(V o_0, V o_2, V+_\emptyset, V+_0, V+_2, V-_\emptyset, V-_0$ or $V-_2)$. For a vertex v, l(v) denotes the label assigned to the vertex. For later convenience, a set will be defined as follows: $Vo=Vo_\emptyset \cup Vo_0 \cup Vo_2$, $V+=V+_\emptyset \cup V+_0 \cup V+_2$, $V-=V-_\emptyset \cup V-_0 \cup V-_2$, $V_0=Vo_0 \cup V+_0 \cup V-_0$, $V_2=Vo_2 \cup V+_2 \cup V-_2$, where the symbol ∪ denotes the disjoint union. Furthermore, the set of child vertices of the vertex v can be divided as follows.

$\Gamma o_0(v)=\Gamma(v) \cap vo_0$, $\Gamma o_2(v)=\Gamma(v) \cap vo_2$, $\Gamma+_0(v)=\Gamma(v) \cap v+_0$, $\Gamma-_0(v)=\Gamma(v) \cap v-_0$, $\Gamma+_2(v)=\Gamma(v) \cap v+_2$, $\Gamma-_2(v)=\Gamma(v) \cap v-_2$, $\Gamma_-(v)=\Gamma(v) \cap v_-$, $\Gamma_+(v)=\Gamma(v) \cap v_+$, $\Gamma_2(v)=\Gamma(v) \cap v_2$.

Furthermore, sgn(v) denotes the "sign" for the vertex v∈V and then sgn(v)=+ for v∈V+∪V$_0$ and sgn(v)=− for v∈V$_-$. Because flow representations will be given by arranging the labels, Rule (1) of the following order relation is defined for the order in which the labels appear.

$$o_0 > o_2 > +_0 > -_0 > +_2 > -_2 \qquad (1)$$

Tree Representations of 2D Structurally Stable Hamiltonian Vector Fields

Tree representations of two-dimensional structurally stable Hamiltonian vector fields according to the graph representation creating step will be described. Graph representations of flow patterns represented by O-words and graph representations of flow patterns represented by I or II words will be described below.

Graph Representations of Flow Patterns with O-Words

Let H be a structurally stable Hamiltonian vector field on a two-dimensional domain $D_z(M)$ represented by an O-word and D be its saddle connection diagram. A method of assigning unique rooted, labeled, and directed trees $T_H=(V, E)$ to the Hamiltonian vector field H and a visualization algorithm for a plane graph will be described below.

First of all, removing all D from the whole domain $D_z(M)$ constructs the set of connected components of $C_H=D_z(M) \setminus D$ that is a set of some open annuli (consisting of periodic orbits). The connected components are the set of vertex V. The vertex of the root is the outermost connected component among the connected components and $+_\emptyset$ is assigned when the periodic orbits contained as the labels are counterclockwise and $-_\emptyset$ is assigned when the periodic orbits are clockwise.

Edges are created in the following manner. For two vertices v and w∈E, a directed edge v⇒w∈E is constructed between them if the common components of the closure of their corresponding connected component (the common boundary between components) is one-dimensional, i.e., dim(cl(v)∩cl(w))=1, and v is an outer component with respect to w. When the set of common component (boundary) cl(v)∩cl(w) contains a saddle connection and the child connected component w has counterclockwise (or clockwise) periodic orbits, $+_0$ (or $-_0$) is assigned as a label for w. Similarly, the set of common component (boundary) cl(v)∩cl(w) contains a ∂-saddle connection and the direction of periodic orbits in w is counterclockwise (or clockwise), $+_2$ (or $-_2$) is assigned as a label for w.

Note that, because there is no ss-orbit in $C_H$, the set of child vertices Γ(v) of the connected component v is Γ(v)=Γ+$_0$(v)∪Γ−$_0$ (v)∪Γ+$_2$ (v)∪Γ−$_2$ (V). Owing to $V_{o_0}=V_{o_2}=\emptyset$, the subsets of the set of vertices V is $V_0=V+_0 \cup V-_0$ and $V_2=V+_2 \cup V-_2$. The number of elements contained in these subsets can be estimated according to the fact that all structurally stable flow patterns are constructed by the operations $B_0$, $B_2$ and C.

Figure 46:
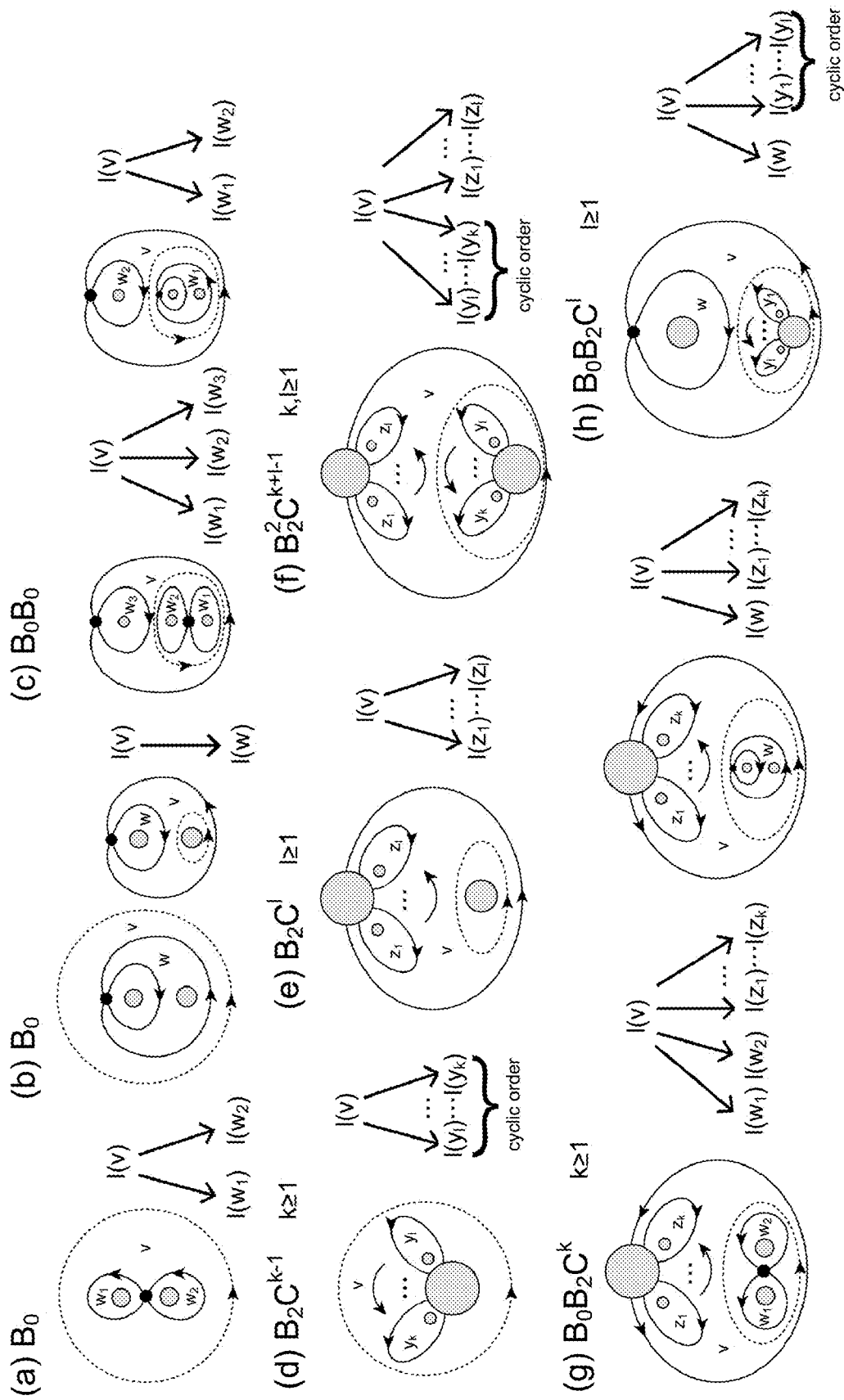
FIG. 46 is a diagram showing all possible flow patterns created by the operations $B_0$, $B_2$ and C and parent-children relations induced by the connected subsets (set of vertices) according to the flow patterns.

FIG. 46 shows all possible streamline patterns generated by the operations $B_0$, $B_2$ and C and parent-children relations induced by the connected subsets (set of vertices) according to the streamline patterns, where (a) represents $B_0$, (b) represents $B_0$, (c) represents $B_0B_0$, (d) represents $B_2C^{k-1}$ and $k\geq 1$, (e) represents $B_2C^l$ and $l\geq 1$, (f) represents $B_2{}^2C^{k+l-1}$, k and $l\geq 1$, (g) represents $B_0B_2C^k$ and $k\geq 1$, and (h) represents $B_0B_2C^l$ and $l\geq 1$. According to FIG. 46, v denotes a parent connected subset and its child connected subsets are denoted by w, y or z. The dashed line represents the set of parent connected components and thus only a single periodic orbit contained therein is drawn with a direction.

As shown in FIG. 46(a), an outward figure-eight pattern created by the operation $B_0$ is constructed. There exist two connected components $w_1 \in V_0$ and $w_2 \in V_0$ sharing the homoclinic saddle connections serving as the boundary with v and their signs are the same, i.e., $sgn(v)=sgn(w_1)=sgn(w_2)$. On the other hand, when the pattern created by $B_0$ is an inward figure-eight pattern as shown in FIG. 46(b), two edges of the two types v and $w \in V_0$ (one is given by $sgn(v)=sgn(w)$ and the other is given by $sgn(v) \neq sgn(w)$) can be constructed depending on which connected component is chosen as a parent component v.

As shown in FIG. 46(c), two types of parent-child edge relations are formed depending on the operation $B_0B_0$. According to the pattern on the left, edges from the parent connected component v to three child connected components $w_1$, $w_2$ and $w_3 \in V_0$ can be constructed, where $sgn(v)=sgn(w_1)=sgn(w_2)$ and $sgn(v) \neq sgn(w_3)$.

According to the pattern on the right, edges from the parent connected component v to two child connected components $w_1$ and $w_2 \in V_0$ can be constructed, where $sgn(v)=sgn(w_1) \neq sgn(w_2)$. In the same manner, as shown in FIGS. 46(d) to 46(f), the operations $B_2C^{k-1}$, $B_2C^l$ and $B_2{}^2C^{k+l-1}$ ($k\geq 1$ and $l\geq 1$) sequentially construct edges of parent-children relations between k connected components containing periodic orbits in the same direction as that of v and l connected components containing periodic orbits in the opposite direction.

FIG. 46(g) is a streamline pattern constructed by the operation $B_0B_2C^k$, which constructs edges from v to $w_1$ and $w_2 \in V_0$, or an edge from v to $w \in V_0$, of the domain with the same sign and k edges to child connected components $z_j \in V_0$ with the opposite signs (j=1, ..., k).

Lastly, for the streamline pattern of FIG. 46(h) created by the operation $B_0B_2C^l$ ($l\geq 1$), one edge to $w \in V_0$ with $sgn(v) \neq sgn(w)$ and 1 edges to $y_j \in V_0$ with the same sign (j=1, ..., 1) are constructed.

No other patterns exist that generate additional parent-children relations according to the operations $B_0$, $B_2$ and C. Hence, the number of elements contained in the set of child connected components is #$\Gamma$+$_0$, (v) and #$\Gamma$-$_0$(v)$\leq 2$, while any non-negative integers can be selected for the number of elements contained in the set of child vertices.

Next, how to draw the graph representation obtained from the assigned saddle connection diagram as a plane graph will be explained. First of all, for all connected components $v \in V$, the elements contained in the set of their child connected subsets $\Gamma(v)$ are arranged according to Rule (1) of the order relation on labels. Note that, when the same multiple labels +$_0$ (or −$_0$) are contained, the elements are arranged in cyclic order (which can be uniquely implemented owing to #$\Gamma$+$_0$ (v) and #$\Gamma$−$_0$(v)$\leq 2$). On the other hand, for the child connected subsets $\Gamma$+$_2$ (v) and $\Gamma$−$_2$(v), how to arrange the elements accord to the following rule.

For the connected components symbolized as $y_j$ in FIG. 46, the order is introduced in cyclic order. In other words, a specific connected component is chosen from them as $y_1$ and other connected components are arranged counterclockwise.

The connected components symbolized as $z_j$ in FIG. 46 can be simply arranged counterclockwise.

Figure 49:
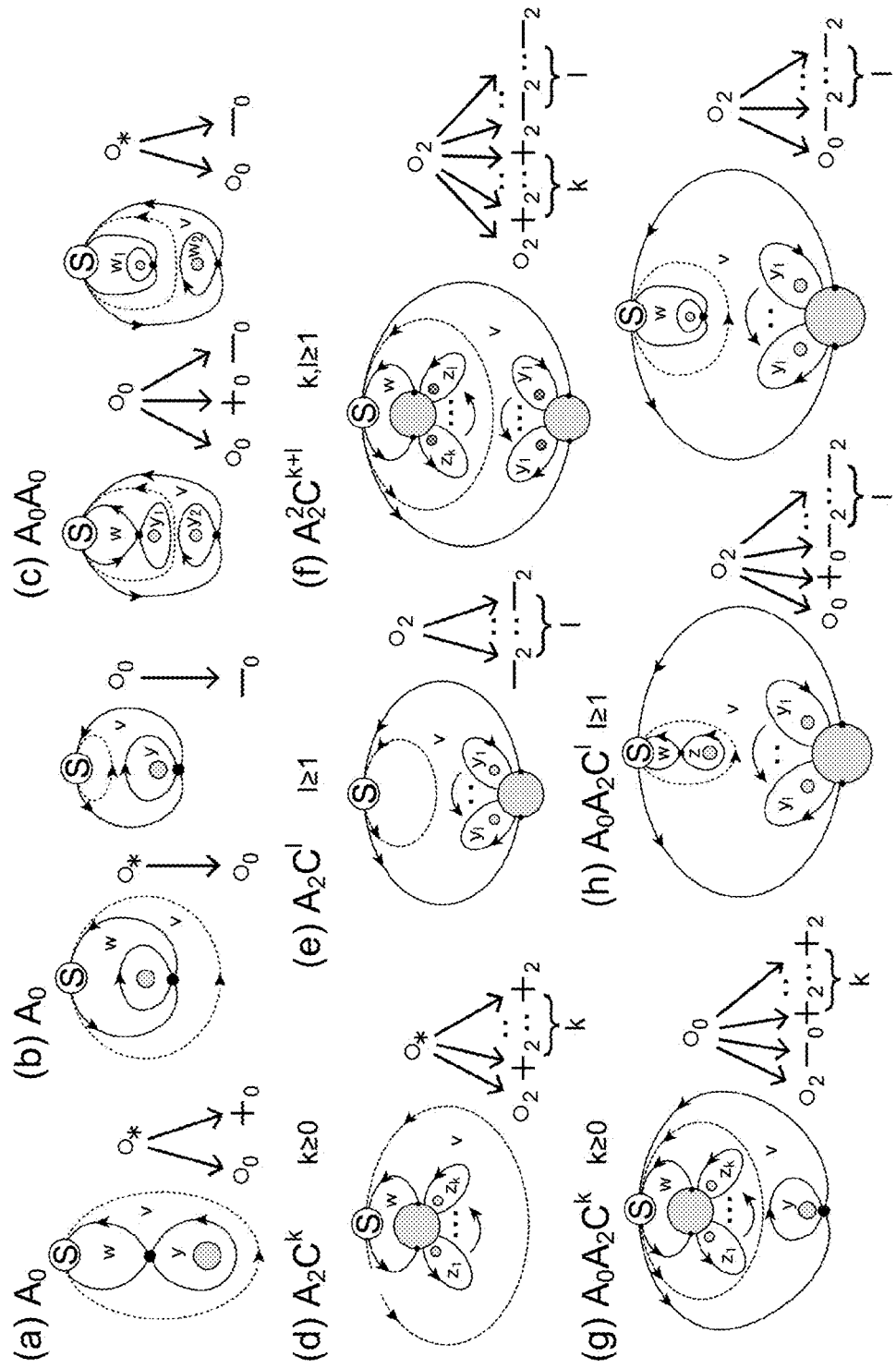
FIG. 49 is a diagram showing local structures of ss-saddle connection diagrams generated by the operations $A_0$, $A_2$ and C and visualization of graph representations obtained according to the local structures.

For the following "2-2-1-1. Process of Converting ss-saddle Connection Diagram of O system into Tree" and "2-2-2-1. Process of Converting ss-saddle connection Diagram of I, II system into Tree", definitions will be given as follows: N denotes a set of non-negative integers and N∞ denotes a set of finite sequences of non-negative integers (i.e., N∞=N∪N²∪N³ ... ). On N∞, a partial order < is defined as follows: s<t, if "n<m" or "there exists a natural number k>0 for n=m, $s_1=t_1$, ..., $s_{k-}=t_{k+1}$, and $s_k<t_k$" is satisfied for the elements of N∞, s=$s_1$ ... $s_n$ and t=$t_1$ ... $t_m$. An invective function S:V→N∞ from a set of vertices V to N∞ will be given below. For a vertex v, S(v) is referred to as a vertex id. Because of injection, a vertex and its vertex id are regarded as the same. Furthermore, 0 is set for a vertex id of a root (in order to regard the vertex and id the same). The structure given below represents that a vertex id corresponds to the searching order prioritizing the tree height. Hereinafter, $\sigma \in \{+,-\}$ will be represented; $\mu=-\sigma$; G denotes a tree; s, s', t and u denote vertices id; and T denotes subsets of the vertices id. FIGS. 46 and 49 will be referred to below, while the direction of flows will be ignored.

2-2-1-1. Process of Converting Saddle Connection Diagram of O System to Tree

FIGS. 47-A to 47-B are flowcharts for explaining the process of converting a saddle connection diagram of O system to a tree. An apparatus, such as a computer, is able to execute the process of converting a saddle connection diagram of O system to a tree, which is shown in FIGS. 47-A to 47-E.

According to FIGS. 47-A to 47-E, a saddle connection diagram D is set for the input and the saddle connection diagram D is converted to have a root at the outermost (step S101) and s=0 and T={0} are put (step S102). It is determined whether the outer boundary of the root 0 is counterclockwise (step S103). When the outer boundary of the root 0 is counterclockwise (YES at step S103), $\sigma$=+ and the tree G=(0,+$_\sigma$) are put (step S104). When the outer boundary of the root 0 is not counterclockwise, i.e., clockwise (NO at step S103), $\sigma$=− and tree G=(0,−$_\sigma$) are put (step S105) and the process moves to step S106.

At step S106, it is determined whether the root 0 has the shape (pattern) in FIG. 46(a). When the root 0 has the shape (pattern) of FIG. 46(a) (YES at step S106), 00 and 01 are set for the vertices id of $w_1$ and $w_2$, a tree obtained by replacing the label of the tree in FIG. 46(a) with pairs of id and label is set for the tree G (i.e., for G, (00, $\sigma_0$)←(0, $\sigma_0$)→(01,$\sigma_0$) is put), and {00,01} is added to a set T (step S107). In other words, replacement with T={0,00,01} is performed. This replacing operation is symbolized as T←T∪{00,01}. Then, the process moves to step S114.

On the other hand, at step S106, when the root 0 does not have the shape in FIG. 46(a) (NO at step S106), the process moves to step S108.

At step S108, it is determined whether the root 0 has the shape on the left in FIG. 46(b). When the root 0 has the shape on the left in FIG. 46(b) (YES at step S108), 00 is set for the vertex id of w, a tree obtained by replacing the label of the tree in FIG. 46(b) with a pair of id and label is set for the tree G (i.e., for G, (0, $\sigma_0$)→(00, $\sigma_0$) is put), and {00} elements added to the set T (step S109), i.e., T←T∪{00} is put. Then, the process moves to step S114.

On the other hand, at step S108, when the root 0 does not have the shape on the left in FIG. 46(b) (NO at step S108), the process moves to step s110.

At step S110, it is determined whether the root 0 has the shape in FIG. 46(d). When the root 0 has the shape in FIG. 46(d) (YES at step S110), 00, . . . , and 0k-1 are set for the vertices of $y_1$, . . . , and $y_k$, a tree obtained by replacing the label of the tree in FIG. 46(d) with pairs of id and label is set for the tree G, and {00, . . . , 0k-1} is added to the set T (step S111), i.e., T←T∪{00, . . . , 0k-1} put. Then, the process moves to step S114.

On the other hand, at step S110, when the root 0 does not have the shape in FIG. 46(d) (NO at step S110), $\sigma_\varnothing$ is set for the tree G (step S112), the tree G is output (step S113) and the process ends.

At step S114, it is determined whether there exists an element t larger than s among T. When s is the largest element among T (NO at step S114), all vertices id of the tree G are removed and the resultant tree is set for G (step S115). The tree G is then output (step S114) and the process ends.

At step S114, when s is not the largest element among T (YES at step S114), s'=min{t∈T|s<t} (s' is the next largest element following s in T) is put, s is replaced with s' to put (s,σ*)←(s', σ*') (step S116). Then, the process moves to step S117.

At step S117, it is determined whether the outer boundary of the vertex s consists of a homoclinic saddle connection and a saddle and the inner boundary s of the vertex s has the shape in FIG. 46(a). When the outer boundary of the vertex s consists of a homoclinic saddle connection and a saddle and the inner boundary of the vertex s has the shape in FIG. 46(a) (YES at step S117), s0 and s1 are set for the vertices id of $w_1$ and $w_2$, a tree obtained by replacing the label of the tree in FIG. 46(a) with pairs of id and label are set for the tree G, and {s0,s1} is added to T (step S118). Then the process returns to step S114.

On the other hand, at step S117, when the outer boundary of the vertex s does not consist of a homoclinic saddle connection and a saddle or the inner boundary of the vertex s does not have the shape in FIG. 46(a) (NO at step S117), the process moves to step S119.

At step S119, it is determined whether the outer boundary of the vertex s consists of a homoclinic saddle connection and a saddle and the inner boundary of the vertex s has the shape on the left in FIG. 46(b). When outer boundary of the vertex s consists of a homoclinic saddle connection and a saddle and the inner boundary of the vertex s has the shape on the left in FIG. 46(b) (YES at step S119), s0 is set for the vertex id of w, a tree obtained by replacing the label of the tree on the left in FIG. 46(b) with a pair of id and label is set for the tree G, and {s0} is added to T (step S120). Then, the process returns to step S114.

On the other hand, when the outer boundary of the vertex s does not consist of a homoclinic saddle connection and a saddle or the inner boundary of the vertex s does not have the shape on the left in FIG. 46(b) (NO at step S119), the process moves to step S121.

At step S121, it is determined whether the outer boundary of the vertex s consists of a homoclinic saddle connection and a saddle and the inner boundary of the vertex s has the shape in FIG. 46(d). When the outer boundary of the vertex s consists of a homoclinic saddle connection and a saddle and the inner boundary of the vertex s has the shape in FIG. 46(d) (YES at step S121), {s0, . . . , sk-1} is set for the vertices id of $y_1$, . . . , $y_k$, a tree obtained by replacing the label of the tree in FIG. 46(d) with pairs of id and label is set for the tree G, and {s0, . . . , sk-1} is added to T (step S122). Then the process returns to step S114.

On the other hand, at step S121, when the outer boundary of the vertex s does not consist of a homoclinic saddle connection and a saddle or the inner boundary of vertex s does not have the shape in FIG. 46(d) (NO at step S121), the process moves to step S123.

At step S123, it is determined whether the vertex s has the shape on the left in FIG. 46(c). When the vertex s has the shape on the left in FIG. 46(c) (YES at step S123), the process moves to step S124.

At step S124, it is determined whether o of the label $\sigma_0$ of the vertex s is + (i.e., the flow in s is counterclockwise). When σ of the label $\sigma_0$ of the vertex s is + (i.e., the flow in s is counterclockwise), s0, s1 and s2 are set for the vertices id of $w_1$, $w_2$ and $w_3$, a tree obtained by replacing the label of the tree on the left in FIG. 46(c) with pairs of id and label is set for the tree G, and {s0,s1,s2} is added to T (step S125). Then the process returns to step S114.

At step S124, when σ of the label $\sigma_0$ of the vertex s is not +, that is, when the label $\sigma_0$ of the vertex s is − (i.e., the flow in s is clockwise) (NO at step S124), s1, s2 and s0 are set for the vertices id of $w_1$, $w_2$ and $w_3$, a tree obtained by replacing the label of the tree on the left in FIG. 46(c) with pairs of id and label is set for the tree G, and {s0,s1,s2} is added to T (step S126). Then the process returns to step S114.

On the other hand, when the vertex s does not have the shape on the left in FIG. 46(c) (NO at step S123), the process moves to step S127.

At step S127, it is determined whether the vertex s has the shape on the right in FIG. 46(c). When the vertex s has the shape on the right in FIG. 46(c) (YES at step S127), the process moves to step S128.

At step S128, it is determined whether o of the label $\sigma_0$ of the vertex s is + (i.e., the flow in s is counterclockwise). When σ of the label $\sigma_0$ of the vertex s is + (i.e., the flow in s is counterclockwise) (YES at step S128), s0 and s1 are set for the vertices id of $w_1$ and $w_2$, a tree obtained by replacing the label of the tree on the right in FIG. 46(c) with pairs of id and label is set for tree G, and {s0,s1} added to T (step S129). Then the process returns to step S114.

On the other hand, when σ of the label $\sigma_0$ of the vertex s is not +, i.e., when σ of the label $\sigma_0$ of the vertex s is − (i.e., the flow in s is clockwise) (NO at step S128), s1 and s0 are set for the vertices id of $w_1$ and $w_2$, a tree obtained by replacing the label of the tree on the right in FIG. 46(c) with pairs of id and label is set for the tree G, and {s0,s1} is added to T (step S130). Then the process returns to step S114.

On the other hand, when, at step S127, when the vertex s does not have the shape on the right in FIG. 46(c) (NO at step S127), the process moves to step S131.

At step S131, it is determined whether the vertex s has the shape in FIG. 46(h). When the vertex s has the shape in FIG. 46(h) (YES at step S131), s0, s1, . . . , and sl are set for the vertices id of w, $y_1$, . . . , and $y_1$, a tree obtained by replacing the label of the tree in FIG. 46(h) with pairs of id and label is set for the tree G, and {s0, . . . , sl} is added to T (step S132). Then the process returns to step S114.

On the other hand, at step S131, when the vertex s does not have the shape in FIG. 46(h) (NO at step S131), the process moves to step S133.

At step S133, it is determined whether the vertex s has the shape on the left in FIG. 46(g). When the vertex s has the shape on the left in FIG. 46(g) (including the case where k=0) (YES at step S133), s0, s1, s2, . . . , and sk+1 are set for the vertices id of $w_1$, $w_2$, $z_1$, . . . , and $z_k$, a tree obtained by replacing the label of the tree on the left in FIG. 46(g) with pairs of id and label is set for the tree G, and {s0, . . . , sk+1} is added to T (step S134). Then the process returns to step S114.

At step S133, when the vertex s does not have shape on the left in FIG. 46(g) (NO at step S133), the process moves to step S135.

At step S135, it is determined whether the vertex s has the shape on the right in FIG. 46(g). When vertex s has the shape on the right in FIG. 46(g) (including the case where k=0) (YES at step S135), s0, s1, . . . , and sk are set for the vertices id of w, $z_1$, . . . , and $z_k$, a tree obtained by replacing the label of the tree on right in FIG. 46(g) with pairs of id and label is set for the tree G, and {s0, . . . , sk} are added to T (step S136). Then the process returns to step S114.

On the other hand, at step S135, when the vertex s has the shape on the right in FIG. 46(g), (NO at step S135), the process moves to step S138 (in this case, the vertex s has the shape in FIG. 46(f) as shown at step S137).

At step S138, it is determined whether σ of the label $σ_0$ of the vertex s is (i.e., the flow in s is counterclockwise). When σ of the label $σ_0$ of the vertex s is + (i.e., the flow in s is counterclockwise) (YES at step S138), s0, . . . , sk−1, sk, . . . , and sl+k−1 are set for the vertices id of $y_1$, . . . , $y_k$, $z_1$, . . . , and $z_l$, a tree obtained by replacing the label of the tree in FIG. 46(f) with pairs of id and label is set for the tree G, and {s0, . . . , sl+k−1} is added to T (step S139). Then the process returns to step S114.

At step S138, when σ of the label $σ_0$ of the vertex s is not +, i.e., when σ of the label $σ_0$ of the vertex s is − (i.e., the flow in s is clockwise) (NO at step S138), sl, . . . , sl+k−1, s0, . . . , and sl−1 are set for the vertices id of $y_1$, . . . , $y_k$, $z_1$, . . . , and $z_l$, a tree obtained by replacing the label of the tree in FIG. 46(f) with pairs of id and label is set for the tree G, and {s0, . . . , sl+k−1} is added to T (step S140). Then the process returns to step S114.

The operations described above are the process of converting a saddle connection diagram of O system into a tree.

2-2-2. Graph Representations of Flows Represented with I, II-Words

Let H be a Hamiltonian vector field with a 1-source-sink point in $D_z(M)$ and D be its corresponding ss-saddle connection diagram. $C_H = D_z(M) \backslash D$ consists of connected components each serving as an open annulus domain containing closed orbits or an open disk domain consisting of ss-orbits. On the other hand, a rooted, labeled, and directed tree is constructed as described below. Similar to the case of O-words, each connected component in $C_H$ is associated with a set of vertices. The connected component serving as the root corresponding to the open disk domain nearest to the 1-source sink point in $C_H$ whose closure contains the 1-source sink point and encloses clockwise ss-orbits is chosen as the connected component serving as the root. The label $o_\emptyset$ is assigned to the connected component. In such a determination manner, the root can be uniquely determined.

FIG. 48 is a diagram for explaining a method of choosing a connection component serving as the root from $C_H = D_Z(M) \backslash D$, where D is an ss-saddle connection diagram that can be represented with a I word or a II word. A dashed line is written to represent an ss-orbit contained in the connected component serving as the root and the direction of the ss-orbit.

In FIG. 48, (a) is an ss-saddle connection diagram represented with a word representation $IA_0A_0$, where the flow of the ss-saddle connection has the right-to-left direction, (b) is an ss-saddle connection diagram represented with a word representation $IA_0A_0$, where the ss-saddle connection has the left-to-right direction, (c) is an ss-saddle connection diagram represented with a word representation $IIA_0A_0$, where the periodic orbits contained in the outermost connected component have the clockwise direction, and (d) has the same word representation $IIA_0A_0$ as that of (c), while the periodic orbits have the counterclockwise direction. Below the ss-saddle connection diagrams, images of the ss-saddle connection diagrams each formed by a conformal mapping that maps a point in the root connected component to infinity are shown. In the images obtained by conformal mapping, every ss-orbit contained in the root is counterclockwise.

For example, in the ss-saddle connection diagram with the word representation $IA_0A_0$, the connected component (the domain containing the dashed curved line) right above 1-source sink point serves as the root. Even in the same shape of the same ss-saddle connection diagram, when the flow direction is reversed as shown in FIG. 48(b), according to that definition, the root is the connected component right below the 1-source-sink point. Regarding the ss-saddle connection diagram with the word representation $IIA_0A_0$ in FIG. 48(c), when the direction of the connected component right above the 1-source-sink point is reversed (FIG. 48(d), the connected component right below the 1-source-sink point serves as the root. Note that, when a point in the root connected component is selected and an ss-saddle connection diagram is formed by conformal mapping that maps the point to infinity, the root component is at the outermost in the image and the ss-orbits are always counterclockwise in the image (see the lower area in each diagram in FIG. 48).

Definitions are made as shown in FIG. 48 by using, for the set of vertices consisting of the connected component thus obtained, ones obtained by mapping a directed edge between vertices by conformal mapping where the connected component serving as the root is outermost. When the dimension of the common component of the closure of two connected components v, w∈V is 1, i.e., dim(cl(v)∩cl(w))=1 and v is outside w, a directed edge from v to w is constructed. For a connected component w∈V with ss-orbits, if dim(cl(v)∩cl(w))=1 and the intersection cl(v)∩cl(w) contains ss-saddle connections (or ss-∂-saddle connections), the label $o_0$ (or $o_2$) is assigned to the child vertex w. For a connected component w∈V enclosing counterclockwise closed orbits, if cl(v)∩cl(w) contains saddle connections (or ∂-saddle connections), the label $+_0$ (or $+_2$) is assigned to the child connected component w. Similarly, the labels $-_0$ and $-_2$ are assigned to connected components vertices containing clockwise closed orbits.

Accordingly, a unique rooted, labeled and directed tree $T_H$=(V,E) can be associated with the ss-saddle connection diagram of the Hamiltonian vector field H. The following is the method of visualizing a graph representation $T_H$=(V,E) of a structurally stable Hamiltonian vector field W a I-word or II-word representation into a plane graph.

Note that $Γ(v)=Γ_o(v)∪Γ_+(v)∪Γ_-(v)$. Suppose that the elements in Γ(v) are arranged according to the Rule (1) of the order relation in advance and the elements with the same label in $Γ_{+2}(v)$U and $Γ_{-2}(v)$ are arranged counterclockwise in cyclic order as in the O-word visualization. Because it suffices if the flowchart (FIGS. 47-A to 47-E) is used to visualize the connected component v with closed orbits in $V_+$ or $V_-$ into a plane graph, it suffices if drawing a graph for the connected component in $V_o$ is considered.

FIG. 49 shows local structures of ss-saddle connection diagrams generated by the operations $A_0$, $A_2$ and C and visualization of graph representations obtained according to the local structures. The parent connected component v is symbolized as $o_\emptyset$ ($o_0$ or $o_2$) in FIG. 49.

FIG. 49 shows local ss-saddle connection diagrams constructed by (a) $A_0$, (b) $A_0$, (c) $A_0A_0$, (d) $A_2C^k$ (k≥1), (e) $A_2C^l$ (l−1), (f) $A_2^2C^{k+1}$ (k, l≥1), (g) $A_0A_2C^k$ (k≥0) and (h) $A_0A_2C^l$ (l≥1) and their corresponding parent-child relations to be generated, where the counterclockwise ss-orbits contained in the parent connected component are shown by dashed lines. The label of the parent connected component is expressed as o* (note that * is any one of ø, 0 and 2). Because the root is determined such that the directions of the ss-orbits are always counterclockwise, the flow directions of the orbits contained in its child connected component is determined automatically.

More specifically, because the parent connected component v has two child connected components w∈Vo$_0$ and y∈V+$_0$ for the outward homoclinic saddle connection in FIG. 49($a$), two arrows to o$_0$ and +$_0$ from o* are drawn. For the inward homoclinic saddle connection like that in FIG. 49($b$), an arrow to o$_0$ or −$_0$ can be drawn depending on which connected component is chosen as the parent. Because two types of patterns are created for the structure created by the operation $A_0A_0$ as shown in FIG. 49($c$), three arrows to o$_0$, +$_0$ and −$_0$ or two edges to o$_0$ and −$_0$ can be drawn.

Arrows to an o$_2$ and k+$_2$ are drawn according to the local structure of the local ss-saddle connection diagram created by the operation $A_2C^k$ (k≥0), like that shown in FIG. 49($d$), with the connected components $\{z_1, \ldots, z_k\}$ containing k closed orbits. For the local streamline structure 49($e$)) created by the operation $A_2C^l$ (l≥1) with the child connected components $\{y_1, \ldots, y_l\}$ containing l clockwise closed orbits, it suffices if l arrows and −$_2$ be drawn. FIG. 49($f$) shows the local structure with a child connected component w∈Vo$_2$, l child connected components $\{y_1, \ldots, y_l\}$, and k child connected components $\{z_1, \ldots, z_k\}$ and shows that k arrows to +$_2$ and l arrows to −$_2$ can be drawn according to the local structure. Lastly, for the structure in FIG. 49($g$) assigned by the operation $A_0A_2C_k$ (or $A_0A_2C^l$ (l≥1) like that in FIG. 49($h$)), arrows to o$_2$ and −$_0$ (or o$_0$ and +$_0$) are drawn and k arrows to +$_2$ (or l arrows to −$_2$) are drawn on the right.

2-2-3-1. Process of Converting ss-Saddle Connection Diagram of I, II System into Tree FIGS. 50-A to 50-D are flowcharts for explaining a process of converting an ss-saddle connection diagram of I, II system into a tree. The process of converting an ss-saddle connection diagram of I, II system into a tree shown in FIGS. 50-A to 50-D is executable by an apparatus, such as a computer.

According to FIGS. 50-A to 50-D, a saddle connection diagram D is set for the input and the saddle connection diagram D is converted to have a root at the outermost like that shown in FIG. 48 by performing given coordinate conversion (step S141) and u=0, T={0} and tree G=(0, o$_ø$) are put (step S142).

At step S143, it is determined whether the root 0 has the shape in FIG. 49 ($a$). When the root 0 has the shape in FIG. 49($a$) (YES at step S143), 1 and 00 are set for the vertices id of w and y, a tree obtained by replacing the label of the tree in FIG. 49($a$) with pairs of id and label is set for the tree G (i.e., (1, o$_0$)←(u, o$_ø$)→(u0,+$_0$) is set for G), and {1,00} is added to T (i.e., T={0} is replaced with T={0, 1, 00}), i.e., T←TU{00, . . . , 0k−1} (step S144). Then, the process moves to step S149.

On the other hand, when the root 0 does not have the shape in FIG. 49($a$) (NO at step S143), the process moves to step S145.

At step S145, it is determined whether the root 0 has the shape on the left in FIG. 49($b$). When the root 0 has the shape on the left in FIG. 49($b$) (YES at step S145), 1 is set for the vertex id of w, a tree obtained by replacing the label of the tree in FIG. 49($b$) with a pair of id and label is set for the tree G (i.e., G is ((0, o$_ø$), (1, o$_0$)), and {1} is added to T (step S146). Then, the process moves to step S149.

On the other hand, at step S145, when the root 0 does not have the shape in FIG. 49($b$) (NO at step S145), the process moves to step S148 (in this case, as shown in step S147, the root 0 has the shape in FIG. 49 ($d$)).

At step S148, 1, 00, . . . , and 0k−1 are set for the vertices id of w, $z_1$, . . . , and $z_k$, a tree obtained by replacing the label of the tree in FIG. 49($d$) with pairs of id and label is set for the tree G, and {1, 00, . . . , 0k−1} is added to T, and the process moves to step S149.

At step S149, it is determined whether there exists an element t larger than u among T. When u is the largest element among T (NO at step S149), all vertices id of the tree G are removed and the resultant tree is set for G (step S150). The tree G is then output (step S151) and the process ends.

On the other hand, at step S149, when it is determined that u is not the largest among T (YES at step S149), u'=min{t∈T|u<t} (i.e., u' is a large element next to u among T) is put, and u is replaced with u' (step S152). The process is then moves to step S153.

At step S153, it is determined whether u is a natural number (i.e., whether u corresponds to id of o$_ø$, o$_0$ and o$_2$). When u is not a natural number (NO at step S153), the process moves to S114 in FIG. 47-B that is the O-word process.

On the other hand, at step S153, when u is a natural number (YES at step S153), the process moves to step S155.

At step S155, it is determined whether the outer boundary of the vertex u consists of an outward homoclinic ss-saddle connection and a circled s (1-source-sink point: see FIG. 4) and whether the inner boundary of u has the shape in FIG. 49($a$). When the outer boundary of the vertex u consists of a homoclinic ss-saddle connection and a circled S and the inner boundary of u has the shape in FIG. 49($a$) (YES at step S155), u+1 and u0 are set for the vertices of w and y, a tree obtained by replacing the label of the tree in FIG. 49($a$) with pairs of id and label is set for the tree G (i.e., (u+1,o$_0$)←(u,o$_0$)→(u0,+$_0$) is set for G), and T is replaced with TU{u+1, u0} (step S156). Then the process returns to step S149.

On the other hand, at step S155, when the outer boundary of the vertex u does not consist of an outward homoclinic ss-saddle connection and a circled S or the inner boundary of u does not have the shape in FIG. 49($a$) (NO at step S155), the process moves to step S157.

At step S157, it is determined whether the outer boundary of the vertex u consists of an outward homoclinic ss-saddle connection and a circled s and the inner boundary of u has the shape on the left in FIG. 49($b$). When the outer boundary of the vertex u consists of a homoclinic ss-saddle connection and a circled S and the inner boundary of u has the shape on the left in FIG. 49($b$) (YES at step S157), u+1 is set for the vertex id of w, a tree obtained by replacing the label of the tree on the left in FIG. 49($b$) with a pair of id and label is set for the tree G, and {u+1} is added to T (step S158). Then the process returns to step S149.

On the other hand, at step S157, when the outer boundary of the vertex u does not consist of an outward homoclinic ss-saddle connection and a circled S or the inner boundary of u does not have the shape on the left in FIG. 49($b$) (NO at step S157), the process moves to step S159.

At step S159, it is determined whether the outer boundary of the vertex u consists of an outward homoclinic ss-saddle connection and a circled s and the inner boundary of u has the shape in FIG. 49($d$). When the outer boundary of the vertex u consists of a homoclinic ss-saddle connection and a circled S and u has the shape in FIG. 49($d$) (YES at step S159), u+1, u0, . . . , and uk−1 are set for the vertices id of w, $z_1, \ldots,$ and $z_k$, a tree obtained by replacing the label of the tree in FIG. 49(d) with a pair of id and label is set for the tree G, and {u+1, u0, . . . , uk−1} is added to T (step S160). Then the process returns to step S149.

On the other hand, at step S159, when the outer boundary of the vertex u does not consist of an outward homoclinic ss-saddle connection and a circled S or the inner boundary of u does not have the shape in FIG. 49(d) (NO at step S159), the process moves to step S161.

At step S161, it is determined whether the vertex u has the shape on the left in FIG. 49(c). When the vertex u has the shape on the left in FIG. 49(c) (YES at step S161), u+1, u0, and u1 are set for the vertices id of w, $y_1$ and $y_2$, a tree obtained by replacing the label of the tree on the left in FIG. 49(c) with pairs of id and label is set for the tree G, and {u+1,u0,u1} is added to T (step S162). Then the process returns to step S149.

On the other hand, at step S161, when the vertex u does not have the shape on the left in FIG. 49(c) (NO at step S161), the process moves to step S163.

At step S163, it is determined whether the vertex u has the shape on the right in FIG. 49(c). When the vertex u has the shape on the right in FIG. 49(c) (YES at step S163), u+1 and u0 are set for the vertices id of $w_1$ and $w_2$, a tree obtained by replacing the label of the tree on the right in FIG. 49(c) with pairs of id and label is set for the tree G, and {u+1,u0} is added to T (step S164). Then the process returns to step S149.

At step S163, when the vertex u does not have the shape on the right in FIG. 49(c) (NO at step S163), the process moves to step S165.

At step S165, it is determined whether the vertex u has the shape in FIG. 49(g). When the vertex u has the shape in FIG. 49(g) (YES at step S165), u+1, u0, u1, . . . , and uk are set for the vertices id of w, y, $z_1, \ldots,$ and $z_k$, a tree obtained by replacing the label of the tree in FIG. 49(g) with pairs of id and label is set for the tree G, and {u+1, u0, . . . , uk} is added to T (step S166). Then the process returns to step S149.

At step S165, when the vertex u does not have the shape in FIG. 49(g) (NO at step S165), the process moves to step S167.

At step S167, it is determined whether the vertex u has the shape on the left in FIG. 49(h). When the vertex u has the shape on the left in FIG. 49(h) (YES at step S167), u+1, u0, . . . , and ul are set for the vertices id of w, y, and $y_1, \ldots,$ a tree obtained by replacing the label of the tree on the left in FIG. 49(h) with pairs of id and label is set for the tree G, and {u+1, u0 . . . , u1, . . . , ul} is added to T (step S168). Then the process returns to step S149.

At step S167, when the vertex u does not have the shape on the left in FIG. 49(h) (NO at step S167), the process moves to step S169.

At step S169, it is determined whether the vertex u has the shape on the right in FIG. 49(h). When the vertex u has the shape on the right in FIG. 49(h) (YES at step S169), u+1, u0, . . . , and ul−1 are set for the vertices id of w, $y_1, \ldots,$ and $y_1$, a tree obtained by replacing the label of the tree on the right in FIG. 49(h) with pairs of id and label is set for the tree G, and {u+1, u0, . . . , ul−1} is added to T (step S170). Then the process returns to step S149.

On the other hand, at step S169, when the vertex u does not have the shape on the right in FIG. 49(h) (NO at step S169), the process moves to step S171.

At step S171, it is determined whether the vertex u has the shape in FIG. 49(f). When the vertex u has the shape in FIG. 49(f) (YES at step S171), u+1, u0, . . . , uk−1, uk, . . . , and ul+k−1 are set for the vertices id of w, $z_1, \ldots, z_k$, $y_1, \ldots,$ and $y_1$, a tree obtained by replacing the label of the tree in FIG. 49(f) with pairs of id and label is set for the tree G, and {u+1, u0, . . . , ul+k−1} is added to T (step S172). Then the process returns to step S149.

At step S171, when the vertex u does not have the shape in FIG. 49(f) (NO at step S171), the process moves to step S173.

At step S173, it is determined whether the vertex u has the shape on the right in FIG. 49(b). When the vertex u has the shape on the right in FIG. 49(b) (YES at step S173), u0 is set for the vertex id of y, a tree obtained by replacing the label of the tree on the right in FIG. 49(b) with a pair of id and label is set for the tree G, and {u0} is added to T (step S174). Then the process returns to step S149.

At step S173, when the vertex u does not have the shape on the right in FIG. 49(b) (NO at step S173), the process moves to step S175.

At step S175, it is determined whether the vertex u has the shape in FIG. 49(e). When the vertex u has the shape in FIG. 49(e) (YES at step S175), u0, . . . , and ul−1 are set for the vertices id of $y_1, \ldots,$ and $y_l$, a tree obtained by replacing the label of the tree in FIG. 49(e) with pairs of id and label is set for the tree G, and {u0, . . . , ul−1} is added to T (step S176). Then the process returns to step S149.

On the other hand, at step S175, when the vertex u does not have the shape in FIG. 49(e) (NO at step S175), the process moves to step S149 (in this case, as shown in step S177, the vertex u has the shape in FIG. 49(a)).

The operations described above are the process of converting an ss-saddle connection diagram of I, II system into a tree.

Graph Representations and their Regular Expressions

According to the descriptions given above, the root can be uniquely determined for the ss-saddle connection diagrams each with a 1-source-sink point and all local structures of the ss-saddle connection diagrams constructed by the operations $A_0$, $A_2$, $B_0$, $B_2$ and C and parent-child relations between connected components derived therefrom are all represented in FIGS. 46 and 49, which accordingly represents the following.

Proposition 3.1: A unique, rooted, labeled and directed tree representation corresponds to each streamline topology of structurally stable Hamiltonian vector field with a 1-source-sink point.

Regarding structurally stable Hamiltonian vector fields without any 1-source-sink point, how to select a root is unambiguous because, for any connected component containing a circular boundary without containing any ∂-saddle, there exists a homeomorphism that always maps the connected component to the outermost one. This means that, for a saddle connection diagram, there exist different graph representations for the number of connected components. To exclude such ambiguity, it is defined that graph representations created owing to the homeomorphism are different from one another. In other words, an equivalence relation $V_1 \sim V_2$ between two structurally stable Hamiltonian vector fields $V_1$ and $V_2$ are defined, if there is a homeomorphism on $D_z$ (M) that maps each orbit of $V_1$ to an orbit of $V_2$ and the outer boundary of $V_1$ to that of $V_2$ preserving orientation of the orbits. Then ~ defines the equivalence relation and a unique directed, labeled and rooted tree can be assigned to the equivalent class.

Preposition 3.2: A unique, rooted, labeled and directed tree representation corresponds to the streamline topologies of the equivalent class for ~ of structurally stable Hamiltonian vector fields.

3. Regular Expression Creating Step

The regular expression creating step (step S22) in FIG. 44 will be described in detail. As a well-known fact regarding the graph theory, a unique "regular expression" can be assumed for any rooted, labelled, and directed tree. Let $T_H=(V,E)$ denotes a graph representation assigned to a structurally stable Hamiltonian vector field H assigned according to the above-described method. A regular expression is inductively assigned to the graph representation in the following manner. Note that the in-degree of all vertices excluding the root is one. When $ht(T_H)=0$, the graph has only the root, i.e., $V=\{v_0\}$, and the regular expression is $l(v_0)$. When there is a regular expression N up to the height $ht(T_H)=n-1$, let $T_{n-1}=\{v_1, v_2, \ldots, v_m\}$ be the set of vertices of the height. With the set of child vertices $\Gamma(V_i)=\{v_{i1}, v_{i2}, \ldots, v_{imi}\}$ of each vertex $v_i$ and their corresponding labels $l_i=l(v_i)$ $(i=1, \ldots, m)$, a new regular expression can be constructed by replacing $l_i$ with $l_i(l_{i1}, l_{i2}, \ldots, l_{imi})$ for N. Note that $l_{ik}=l(v_{ik})$ $(k=1, \ldots, m_i)$. Let $N_{TH}$ be the regular expression of $T_H$ thus constructed. From the construction method, the following proposition is obtained.

Proposition 3.3. The mapping $N_T=f_N(T)$ from any rooted, labeled and directed tree T to the regular expression $N_T$ is bijective.

Indication of Propositions 3.1 and 3.2 is, in other words, that the mapping $T_H=f_T(H)$ from (ss-)saddle connection diagrams H to their corresponding graph representations $T_H$ is infective. Hence, it follows from Proposition 3.3 that the composite mapping $N_T=f_N(f_T(W))$ is also infective. In other words, structurally stable Assigning different regular expressions to Hamiltonian vector fields with the same word representation and using regular expressions to patterns that cannot be distinguished by word representations makes it possible to distinguish them. As an example, FIG. 51-A shows visualization of graph representations of structurally stable streamline patterns assigned by the same word representation $IA_0C$ and their regular expressions. As described in 2-2-2. Graph representations of flows represented with I,II-words, for the root connected component, one right below or above the 1-source-sink point is chosen. As also can be seen from it, their regular expressions are different from each other.

FIG. 51-A shows graph representations of structurally stable streamline patterns with word representations $IA_0C$ and their corresponding regular expressions. The root corresponds to the connected component right below the 1-source-sink point according its definition. In order to obtain the graph representations, patterns where the root connected component is mapped to the outermost is drawn on the right.

3-1. Process of Converting Tree into Regular Expression

FIG. 51-B is a flowchart for explaining a process of converting a tree into a regular expression. The process of converting a tree into a regular expression shown in FIG. 51-B is executable by an apparatus, such as a computer. In the following processing, id is assigned to every point in a tree as pre-processing. Note that id of different points are different from one another. According to FIG. 51-B, a tree G is set for the input (step S178). Then V is set for the set of vertices of the tree G, $s=0$ and $T=\{0\}$ are put, X is set for the empty set, and the regular expression $N=(s, \sigma_o)$ ( ) is put (step S179).

At step S180, $(s^{(1)}, \sigma^{(1)}), \ldots, (s^{(h)}, \sigma^{(h)})$ is set for the result of reading the children of s from the left, where $(s,\sigma^*)$ ( ) in the regular expression N is replaced with $\sigma^*(s^{(1)}, \sigma^{(1)}$ ( ), \ldots, (s^{(h)}, \sigma^{(h)})$ ( )), $\{s^{(1)}, \ldots, s^{(h)}\}$ is added to T, and $\{s\}$ is added to X.

At step S181, it is determined whether $\# V=\# X$. When $\# V=\# X$ (YES at step S181), the regular expression N is output and the process ends.

At step S181, when $\# V=\# X$ is not satisfied (NO at step S181), one $s' \epsilon T-X$ is chosen (Note: any choosing method may be used) and $(s, \sigma^*)$ is replaced with $(s', \sigma'^*)$ (step S182). Then the process returns to step S180.

The operations described above are the process of converting a tree into a regular expression.

The apparatus configuration of the apparatus for implementing the above-described flow pattern regular expression method according to the embodiment with a computer will be described here. The method according to the embodiment may be implemented by a person or a computer or may be used when the following processes according to the embodiment may be performed by a person.

Configuration of Fluid Transition Route Acquisition Apparatus According to Second Embodiment The configuration of a fluid transition route acquisition apparatus according to the second embodiment will be described here with reference to FIG. 52. FIG. 52 is a block diagram showing an exemplary fluid transition route acquisition apparatus 101 to which the second embodiment is applied, schematically showing only components relevant to the second embodiment among the components. In FIG. 52, components having equivalent functions as those of the fluid transition route acquisition apparatus 100 according to the first embodiment shown in FIG. 29 are denoted by the same reference numerals as those in FIG. 29 to omit descriptions of the common components and only different aspects will be described. The fluid transition route acquisition apparatus 101 according to the second embodiment is different from the fluid transition route acquisition apparatus 100 according to the second embodiment in that the fluid transition route acquisition apparatus 101 has a regular expression forming unit 120, in that a transition information acquisition unit 102g2 acquires transition information by using regular expressions in addition to the process performed by the transition information acquisition unit 102g according to FIG. 29, and in that a simulation unit 102a2 further executes, in addition to the process performed by simulation unit 102a according to FIG. 29, a design parameter process selection process of selecting a possible design parameter by using word representations and regular expressions.

The storage unit 106 according to the second embodiment further stores various types of data (for example, data from the patterns shown in FIGS. 2 to 6, FIG. 46, FIGS. 48 and 49, and FIG. 51-A) necessary for the fluid transition route acquisition apparatus 101 to implement the above-described regular expression creating method, a database, tables, etc.

The control unit 102 according to the second embodiment further includes the regular expression forming unit 120 that impalements the above-described regular expression creating method. The regular expression forming unit 120 includes a graph representation creating unit 120a and a regular expression creating unit 120b.

The graph representation creating unit 120a is a graph representation creating unit for executing the above-described graph representation creating step (step S21). For example, by executing the process of converting a saddle connection diagram of O system into tree shown in FIGS. 47-A to 47-E and the process of converting an ss-saddle connection diagram of I, II system into tree shown in FIGS. 50-A to 50-D, etc., the graph representation creating unit 120a creates a graph representation having one-to-one correspondence to a flow pattern in a multiply connected exterior domain with N (N is an integer equal to or larger than 1) holes topologically. The graph representation may be one obtained by assigning a unique rooted, labeled and directed tree $T_H=(V,E)$ (where V is a set of points called vertices and E is a set of edges connecting vertices) to a structurally stable Hamiltonian vector field H defined by a flow pattern and then visualizing the tree as plane graph. The graph representation may include one obtained by, when v is a parent vertex, w is a child vertex of the parent vertex, l(v) is a label assigned to the parent vertex v, l(w) is a label assigned to the child vertex w, and $\Gamma(v)$ is the set of child vertices of v, arranging the set of child vertices $\Gamma(v)$ of v according to the rules of a given order relation and drawing arrows from l(v) to l(w) from left to right for $w \in \Gamma(v)$. The flow pattern may be any one or more patterns of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes. Furthermore, when a flow pattern has a 1-source-sink point, the flow pattern may be converted such that the domain containing a counterclockwise ss-orbit closest to the 1-source-sink pair is the outermost domain, the orbits appearing on the (ss-)saddle connection diagram of the converted flow pattern may be extracted from the whole domain, vertices may be set for the connected components obtained by excluding all orbits appearing on (ss-)saddle connection diagram from the whole domain and the outermost connected component may be regarded as the root, the connected components sharing the boundary with the current component may be regarded as children of the current component to which labels are assigned according to the orbit serving as the boundary, the children may be arranged according to a given order relation between labels, the children of the current component may be set for current components and this setting may be repeatedly executed until there is no child. The flow pattern may be a flow pattern diagram that is created by repeating an operation, starting from one or multiple patterns of the above-described patterns, of assigning any one of the operation words defining the five types of operation words that can be topologically adopted to add a hole to a flow pattern until the number of holes reaches N.

The regular expression creating unit 120b is a regular expression creating unit for implementing the above-described regular expression creating step (step S22). For example, by executing the process of converting a tree into a regular expression shown in FIG. 51-B, the regular expression creating unit 120b creates a regular expression from a graph representation created by the graph representation creating unit 120a.

Figure 56:
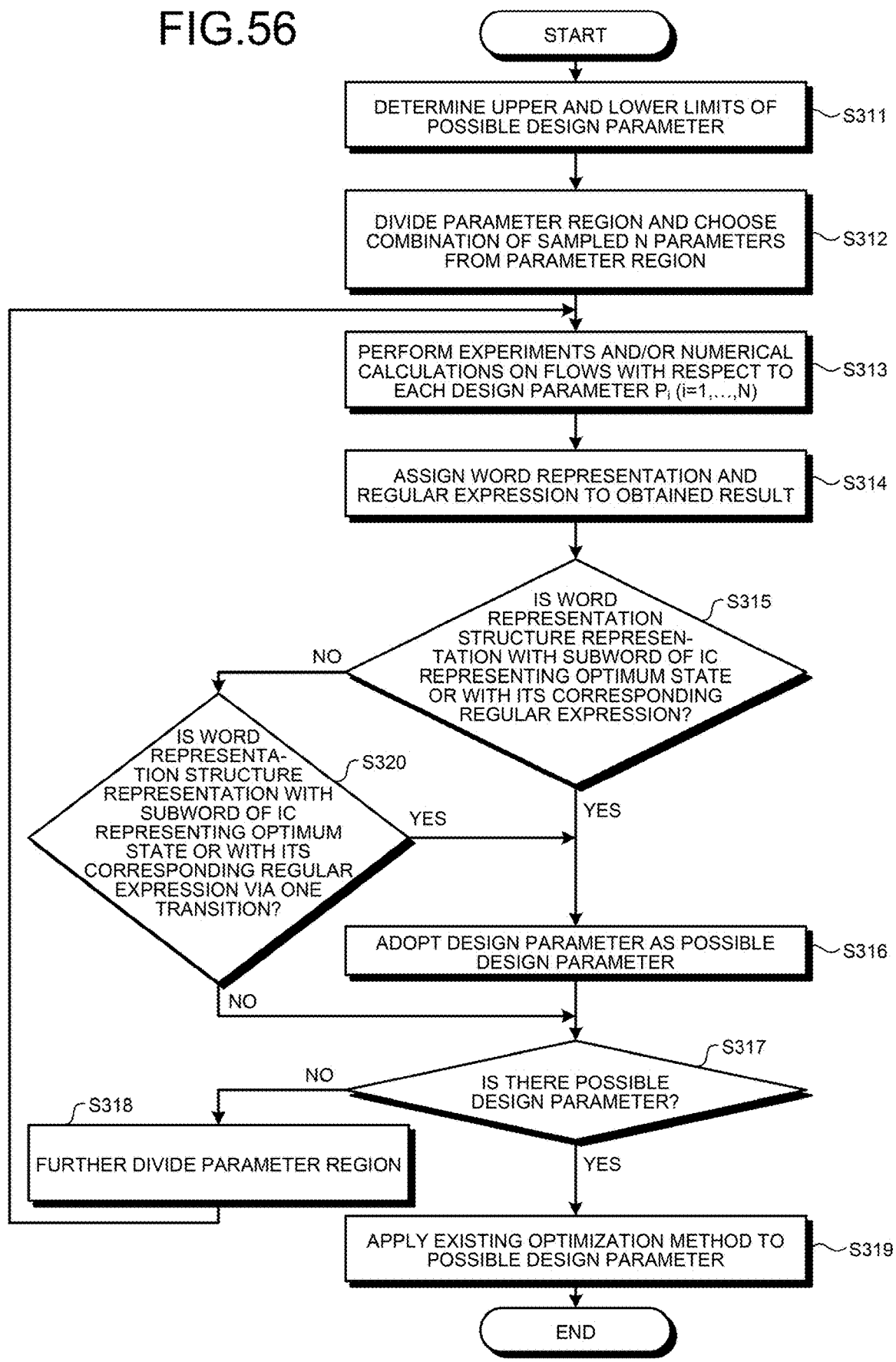
FIG. 56 is a flowchart for explaining a method of designing an object in a fluid by using word representations and regular expressions.

The simulation unit 102a2 further executes a possible design parameter selecting process (see FIG. 56). In the possible design parameter selecting process, to select a possible design parameter for an object in a fluid, an upper limit and a lower limit of the design parameter are set, multiple parameters from the parameter region defined by the upper limit and the lower limit may be selected, experiments and/or numerical calculations may be performed on a flow with respect to each of the selected multiple parameters, word representations and/or regular expressions may be assigned to the results of experiments and/or numerical calculations, a design parameter having a word representation and/or regular expression representing the optimum state among the assigned word representations and/or regular expressions may be selected as the possible design parameter.

In the possible setting parameter selecting process, even in a case where the assigned word representations and/or regular expressions do not include the word representation and/or regular expression representing the optimum state, the design parameter may be selected as the possible design parameter when the word representations and/or regular expressions include the word representation and/or regular expression representing the optimum state via one transition of the flow pattern. Furthermore, in the possible design parameter selecting process, optimization designing may be performed with the selected design parameter.

The transition information acquisition unit 102g2 may acquire a transition route by using, in addition to tword representations, regular expressions with one-to-one correspondence to flow patterns. When there are multiple possible transition routes that are acquired according to the pattern transition information by using the word representation of a specified structurally stable flow pattern as a reference, the transition information acquisition unit 102g2 may specify one transition route by using the regular expression having one-to-one correspondence with the structurally stable flow pattern. Furthermore, when there are multiple possible transition routes acquired according to the information on the change by using, as a reference, the change in operation word for word representation between specified two structurally stable flow patterns, the transition information acquisition unit 102g2 may acquire the regular expressions (e.g., $N_1$ and $N_2$) corresponding respectively to the word representations (e.g., $W_1$ and $W_2$) of the two structurally stable flow patterns, and, regarding the multiple possible transition routes, when the subrepresentation for causing transition is not contained in the regular expression (e.g., $N_1$) corresponding to one (e.g., $W_1$) of the word representations of the structurally stable flow patterns, the transition information acquisition unit 102g2 may exclude the possible transition from possible transition routes. Furthermore, when there are multiple possible transition routes that are not excluded, the transition information acquisition unit 102g2 acquires regular expressions corresponding respectively to the multiple possible transition routes that are not excluded and specifies, as a transition pattern, a possible selection route, among the multiple possible selection routes that are not excluded, whose corresponding regular expression matches the regular expression ($N_2$) corresponding to the word representation (e.g., $W_2$) of the other structurally stable flow pattern.

Figure 53:
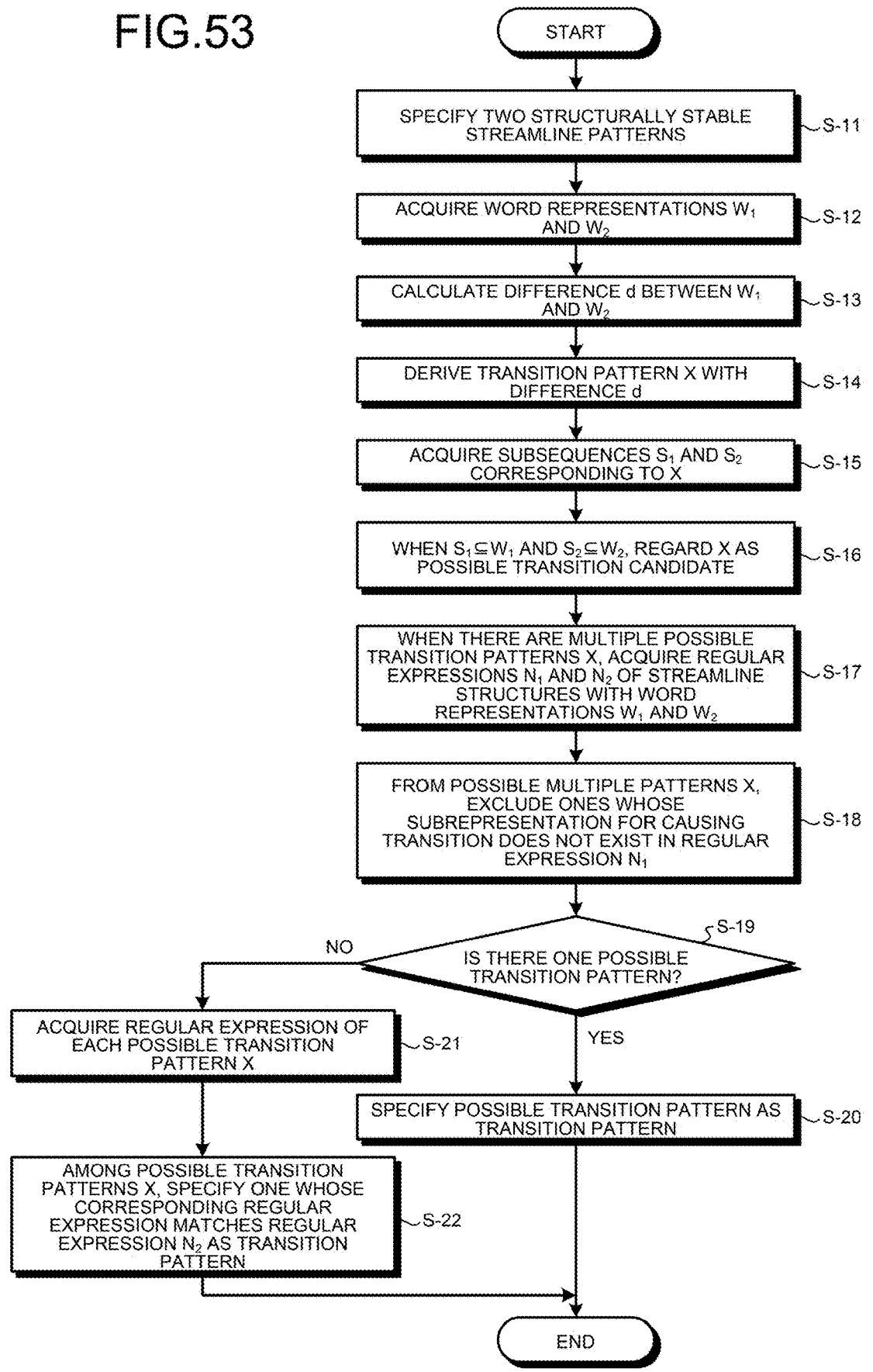
FIG. 53 is a flowchart of an exemplary transition route searching process using the index difference that is performed by the fluid transition route acquisition apparatus 101.

FIG. 53 is a flowchart of an exemplary transition route searching process using the index difference performed by the fluid transition route acquisition apparatus 101 according to the second embodiment. In FIG. 53, steps of performing the same processing as that in FIG. 31 are denoted with the same step numbers. In the following example, the lists in FIGS. 26 to 28 obtained on perturbation of h-unstable and p-unstable streamline patterns and their subword representations are used as the pattern transition information.

According to FIG. 53, first of all, the transition information acquisition unit 102g2 leads to specifying two structurally stable streamline patterns (step S-11).

The transition information acquisition unit 102g2 then acquires word representations $W_1$ and $W_2$ corresponding to the two structurally stable streamline patterns (step S-12). For example, when streamline diagrams are specified, the transition information acquisition unit 102g2 acquires the corresponding word representations $W_1$ and $W_2$ owing to the processing performed by the word representation forming unit 102c.

The transition information acquisition unit 102g2 then calculates the difference d between the word representations $W_1$ and $W_2$ (step S-13). In other words, the transition information acquisition unit 102g2 chooses a proper * from among I, II and O and calculates $d=\text{ind}^*(W_1)-\text{ind}^*(W_2)$.

The transition information acquisition unit 102g2 then derives a transition pattern X with the difference d from the pattern transition information (the lists in FIGS. 26 to 28) (step S-14). When the transition pattern X with the difference d does not match, the transition information may represent that the two structurally stable streamline patterns cannot transition to each other via one transition, or a transition route in which they can transition to each other via multiple transitions may be searched for. For example, assuming that the streamline patterns can transition to each other via k transitions, the transition information acquisition unit 102g may derive a combination of transition patterns $X_1, X_2, \ldots,$ and $X_k$ satisfying $d=\text{ind}^*(W_1)-\text{ind}^*(W_2)=d_1+d_2+\ldots+d_k$. Adjacent streamline patterns on transition have to have the same word representation (a subword has to be shared).

The transition information acquisition unit 102g2 searches for all transition patterns X with the difference d from the lists (step S-14) and acquires the subsequences $S_1$ and $S_2$ corresponding to each of the transition patterns X (step S-15). When multiple transitions are assumed, subsequences $S_1, S_{21}$ to $S_{1k}$, and $S_{2k}$ are calculated for the transition patterns $X_1, X_2, \ldots,$ and $X_k$.

The transition information acquisition unit 102g2 examines whether the subsequences $S_1$ and $S_2$ serve as subwords of $W_1$ and $W_2$, respectively. When they serve as the subwords, X is incorporated as a possible transition in the transition information (step S-16). In other words, it is examined whether $S_1 \subseteq W_1$ and $S_2 \subseteq W_2$. When $S_1 \subseteq W_1$ and $S_2 \subseteq W_2$ are satisfied, the transition information acquisition unit 102g acquires X as a possible transition and, if not, discards X.

Furthermore, when there are multiple possible transition patterns X, the transition information acquisition unit 102g2 acquires the regular expressions $N_1$ and $N_2$ of the streamline structures with the word representations $W_1$ and $W_2$ owing to the processing performed by the regular expression forming unit 120 (step S-17).

Regarding the multiple possible transition patterns, the transition information acquisition unit 102g2 excludes a possible transition pattern whose subword representation for causing the transition does not exist in the regular expression $N_1$ (step S-18).

The transition information acquisition unit 102g2 determines whether there is only one possible transition pattern (step S-19). When there is only one possible transition pattern (YES at step S-19), the possible transition pattern is specified as the transition pattern (step S-20).

On the other hand, when there are more than one possible transition pattern (NO at step S-19), the transition information acquisition unit 102g2 acquires regular expressions for the respective possible transition patterns X owing to the processing performed by the regular expression forming unit 120 (step S-21).

The transition information acquisition unit 102g2 specifies, as the transition pattern, the possible transition pattern X whose corresponding regular expression matches the regular expression $N_2$ among the possible transition patterns X (step S-22).

As described above, according to the second embodiment, when there are multiple possible transition patterns, it is possible to determine whether a transition has actually occurred by performing comparison of a subrepresentation contained in the regular expression $N_1$ and comparison with the regular expression $N_2$ of the transition pattern, thereby specifying one transition pattern.

Example

Figure 54:
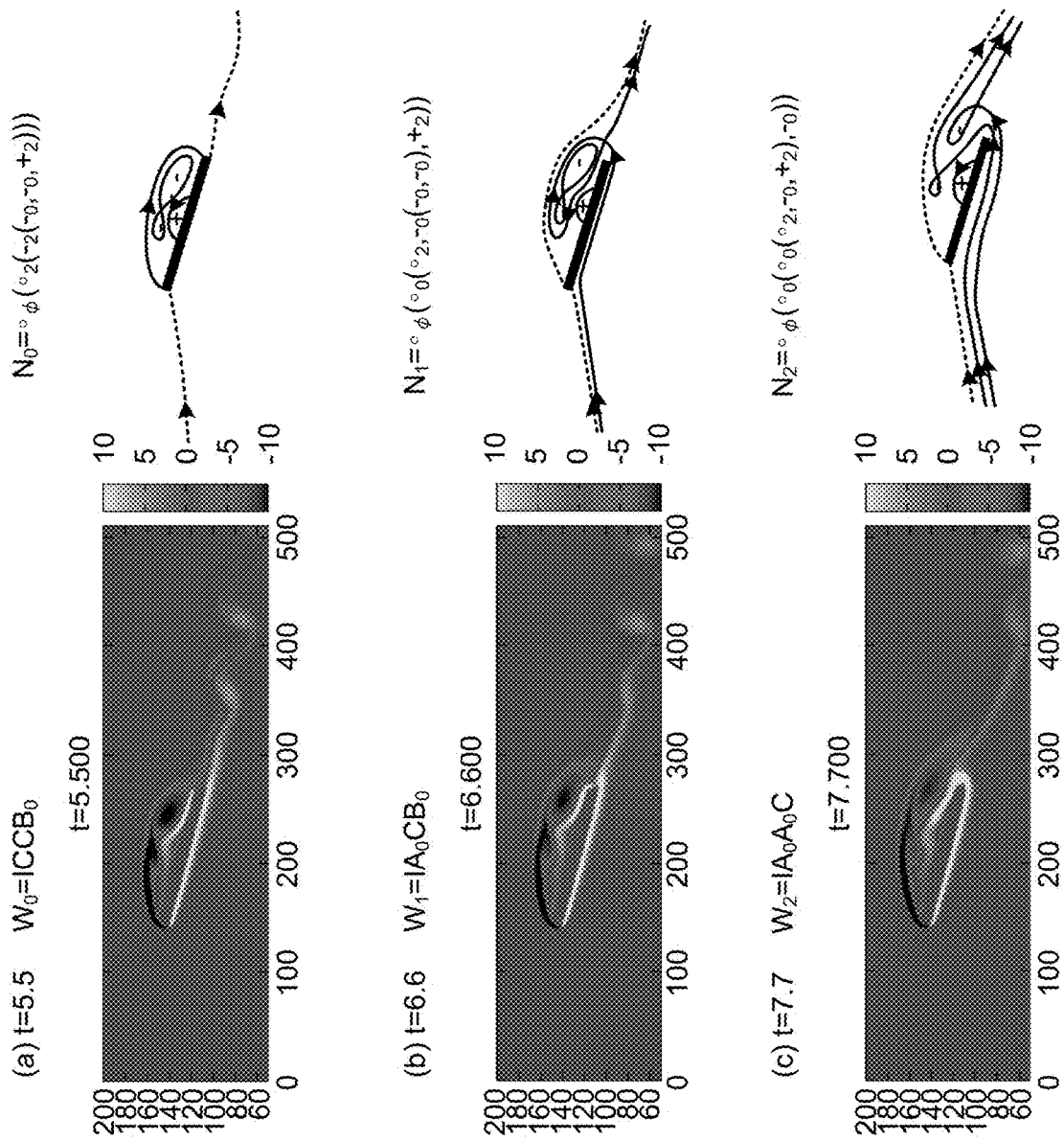
FIG. 54 shows the time evolution of a flat plate placed in a uniform flow from t=5.5 to t=7.7, the topologies of the streamline patterns, their corresponding maximal expressions, and their corresponding regular expressions.

With reference to FIGS. 54 and 55, an example will be described in which a transition pattern is specified by using word representations and regular expressions under the same conditions as those of the example explained according to FIGS. 32 to 35. FIG. 54 shows the time evolution of a flat plate placed in a uniform flow from t=5.5 to t=7.7, the topologies of its streamline patterns, their corresponding maximal expressions, and their corresponding regular expressions. FIG. 55 is a diagram showing transition occurring during the time evolution from the time t=5.5 to 7.7.

According to FIG. 54, the regular expression $N_0 = o_\varnothing(o_2(-_2(-_0,-_0,+_2)))$ of the streamline pattern at t=5.5, the regular expression $N_1 = o_\varnothing(o_0(o_2,-_0(-_0,-_0),+_2)$ of the streamline pattern at t=6.6, and the regular expression $N_2 = o_\varnothing(o_0(o_2,-_0,+_2),-_0))$ of the streamline pattern at t=7.7 are further assigned. Which transition has occurred will be given according to the algorithm according to the second embodiment (such as the transition route searching process using the index difference). According to the algorithm according to the second embodiment, the transition pattern can be specified only by comparison the word representation and the regular expression.

The maximal word representations at the times t=5.5 and t=6.6 are $W_0 = \text{ICCB}_0$ and $W_1 = \text{IA}_0\text{CB}_0$ and the difference d between the indices is given by $d=\text{ind}_I(W_1)-\text{ind}_I(W))=(1,0,0,0,-1)$. The lists in FIGS. 26 to 28 represents that there are three transitions $X=\text{I}\Delta_1, \text{IM}_{1,s}, \text{ICM}_{1,i}$ as the transition X that generates the index difference.

By assigning the corresponding regular expression according to the way of the transition $X=\text{IM}_{1,s}$, $N_{IM1,s}=o_\varnothing(o_0(o_2, -_0, (-_0, -_0), +_2)$ is obtained. By comparing them, $N_I=N_{IM1,s}$ is obtained and accordingly it can be determined that the transition that has actually occurred owing to the one-to-one correspondence of the regular expression is $X=\text{IM}_{1,s}$.

For the time from t=6.6 to t=7.7, their corresponding maximal representations are $W_1 = \text{IA}_0\text{CB}_0$ and $W_2 = \text{IA}_0\text{A}_0\text{C}$ and the difference between the indices is given by $d=\text{ind}_I(W_2)-\text{ind}_I(W_1)=(1,0,-1,0,0)$. By searching the lists in FIGS. 26 to 28 for X, $X=\text{ICD}_0, \text{A}_0\text{E}_{0,s}$ and $\text{IC}\Psi(2)$ are obtained.

Because the subwords $S_1$ and $S_2$ corresponding to $X=\text{IC}\Psi(2)$ are not contained in $W_2$ and $W_1$, they are excluded.

On the other hand, because $S_1 \subseteq W_1$ and $S_2 \subseteq W_2$ are satisfied for $X=\text{A}_0\text{E}_{0,s}$ and $X=\text{ICD}_0$, they are possible transitions that can occur. Because the corresponding regular expression becomes equivalent to $N_2$ according to the transition $X=\text{A}_0\text{E}_0$, it can be specified that the transition to occur owing to the one-to-one correspondence of the regular expression is $X=\text{A}_0\text{E}_{0,s}$.

Method of Designing Object in Fluid Using Word Representation and Regular Expression (Possible Parameter Selecting Process)

For example, regarding a designing method in which, through control on the shape and layout of an object, such as a bridge or bridge piers, placed in a flow (hereinafter, referred to as the designing subject) and the flow surrounding the object, a parameter optimum to the designing subject is determined, how to perform designing using word representations and regular expressions will be described.

Premise 1: There is a variable design parameter to the design subject (for example apparatus for controlling the shape, layout and flows).

Premise 2: For designing a designing subject, "optimum states" according to the problems are set, and the optimum state is described as a characteristic of the streamline structure. For example, when the state where a separation vortex is closed in is the optimum state, maximizing the lift is expected for wing and minimizing the drag can be expected for bridge piers.

Premise 3: In such designing, it is possible to perform experiments and numerical calculations while varying the design parameter (leading to the word representations and regular representations of streamline pattern thus obtained). The flow is limited to two-dimensional flows below. For three-dimensional flows, designing may be possible by, for example, converting them into two-dimensional flow by taking their cross-sections (note that it is not necessarily possible to deal with three-dimensional flows).

In conventional optimization designing, starting from the default state, optimization of the design parameter is performed, for example, through experience and trial and error or with a conventional optimization method. Even if one type of optimization is realized, this may be local optimization or may be physically unstable and therefore it may be not clear whether it is durable to practical designing.

In design parameter searching according to the embodiment, under such circumstances, ideal circumstances are initially set for word representations and regular expressions of flow patterns and accordingly a parameter region that realizes the ideal state can be searched for. Accordingly, "possible" design parameters that realize the optimum setting can be searched quickly as many as possible. Performing the known optimization method, starting from those possible design parameters, increases the possibility that a lot of and highly-feasible design parameters are obtained.

FIG. 56 is a flowchart for explaining a method of designing an object in a fluid, using word representations and regular expressions, i.e., the above-described possible design parameter selecting process. The flowchart shown in FIG. 56 is executed by the simulation unit 102*a*2.

According to FIG. 56, first of all, possible upper and lower limits of a design parameter are determined (step S311). The parameter region determined at step S311 (the region defined by the upper and lower limits of the design parameter is referred to as the "parameter region") is divided and a sample of combination of N parameters is selected from the parameter region (a design parameter P$_i$ (i=1, . . . , N)) (step S312). The sample may be selected properly according to the experiences and the calculation results, etc., or, if there is no prior information, the parameter region may be divided equally for sampling.

An example will be described below where the purpose of designing is that "C" is contained in the word representation as a word representation representing the vortex closed state. Experiments and numerical calculations on a flow is performed with respect to each design parameter P$_i$ (i=1, . . . , N) (step S313). A word representation and a regular representation are assigned to each obtained result (step S314). It is determined whether the word representation is a structure representation with a subword IC representing the optimum state or with its corresponding regular expression (step S315). When the word representation is a structure representation with a subword IC representing the optimum state or with its corresponding regular expression (YES at step S315), the design parameter is adopted as a possible design parameter (step S316). On the other hand, when the word representation is not a structure representation with a subword IC representing the optimum state or with its corresponding regular expression (NO at step S315), it is determined whether the word representation is a structure representation with a subword IC representing the optimum state or with its corresponding regular expression via one transition (step S320). When the word representation is a structure representation with a subword IC representing the optimum state or with its corresponding regular expression via one transition (YES at step S320), the design parameter is adopted as a possible design parameter (step S316). When the word representation is not a structure representation with a subword IC representing the optimum state or with its corresponding regular expression via one transition (one transition from a structurally stable flow pattern to a structurally unstable flow pattern in an intermediate state) (NO at step S320), the design parameter is not adopted as a possible design parameter.

At step S317, it is determined whether there is a possible design parameter (step S317). When there is a possible design parameter (YES at step S317), an existing optimization method is applied to the possible design parameter (step S319). In addition to applying the existing optimization method, calculating a word representation and a regular expression necessarily and monitoring them at each stage in the optimization process enables optimization of quantitative flow and optimization designing enabling optimization of ideal streamline structure simultaneously.

When there is no possible design parameter (NO at step S317), the parameter region is further divided (step S318) and executes the processing at steps S313 to S317.

Figure 57:
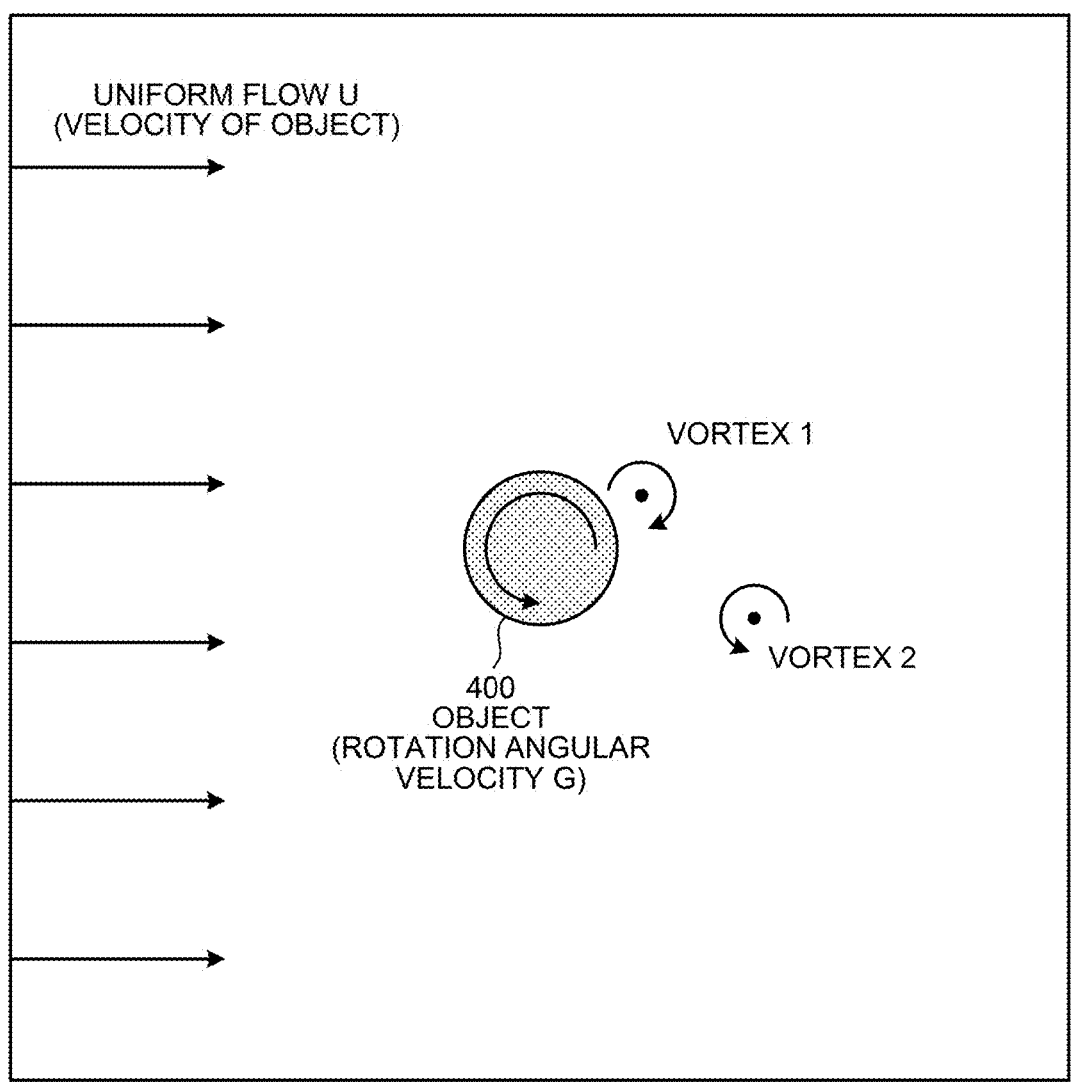
FIG. 57 is a diagram for explaining a specific example for explaining the method of designing an object in a fluid by using word representations and regular expressions.
Figure 58:
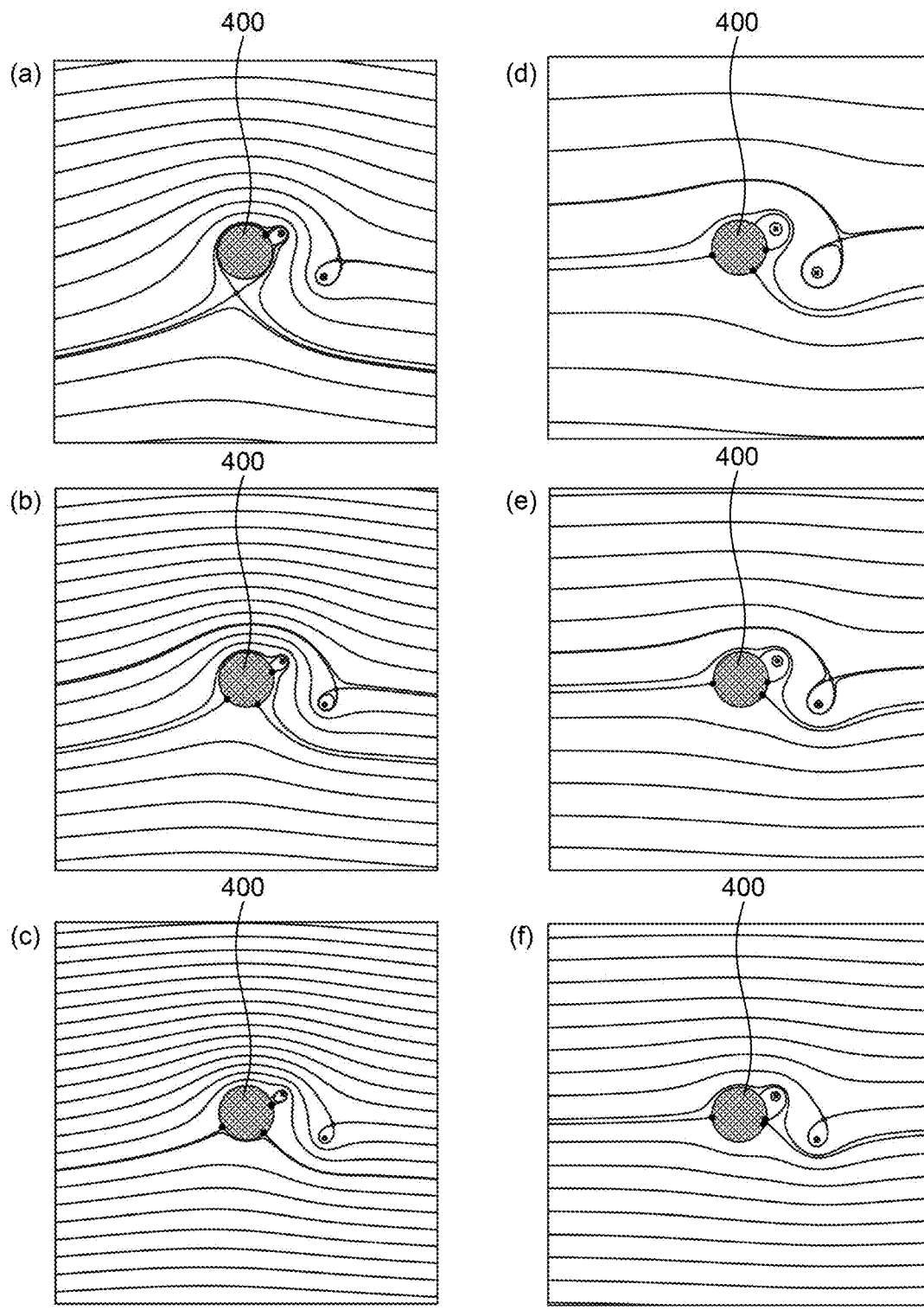
FIG. 58 is a diagram for explaining the exemplary specific example for explaining the method of designing an object in a fluid by using word representations and regular expressions.

FIGS. 57 and 58 are diagrams for explaining an exemplary specific example for explaining the above-described method of designing an object in a fluid by using word representations and regular expressions. FIG. 57 assumes circumstances where there exist two vortex structures (Vortex 1 and Vortex 2) behind an object 400 placed in a uniform flow. Let U denote the velocity of uniform flow (or the traveling speed of the object). It is assumed that the object 400 is capable of rotating at an angular velocity G. It is assumed that the intensity and position of the vortices are already given in the flow, and it is considered to optimize an apparatus that "closes" Vortex 1 in to maximize the lift to which the object 400 is subjected and causes Vortex 2 to be away from the object along the flow by searching for "parameters U and G". Because the vortex closed state can be expressed by the word representation "C" and the vortex to be away can be represented by "A$_O$", the designing method is applied to narrow down the parameter region to achieve the word representation IA$_O$C representing the targeted circumstances.

Regarding the design parameter, U is variable from 0 to 1.1 and G is variable from $-1.6 \times 2\pi$ to $1.6 \times 2\pi$ (upper and lower limits of the design parameter is determined at step S311). These parameter sections are divided into five sections to divide the design parameter region (step S312). The results of executing steps S313 to S320 are (a) to (f) in FIG. 58. According to the designing method, the optimization designing is achieved between "$0.5 \leq U \leq 0.9$ and $G = -0.8 \times 2\pi$" (corresponding to (a) to (c) in FIG. 58) and "$0.3 \leq U \leq 0.7$ and $G=0$" (corresponding to (d) to (f) in FIG. 58). Owing to narrowing down the possible parameters, dividing these parameter regions is further repeated to search for the best parameter region maximizing the quantitative quantity, such as the lift. Accordingly, it is possible to know the velocity of the object 400 and each rotation velocity for maximizing the lift by closing the vortex.

As described above, according to the second embodiment, when there are multiple possible transition routes, one transition route is specified by using the regular expressions having one-to-one correspondence to the flow patterns, which thus makes it possible to specify the transition route without performing pattern matching even when there are multiple selection routes.

According to the second embodiment, when there are multiple possible transition routes, regular expressions corresponding respectively to the word representations of two structurally stable flow patterns are acquired and, regarding the multiple possible transition routes, when the subrepresentation for causing the transition is not contained in the regular expression corresponding to the word representation of one of the structurally stable flow patterns, the possible transition route is excluded from possible transition routes. In this manner, by only comparing the subrepresentation of the possible transition route with the regular expression, it is possible to exclude the possible transition route via which the flow pattern would never transition.

According to the second embodiment, when there are multiple possible transition routes that are not excluded, regular expressions corresponding respectively to the multiple possible transition routes that are not excluded are acquired and a possible transition route whose corresponding regular expression matches the regular expression corresponding to the word representation of the other structurally stable flow pattern, among the possible transition routes that are not excluded, is specified as the transition pattern. Accordingly, only comparing the regular expressions with each other makes it possible to specify one transition route.

According to the second embodiment, the regular expression creating method of creating a regular expression of a flow pattern in a multiply connected exterior domain with N (N is an integer equal to or larger than 1) holes topologically includes the graph representation creating step of creating a graph representation having one-to-one correspondence to the flow pattern and the regular expression creating step of creating a regular expression from the graph representation that is created at the graph representation creating step. Accordingly, it is possible to provide a new representation method enabling one-to-one correspondence to the flow pattern.

According to the second embodiment, the graph representation is obtained by assigning a unique rooted, labeled and directed tree $T_H=(V,E)$ (where V is a set of points called vertices and E is a set of edges connecting the vertices) to a structurally stable Hamiltonian vector field H defined by a flow pattern and then visualizing the tree as a plane graph. Accordingly, for a structurally stable Hamiltonian vector field, it is possible to provide, as a graph representation, one obtained by visualizing a unique rooted, labeled and directed tree into a plane graph.

According to the second embodiment, the graph representation may be obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to the rules of a given order relation and drawing arrows from l(v) to l(w) from left to right for w∈Γ(v). Accordingly, it is possible to provide a graph representation in which parent-child connected relation can be seen by sight.

According to the second embodiment, the flow pattern may be at least one of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes. Accordingly, it is possible to assign regular expressions to all basic flow patterns and deal with regular expressions of specific flow patterns.

According to the second embodiment, the word representation conversion step of converting a regular expression created at the regular expression creating step into a word representation is included. Accordingly, it is possible to convert a regular expression into a word representation.

According to the second embodiment, the word representation is a sign word that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes. Accordingly, it is possible to convert regular expressions into all basic flow patterns and the word representations that define the five types of operations that can be topologically adopted.

According to the second embodiment, as in word representation, it is possible to provide the regular expression creating method, the regular expression creating device, and the program for flow patterns that make it possible to easily deal with flow patterns that can be adopted to structures without depending on experiences and intuition. Use of both word representation and regular expression makes it possible to limit ones that cannot limit specific flows with only word representations and further develop the theory of flow optimum control.

According to the second embodiment, word representations and regular expressions are extremely useful in various fields involving designing and layout of structures, such as designing bridge piers, a layout of a breakwater, removal of contaminants at harbors, designing blades for wind power generation, a structure of pantograph of train, and the optimum layout of oil fences. It is also possible to apply them to fields, such as sport dynamics, for designing the structures of sports goods.

INDUSTRIAL APPLICABILITY

As described in detail above, according to the present invention, it is possible to provide a fluid transition route acquisition apparatus, a fluid transition route acquisition method, and a program that make it possible to obtain knowledge on flow pattern transition. For example, they are extremely useful in various fields accompanying designing and controlling the shape and layout of a structure and prediction of change of a fluid, such as designing a flying object, a structure of a pantograph of a train, a structure of an automobile, such as a racing car, designing sports goods for, for example, ski jumping, designing a high speed vessel, and weather forecasting. Particularly, they are extremely useful in fields where layout designing of a flow field and a large number of structures contained in the flow field is important (such as designing bridge piers, a layout of a breakwater, removal of contaminants at harbors, designing blades for wind power generation, designing wings of an aircraft, and the optimum layout of oil fences).

REFERENCE SIGNS LIST 100, 101 FLUID TRANSITION ROUTE ACQUISITION APPARATUS
102 CONTROL UNIT
102, 102a2 SIMULATION UNIT
102b STREAMLINE ANALYZING UNIT
102c PATTERN WORD ASSIGNING UNIT
102e OPERATION WORD ASSIGNING UNIT
102f MAXIMAL WORD REPRESENTATION UNIT
102g, 102g2 TRANSITION INFORMATION ACQUISITION UNIT
104 COMMUNICATION CONTROL INTERFACE UNIT
106 STORAGE UNIT
106a SIMULATION RESULT FILE
106b STREAMLINE DIAGRAM FILE
106c PATTERN TRANSITION FILE
108 INPUT/OUTPUT CONTROL INTERFACE UNIT
112 INPUT DEVICE
114 OUTPUT DEVICE
120 REGULAR EXPRESSION FORMING UNIT
120a GRAPH REPRESENTATION CREATING UNIT
120b REGULAR EXPRESSION CREATING UNIT
120c WORD REPRESENTATION CREATING UNIT
200 EXTERNAL SYSTEM
300 NETWORK

The invention claimed is:

1. A system for optimizing structure designing, comprising a fluid transition route acquisition apparatus, an input device, and an output device, wherein:
the fluid transition route acquisition apparatus comprises a storage unit and a control unit,
the storage unit storing pattern transition information on whether a structurally stable flow pattern in whole or in part of a topological two-dimensional flow structure can transition to another structurally stable flow pattern via a structurally unstable flow pattern in an intermediate state, and
the control unit including:
a transition information acquisition unit that, according to the pattern transition information, acquires transition information on a transition route leading from a specified structurally stable flow pattern to another structurally stable flow pattern that can be topologically adopted; and
a simulation unit that, according to a design variable representing a shape of a structure, performs simulation of a fluid with respect to the structure;
the input device is configured to receive a user-specified structurally stable flow pattern; and
the output device is configured to produce transition information on a transition route leading from the user-specified structurally stable flow pattern to another structurally stable flow pattern that can be topologically adopted;
and wherein:
the structurally stable flow pattern is identified by a word representation that is formed by assigning any one of operation words that define five types of operations that can be topologically adopted to add one hole to a flow pattern, for the number of times corresponding to the number of added holes, to pattern words that define three types of flow patterns in total including, in addition to two types of flow patterns that can be topologically adopted in a simply connected exterior domain with one hole, a pattern without any 1 source-sink point in a doubly connected exterior domain with two holes;
the pattern transition information is information in which the structurally stable flow patterns that can transition to each other via the structurally unstable flow pattern in the intermediate state are described with the word representations;
the transition information acquisition unit acquires the transition information according to the pattern transition information by using the word representation of the specified structurally stable flow pattern as a reference; and
the simulation unit, while changing the design variable representing the shape of the structure, searches such that the flow pattern of the fluid with respect to the structure matches the transition information.

2. The system for optimizing structure designing according to claim 1, wherein the transition information includes information on the structurally unstable flow pattern in the intermediate state to the another structurally stable flow pattern.

3. The system for optimizing structure designing according to claim 1, wherein according to the pattern transition information, the transition information acquisition unit acquires the transition information leading from one of two specified structurally stable flow patterns to the other structurally stable flow pattern.

4. The system for optimizing structure designing according to claim 3, wherein the transition information acquisition unit acquires the transition information including the number of transitions each leading from one of the structurally stable flow patterns to the other structurally stable flow pattern, in which transition via the structurally unstable flow pattern in the intermediate state is regarded as one transition.

5. The system for optimizing structure designing according to claim 4, wherein the transition information acquisition unit acquires the transition information leading from one of the structurally stable flow patterns to the other structurally stable flow pattern with the minimum number of transitions.

6. The system for optimizing structure designing according to claim 1, wherein
the pattern transition information includes information on a change in operation word for word representation between the structurally stable flow patterns that can transition to each other via the structurally unstable flow pattern in the intermediate state, and
the transition information acquisition unit acquires the transition information according to the information on the change by using the change in operation word for word representation between two specified structurally stable flow patterns as a reference.

7. The system for optimizing structure designing according to claim 1, wherein
when there are multiple possible transition routes that are acquired according to the pattern transition information by using the word representation of the specified structurally stable flow pattern as a reference, the transition information acquisition unit specifies one transition route by using a regular expression with one-to-one correspondence to the flow pattern.

8. The system for optimizing structure designing according to claim 7, wherein
when there are multiple possible transition routes that are acquired according to the information on the change by using the change in operation word for word representation between the specified two structurally stable flow patterns as a reference, the transition information acquisition unit acquires regular expressions corresponding respectively to the word representations of the two structurally stable flow patterns and, regarding the multiple possible transition routes, when a subrepresentation for causing the transition is not included in the regular expression corresponding to the word representation of one of the structurally stable flow patterns, the transition information acquisition unit excludes it from possible transition routes.

9. The system for optimizing structure designing according to claim 8, wherein
when there are multiple possible transition routes that are not excluded, the transition information acquisition unit acquires regular expressions corresponding respectively to the multiple possible transition routes that are not excluded and specifies, as a transition pattern, a possible transition route, among the multiple possible transition routes that are not excluded, whose corresponding regular expression matches the regular expression corresponding to the word representation of the other structurally stable flow pattern.

10. The system for optimizing structure designing according to claim 7, wherein the regular expression is created according to a graph representation with one-to-one correspondence with the flow pattern.

11. The system for optimizing structure designing according to claim 10, wherein the graph representation is obtained by assigning a unique rooted, labeled and directed tree $T_H=(V,E)$ (where V is a set of points called vertices and E is a set of edges connecting the vertices) to a structurally stable Hamiltonian vector field H defined by the flow pattern and then visualizing the tree as a plane graph.

12. The system for optimizing structure designing according to claim 7, wherein the simulation unit, to select a possible design parameter for an object in a fluid, sets an upper limit and a lower limit of the design parameter, selects multiple parameters from a parameter region defined by the upper limit and the lower limit, performs experiments and/or numerical calculations on a flow with respect to the selected multiple parameters, assigns word representations and/or regular expressions to the results of experiments and/or numerical calculations, and selects, as the possible design parameter, a design parameter having the word representation and/or regular expression representing an optimum state among the assigned word representations and/or regular expressions.

13. The system for optimizing structure designing according to claim 12, wherein even in a case where the assigned word representations and/or regular expressions do not include the word representation and/or regular expression representing the optimum state, the simulation unit selects the design parameter as the possible design parameter when the word representations and/or regular expressions include the word representation and/or regular expression representing the optimum state via one transition.

14. A method performed by a computer for optimizing structure designing, the method comprising:
acquiring, according to a pattern transition information, transition information on a transition route leading from a specified structurally stable flow pattern to another structurally stable flow pattern that can be topologically adopted, the pattern transition information relating to whether a structurally stable flow pattern in whole or in part of a topological two-dimensional flow structure can transition to another structurally stable flow pattern via a structurally unstable flow pattern in an intermediate state;
storing the pattern transition information;
receiving a user-specified structurally stable flow pattern;
producing transition information on a transition route leading from the user-specified structurally stable flow pattern to another structurally stable flow pattern that can be topologically adopted; and
performing, according to a design variable representing a shape of a structure, simulation of a fluid with respect to the structure;
wherein:
the structurally stable flow pattern is identified by a word representation that is formed by assigning any one of operation words that define five types of operations that can be topologically adopted to add one hole to a flow pattern, for the number of times corresponding to the number of added holes, to pattern words that define three types of flow patterns in total including, in addition to two types of flow patterns that can be topologically adopted in a simply connected exterior domain with one hole, a pattern without any 1 source-sink point in a doubly connected exterior domain with two holes;
the pattern transition information is information in which the structurally stable flow patterns that can transition to each other via the structurally unstable flow pattern in the intermediate state are described with the word representations;
in the acquiring step, the transition information is acquired according to the pattern transition information by using the word representation of the specified structurally stable flow pattern as a reference; and
in the performing step, while changing the design variable representing the shape of the structure, search is conducted such that the flow pattern of the fluid with respect to the structure matches the transition information.

15. A non-transitory computer-readable medium comprising computer readable program codes for optimizing structure designing, performed by a computer, the program codes when executed causing the computer to execute:
acquiring, according to a pattern transition information, transition information on a transition route leading from a specified structurally stable flow pattern to another structurally stable flow pattern that can be topologically adopted, the pattern transition information relating to whether a structurally stable flow pattern in whole or in part of a topological two-dimensional flow structure can transition to another structurally stable flow pattern via a structurally unstable flow pattern in an intermediate state;
storing the pattern transition information;
receiving a user-specified structurally stable flow pattern;
producing transition information on a transition route leading from the user-specified structurally stable flow pattern to another structurally stable flow pattern that can be topologically adopted; and
performing, according to a design variable representing a shape of a structure, simulation of a fluid with respect to the structure;

wherein:
the structurally stable flow pattern is identified by a word representation that is formed by assigning any one of operation words that define five types of operations that can be topologically adopted to add one hole to a flow pattern, for the number of times corresponding to the number of added holes, to pattern words that define three types of flow patterns in total including, in addition to two types of flow patterns that can be topologically adopted in a simply connected exterior domain with one hole, a pattern without any 1 source-sink point in a doubly connected exterior domain with two holes;

the pattern transition information is information in which the structurally stable flow patterns that can transition to each other via the structurally unstable flow pattern in the intermediate state are described with the word representations;

in the acquiring step, the transition information is acquired according to the pattern transition information by using the word representation of the specified structurally stable flow pattern as a reference; and in the performing step, while changing the design variable representing the shape of the structure, search is conducted such that the flow pattern of the fluid with respect to the structure matches the transition information.

* * * * *